US009016092B2

(12) United States Patent
Hachitani et al.

(10) Patent No.: US 9,016,092 B2
(45) Date of Patent: Apr. 28, 2015

(54) GLASS FOR MAGNETIC RECORDING MEDIA SUBSTRATES, MAGNETIC RECORDING MEDIA SUBSTRATES, MAGNETIC RECORDING MEDIA AND METHOD FOR PREPARATION THEREOF

(75) Inventors: Yoichi Hachitani, Shinjuku-ku (JP); Kinobu Osakabe, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 12 days.

(21) Appl. No.: 12/933,398

(22) PCT Filed: Mar. 18, 2009

(86) PCT No.: PCT/JP2009/001203

§ 371 (c)(1), (2), (4) Date: Dec. 20, 2010

(87) PCT Pub. No.: WO2009/116278

PCT Pub. Date: Sep. 24, 2009

(65) Prior Publication Data

US 2011/0086241 A1 Apr. 14, 2011

(30) Foreign Application Priority Data

Mar. 19, 2008 (JP) ................................ 2008-072096
Jun. 30, 2008 (JP) ................................ 2008-170845

(51) Int. Cl.

| | |
|---|---|
| ***G11B 5/735*** | (2006.01) |
| ***C03B 11/00*** | (2006.01) |
| ***C03B 19/00*** | (2006.01) |
| ***G11B 5/84*** | (2006.01) |
| ***C03C 3/083*** | (2006.01) |
| ***C03C 3/085*** | (2006.01) |
| ***C03C 3/087*** | (2006.01) |
| ***C03C 3/095*** | (2006.01) |
| ***C03C 3/097*** | (2006.01) |
| ***G11B 5/73*** | (2006.01) |

(52) U.S. Cl.

CPC ............. *G11B 5/8404* (2013.01); *C03C 3/083* (2013.01); *C03C 3/085* (2013.01); *C03C 3/087* (2013.01); *C03C 3/095* (2013.01); *C03C 3/097* (2013.01); *G11B 5/7315* (2013.01)

(58) Field of Classification Search

CPC . C03C 3/087; C03C 2203/10; G11B 2220/20

USPC .................. 428/64.4, 426, 432, 846.9, 848.2, 428/848.6; 501/5, 33.1, 41, 56, 62, 63, 61, 501/64, 67, 11, 69, 68, 55; 65/25.3, 134.2, 65/134.3, 134.5, 195, 182.2, 114, 30.14; 359/619

See application file for complete search history.

(56) References Cited

U.S. PATENT DOCUMENTS

| | | | | |
|---|---|---|---|---|
| 6,627,566 | B1 | 9/2003 | Zou | |
| 6,743,529 | B2 | 6/2004 | Saito et al. | |
| 2002/0009602 | A1* | 1/2002 | Kitayama et al. | 428/64.4 |
| 2002/0023463 | A1* | 2/2002 | Siebers et al. | 65/134.2 |
| 2002/0049128 | A1* | 4/2002 | Koyama et al. | 501/70 |
| 2002/0127432 | A1* | 9/2002 | Saito et al. | 428/848 |
| 2004/0018929 | A1* | 1/2004 | Zou | 65/33.1 |
| 2005/0013004 | A1* | 1/2005 | Miyakoshi et al. | 359/619 |
| 2005/0079391 | A1* | 4/2005 | Ikenishi et al. | 428/848 |
| 2005/0096209 | A1* | 5/2005 | Kase et al. | 501/70 |
| 2005/0178159 | A1* | 8/2005 | Shiraishi et al. | 65/182.2 |
| 2005/0181218 | A1* | 8/2005 | Shiraishi et al. | 428/426 |
| 2005/0209083 | A1* | 9/2005 | Takagi et al. | 501/69 |
| 2005/0244656 | A1* | 11/2005 | Ikenishi et al. | 428/426 |
| 2006/0042317 | A1* | 3/2006 | Miyamoto | 65/61 |
| 2006/0068209 | A1* | 3/2006 | Hirose et al. | 428/426 |
| 2010/0167091 | A1* | 7/2010 | Tachiwana et al. | 428/846.9 |
| 2010/0215993 | A1* | 8/2010 | Yagi et al. | 428/846.9 |

FOREIGN PATENT DOCUMENTS

| | | | | |
|---|---|---|---|---|
| CN | 1290665 A | | 4/2001 | |
| CN | 100482606 C | | 4/2009 | |
| JP | 2002-293571 | * | 3/2001 | C05C 4/03 |
| JP | 2002293571 A | | 10/2002 | |
| SU | 399469 A | | 10/1973 | |
| SU | 399469 | * | 11/1974 | C03C 5/00 |
| SU | 1284958 A | | 1/1987 | |
| WO | 2007142324 A1 | | 12/2007 | |
| WO | WO 2007/142324 | * | 12/2007 | C03C 3/087 |

OTHER PUBLICATIONS

Translation JP 2001-076336, Hasimoto et al, Mar. 2001.*
Machine translation JP2002-293571, Mar. 2001.*
Official Action dated Jul. 26, 2012 issued by the Intellectual Property Office of Singapore in corresponding Singapore Patent Application No. 201006757-7.
Official Action dated Jul. 5, 2012 issued by the State Intellectual Property Office of China in corresponding Chinese Patent Application No. 200980109840.9.
Official Action dated Dec. 13, 2011 issued by the European Patent Office in counterpart European Patent Application No. 09 722 430. 7-1217.
Official Action dated Apr. 24, 2012 issued by the European Patent Office in counterpart European Patent Application No. 09 722 430. 7-1217.

(Continued)

*Primary Examiner* — Kevin Bernatz
(74) *Attorney, Agent, or Firm* — Sughrue Mion, PLLC

(57) ABSTRACT

A glass for a magnetic recording medium substrate permitting the realization of a magnetic recording medium substrate affording good chemical durability and having an extremely flat surface, a magnetic recording medium substrate comprised of this glass, a magnetic recording medium equipped with this substrate, and methods of manufacturing the same. The glass is an oxide glass not including As or F.

20 Claims, 2 Drawing Sheets

(56) References Cited

OTHER PUBLICATIONS

Chinese Office Action issued Jan. 31, 2012 in corresponding Chinese Patent Application No. 200980109840.9.

European Office Action corresponding to European Patent Application No. 09722430.7, dated Nov. 23, 2012.

Chinese Office Action corresponding to Chinese Patent Application No. 200980109840.9, dated Dec. 6, 2012.

English language translation of International Preliminary Report on Patentabliltiy and Written Opinion.

Office Action issued in Taiwanese Patent Application No. 098108960 dated Sep. 18, 2013.

Notice of Reasons for Rejection issued in corresponding Japanese Patent Application No. 2010-503777 dated Jan. 7, 2014.

Office Action, dated Mar. 31, 2014, issued by the State Intellectual Property Office of the People's Republic of China, in counterpart Application No. 201210177048.0.

Communication dated Jun. 20, 2014, issued by the Intellectual Property Office of Singapore in corresponding Application No. 201006757-7.

European Search Report corresponding to European Patent Application No. 09722430.7, dated Mar. 31, 2011.

* cited by examiner

GLASS FOR MAGNETIC RECORDING MEDIA SUBSTRATES, MAGNETIC RECORDING MEDIA SUBSTRATES, MAGNETIC RECORDING MEDIA AND METHOD FOR PREPARATION THEREOF

CROSS-REFERENCES TO RELATED PATENT APPLICATIONS

The present application claims priority under Japanese Patent Application 2008-72096, filed on Mar. 19, 2008, and Japanese Patent Application 2008-170845, filed on Jun. 30, 2008, the entire contents of which are hereby incorporated by reference.

PRIOR ART

The present invention relates to a glass employed in the substrates of magnetic recording media such as hard disks, a magnetic recording medium substrate comprised of this glass, and a magnetic recording medium equipped with this substrate. The present invention further relates to a method for manufacturing the magnetic recording medium substrate, and a method for manufacturing the magnetic recording medium.

BACKGROUND ART

With developments in electronics technology, particularly information-related technology typified by computers, demand for information-recording media such as magnetic disks, optical disks, and magnetooptical disks has increased quickly. The main component elements of magnetic storage devices such as computers are a magnetic recording medium and a magnetic head for magnetic recording and reproduction. Flexible disks and hard disks are known as magnetic recording media. Among these, there exist substrate materials in the form of aluminum substrates, glass substrates, ceramic substrates, carbon substrates, and the like for hard disks (magnetic disks). In practical terms, aluminum substrates and glass substrates are primarily employed, depending on size and application. However, with the reduction in size of the hard disk drives employed in notebook computers and the increased density of magnetic recording, the requirements imposed on disk substrate surface flatness and thickness reduction have become quite stringent. Thus, aluminum substrates, which afford poor processability, strength, and rigidity, are inadequate. Accordingly, glass substrates for magnetic disks affording high strength, high rigidity, high impact resistance, and high surface flatness have made an appearance.

In recent years, vertical magnetic recording methods have been employed in an attempt to achieve higher recording densities in information-recording media (for example, high recording densities of 100 Gbit/inch$^2$ or greater). The use of vertical magnetic recording methods permits a marked increase in recording density. Additionally, achieving a high recording density requires greatly reducing the distance (referred to as the "flying height" in magnetic recording media) between the heads for reading and writing data (such as magnetic heads) and the medium surface, to 8 nm or less. However, when the substrate surface is not smooth, irregularities on the substrate surface are reflected on the medium surface, precluding a reduction in the distance between the heads and the recording medium, and hindering improvement in linear recording density. Thus, achieving high recording density through the use of a vertical magnetic recording method requires a glass substrate for use in an information-recording medium with a markedly better degree of flatness than in the past.

Since adhesion of foreign matter to the glass substrate of an information-recording medium is unacceptable, adequate cleaning must be conducted. Cleaning agents such as acids and alkalis are employed in cleaning. However, when the chemical durability (acid and alkali resistance) of the glass constituting the substrate is inadequate, the manufacturing process ends up producing surface roughness, even when the substrate surface is finished for flatness. Even slight surface roughness makes it difficult to achieve a medium substrate with the level of flatness required by vertical recording methods. Thus, increasing the linear density of an information-recording medium requires a substrate material having good chemical durability.

[Patent Document 1] International Patent Application Publication No. 2007-142324 (WO 2007/142324) (the entire contents of which are hereby incorporated by reference).

DISCLOSURE OF THE INVENTION

Problem to be Solved by the Invention

With the increasing recording density of magnetic recording media, a substrate glass having extremely few bubbles in addition to chemical durability is required. This goes beyond even the level of residual bubbles that is required of optical glass.

When even extremely small bubbles remain in the glass, minute voids corresponding to bubbles appear in the substrate surface in the course of polishing the glass and shaping the substrate surface, forming localized pits and reducing the flatness of the substrate surface.

In the glass disclosed in Patent Document 1, to increase chemical durability and achieve the properties required of a glass for use in a magnetic recording medium substrate, the content of $SiO_2$ and $Al_2O_3$ among the glass components is increased. To the extent that chemical durability does not decrease, $Li_2O$ and $Na_2O$ are incorporated, having the effect of maintaining melting properties, the coefficient of thermal expansion, and the like. However, in such glass, problems occur because, despite a lower glass melting temperature than in nonalkali glass, the melting temperature increases in alkali-containing glasses for magnetic recording medium substrates, making it difficult to effectively remove bubbles, due to the relation between the glass temperature and viscosity during the clarification step with $Sb_2O_3$, which has conventionally been employed as a clarifying agent.

The present invention, devised to solve such problems, has for its object to provide: a glass for a magnetic recording medium substrate permitting the realization of a magnetic recording medium substrate affording good chemical durability and having an extremely flat surface, a magnetic recording medium substrate comprised of this glass, a magnetic recording medium equipped with this substrate, and methods of manufacturing the same.

Means of Solving the Problem

The present invention, which solves the above-stated problems, is as follows:

[1]

A glass for a magnetic recording medium substrate, comprised of an oxide glass, characterized:

by comprising, denoted as mass percentages:

Si 20 to 40 percent,

Al 0.1 to 10 percent,

Li 0.1 to 5 percent,

Na 0.1 to 10 percent,

K 0 to 5 percent (where the total content of Li, Na, and K is 15 percent or less), Sn 0.005 to 0.6 percent, and Ce 0 to 1.2 percent;

in that the Sb content is 0 to 0.1 percent; and by not comprising As or F.

[2]

The glass for a magnetic recording medium substrate according to [1], further characterized in that the ratio of the Ce content to the Sn content, Ce/Sn, falls within a range of 0 to 2.1.

[3]

The glass for a magnetic recording medium substrate according to [1], further characterized in that the ratio of the Ce content to the Sn content, Ce/Sn, falls within a range of 0.02 to 1.3.

[4]

The glass for a magnetic recording medium substrate according to any one of [1] to [3], further characterized by not comprising Sb.

[5]

The glass for a magnetic recording medium substrate according to any one of [1] to [4], comprising, denoted as mass percentages:

Mg 0 to 5 percent,

Ca 0 to 5 percent,

Sr 0 to 2 percent, and

Ba 0 to 2 percent.

[6]

The glass for a magnetic recording medium substrate according to any one of [1] to [5], further characterized by comprising 0.1 to 10 mass percent of Zr, Ti, La, Nb, Ta, and Hf in total.

[7]

The glass for a magnetic recording medium substrate according to any one of [1] to [6], characterized by a total content of Mg, Ca, Sr, and Ba of 0 to 10 percent.

[8]

The glass for a magnetic recording medium substrate according to any one of [1] to [7], characterized in that the total content of Si and Al is 30 mass percent or greater, and by having a viscous property whereby the viscosity at 1,400° C. is $10^3$ dPa·s or lower.

[9]

The glass for a magnetic recording medium substrate according to any one of [1] to [8], comprising, denoted as mass percentages:

Si 28 to 34 percent,

Al 6 to 10 percent (where the total content of Si and Al is 37 percent or greater), Li 0.1 to 3 percent, Na 5 to 10 percent, K 0.1 to 1 percent (where the total content of Li, Na, and K is 7 to 13 percent), Mg 0.1 to 2 percent, Ca 0.1 to 2 percent, Sr and Ba in total 0 to 1 percent, Zr 1 to 5 percent, B 0 to 1 percent, and Zn 0 to 1 percent.

[10]

The glass for a magnetic recording medium substrate according to any one of [1] to [8], comprising, denoted as mass percentages:

Si 28 to 34 percent,

Al 6 to 10 percent (where the total content of Si and Al is 37 percent or greater), Li 1 to 5 percent, Na 1 to 10 percent, K 0.1 to 3 percent (where the total content of Li, Na, and K is 5 to 11 percent), Mg 0 to 2 percent, Ca 0 to 2 percent, Sr 0 to 1 percent, Ba 0 to 1 percent, Zr, Ti, La, Nb, Ta, and Hf in total 1 to 10 percent, B 0 to 1 percent, Zn 0 to 1 percent, and P 0 to 1 percent.

[11]

A method for manufacturing a glass for a magnetic recording medium substrate comprised of an oxide glass, characterized by:

preparing a glass starting material to which Sn, and optionally Ce, are added, comprising, denoted as mass percentages:

Si 20 to 40 percent,

Al 0.1 to 10 percent,

Li 0.1 to 5 percent,

Na 0.1 to 10 percent,

K 0 to 5 percent (wherein the total content of Li, Na, and K is 15 percent or lower), Sn 0.005 to 0.6 percent, Ce 0 to 1.2 percent, and so as to permit obtaining a glass comprising 0 to 0.1 percent of Sb and no As or F;

melting the glass starting material;

clarifying the resulting glass melt; and then molding the resulting glass melt.

[12]

The method for manufacturing a glass for a magnetic recording medium substrate according to [11], further characterized by:

preparing a glass starting material comprising a ratio of Ce content to Sn content, Ce/Sn, falling within a range of 0.02 to 1.3;

maintaining the resulting glass melt at 1,400 to 1,600° C.;

decreasing the temperature;

maintaining the temperature at 1,200 to 1,400° C.; and conducting molding.

[13]

The method for manufacturing a glass for a magnetic recording medium substrate according to [11] or [12], wherein the viscosity of the glass melt at 1,400° C. is $10^3$ dPa·s or lower.

[14]

The method for manufacturing a glass for a magnetic recording medium substrate according to any one of [11] to [13], wherein the quantities of Sn and Ce added are established so as to achieve a density of residual bubbles in the glass of 60 bubbles/kg or lower.

[15]

A glass for a magnetic recording medium substrate comprised of oxide glass, characterized:

by comprising, as converted based on the oxide, denoted as molar percentages:

$SiO_2$ 60 to 75 percent,
$Al_2O_3$ 1 to 15 percent,
$Li_2O$ 0.1 to 20 percent,
$Na_2O$ 0.1 to 15 percent, and
$K_2O$ 0 to 5 percent (where the total content of $Li_2O$, $Na_2O$, and $K_2O$ is 25 percent or lower);

in that, based on the total amount of the glass components, 0.01 to 0.7 mass percent of Sn oxide and 0 to 1.4 mass percent of Ce oxide are added;

in that the content of Sb oxide is 0 to 0.1 mass percent; and by not comprising As or F.

[16]

The glass for a magnetic recording medium substrate according to [15], further characterized in that the ratio of the content of Ce oxide to the content of Sn oxide (Ce oxide/Sn oxide) as denoted by mass percentages falls within a range of 0 to 2.0.

[17]

The glass for a magnetic recording medium substrate according to [15], further characterized in that the ratio of the content of Ce oxide to the content of Sn oxide (Ce oxide/Sn oxide) as denoted by mass percentages falls within a range of 0.02 to 1.2.

[18]

The glass for a magnetic recording medium substrate according to any one of [15] to [17], further characterized by not comprising Sb.

[19]

The glass for a magnetic recording medium substrate according to any one of [15] to [18], comprising, denoted as molar percentages:

MgO 0 to 10 percent,
CaO 0 to 10 percent,
SrO 0 to 5 percent, and
BaO 0 to 5 percent.

[20]

The glass for a magnetic recording medium substrate according to any one of [15] to [19], characterized by comprising 0.1 to 5 molar percent of $ZrO_2$, $TiO_2$, $La_2O_3$, $Nb_2O_5$, $Ta_2O_5$, and $HfO_2$ in total.

[21]

The glass for a magnetic recording medium substrate according to any one of [15] to [20], characterized by comprising a total content of 0.1 to 10 molar percent of MgO, CaO, SrO, and BaO.

[22]

The glass for a magnetic recording medium substrate according to any one of [15] to [21], characterized in that the total content of $SiO_2$ and $Al_2O_3$ is 65 molar percent or greater, and by having a viscous property such that the viscosity at 1,400° C. is $10^3$ dPa·s or lower.

[23]

The glass for a magnetic recording medium substrate according to any one of [15] to [22], comprising, denoted as mass percentages:

$SiO_2$ 66 to 70 percent,
$Al_2O_3$ 7 to 12 percent (where the total content of $SiO_2$ and $Al_2O_3$ is 75 percent or greater), $Li_2O$ 5 to 10 percent,
$Na_2O$ 8 to 13 percent,
$K_2O$ 0.1 to 2 percent (wherein the total content of $Li_2O$, $Na_2O$, and $K_2O$ is 15 to 22 percent), MgO 0.1 to 5 percent,
CaO 0.1 to 5 percent,
SrO and BaO in total 0 to 1 percent,
$ZrO_2$ 0.1 to 2 percent,
$B_2O_3$ 0 to 1 percent, and
ZnO 0 to 1 percent.

[24]

The glass for a magnetic recording medium substrate according to any one of [15] to [22], comprising, denoted as mass percentages:

$SiO_2$ 66 to 70 percent,
$Al_2O_3$ 5 to 12 percent,
$Li_2O$ 5 to 20 percent,
$Na_2O$ 1 to 13 percent,
$K_2O$ 0.1 to 2 percent (wherein the total content of $Li_2O$, $Na_2O$, and $K_2O$ is 18 to 22 percent), MgO and CaO in total 0 to 5 percent,
SrO and BaO in total 0 to 5 percent,
$ZrO_2$, $TiO_2$, $La_2O_3$, $Nb_2O_5$, $Ta_2O_5$, and $HfO_2$ in total 0.1 to 5 percent,
$B_2O_3$ 0 to 3 percent,
ZnO 0 to 1 percent, and
$P_2O_5$ 0 to 0.5 percent.

[25]

The glass for a magnetic recording medium substrate according to any one of [15] to [24], characterized by exhibiting an acid resistant property such that the etching rate when immersed in a 0.5 volume percent hydrogenfluosilicic acid aqueous solution maintained at 50° C. is 3.0 nm/minute or less and an alkali resistant property such that the etching rate when immersed in a 1 mass percent potassium hydroxide aqueous solution maintained at 50° C. is 0.1 nm/minute or less.

[26]

A method for manufacturing a glass for a magnetic recording medium substrate comprised of an oxide glass, characterized by:

preparing a glass starting material to which Sn, and optionally Ce, are added, comprising, as converted based on the oxides, denoted as molar percentages:

$SiO_2$ 60 to 75 percent,
$Al_2O_3$ 1 to 15 percent,
$Li_2O$ 0.1 to 20 percent,
$Na_2O$ 0.1 to 15 percent, and
$K_2O$ 0 to 5 percent (wherein the total content of $Li_2O$, $Na_2O$, and $K_2O$ is 25 percent or lower);

so as to permit obtaining a glass comprising 0 to 0.1 percent of Sb, no As or F, and, based on the total amount of the glass components, 0.01 to 0.7 mass percent of Sn oxide and 0 to 1.4 mass percent of Ce oxide;

melting the glass starting material;

clarifying the resulting glass melt; and molding the resulting glass melt.

[27]

The method for manufacturing a glass for a magnetic recording medium substrate according to [26], further comprising:

mixing the glass starting material so that the ratio of the content of Ce oxide to the content of Sn oxide (Ce oxide/Sn oxide) denoted as a mass percentage falls within a range of 0.02 to 1.2, melting the starting material, maintaining the resulting glass melt at 1,400 to 1,600° C., reducing the temperature, maintaining the temperature at 1,200 to 1,400° C., and molding the glass melt.

[28]

The method for manufacturing a glass for a magnetic recording medium substrate according to [26] or [28], wherein the quantities of Sn and Ce added are established to achieve a density of residual bubbles in the glass of 60 bubbles/kg or lower.

[29]

The method for manufacturing a glass for a magnetic recording medium substrate according to any one of [26] to [28], wherein the quantities of Sn and Ce added are established to achieve a density of residual bubbles in the glass of 60 bubbles/kg or lower.

[30]

The method for manufacturing a glass for a magnetic recording medium substrate according to any one of [11] to [14] and [26] to [29], wherein the glass melt is made to flow out to obtain glass melt gobs, and the glass gobs are press molded.

[31]

The method for manufacturing a glass for a magnetic recording medium substrate according to any one of [11] to [14] and [26] to [29], wherein the glass melt is molded into a sheet of glass by the float method.

[32]

The method for manufacturing a glass for a magnetic recording medium substrate according to any one of [11] to [14] and [26] to [29], wherein the glass melt is molded into a sheet of glass by overflow down draw molding.

[33]

The glass for a magnetic recording medium substrate according to any one of [1] to [10] and [15] to [25] that has been subjected to a chemical strengthening treatment.

[34]

A magnetic recording medium substrate comprised of the glass described in any one of [1] to [10], [15] to [25], and [33].

[35]

The magnetic recording medium substrate according to claim 34, wherein roughness Ra of the main surface is less than 0.25 nm.

[36]

The magnetic recording medium substrate according to claim 34 or [35], characterized by a bending strength of 10 kg or greater.

[37]

The magnetic recording medium substrate of any one of claims 34 to [36], having a disklike shape and a thickness of 1 mm or less.

[38]

A method for manufacturing a magnetic recording medium substrate, comprising the steps of:

mirror-surface polishing the glass described in any one of [1] to [10], [15] to [25], and [33], and following mirror-surface polishing, subjecting the glass to a cleaning step in which the glass is cleaned with an acid and cleaned with an alkali.

[39]

The method for manufacturing a magnetic recording medium substrate according to [38], further comprising a step of subjecting the glass to a chemical strengthening treatment between the mirror-surface polishing step and the cleaning step.

[40]

A method for manufacturing a magnetic recording medium substrate, comprising the steps of:

manufacturing a glass by the method described in any one of [11] to [14] and [26] to [32], mirror-surface polishing the glass, and following mirror surface polishing, subjecting the glass to a cleaning step in which the glass is cleaned with an acid and cleaned with an alkali.

[41]

The method for manufacturing a magnetic recording medium substrate of [40], additionally comprising a step of subjecting the glass to a chemical strengthening treatment between the mirror-surface polishing step and the cleaning step.

[42]

A magnetic recording medium having an information recording layer on the magnetic recording medium substrate described in any one of claims 34 to [37].

[43]

The magnetic recording medium according to [42], suited to a vertical magnetic recording method.

[44]

A method for manufacturing a magnetic recording medium, comprising:

preparing a magnetic recording medium substrate by the method described in any one of [38] to [41] and forming an information recording layer on the substrate.

[45]

A glass for a magnetic recording medium substrate comprised of oxide glass, characterized:

by comprising, converted based on the oxide, denoted as molar percentages:

$SiO_2$ 60 to 75 percent, $Al_2O_3$ 1 to 15 percent, $Li_2O$ 0.1 to 20 percent, $Na_2O$ 0.1 to 15 percent, $K_2O$ 0 to 5 percent (where the total content of $Li_2O$, $Na_2O$, and $K_2O$ is 25 percent or less);

by comprising a 0.1 to 3.5 mass percent of total content of Sn oxide and Ce oxide, based on the total amount of the glass components;

in that the ratio of the Sn oxide content to the total content of Sn oxide and Ce oxide (Sn oxide content/(Sn oxide content+Ce oxide content)) is 0.01 to 0.99;

in that the Sb oxide content is 0 to 0.1 percent; and by comprising no As or F.

[46]

The glass for a magnetic recording medium substrate according to [45], further characterized in that the ratio of the Sn oxide content to the total content of Sn oxide and Ce oxide (Sn oxide content/(Sn oxide content+Ce oxide content)) is ⅓ or greater.

[47]

The glass for a magnetic recording medium substrate according to [45], further characterized in that the ratio of the Sn oxide content to the total content of Sn oxide and Ce oxide (Sn oxide content/(Sn oxide content+Ce oxide content)) falls within a range of 0.45 to 0.98.

[48]

The glass for a magnetic recording medium substrate according to any one of [45] to [47], further characterized by not containing Sb.

[49]

The glass for a magnetic recording medium substrate according to any one of [45] to [48], comprising, denoted as molar percentages:

MgO 0 to 10 percent,

CaO 0 to 10 percent,

SrO 0 to 5 percent,

BaO 0 to 5 percent, $B_2O_3$ 0 to 3 percent,
$P_2O_5$ 0 to 1 percent, and
ZnO 0 to 3 percent.

[50]

The glass for a magnetic recording medium substrate according to any one of [45] to [49], further characterized by comprising a total content of $ZrO_2$, $TiO_2$, $La_2O_3$, $Nb_2O_5$, $Ta_2O_5$, and $HfO_2$ of 0.1 to 5 molar percent.

[51]

The glass for a magnetic recording medium substrate according to any one of [45] to [50], further characterized by comprising a total content of MgO, CaO, SrO, and BaO of 0.1 to 10 molar percent.

[52]

The glass for a magnetic recording medium substrate of any one of [45] to [51], further characterized in that the total content of $SiO_2$ and $Al_2O_3$ is 65 molar percent or greater and by having a viscous property such that the viscosity at 1,400° C. is $10^3$ dPa·s or lower.

[53]

The glass for a magnetic recording medium substrate of any one of [45] to [52], comprising, denoted as mass percentages:

$SiO_2$ 66 to 70 percent,
$Al_2O_3$ 7 to 12 percent
(where the total content of $SiO_2$ and $Al_2O_3$ is 75 percent or greater),
$Li_2O$ 5 to 10 percent,
$Na_2O$ 8 to 13 percent,
$K_2O$ 0.1 to 2 percent
(wherein the total content of $Li_2O$, $Na_2O$, and $K_2O$ is 15 to 22 percent),
MgO 0.1 to 5 percent,
CaO 0.1 to 5 percent,
SrO and BaO in total 0 to 1 percent,
$ZrO_2$ 0.1 to 2 percent,
$B_2O_3$ 0 to 1 percent, and
ZnO 0 to 1 percent.

[54]

The glass for a magnetic recording medium substrate of any one of [45] to [52], comprising, denoted as mass percentages:

$SiO_2$ 66 to 70 percent,
$Al_2O_3$ 5 to 12 percent,
$Li_2O$ 5 to 20 percent,
$Na_2O$ 1 to 13 percent,
$K_2O$ 0.1 to 2 percent
(wherein the total content of $Li_2O$, $Na_2O$, and $K_2O$ is 18 to 22 percent),
MgO and CaO in total 0 to 5 percent,
SrO and BaO in total 0 to 5 percent,
$ZrO_2$, $TiO_2$, $La_2O_3$, $Nb_2O_5$, $Ta_2O_5$, and $HfO_2$ in total 0.1 to 5 percent,
$B_2O_3$ 0 to 3 percent,
ZnO 0 to 1 percent, and
$P_2O_5$ 0 to 0.5 percent.

[55]

The glass for a magnetic recording medium substrate according to any one of [45] to [54], characterized by exhibiting an acid resistant property such that the etching rate when immersed in a 0.5 volume percent hydrogenfluosilicic acid aqueous solution maintained at 50° C. is 3.0 nm/minute or less and an alkali resistant property such that the etching rate when immersed in a 1 mass percent potassium hydroxide aqueous solution maintained at 50° C. is 0.1 nm/minute or less.

[56]

A method for manufacturing a glass for a magnetic recording medium substrate comprised of an oxide glass, characterized by:

preparing a glass starting material to which Sn and Ce are added, comprising, as converted based on the oxide, denoted as molar percentages:

$SiO_2$ 60 to 75 percent,
$Al_2O_3$ 1 to 15 percent,
$Li_2O$ 0.1 to 20 percent,
$Na_2O$ 0.1 to 15 percent, and
$K_2O$ 0 to 5 percent
(wherein the total content of $Li_2O$, $Na_2O$, and $K_2O$ is 25 percent or lower);

and, so as to permit obtaining a glass containing a total quantity of Sn oxide and Ce oxide of 0.1 to 3.5 mass percent based on the total amount of the glass components, wherein the ratio of the content of Sn oxide to the total content Sn oxide and Ce oxide (content of Sn oxide/(content of Sn oxide+content of Ce oxide)) is 0.01 to 0.99, having an Sb oxide content of 0 to 0.1 percent, and comprising no As or F;

melting the glass starting material;
clarifying the resulting glass melt; and
molding the resulting glass melt.

[57]

The method for manufacturing a glass for a magnetic recording medium substrate according to [56], wherein the glass melt obtained by preparing and melting the glass starting material is maintained at 1,400 to 1,600° C., the temperature is decreased, the glass melt is maintained at 1,200 to 1,400° C., and the glass melt is molded.

[58]

The method for manufacturing a glass for a magnetic recording medium substrate according to [56] or [57], wherein the viscosity of the glass melt at 1,400° C. is $10^3$ dPa·s or lower.

[59]

The method for manufacturing a glass for a magnetic recording medium substrate of any one of [56] to [58], wherein the quantities of Sn and Ce added are established so as to achieve a density of residual bubbles in the glass of 60 bubbles/kg or less.

[60]

The method for manufacturing a glass for a magnetic recording medium substrate according to any one of [56] to [59], wherein the glass melt is made to flow out to obtain glass melt gobs and the glass gobs are press molded.

[61]

The method for manufacturing a glass for a magnetic recording medium substrate according to any one of [56] to [59], wherein the glass melt is molded into a sheet of glass by the float method.

[62]

The method for manufacturing a glass for a magnetic recording medium substrate according to any one of [56] to [59], wherein the glass melt is molded into a sheet of glass by overflow down draw molding.

[63]

The glass for a magnetic recording medium substrate of any one of [45] to [55] that has been subjected to a chemical strengthening treatment.

[64]

A magnetic recording medium substrate being composed of the glass described in any one of [45] to [55] and [61].

[65]

The magnetic recording medium substrate according to [64], wherein roughness Ra of the main surface is less than 0.25 nm.

[66]

The magnetic recording medium substrate according to [64] or [65], further characterized by exhibiting a bending strength of 10 kg or greater.

[67]

The magnetic recording medium substrate described in any one of [64] to [66], having a disklike shape and a thickness of 1 mm or less.

[68]

A method for manufacturing a magnetic recording medium substrate, comprising:

a step of mirror-surface polishing the glass described in any one of [45] to [55] and [61]; and following mirror-surface polishing, a cleaning step of cleaning with an acid and cleaning with an alkali.

[69]

A method for manufacturing the magnetic recording medium substrate according to [68], further comprising a step of subjecting the glass to a chemical strengthening treatment between the mirror-surface polishing step and the cleaning step.

[70]

A method for manufacturing a magnetic recording medium substrate, comprising:

a step of preparing a glass by the method described in any one of [56] to [62], a step of mirror-surface polishing the glass, and following mirror-surface polishing, a cleaning step of cleaning with an acid and cleaning with an alkali.

[71]

The method for manufacturing a magnetic recording medium substrate according to [70], further comprising a step of subjecting the glass to a chemical strengthening treatment between the mirror-surface polishing step and the washing step.

[72]

A magnetic recording medium comprising an information recording layer on the magnetic recording medium substrate described in any one of [64] to [67].

[73]

The magnetic recording medium according to [72], suited to a vertical recording method.

[74]

A method for manufacturing a magnetic recording medium, comprising:

preparing a magnetic recording medium substrate according to the method described in any one of [68] to [71]; and forming an information recording layer on the substrate.

[75]

A glass for a magnetic recording medium substrate comprised of oxide glass, characterized:

by comprising, denoted as mass percentages:

Si 20 to 40 percent,

Al 0.1 to 10 percent,

Li 0.1 to 5 percent,

Na 0.1 to 10 percent,

K 0 to 5 percent (where the total content of Li, Na, and K is 15 percent or less), Sn 0.005 to 0.6 percent, and Ce 0 to 1.2 percent;

in that the Sb content is 0 to 0.1 percent;

by not comprising As or F; and by having a λ(lambda)80 of 320 nm or greater.

[76]

A glass for a magnetic recording medium substrate comprised of oxide glass, characterized:

by comprising, as converted based on the oxides, denoted as molar percentages:

$SiO_2$ 60 to 75 percent, $Al_2O_3$ 1 to 15 percent, $Li_2O$ 0.1 to 20 percent, $Na_2O$ 0.1 to 15 percent, and $K_2O$ 0 to 5 percent (where the total content of $Li_2O$, $Na_2O$, and $K_2O$ is 25 percent or lower);

in that, based on the total amount of the glass components, 0.01 to 0.7 mass percent of Sn oxide and 0 to 1.4 mass percent of Ce oxide are added;

in that the content of Sb oxide is 0 to 0.1 mass percent;

by not comprising As or F; and by having a λ(lambda)80 of 320 nm or greater.

[77]

A glass for a magnetic recording medium substrate comprised of oxide glass, characterized:

by comprising, converted based on the oxide, denoted as molar percentages:

$SiO_2$ 60 to 75 percent, $Al_2O_3$ 1 to 15 percent, $Li_2O$ 0.1 to 20 percent, $Na_2O$ 0.1 to 15 percent, and $K_2O$ 0 to 5 percent (where the total content of $Li_2O$, $Na_2O$, and $K_2O$ is 25 percent or less);

by comprising a 0.1 to 3.5 mass percent total content of Sn oxide and Ce oxide, based on the total amount of the glass components;

in that the ratio of the Sn oxide content to the total content of Sn oxide and Ce oxide (Sn oxide content/(Sn oxide content+Ce oxide content)) is 0.01 to 0.99;

in that the Sb oxide content is 0 to 0.1 percent;

by comprising no As or F; and by having a λ(lambda)80 of 320 nm or greater.

Advantages of the Invention

The present invention provides a glass for a magnetic recording medium substrate permitting the achievement of a magnetic recording medium substrate having good chemical durability and an extremely flat surface, a magnetic recording medium substrate comprised of this glass, a magnetic recording medium equipped with the substrate, and methods of manufacturing the same.

BEST MODES OF CARRYING OUT THE INVENTION

The glass for a magnetic recording medium substrate of the present invention is an amorphous glass and is comprised of two forms. In the first form (referred to as "glass I"), the proportions of the atoms constituting the glass are specified by mass ratio. In the second form (referred to as "glass II"), the contents of the various oxides, as converted based on the oxides, are specified. There is also a third form (referred to as "glass III") of the glass for a magnetic recording medium substrate of the present invention, an amorphous glass, in which the contents of the various oxides as converted based on the oxides, are specified.

A far flatter substrate surface can be achieved with amorphous glass than with crystalline glass.

[Glass I]

Glass I of the present invention is a glass for a magnetic recording medium substrate, comprised of an oxide glass, characterized:

by comprising, based on mass:

Si 20 to 40 percent,

Al 0.1 to 10 percent,

Li 0.1 to 5 percent,

Na 0.1 to 10 percent,

K 0 to 5 percent (where the total content of Li, Na, and K is 15 percent or less), Sn 0.005 to 0.6 percent, and Ce 0 to 1.2 percent;

in that the Sb content is 0 to 0.1 percent; and by not comprising As or F.

In glass I, the contents and total contents of the various components are expressed as mass percentages, unless specifically stated otherwise.

Si is a network-forming component of glass. It is an essential component that serves to enhance glass stability, chemical durability, and particularly, acid resistance; it also serves to lower thermal diffusion in the substrate; and increase the heating efficiency of the substrate by radiation. When the Si content is less than 20 percent, these functions are not adequately performed. When 40 percent is exceeded, unmelted material is produced in the glass, the viscosity of the glass during clarification becomes excessively high, and bubble elimination is inadequate. When a substrate is formed of glass containing unmelted material, protrusions due to unmelted material are formed on the surface of the substrate by polishing, precluding use as a magnetic recording medium substrate, for which an extremely high degree of surface flatness is required. In glass containing bubbles, when a portion of the bubbles are exposed on the substrate surface by grinding, they become pits, compromising flatness on the main surface of the substrate, thereby precluding its use as a magnetic recording medium substrate. Thus, the Si content is 20 to 40 percent, desirably falling within a range of 25 to 35 percent, and preferably falling within a range of 28 to 34 percent.

Al contributes to the formation of the glass network, and serves to enhance glass stability and chemical durability. When the Al content is less than 0.1 percent, these functions cannot be adequately performed, and when 10 percent is exceeded, the meltability of the glass diminishes and unmelted material tends to be produced. Accordingly, the Al content is 0.1 to 10 percent, desirably falling within a range of 1 to 10 percent, preferably falling within a range of 5 to 10 percent, more preferably falling within a range of 6 to 10 percent, and still more preferably, falling within a range of 7 to 10 percent.

Both Si and Al are components that contribute to enhancing chemical durability. To further enhance chemical durability, it is desirable for the total content of Si and Al to be 30 percent or greater, preferably 32 percent or greater, more preferably 35 percent or greater, still more preferably 36 percent or greater, and yet more preferably, 37 percent or greater. Increasing the total content of Si and Al lowers the thermoconductivity of the glass, increasing the heating efficiency of the substrate during manufacturing of a magnetic recording medium.

Li is an essential component that serves to strongly increase the meltability and moldability of the glass, even in alkalis. It is also desirable for imparting suitable thermal expansion characteristics to a magnetic recording medium substrate by increasing the coefficient of thermal expansion. In chemically strengthened glass, it serves as a component that supports ion exchange during chemical strengthening. When the Li content is less than 0.1 percent, these functions cannot be adequately achieved. In particular, in glass I, in which relatively large quantities of Si and Al are incorporated to enhance chemical durability, an Li content of less than 0.1 percent results in an excessively high viscosity of the glass during clarification, precluding an adequate clarifying effect. When the Li content exceeds 5 percent, chemical durability, particularly acid resistance, diminishes. In addition, when the glass is formed into a substrate, the amount of alkali leaching out from the substrate surface increases. The precipitating alkali damages the information recording layer and the like. Accordingly, the Li content is 0.1 to 5 percent, desirably falling within a range of 1 to 5 percent, preferably a range of 1 to 4 percent, and still more preferably, a range of 1 to 3 percent.

Na is an essential component that serves to enhance glass meltability and moldability, and is desirable for imparting suitable thermal expansion characteristics to a magnetic recording medium substrate by increasing the coefficient of thermal expansion. In a chemically strengthened glass, it serves as a component that supports ion exchange during chemical strengthening. When the Na content is less than 0.1 percent, these functions cannot be adequately achieved. In particular, in glass I, in which relatively large quantities of Si and Al are incorporated to enhance chemical durability, an Na content of less than 0.1 percent results in an excessively high viscosity of the glass during clarification, precluding an adequate clarifying effect. When the Na content exceeds 10 percent, chemical durability, particularly acid resistance, diminishes. In addition, when the glass is formed into a substrate, the amount of alkali leaching out from the substrate surface increases. The precipitating alkali damages the information recording layer and the like. Accordingly, the Na content is 0.1 to 10 percent, desirably falling within a range of 1 to 10 percent, preferably a range of 5 to 10 percent.

Li and Na are essential components in glass I, producing effects by reducing and preventing the leaching out of alkalis from the glass surface due to the effect of alkali mixing.

K is an optional component that serves to enhance glass meltability and moldability, and is desirable for imparting suitable thermal expansion characteristics to a magnetic recording medium substrate by increasing the coefficient of thermal expansion. However, when the content of K exceeds 5 percent, chemical durability, particularly acid durability, diminishes. In addition, when the glass is formed into a substrate, the amount of alkali leaching out of the substrate surface increases, and the precipitating alkali damages the information recording layer and the like. Accordingly, the content of K is 0 to 5 percent, desirably falling within a range of 0 to 3 percent, and preferably falling within a range of 0.1 to 1 percent.

In glass I, the total content of Li, Na, and K is limited to 15 percent or less to achieve good chemical durability. The total content of Li, Na, and K desirably falls within a range of 5 to 15 percent, preferably within a range of 5 to 13 percent, more preferably within a range of 5 to 12 percent, still more preferably within a range of 5 to 11 percent, and yet more preferably, within a range of 7 to 11 percent.

In glass I, which contains relatively large quantities of Si and Al, the temperature of the glass during clarification is high, despite containing Li and Na. In such a glass, Sb has a poorer clarifying effect than Sn or Ce, described further below. In a glass to which Sn is added, the clarifying effect ends up deteriorating. When the Sb content exceeds 0.1 percent, the coexistence of Sn causes the residual bubbles in the glass to increase sharply. Accordingly, the Sb content is limited to 0.1 percent or less in glass I. The Sb content desirably falls within a range of 0 to 0.08 percent, preferably within a range of 0 to 0.05 percent, still more preferably within a range of 0 to 0.02 percent, and yet more preferably, within a range of 0 to 0.01 percent. The addition of no Sb (glass containing no Sb) is particularly desirable. Not incorporating Sb (rendering the glass "Sb-free") reduces the density of residual bubbles in the glass to a range of from about one part in several to about one percent.

Sb has a greater effect on the environment than Sn or Ce. Thus, reducing the Sb content, or using no Sb at all, reduces the effect on the environment.

Although a powerful clarifying agent, As is desirably not incorporated (rendering the glass "As-free") because it is toxic. Further, although F exhibits a clarifying effect, it volatizes during glass manufacturing, causing the properties and characteristics of the glass to fluctuate, and creating problems in terms of stable melting and molding. Further, volatization causes the generation of heterogenous portions, called striae, in the glass. When striae are present in the glass and polishing is conducted, slight differences in the rates at which the glass is removed in striae portions and homogenous portions produce irregularities on the polished surface, which are undesirable in magnetic recording medium substrates for which a high degree of flatness is required. Accordingly, As and F are not incorporated into glass I.

Glass I is prepared by the steps of melting a glass starting material, clarifying the glass melt obtained by melting the glass starting material, homogenizing the clarified glass melt, causing the homogenized glass melt to flow out, and molding it. In this process, the clarifying step is conducted at a relatively high temperature and the homogenizing step at a relatively low temperature. In the clarifying step, bubbles are actively produced in the glass, and clarification is promoted by incorporating minute bubbles contained in the glass to form large bubbles, which then tend to rise. Additionally, an effective method of eliminating bubbles is to incorporate as a glass component oxygen that is present as a gas within the glass in a state where the temperature of the glass is lowered as it flows out.

Sn and Ce also have the effects of releasing and incorporating gases. Sn strongly serves to promote clarification by actively releasing oxygen primarily at high temperature (in a temperature range of about 1,400 to 1,600° C.), while Ce strongly serves to incorporate oxygen at a low temperature state (a temperature range of about 1,200 to 1,400° C.), fixing it as a glass component. By coexisting Sn and Ce, which exhibit good clarifying effects at different temperature ranges in this manner, it is possible to adequately eliminate bubbles even in glasses in which the incorporation of Sb, As, and F is limited.

Sn is necessarily incorporated in a quantity of 0.005 percent or greater to achieve the above clarifying effect. However, when 0.6 percent is exceeded, metallic tin precipitates out into the glass. When the glass is polished to prepare a substrate, protrusions of metallic tin are produced on the substrate surface, and areas in which metallic tin drops out of the surface form pits, risking loss of the flatness of the substrate surface. Accordingly, the Sn content is 0.005 to 0.6 percent. From the above perspectives, the Sn content desirably falls within a range of 0.01 to 0.6 percent, preferably within a range of 0.06 to 0.6 percent, and more preferably, within a range of 0.1 to 0.6 percent.

Ce is desirably incorporated to enhance the clarifying effect. However, when 1.2 percent is exceeded, it reacts strongly with the refractory material and platinum constituting the melt vessel, and with the metal mold used to mold the glass. This increases impurities, negatively affecting the surface state. Accordingly, the Ce content is 0 to 1.2 percent. From the above perspective, the Ce content desirably falls within a range of 0 to 0.7 percent.

Sn and Ce serve to produce crystal nuclei when preparing crystalline glass. Since the glass in the present invention is employed in a substrate comprised of amorphous glass, it is desirable that no crystals precipitate during heating. Thus, the addition of excessive amounts of Sn and Ce is to be avoided.

As set forth above, since Sn releases oxygen gas into the glass melt at high temperature, when a large quantity of Sn is employed, the quantity of Ce, which incorporates oxygen gas present in the melt at low temperature, is also desirably increased. With this point in mind, preferred ranges of the Sn and Ce contents are given below.

When the Sn content is 0.005 percent or greater but less than 0.1 percent, the Ce content is desirably kept to 0 to 0.4 percent, preferably 0.0001 to 0.2 percent, and more preferably, 0.001 to 0.12 percent.

When the Sn content is 0.1 percent or greater but less than 0.14 percent, the Ce content is desirably kept to 0 to 0.4 percent, preferably 0.0005 to 0.4 percent, and more preferably, 0.003 to 0.14 percent.

When the Sn content is 0.14 percent or greater but less than 0.28 percent, the Ce content is desirably kept to 0 to 0.4 percent, preferably 0.0005 to 0.4 percent, more preferably 0.001 to 0.36 percent, and still more preferably, 0.001 to 0.3 percent.

When the Sn content is 0.28 percent or greater but less than 0.3 percent, the Ce content is desirably kept to 0 to 0.4 percent, preferably 0.0005 to 0.4 percent, more preferably 0.001 to 0.4 percent, and still more preferably, 0.006 to 0.4 percent.

When the Sn content is 0.3 percent or greater but less than 0.35 percent, the Ce content is desirably kept to 0 to 0.4 percent, preferably 0.0004 to 0.6 percent, more preferably 0.0005 to 0.5 percent, and still more preferably, 0.006 to 0.4 percent.

When the Sn content is 0.35 percent or greater but less than 0.43 percent, the Ce content is desirably kept to 0.0004 to 0.6 percent, preferably 0.0005 to 0.5 percent, and more preferably, 0.06 to 0.5 percent.

When the Sn content is 0.43 percent or greater but less than 0.45 percent, the Ce content is desirably kept to 0.0004 to 0.6 percent, preferably 0.0005 to 0.5 percent.

When the Sn content is 0.45 percent or greater but less than 0.5 percent, the Ce content is desirably kept to 0.0003 to 0.7 percent, preferably 0.005 to 0.6 percent, and more preferably, 0.006 to 0.5 percent.

For bubbles 0.3 mm and smaller in size (the size of bubbles (voids) remaining in the solidified glass), Sn works strongly to eliminate both relatively large and extremely small bubbles. Ce can be optionally added. However, the clarifying effect can be increased by keeping the ratio (by mass) of the Ce content to the Sn content, Ce/Sn, to 2.1 or lower.

When Ce is added along with Sn, the density of large bubbles of about 50 micrometers to 0.3 mm can be reduced to about one in several tens of parts. To achieve such an effect, the lower limit of the ratio (by mass) of the Ce content to the Sn content, Ce/Sn, is desirably 0.005, preferably 0.01, more preferably 0.02, still more preferably 0.03, yet more preferably 0.05, yet still more preferably 0.1, and even more preferably, 0.5. The upper limit of the ratio (by mass) of the Ce content to the Sn content, Ce/Sn, is desirably 2.0, preferably 1.8, more preferably 1.6, still more preferably 1.5, yet more preferably 1.4, yet still more preferably 1.3, even more preferably 1.2, and particularly preferably, 1.1.

From the above perspective, the total contents of Sn and Ce desirably falls within a range of 0.15 to 1.2 percent, preferably within a range of 0.15 to 0.8 percent.

A desirable form of glass I comprises:

Mg 0 to 5 percent,

Ca 0 to 5 percent,

Sr 0 to 2 percent, and

Ba 0 to 2 percent.

Mg serves to enhance glass meltability, moldability, and stability; heighten rigidity and hardness; and increase the coefficient of thermal expansion. However, the incorporation of an excessive quantity reduces chemical durability. Thus, the Mg content is desirably 0 to 5 percent. The Mg content preferably falls within a range of 0 to 2 percent, more preferably, within a range of 0.1 to 2 percent.

Ca specifically serves to enhance glass meltability, moldability, and stability; heighten rigidity and hardness; and increase the coefficient of thermal expansion. However, the incorporation of an excessive quantity reduces chemical durability. Thus, the Ca content is desirably 0 to 5 percent. The Ca content preferably falls within a range of 0 to 2 percent, more preferably, within a range of 0.1 to 2 percent.

Sr also serves to enhance glass meltability, moldability, and stability, and increase the coefficient of thermal expansion. However, the incorporation of an excessive quantity reduces chemical durability and increases the specific gravity and cost of starting materials. Thus, the Sr content is desirably 0 to 2 percent. The Sr content preferably falls within a range of 0 to 1 percent, more preferably within a range of 0 to 0.5 percent, and still more preferably, is zero.

Ba also serves to enhance glass meltability, moldability, and stability, and increase the coefficient of thermal expansion. However, the incorporation of an excessive quantity reduces chemical durability and increases the specific gravity and cost of starting materials. Thus, the Ba content is desirably 0 to 2 percent. The Ba content preferably falls within a range of 0 to 1 percent, more preferably within a range of 0 to 0.5 percent, and still more preferably, is zero.

To achieve meltability, moldability, glass stability, thermal expansion characteristics, and chemical durability, the total content of Mg, Ca, Sr, and Ba is desirably 0 to 10 percent, preferably 0 to 5 percent, and more preferably, 0.1 to 2 percent.

Since Mg and Ca are more desirable components than Sr and Ba among the alkaline earth metal components as set forth above, the total content of Mg and Ca is desirably 0 to 5 percent, preferably 0.1 to 5 percent. Further, the total content of Sr and Ba is desirably 0 to 2 percent, preferably 0 to 1 percent, and more preferably, zero.

Zr, Ti, La, Nb, Ta, and Hf serve to enhance chemical durability, particularly alkali resistance. However, when employed in excessive quantity, they reduce meltability. Thus, the total content of Zr, Ti, La, Nb, Ta, and Hf is desirably 0 to 10 percent, preferably 0.1 to 10 percent, and more preferably, 1 to 5 percent.

Of these, Zr does a particularly good job of enhancing chemical durability, particularly alkali resistance, while maintaining glass stability. It also serves to increase rigidity, toughness, and chemical strengthening efficiency. Accordingly, the Zr content is desirably 0 to 5 percent. The Zr content preferably falls within a range of 0.1 to 5 percent, more preferably a range of 1 to 2 percent.

To increase chemical durability, particularly alkali resistance, and chemical strengthening efficiency without compromising meltability, the ratio of the Zr content to the total content of Zr, Ti, La, Nb, Ta, and Hf is desirably 0.1 to 1, preferably 0.5 to 1, and more preferably, 1.

Sulfates can be added as clarifying agents to glass I in a range of 0 to 1 percent. However, they present a risk of unmelted material in the glass melt being scattered about by blowing, causing a sharp increase in foreign material in the glass. Thus, the incorporation of sulfates is undesirable.

By contrast, Sn and Ce do not present the problem of scattering by blowing or increased foreign material, and have good effects in eliminating bubbles.

Additional components that can be incorporated include B, which serves to reduce brittleness and enhance meltability. However, when introduced in excessive quantity, it diminishes chemical durability. The content thereof is thus desirably 0 to 2 percent, preferably 0 to 1 percent, and still more preferably, zero.

Zn serves to enhance meltability and increase rigidity. However, the incorporation of an excessive quantity reduces chemical durability and causes the glass to become brittle. Accordingly, the content thereof is desirably 0 to 3 percent, preferably 0 to 1 percent, and still more preferably, zero.

P can also be incorporated in small amounts without forfeiting the object of the invention. However, the incorporation of an excessive quantity reduces chemical durability. Thus, the content thereof is desirably 0 to 1 percent, preferably 0 to 0.5 percent, more preferably 0 to 0.2 percent, and still more preferably, zero.

From the perspectives of enhancing meltability, moldability, and glass stability; increasing chemical durability, particularly alkali resistance; increasing heating efficiency during manufacturing of a magnetic recording medium; suppressing the leaching out of alkali from the glass surface due to the mixed alkali effect; and the like, a particularly desirable form of glass I comprises, denoted as mass percentages:

Si 28 to 34 percent,

Al 6 to 10 percent (wherein the total content of Si and Al is 37 percent or greater), Li 0.1 to 3 percent, Na 5 to 10 percent, K 0.1 to 1 percent (where the total content of Li, Na, and K is 7 to 13 percent), Mg 0.1 to 2 percent, Ca 0.1 to 2 percent, Sr and Ba in total 0 to 1 percent, Zr 1 to 5 percent, B 0 to 1 percent, and Zn 0 to 1 percent (referred to as glass I-1).

A particularly desirable form of glass I-1 comprises:

Si 28 to 34 percent,

Al 6 to 10 percent (wherein the total content of Si and Al is 37 percent or greater), Li 1 to 3 percent, Na 6 to 10 percent, K 0.1 to 1 percent, Mg 0.1 to 2 percent, Ca 0.1 to 2 percent, Sr and Ba in total 0 to 0.7 percent, and Zr 1 to 3 percent.

This particularly desirable form affords the effects of a reduction in the specific gravity of the glass, further enhanced alkali resistance, and even better meltability.

From the perspectives of enhancing meltability, moldability, and glass stability; increasing chemical durability; and increasing heating efficiency during manufacturing of a magnetic recording medium, a desirable second form of glass I comprises, denoted as mass percentages:

Si 28 to 34 percent,
Al 6 to 10 percent
(wherein the total content of Si and Al is 37 percent or greater),
Li 1 to 5 percent,
Na 1 to 10 percent,
K 0.1 to 3 percent
(where the total content of Li, Na, and K is 5 to 11 percent),
Mg 0 to 2 percent,
Ca 0 to 2 percent,
Sr 0 to 1 percent,
Ba 0 to 1 percent,
Zr, Ti, La, Nb, Ta, and Hf in total 1 to 10 percent,
B 0 to 1 percent,
Zn 0 to 1 percent, and
P 0 to 1 percent
(referred to as glass I-2).

A particularly desirable form of glass I-2 comprises:

Si 28 to 34 percent,
Al 6 to 10 percent
(wherein the total content of Si and Al is 37 percent or greater),
Li 1 to 5 percent,
Na 1 to 10 percent,
K 0.1 to 3 percent
(where the total content of Li, Na, and K is 5 to 11 percent),
Mg, Ca, Sr, and Ba in total 0 to 1 percent, and
Ti, La, and Nb in total 3 to 8 percent.

This particularly desirable form affords the effect of limiting the quantity of alkaline earth metal components. The incorporation of Ti, La, and Nb produces better chemical durability. To obtain even better chemical durability, a glass comprising 0.5 to 2 percent of Ti, 1 to 3 percent of La, and 0.5 to 2 percent of Nb is preferred.

[Glass II]

Glass II will be described next.

Glass II is a glass for a magnetic recording medium substrate comprised of oxide glass, characterized:

by comprising, as converted based on the oxide, denoted as molar percentages:

$SiO_2$ 60 to 75 percent,
$Al_2O_3$ 1 to 15 percent,
$Li_2O$ 0.1 to 20 percent,
$Na_2O$ 0.1 to 15 percent, and
$K_2O$ 0 to 5 percent
(where the total content of $Li_2O$, $Na_2O$, and $K_2O$ is 25 percent or lower);

in that, based on the total amount of the glass components, 0.01 to 0.7 mass percent of Sn oxide and 0 to 1.4 mass percent of Ce oxide are added; in that the content of Sb oxide is 0 to 0.1 mass percent; and by not comprising As or F.

Below, unless specifically indicated otherwise, the contents of Sn oxide, Ce oxide, and Sb oxide in glass II are given in the form of quantities added as mass percentages based on the total amount of the glass components which are glass components excluding Sn oxide, Ce oxide and Sb oxide. Other component contents and total contents are given as molar percentages.

$SiO_2$, a glass network-forming component, is an essential component that serves to enhance glass stability, chemical durability, and particularly, acid resistance; lower thermal diffusion in the substrate; and increase the heating efficiency of the substrate by radiation. When the content of $SiO_2$ is less than 60 percent, these functions are not adequately performed. At greater than 75 percent, unmelted material is produced in the glass, the viscosity of the glass becomes excessively high during clarification, and bubble elimination becomes inadequate. When a substrate is formed of glass containing unmelted material, protrusions due to unmelted material are formed on the surface of the substrate by polishing, precluding use as a magnetic recording medium substrate for which an extremely high degree of surface flatness is required. In glass containing bubbles, when a portion of the bubbles are exposed on the substrate surface by grinding, they become pits, compromising flatness on the main surface of the substrate, thereby precluding use as a magnetic recording medium substrate. Thus, the $SiO_2$ content is 60 to 75 percent, desirably falling within a range of 65 to 75 percent, preferably falling within a range of 66 to 75 percent, and more preferably, falling within a range of 66 to 70 percent.

$Al_2O_3$ contributes to the formation of the glass network, and serves to enhance glass stability and chemical durability. When the $Al_2O_3$ content is less than 1 percent, these functions cannot be adequately performed, and when 15 percent is exceeded, the meltability of the glass diminishes and unmelted material tends to be produced. Accordingly, the $Al_2O_3$ content is 1 to 15 percent. The $Al_2O_3$ content desirably falls within a range of 5 to 13 percent, preferably within a range of 7 to 12 percent.

To enhance chemical durability, it is desirable for the total content of $SiO_2$ and $Al_2O_3$ to be 65 percent or greater, preferably 70 percent or greater, more preferably 73 percent or greater, still more preferably 74 percent or greater, yet more preferably, 75 percent or greater, and even more preferably, 75.5 percent or greater. Increasing the total content of $SiO_2$ and $Al_2O_3$ lowers the thermoconductivity of the glass, increasing the heating efficiency of the substrate during manufacturing of a magnetic recording medium.

$Li_2O$ is an essential component that serves to strongly increase the meltability and moldability of the glass, even in alkalis. It is also desirable for imparting suitable thermal expansion characteristics to a magnetic recording medium substrate by increasing the coefficient of thermal expansion. In chemically strengthened glass, it serves as a component that supports ion exchange during chemical strengthening. When the $Li_2O$ content is less than 0.1 percent, these functions cannot be adequately achieved. In particular, in glass II, in which relatively large quantities of $SiO_2$ and $Al_2O_3$ are incorporated to enhance chemical durability, an $Li_2O$ content of less than 0.1 percent results in an excessively high viscosity of the glass during clarification, precluding an adequate clarifying effect. Additionally, when the $Li_2O$ content exceeds 20 percent, chemical durability, particularly acid resistance, diminishes. When the glass is formed into a substrate, the amount of alkali leaching out from the substrate surface increases. The precipitating alkali damages the information recording layer and the like. Accordingly, the $Li_2O$ content is 0.1 to 20 percent. The $Li_2O$ content desirably falls within a range of 1 to 15 percent, preferably within a range of 5 to 10 percent.

$Na_2O$ is an essential component that serves to enhance glass meltability and moldability, and is desirable for imparting suitable thermal expansion characteristics to a magnetic recording medium substrate by increasing the coefficient of thermal expansion. In a chemically strengthened glass, it serves as a component that supports ion exchange during chemical strengthening. When the $Na_2O$ content is less than 0.1 percent, these functions cannot be adequately achieved. In particular, in glass II, in which relatively large quantities of $SiO_2$ and $Al_2O_3$ are incorporated to enhance chemical durability, an $Na_2O$ content of less than 0.1 percent results in an excessively high viscosity of the glass during clarification, precluding an adequate clarifying effect. Additionally, when the $Na_2O$ content exceeds 15 percent, chemical durability, particularly acid resistance, diminishes. When the glass is formed into a substrate, the amount of alkali leaching out from the substrate surface increases. The precipitating alkali damages the information recording layer and the like. Accordingly, the $Na_2O$ content is 0.1 to 15 percent, desirably falling within a range of 1 to 15 percent, preferably a range of 8 to 13 percent.

$Li_2O$ and $Na_2O$ are essential components in glass II, producing effects by reducing and preventing the leaching out of alkalis from the glass surface due to the effect of alkali mixing.

$K_2O$ is an optional component that serves to enhance glass meltability and moldability, and is desirable for imparting suitable thermal expansion characteristics to a magnetic recording medium substrate by increasing the coefficient of thermal expansion. However, when the content of $K_2O$ exceeds 5 percent, chemical durability, particularly acid durability, diminishes. When the glass is formed into a substrate, the amount of alkali leaching out of the substrate surface increases. The precipitating alkali damages the information recording layer and the like. Accordingly, the content of $K_2O$ is 0 to 5 percent, desirably falling within a range of 0.1 to 2 percent, and preferably falling within a range of 0.1 to 1 percent.

In glass II, the total content of $Li_2O$, $Na_2O$, and $K_2O$ is limited to 25 percent or less to achieve good chemical durability. However, in addition to serving to enhance meltability and moldability as well as serving to impart suitable thermal expansion characteristics to a magnetic recording medium substrate by increasing the coefficient of thermal expansion, $Li_2O$, $Na_2O$, and $K_2O$ also serve to lower the viscosity of the glass during clarification, promoting bubble elimination. When these factors are taken into account, the total content of $Li_2O$, $Na_2O$, and $K_2O$ desirably falls within a range of 15 to 25 percent. The lower limit of the total content of $Li_2O$, $Na_2O$, and $K_2O$ is preferably 18 percent, and the upper limit thereof is preferably 23 percent, more preferably 22 percent, still more preferably 21 percent, and yet still more preferably, 20 percent.

In glass II, which contains relatively large quantities of $SiO_2$ and $Al_2O_3$, the temperature of the glass during clarification is high, despite containing $Li_2O$ and $Na_2O$. In such a glass, Sb oxide has a poorer clarifying effect than Sn oxide or Ce oxide, described further below. In a glass to which Sn oxide is added, the clarifying effect ends up is deteriorated by Sb oxide. When the Sb oxide content exceeds 0.1 percent, the coexistence of Sn oxide causes the residual bubbles in the glass to increase sharply. Accordingly, the Sb oxide content is limited to 0.1 percent or less in glass II. The Sb oxide content desirably falls within a range of 0 to 0.1 percent, preferably within a range of 0 to 0.05 percent, still more preferably within a range of 0 to 0.01 percent, and yet more preferably, within a range of 0 to 0.001 percent. The addition of no Sb oxide (glass containing no Sb) is particularly desirable. Not incorporating Sb (rendering the glass "Sb-free") reduces the density of residual bubbles in the glass to a range of from about one part in several to about one percent. Here, the term "Sb oxide" means oxides such as $Sb_2O_3$ and $Sb_2O_5$ that have melted into the glass, irrespective of the valence number of Sb.

Sb oxide has a greater effect on the environment than Sn oxide or Ce oxide. Thus, reducing the Sb oxide content, or using no Sb at all, is desirable because it lessens the effect on the environment.

Although As is a powerful clarifying agent, the glass is desirably rendered As-free due to the toxicity of this element. Further, although F exhibits a clarifying effect, it volatizes during glass manufacturing, causing the properties and characteristics of the glass to fluctuate, and creating problems in terms of stable melting and molding. Further, volatization causes the generation of heterogeneous portions, called striae, in the glass. When striae are present in the glass and polishing is conducted, slight differences in the rates at which the glass is removed in striae portions and homogenous portions produce irregularities on the polished surface, which are undesirable in magnetic recording medium substrates for which a high degree of flatness is required. Accordingly, As and F are not incorporated into glass II.

Glass II is prepared by the steps of melting a glass starting material, clarifying the glass melt that has been obtained by melting the glass starting material, homogenizing the clarified glass melt, causing the homogenized glass melt to flow out, and molding it. In this process, the clarifying step is conducted at a relatively high temperature and the homogenizing step at a relatively low temperature. In the clarifying step, bubbles are actively produced in the glass, and clarification is promoted by incorporating minute bubbles contained in the glass to form large bubbles, which then tend to rise. Additionally, an effective method of eliminating bubbles is to incorporate, as a glass component, oxygen that is present as a gas within the glass in a state where the temperature of the glass is lowered as it flows out.

The clarification mechanisms of Sn and Ce are as set forth above. By coexisting Sn oxide and Ce oxide, it is possible to adequately eliminate bubbles even in glasses in which the incorporation of Sb, As, and F is limited.

Sn oxide is necessarily incorporated in a quantity of 0.01 percent or greater to achieve the above clarifying effect. However, when 0.7 percent is exceeded, metallic tin precipitates out into the glass. When the glass is polished to prepare a substrate, protrusions of metallic tin are produced on the substrate surface, and areas in which metallic tin drops out of the surface form pits, risking loss of the flatness of the substrate surface. Accordingly, the Sn oxide content is 0.01 to 0.7 percent. From the above perspectives, the Sn oxide content desirably falls within a range of 0.1 to 0.6 percent, preferably within a range of 0.15 to 0.5 percent. Here, the term "Sn oxide" means oxides such as $SnO$ and $SnO_2$ that have melted into the glass, irrespective of the valence of Sn. The Sn oxide content is the total content of oxides such as $SnO$ and $SnO_2$.

Ce oxide is desirably incorporated to enhance the clarifying effect. However, when 1.4 percent is exceeded, it reacts strongly with the refractory material and platinum constituting the melting vessel, and reacts strongly with the metal mold used to mold the glass. This increases impurities, negatively affecting the surface state. Accordingly, the Ce oxide content is 0 to 1.4 percent. The Ce oxide content desirably falls within a range of 0 to 0.7 percent, preferably within a range of 0.003 to 0.7 percent. Here, the term "Ce oxide" means oxides such as $CeO_2$ and $Ce_2O_3$ that have melted into the glass, irrespective of the valence of Ce. The Ce oxide content is the total content of oxides such as $CeO_2$ and $Ce_2O_3$.

Sn and Ce serve to produce crystal nuclei when preparing crystalline glass. Since the glass in the present invention is employed in a substrate comprised of amorphous glass, it is desirable that no crystals precipitate during heating. Thus, the addition of excessive amounts of Sn oxide and Ce oxide is to be avoided.

As set forth above, since Sn oxide releases oxygen gas into the glass melt at high temperature, when a large quantity of Sn oxide is employed, the quantity of Ce oxide, which incorporates oxygen gas present in the melt at low temperature, is also desirably increased. With this point in mind, preferred ranges of the Sn oxide and Ce oxide contents are given below.

When the Sn oxide content is 0.1 percent or greater but less than 0.15 percent, the Ce oxide content is desirably kept to 0 to 0.45 percent, preferably 0 or greater but less than 3 percent, more preferably 0.001 to 0.18 percent, still more preferably 0.001 to 0.15 percent, yet still more preferably 0.001 to 0.11 percent, and even more preferably, 0.003 to 0.1 percent.

When the Sn oxide content is 0.15 percent or greater but less than 0.35 percent, the Ce oxide content is desirably kept to 0 to 0.45 percent, preferably 0.001 to 0.4 percent, and more preferably, 0.003 to 0.25 percent.

When the Sn oxide content is 0.35 percent or greater but less than 0.45 percent, the Ce oxide content is desirably kept to 0 to 0.45 percent, preferably 0.001 to 0.4 percent, and more preferably 0.006 to 0.35 percent.

When the Sn oxide content is 0.45 percent or greater but less than 0.5 percent, the Ce oxide content is desirably kept to 0.001 to 0.5 percent, preferably 0.008 to 0.5 percent, and more preferably, 0.06 to 0.5 percent.

When the Sn oxide content is 0.5 percent or greater but less than 0.55 percent, the Ce oxide content is desirably kept to 0.001 to 0.5 percent, preferably 0.008 to 0.5 percent.

When the Sn oxide content is 0.55 percent or greater but less than 0.6 percent, the Ce oxide content is desirably kept to 0.0005 to 0.6 percent, preferably 0.005 to 0.6 percent, and more preferably, 0.1 to 0.6 percent.

For bubbles 0.3 mm and smaller in size (the size of bubbles (voids) remaining in the solidified glass), Sn oxide works strongly to eliminate both relatively large and extremely small bubbles. Ce oxide can be optionally added. However, the clarifying effect can be increased by keeping the ratio (by mass) of the Ce oxide content to the Sn oxide content, $CeO_2/SnO_2$, to 2.0 or lower.

When Ce oxide is added along with Sn oxide, the density of large bubbles of about 50 micrometers to 0.3 mm can be reduced to about one in several tens of parts. To achieve such an effect, the lower limit of the ratio (by mass) of the Ce oxide content to the Sn oxide content, Ce/Sn, is desirably 0.01, preferably 0.02, more preferably 0.05, and still more preferably 0.1. The upper limit of the mass ratio of the Ce oxide content to the Sn oxide content, Ce/Sn, is desirably 1.8, preferably 1.6, more preferably 1.5, still more preferably 1.4, yet more preferably 1.3, yet still more preferably 1.2, and even more preferably, 1.1.

A desirable form of glass II comprises:

MgO 0 to 10 percent,

CaO 0 to 10 percent,

SrO 0 to 5 percent, and

BaO 0 to 5 percent.

MgO serves to enhance glass meltability, moldability, and glass stability; heighten rigidity and hardness; and increase the coefficient of thermal expansion. However, the incorporation of an excessive quantity reduces chemical durability. Thus, the MgO content is desirably 0 to 10 percent. The MgO content preferably falls within a range of 0 to 5 percent, more preferably, within a range of 0.1 to 5 percent.

CaO specifically serves to enhance glass meltability, moldability, and glass stability; heighten rigidity and hardness; and increase the coefficient of thermal expansion. However, the incorporation of an excessive quantity reduces chemical durability. Thus, the CaO content is desirably 0 to 10 percent. The Ca content preferably falls within a range of 0 to 5 percent, more preferably, within a range of 0.1 to 5 percent.

SrO also serves to enhance glass meltability, moldability, and glass stability, and increase the coefficient of thermal expansion. However, the incorporation of an excessive quantity reduces chemical durability and increases the specific gravity and cost of starting materials. Thus, the SrO content is desirably 0 to 5 percent. The SrO content preferably falls within a range of 0 to 2 percent, more preferably within a range of 0 to 1 percent, and still more preferably, is zero.

BaO also serves to enhance glass meltability, moldability, and glass stability, and increase the coefficient of thermal expansion. However, the incorporation of an excessive quantity reduces chemical durability and increases the specific gravity and cost of starting materials. Thus, the BaO content is desirably 0 to 5 percent. The Ba content preferably falls within a range of 0 to 2 percent, more preferably within a range of 0 to 1 percent, and still more preferably, is zero.

To achieve meltability, moldability, glass stability, thermal expansion characteristics, and chemical durability, the total content of MgO, CaO, SrO, and BaO is desirably 0.1 to 10 percent, preferably 0.1 to 5 percent, and more preferably, 1 to 5 percent.

Since MgO and CaO are more desirable components than SrO and BaO among the alkaline earth metal components as set forth above, the total content of MgO and CaO is desirably 0 to 5 percent, preferably 0.1 to 5 percent, and more preferably, 1 to 5 percent. Further, the total content of SrO and BaO is desirably 0 to 5 percent, preferably 0 to 1 percent, and more preferably, zero.

$ZrO_2$, $TiO_2$, $La_2O_3$, $Nb_2O_5$, $Ta_2O_5$, and $HfO_2$ serve to enhance chemical durability, particularly alkali resistance. However, when employed in excessive quantity, they reduce meltability. Thus, the total content of $ZrO_2$, $TiO_2$, $La_2O_3$, $Nb_2O_5$, $Ta_2O_5$, and $HfO_2$ is desirably 0 to 5 percent, preferably 0.1 to 5 percent, and more preferably, 0.1 to 3 percent.

Of these, $ZrO_2$ does a particularly good job of enhancing chemical durability, particularly alkali resistance, while maintaining glass stability. It also serves to increase rigidity, toughness, and chemical strengthening efficiency. Accordingly, the $ZrO_2$ content is desirably 0.1 to 5 percent. The $ZrO_2$ content preferably falls within a range of 0.1 to 3 percent, more preferably within a range of 0.1 to 2 percent.

To increase chemical durability, particularly alkali resistance, and chemical strengthening efficiency without compromising meltability, the ratio of the $ZrO_2$ content to the total content of $ZrO_2$, $TiO_2$, $La_2O_3$, $Nb_2O_5$, $Ta_2O_5$, and $HfO_2$ is desirably 0.1 to 1, preferably 0.3 to 1, more preferably 0.5 to 1, still more preferably 0.8 to 1, yet still more preferably 0.9 to 1, and particularly preferably, 1.

Sulfates can be added as clarifying agents to glass II in a range of 0 to 1 percent. However, they present a risk of unmelted material in the glass melt being scattered about by blowing, causing a sharp increase in foreign material in the glass. Thus, no incorporation of sulfates is desirable.

By contrast, Sn oxide and Ce oxide do not present the problem of scattering by blowing or increased foreign material, and have good effects in eliminating bubbles.

Additional components that can be incorporated include $B_2O_3$, which serves to reduce brittleness and enhance meltability. However, when introduced in excessive quantity, it diminishes chemical durability. The content thereof is thus desirably 0 to 3 percent, preferably 0 to 1 percent, and still more preferably, zero.

ZnO serves to enhance meltability and increase rigidity. However, the incorporation of an excessive quantity reduces chemical durability and causes the glass to become brittle. Accordingly, the content thereof is desirably 0 to 3 percent, preferably 0 to 1 percent, and still more preferably, zero.

$P_2O_5$ can also be incorporated in small amounts without forfeiting the object of the invention. However, the incorporation of an excessive quantity reduces chemical durability. Thus, the content thereof is desirably 0 to 1 percent, preferably 0 to 0.5 percent, more preferably 0 to 0.3 percent, and still more preferably, zero.

From the perspectives of enhancing meltability, moldability, and glass stability; increasing chemical durability, particularly alkali resistance; increasing heating efficiency during manufacturing of a magnetic recording medium; suppressing the leaching out of alkali from the glass surface due to the mixed alkali effect; and the like, a particularly desirable form of glass II comprises, denoted as mass percentages:

$SiO_2$ 66 to 70 percent,
$Al_2O_3$ 7 to 12 percent
(where the total content of $SiO_2$ and $Al_2O_3$ is 75 percent or greater),
$Li_2O$ 5 to 10 percent,
$Na_2O$ 8 to 13 percent,
$K_2O$ 0.1 to 2 percent
(wherein the total content of $Li_2O$, $Na_2O$, and $K_2O$ is 15 to 22 percent),
MgO 0.1 to 5 percent,
CaO 0.1 to 5 percent,
SrO and BaO in total 0 to 1 percent,
$ZrO_2$ 0.1 to 2 percent,
$B_2O_3$ 0 to 1 percent, and
ZnO 0 to 1 percent
(referred to as glass II-1).

A particularly desirable form of glass II-1 comprises:

$SiO_2$ 66 to 70 percent,
$Al_2O_3$ 7 to 11 percent,
$Li_2O$ 6 to 10 percent,
$Na_2O$ 9 to 13 percent,
$K_2O$ 0.1 to 1 percent
(wherein the total content of $Li_2O$, $Na_2O$, and $K_2O$ is 16 to 22 percent),
MgO 0.1 to 2 percent,
CaO 0.5 to 4 percent,
SrO and BaO in total 0 to 0.5 percent, and
$ZrO_2$ 0.5 to 2 percent.

This particularly desirable form affords the effects of reducing the specific gravity of the glass, further enhancing alkali resistance, and further improving meltability.

From the perspectives of enhancing meltability, moldability, and glass stability; increasing chemical durability; increasing heating efficiency during manufacturing of a magnetic recording medium; and the like, a desirable form of glass II comprises, denoted as mass percentages:

$SiO_2$ 66 to 70 percent,
$Al_2O_3$ 5 to 12 percent,
$Li_2O$ 5 to 20 percent,
$Na_2O$ 1 to 13 percent,
$K_2O$ 0.1 to 2 percent
(wherein the total content of $Li_2O$, $Na_2O$, and $K_2O$ is 18 to 22 percent),
MgO and CaO in total 0 to 5 percent,
SrO and BaO in total 0 to 5 percent,
$ZrO_2$, $TiO_2$, $La_2O_3$, $Nb_2O_5$, $Ta_2O_5$, and $HfO_2$ in total 0.1 to 5 percent,
$B_2O_3$ 0 to 3 percent,
ZnO 0 to 1 percent, and
$P_2O_5$ 0 to 0.5 percent
(referred to as glass II-2).

A particularly desirable form of glass II-2 comprises:

$SiO_2$ 66 to 70 percent;
$Al_2O_3$ 5 to 11 percent
$Li_2O$ 10 to 19 percent;
$Na_2O$ 1 to 6 percent;
$K_2O$ 0.1 to 2 percent,
MgO and CaO in total 0 to 2 percent;
SrO and BaO in total 0 to 2 percent; and
$ZrO_2$, $TiO_2$, $La_2O_3$, $Nb_2O_5$, $Ta_2O_5$, and $HfO_2$ in total 0.5 to 4 percent. In this particularly desirable form, the quantity of alkaline earth metal components is suppressed and $TiO_2$, $La_2O_3$, and $Nb_2O_5$ are incorporated to achieve better chemical durability. To obtain better chemical durability, a glass containing 0.5 to 3 percent of $TiO_2$, 0.1 to 2 percent of $La_2O_3$, and 0.1 to 2 percent of $Nb_2O_5$ is preferred.

[Common Features of Glasses I and II]

The common features of glasses I and II will be described below.

In the glasses of the present invention, Sn, or Sn and Ce, exhibit better clarifying effects than Sb. As set forth above, Sn primarily actively releases oxygen gas in high temperature states (a temperature range of about 1,400 to 1,600° C.), thereby strongly promoting clarification. Ce strongly incorporates oxygen gas in low temperature states (a temperature range of about 1,200 to 1,400° C.), fixing it as a glass component. The viscosity of the glass at 1,400° C., where the temperature range of the clarifying effect of Sn meets the temperature range of the clarifying effect of Ce, greatly affects clarification efficiency.

To increase the chemical durability of both glass I and glass II, the quantities of the Si component and Al component are increased, and an alkali component is made an essential component. However, since the quantities thereof are limited as set forth above, the viscosity of the glass at 1,400° C. exhibits an upward trend. When the viscosity of the glass in the clarification temperature range becomes excessively high, the rate at which bubbles rise in the glass decreases and bubble elimination deteriorates.

To simultaneously achieve enhanced chemical durability and an improved clarifying effect in the present invention, the viscosity at 1,400° C. is desirably made $10^3$ dPa·s or lower while employing a total content of Si and Al of 30 mass percent or higher in glass I, and the viscosity at 1,400° C. is desirably made $10^3$ dPa·s or lower while employing a total content of $SiO_2$ and $Al_2O_3$ of 65 molar percent or greater in glass II.

From the perspective of enhancing chemical durability, the range of the total content of Si and Al in glass I is desirably 32 mass percent or greater, preferably 35 mass percent or greater, more preferably 36 mass percent or greater, and still more preferably, 37 mass percent or greater. The range of the total content of $SiO_2$ and $Al_2O_3$ in glass II is desirably 65 molar percent or greater, preferably 70 molar percent or greater, more preferably 73 molar percent or greater, still more preferably 74 molar percent or greater, yet still more preferably 75 molar percent or greater, and even more preferably, 75.5 molar percent or greater.

To enhance the clarifying effect, the viscosity of both glass I and glass II is desirably $10^{27}$ dPa·s or lower at 1,400° C.

In this manner, the density of residual bubbles contained in the glass per unit mass is kept to 60 bubbles/kg or lower, desirably 40 bubbles/kg or lower, preferably 20 bubbles/kg or lower, more preferably 10 bubbles/kg or lower, still more preferably 2 bubbles/kg or lower, and even more preferably, 0 bubbles/kg. This permits the highly efficient mass production of substrates suited to high recording density magnetic recording media.

Halogens other than F, such as Cl, Br, and I, are desirably not added to glass I or glass II. These halogens also volatize from the glass melt, producing striae, which are undesirable in the formation of a flat substrate surface.

Since Pb, Cd, and the like negatively affect the environment, their incorporation is also desirably avoided.

In both glasses I and II, the incorporation of Sn in the form of $SnO_2$ is desirable for effectively releasing oxygen gas at high temperature.

Adding Sn and Ce as set forth above increases the Young's modulus of the glass. Increasing the Young's modulus affords good fluttering resistance during high-speed rotation of a magnetic recording medium equipped with a substrate made of glass I or glass II.

Further, the addition of Sn and Ce as set forth above permits the stable production of thinner blanks in the course of press molding a glass melt into disk-shaped substrate blanks, making it possible to reduce the sheet thickness tolerance of the glass blanks.

Further, the addition of Ce makes it possible to use the emission of blue fluorescence when glass I or glass II is irradiated with light of short wavelength, such as UV light, to readily distinguish between substrates comprised of glass I or glass II and substrates made from glass to which no Ce has been added, which are identical in appearance and otherwise difficult to distinguish visually. That is, by irradiating these two types of substrates with UV light and checking for the presence of fluorescence, it is possible to distinguish between them without analyzing the composition of the glasses. As a result, in the course of producing magnetic recording media with substrates comprised of multiple types of glass, this test can be used to avoid problems caused by the mixing in of substrates comprised of heterogeneous glass.

Further, by irradiating light of short wavelength, such as UV light, onto a substrate comprised of glass I or glass II to which Ce has been added to generate fluorescence, it is possible to check relatively easily for the presence of foreign matter on the substrate surface.

The method for manufacturing the glass for a magnetic recording medium substrate of the present invention will be described next. The first form of the method for manufacturing a glass for a magnetic recording medium of the present invention (referred to as "glass manufacturing method I") is a method for manufacturing a glass for a magnetic recording medium substrate comprised of an oxide glass, characterized by: mixing a glass starting material to which Sn, and optionally Ce, are added, comprising, denoted as mass percentages:

Si 20 to 40 percent;

Al 0.1 to 10 percent;

Li 0.1 to 5 percent;

Na 0.1 to 10 percent;

K 0 to 5 percent (wherein the total content of Li, Na, and K is 15 percent or lower);

Sn 0.005 to 0.6 percent; and

Ce 0 to 1.2 percent;

so as to permit obtaining a glass with an Sb content of 0 to 0.1 percent and containing no As or F; melting the glass starting material; clarifying the glass melt obtained; and then molding the glass melt obtained. That is, glass manufacturing method I is a method for manufacturing glass I. The desirable composition range and characteristic ranges thereof are as set forth above.

A desirable form of glass manufacturing method I is a method comprising mixing a glass starting material comprising a ratio of Ce content to Sn content, Ce/Sn, falling within a range of 0.02 to 1.3; maintaining the glass melt obtained at 1,400 to 1,600° C.; decreasing the temperature; maintaining the temperature at 1,200 to 1,400° C.; and conducting molding.

Employing a ratio of Ce content to Sn content, Ce/Sn, of 0.02 to 1.3 and maintaining the glass melt at 1,400 to 1,600° C. lowers the viscosity of the glass, creating a state in which bubbles in the glass readily rise. Further, the release of oxygen by Sn produces a clarification-enhancing effect. Subsequently lowering the temperature of the glass melt and maintaining it at 1,200 to 1,400° C. makes it possible to markedly enhance the elimination of bubbles through the incorporation of oxygen by Ce.

The second form of the method for manufacturing a glass for a magnetic recording medium substrate of the present invention (referred to as "glass manufacturing method II") is a method for manufacturing a glass for a magnetic recording medium substrate comprised of an oxide glass, characterized by: mixing a glass starting material to which Sn, and optionally Ce, are added, comprising, as converted based on the oxides, denoted as molar percentages:

$SiO_2$ 60 to 75 percent, $Al_2O_3$ 1 to 15 percent, $Li_2O$ 0.1 to 20 percent, $Na_2O$ 0.1 to 15 percent, and $K_2O$ 0 to 5 percent (wherein the total content of $Li_2O$, $Na_2O$, and $K_2O$ is 25 percent or lower);

so as to permit obtaining a glass comprising 0 to 0.1 percent of Sb, no As or F, and, based on the total amount of the glass components, 0.01 to 0.7 mass percent of Sn oxide and 0 to 1.4 mass percent of Ce oxide; melting the glass starting material; clarifying the glass melt obtained; and molding the glass melt obtained. That is, glass manufacturing method II is a method for manufacturing glass II. The desirable composition range and characteristic ranges thereof are as set forth above.

A desirable form of glass manufacturing method II is a method comprising mixing the glass starting material so that the ratio of the content of Ce oxide to the content of Sn oxide (Ce oxide/Sn oxide) denoted as a mass percentage falls within a range of 0.02 to 1.2; melting the starting material; maintaining the glass melt obtained at 1,400 to 1,600° C.; reducing the temperature; maintaining the temperature at 1,200 to 1,400° C.; and molding the glass melt.

Employing a ratio of Ce oxide content to Sn oxide content (Ce oxide/Sn oxide) of 0.02 to 1.2 and maintaining the glass melt at 1,400 to 1,600° C. lowers the viscosity of the glass, creating a state in which bubbles in the glass readily rise. Further, the release of oxygen by Sn produces a clarification-enhancing effect. Subsequently lowering the temperature of the glass melt and maintaining it at 1,200 to 1,400° C. makes it possible to markedly enhance the elimination of bubbles through the incorporation of oxygen by Ce.

When both Sn and Ce are present in the glass melt in glass manufacturing methods I and II, the characteristic of the glass in the form of a viscosity at 1,400° C. of $10^3$ dPa·s or lower and the synergistic effect due to the presence of both Sn and Ce markedly enhance bubble elimination.

Denoting the period of maintenance at 1,400 to 1,600° C. as TH and the period of maintenance at 1,200 to 1,400° C. as TL, it is desirable to keep TL/TH to 0.5 or less, preferably 0.2 or less. Increasing TH relative to TL in this manner facilitates the discharging of gases within the glass to the exterior. To promote the gas incorporating effect of Ce within the glass, TL/TH is desirably greater than 0.01, preferably greater than 0.02, more preferably greater than 0.03, and still more preferably, greater than 0.04.

To increase the individual bubble eliminating effects of Sn and Ce, the temperature difference in the course of dropping the temperature from within the range of 1,400 to 1,600° C. to within the range of 1,200 to 1,400° C. is desirably 30° C. or greater, preferably 50° C. or greater, more preferably 80° C. or greater, still more preferably 100° C. or greater, and even more preferably, 150° C. or greater. The upper limit of the temperature difference is 400° C.

In glass manufacturing methods I and II, the quantities of Sn and Ce added are desirably established to yield a density of residual bubbles within the glass of 100 bubbles/kg or lower. The quantities of Sn and Ce added are preferably established to yield a density of residual bubbles of 60 bubbles/kg or lower. The quantities of Sn and Ce added are more preferably established to yield a density of residual bubbles of 40 bubbles/kg or lower. The quantities of Sn and Ce added are still more preferably established to yield a density of residual bubbles of 20 bubbles/kg or lower. The quantities of Sn and Ce added are yet still more preferably established to yield a density of residual bubbles of 10 bubbles/kg or lower. The quantities of Sn and Ce added are even more preferably established to yield a density of residual bubbles of 2 bubbles/kg or lower. The quantities of Sn and Ce added are particularly preferably established to yield a density of residual bubbles of 0 bubbles/kg. Even when residual bubbles are present, the size of all of the bubbles can be kept to 0.3 mm or less. The above quantities of Sn and Ce added can be specified as the total quantity of Sn and Ce added, as a ratio of the quantities of Sn and Ce added, or the like.

In glass manufacturing methods I and II, that is, in the methods for manufacturing glasses I and II, the glass starting materials are charged to a melting vat, heated and melted to obtain a glass melt. The glass melt is then sent to a clarifying vat. While the glass melt is in the clarifying vat, it is maintained in a higher temperature state than in the melting vat—for example, within a temperature range of 1,400 to 1,600° C. The glass melt is then sent to an operating vat from the clarifying vat. In the operating vat, it is stirred by a stirring device. Once it has been homogenized, it is caused to flow out of a outflow pipe connected to the operating vat and then molded. The clarifying vat and operating vat are linked by means of a connecting apparatus, such as a pipe. While the glass melt is flowing through the connecting apparatus, the temperature decreases due to heat exchange with the connecting apparatus. The interior of the operating vat is maintained at 1,200 to 1,400° C. In such a process, the Sn discharges oxygen gas within the clarifying vat, promoting clarification. The Ce incorporates oxygen gas within the glass in the operating vat, fixing the oxygen in the glass composition and thereby promoting the bubble eliminating effect.

The melting vat, in which the glass starting materials are heated and vitrified, and the clarifying vat, are comprised of a refractory material such as electrocasting bricks, sintered bricks, or the like. The operating vat and the connecting pipe linking the clarifying vat and the operating vat, and the outflow pipe, are desirably comprised of platinum or a platinum alloy (referred to as a "platinum-based material"). The molten material within the melting vat where the starting material is vitrified, and the glass melt within the clarifying vat reaching the maximum temperature in the glass manufacturing process, both exhibit highly corrosive properties. Although platinum-based materials exhibit good resistance to corrosion, they corrode when they come into contact with highly corrosive glass, mixing into the glass as a solid platinum material. Since the solid platinum material exhibits resistance to corrosion, platinum that has mixed into the glass as a solid material does not completely melt into the glass, but remains as foreign matter in the molded glass. However, refractory material that corrodes will mix into the glass, melting into the glass and tending not to remain as foreign matter. Accordingly, the melting vat and clarifying vat are desirably manufactured of a refractory material. When the operating vat is made of a refractory material, the surface of the refractory material melts into the glass melt, generating striae in the glass which was homogeneous, and rendering it heterogeneous. The temperature of the operating vat reaches up to 1,400° C., and the corrosiveness of the glass decreases. Thus, the operating vat, connecting pipe, and outflow pipe are desirably comprised of platinum-based material that tends not to melt into the glass. The stirring apparatus that stirs and homogenizes the glass melt in the operating vat is also desirably comprised of a platinum-based material.

[Glass III]

Glass III will be described next.

Glass III is a glass for a magnetic recording medium substrate comprised of oxide glass, characterized by comprising, converted based on the oxide, denoted as molar percentages:

$SiO_2$ 60 to 75 percent, $Al_2O_3$ 1 to 15 percent, $Li_2O$ 0.1 to 20 percent, $Na_2O$ 0.1 to 15 percent, $K_2O$ 0 to 5 percent (where the total content of $Li_2O$, $Na_2O$, and $K_2O$ is 25 percent or less);

by comprising a 0.1 to 3.5 mass percent total content, based on the total amount of the glass components, of Sn oxide and Ce oxide; in that the ratio of the Sn oxide content to the total content of Sn oxide and Ce oxide (Sn oxide content/(Sn oxide content+Ce oxide content)) is 0.01 to 0.99; in that the Sb oxide content is 0 to 0.1 percent; and by comprising no As or F.

Below, unless specifically indicated otherwise, the contents of Sn oxide, Ce oxide, and Sb oxide are given in the form of quantities added as mass percentages based on the total amount of the glass components. Additionally, component contents and total contents are given as molar percentages.

The various contents of $SiO_2$, $Al_2O_3$, $Li_2O$, $Na_2O$, and $K_2O$, and the total contents of $Li_2O$, $Na_2O$, and $K_2O$ in glass III are identical to those in glass II.

In glass III, which comprises relatively large contents of $SiO_2$ and $Al_2O_3$, the temperature of the glass during clarification is high despite containing $Li_2O$ and $Na_2O$. In such a glass, Sb oxide has a poorer clarifying effect than Sn oxide or Ce oxide, described further below. In a glass to which Sn oxide is added, the clarifying effect ends up deteriorating with Sb oxide. When the Sb oxide content exceeds 0.1 percent, the coexistence of Sn oxide causes the residual bubbles in the glass to increase sharply. Accordingly, the Sb oxide content is limited to 0.1 percent or less in glass III. The Sb oxide content desirably falls within a range of 0 to 0.05 percent, preferably within a range of 0 to 0.01 percent, and still more preferably, within a range of 0 to 0.001 percent. The addition of no Sb oxide (glass containing no Sb) is particularly desirable. Not incorporating Sb (rendering the glass "Sb-free") reduces the density of residual bubbles in the glass to a range of from about one part in several to about one percent. Here, the term "Sb oxide" means oxides such as $Sb_2O_3$ and $Sb_2O_5$ that have melted into the glass, irrespective of the valence number of Sb.

Sb oxide has a greater effect on the environment than Sn oxide or Ce oxide. Thus, reducing the Sb oxide content, or using no Sb at all, is desirable because it lessens the effect on the environment.

Although As is a powerful clarifying agent, the glass is desirably rendered As-free due to the toxicity of this element. Further, although F exhibits a clarifying effect, it volatizes during glass manufacturing, causing the properties and characteristics of the glass to fluctuate, and creating problems in terms of stable melting and molding. Further, volatization causes the generation of heterogeneous portions, called striae, in the glass. When striae are present in the glass and polishing is conducted, slight differences in the rates at which the glass is removed in striae portions and homogenous portions produce irregularities on the polished surface, which are undesirable in magnetic recording medium substrates for which a high degree of flatness is required. Accordingly, As and F are not incorporated into glass III.

Glass III is prepared by the steps of melting a glass starting material, clarifying the glass melt obtained by melting the glass starting material, homogenizing the clarified glass melt, causing the homogenized glass melt to flow out, and molding it. In this process, the clarifying step is conducted at a relatively high temperature and the homogenizing step at a relatively low temperature. In the clarifying step, bubbles are actively produced in the glass, and clarification is promoted by incorporating minute bubbles contained in the glass to form large bubbles, which then tend to rise. Additionally, an effective method of eliminating bubbles is to incorporate, as a glass component, oxygen that is present as a gas within the glass in a state where the temperature of the glass is lowered as it flows out.

In glass III, the Sn oxide serves to promote clarification by releasing oxygen gas at high temperature, incorporating the small bubbles contained in the glass into large bubbles, which then tend to rise. Additionally, the Ce oxide serves to eliminate bubbles by incorporating as a glass component the oxygen that is present as a gas in the glass at low temperature. For bubbles 0.3 mm and smaller in size (the size of bubbles (voids) remaining in the solidified glass), Sn oxide works strongly to eliminate both relatively large and extremely small bubbles. When Ce oxide is added along with Sn oxide, the density of large bubbles of about 50 micrometers to 0.3 mm can be reduced to about one in several tens of parts. Employing Ce oxide in combination with Sn oxide in this manner enhances the clarifying effect of the glass over a broad temperature range, from a high temperature range to a low temperature range, permitting adequate bubble elimination even in glasses in which the incorporation of Sb oxide, As, and F is limited.

An adequate clarifying effect cannot be expected when the total content of Sn oxide and Ce oxide is less than 0.1 percent. When 3.5 percent is exceeded, the Sn oxide and Ce oxide do not melt entirely, running the risk of becoming foreign matter and contaminating the glass. When foreign matter appears in even trace quantities on the surface in the course of manufacturing a substrate, it forms protrusions, portions where foreign matter has dropped out become pits, the flatness of the substrate surface is lost, and the substrate can no longer be employed as a magnetic recording medium substrate. Sn and Ce serve to produce crystal nuclei when preparing crystalline glass. Since the glass in the present invention is employed in a substrate comprised of amorphous glass, it is desirable that no crystals precipitate during heating. The addition of excessive amounts of Sn and Ce tends to cause such crystals to precipitate. Thus, the addition of excessive amounts of Sn oxide and Ce oxide is to be avoided. For these reasons, in glass III, the total content of Sn oxide and Ce oxide is 0.1 to 3.5 percent. The total content of Sn oxide and Ce oxide desirably falls within a range of 0.1 to 2.5 percent, preferably within a range of 0.1 to 1.5 percent, and more preferably, within a range of 0.5 to 1.5 percent.

In glass III, the ratio of the Sn oxide content to the total content of Sn oxide and Ce oxide (Sn oxide content/(Sn oxide content+Ce oxide content)) falls within a range of 0.01 to 0.99.

When this ratio drops below 0.01 or exceeds 0.99, the synergistic effect of the clarifying effect of Sn oxide at high temperature and the clarifying effect of Ce oxide at low temperature becomes difficult to achieve. When an unbalanced amount of either Sn oxide or Ce oxide is added, the oxide that has been incorporated in large quantity from among Sn oxide and Ce oxide tends not to melt entirely, and to produce unmelted material in the glass.

For these reasons, the ratio of the Sn oxide content to the total content of Sn oxide and Ce oxide (Sn oxide content/(Sn oxide content+Ce oxide content)) falls within a range of 0.01 to 0.99. This ratio desirably falls within a range of 0.02 and above, preferably a range of ⅓ and above, more preferably a range of 0.35 to 0.99, still more preferably a range of 0.45 to 0.99, yet still more preferably a range of 0.45 to 0.98, and even more preferably, a range of 0.45 to 0.85.

The content of Sn oxide is desirably 0.1 percent or greater to achieve the above-described clarifying effect. However, when 3.5 percent is exceeded, it precipitates out of the glass as foreign matter. In the course of grinding the glass, protrusions of foreign matter form on the surface of the substrate, portions where foreign matter has dropped out of the surface become pits, and there is a risk of losing the flatness of the substrate surface. Accordingly, the content of Sn oxide is desirably 0.1 to 3.5 percent. From the above perspective, the Sn content preferably falls within a range of 0.1 to 2.5 percent, more preferably within a range of 0.1 to 1.5 percent, and still more preferably, a range of 0.5 to 1.0 percent. Here, the term "Sn oxide" means oxides such as SnO and $SnO_2$ that have melted into the glass, irrespective of the valence of Sn. The Sn oxide content is the total content of oxides such as SnO and $SnO_2$.

Ce oxide is desirably incorporated to enhance the clarifying effect. However, when 3.5 percent is exceeded, it reacts strongly with the refractory material and platinum constituting the melt vessel, and reacts strongly with the metal mold used to mold the glass. This increases impurities, negatively affecting the surface state. Accordingly, the Ce oxide content is 0.1 to 3.5 percent. The Ce content desirably falls within a range of 0.5 to 2.5 percent, preferably within a range of 0.5 to 1.5 percent, and still more preferably, within a range of 0.5 to 1.0 percent. Here, the term "Ce oxide" means oxides such as $CeO_2$ and $Ce_2O_3$ that have melted into the glass, irrespective of the valence of Ce. The Ce oxide content is the total content of oxides such as $CeO_2$ and $Ce_2O_3$.

Sn and Ce serve to produce crystal nuclei when preparing crystalline glass. Since the glass in the present invention is employed in a substrate comprised of amorphous glass, it is desirable that no crystals precipitate during heating. Thus, the addition of excessive amounts of Sn oxide and Ce oxide is to be avoided.

As set forth above, the addition of Sn and Ce increases the Young's modulus of the glass. Increasing the Young's modulus affords good fluttering resistance during high-speed rotation of a magnetic recording medium equipped with a substrate made from glass III.

Further, the addition of Sn and Ce as set forth above permits the stable production of thinner blanks in the course of press molding glass melt into disk-shaped substrate blanks, making it possible to reduce the sheet thickness tolerance of the glass blanks.

Further, the addition of Ce makes it possible to use the emission of blue fluorescence when glass III is irradiated with light of short wavelength, such as UV light, to readily distinguish between substrates comprised of glass III and substrates made from glass to which no Ce has been added, which are identical in appearance and otherwise difficult to visually distinguish. That is, by irradiating these two types of substrates with UV light and checking for the presence of fluorescence, it is possible to distinguish between them without analyzing the composition of the glasses. As a result, in the course of producing magnetic recording media with substrates comprised of multiple types of glass, this test can be used to avoid problems caused by contamination of substrates comprised of heterogeneous glass.

Further, by irradiating light of short wavelength, such as UV light, onto a substrate comprised of glass III, it is possible to check relatively easily for the presence of foreign matter on the substrate surface.

A desirable form of glass III of the present invention comprises:

MgO 0 to 10 percent;
CaO 0 to 10 percent;
SrO 0 to 5 percent;
BaO 0 to 5 percent;
$B_2O_3$ 0 to 3 percent; and
$P_2O_5$ 0 to 1 percent.

In the above desirable form of glass III, the various contents and total contents of MgO, CaO, SrO, BaO, $B_2O_3$, $P_2O_5$, and ZnO; the ratio of the $ZrO_2$ content to the total content of $ZrO_2$, $TiO_2$, $La_2O_3$, $Nb_2O_5$, $Ta_2O_5$, and $HfO_2$; and the like are identical to those of the desirable form of glass II.

Sulfates can be added as clarifying agents to glass III in a range of 0 to 1 percent. However, they present a risk of unmelted material in the glass melt being scattered about by blowing, causing a sharp increase in foreign material in the glass. Thus, no incorporation of sulfates is desirable.

By contrast, Sn oxide and Ce oxide do not present the problem of scattering by blowing or increased foreign material, and have good effects in eliminating bubbles.

As set forth above, Sn primarily actively releases oxygen gas in high temperature states (a temperature range of about 1,400 to 1,600° C.), thereby strongly promoting clarification. Ce strongly incorporates oxygen gas in low temperature states (a temperature range of about 1,200 to 1,400° C.), fixing it as a glass component. The viscosity of the glass at 1,400° C., where the temperature range of the clarifying effect of Sn meets the temperature range of the clarifying effect of Ce, greatly affects clarification efficiency.

In glass III, to increase chemical durability, the quantity of the Si and Al components is increased and an alkali component is made an essential component. However, since the contents thereof are limited as set forth above, the viscosity of the glass at 1,400° C. exhibits an upward trend. When the viscosity of the glass becomes excessively high in the clarification temperature range, the rate at which bubbles rise in the glass decreases, and bubble elimination deteriorates.

In glass III, to simultaneously achieve enhanced chemical durability and an improved clarifying effect, the viscosity at 1,400° C. is desirably kept to $10^3$ dPa·s or lower while employing a total content of $SiO_2$ and $Al_2O_3$ of 65 molar percent.

From the perspective of enhancing chemical durability, in glass III, the total content of $SiO_2$ and $Al_2O_3$ desirably ranges 65 molar percent or more, preferably 70 molar percent or more, more preferably 73 molar percent or more, still more preferably 74 molar percent or more, yet still more preferably 75 molar percent or more, and even more preferably 75.5 molar percent or more.

To increase the clarifying effect, in glass III, the viscosity at 1,400° C. is desirably kept to $10^{27}$ dPa·s or lower.

In this manner, the density of residual bubbles contained in the glass per unit mass is kept to 60 bubbles/kg or lower, desirably 40 bubbles/kg or lower, preferably 20 bubbles/kg or lower, more preferably 10 bubbles/kg or lower, still more preferably 2 bubbles/kg or lower, and even more preferably, 0 bubbles/kg. This permits the highly efficient mass production of substrates suited to high recording density magnetic recording media.

The method for manufacturing glass III, that is, a third form of the method for manufacturing a glass for a magnetic recording medium substrate of the present invention (referred to as "glass manufacturing method III") will be described next. Glass manufacturing method III is a method for manufacturing a glass for a magnetic recording medium substrate comprised of an oxide glass, characterized by: mixing a glass starting material to which Sn and Ce, are added, comprising, as converted based on the oxides, denoted as molar percentages:

$SiO_2$ 60 to 75 percent;
$Al_2O_3$ 1 to 15 percent;
$Li_2O$ 0.1 to 20 percent;
$Na_2O$ 0.1 to 15 percent; and
$K_2O$ 0 to 5 percent (wherein the total content of $Li_2O$, $Na_2O$, and $K_2O$ is 25 percent or lower);

so as to permit obtaining a glass containing a total quantity of Sn oxide and Ce oxide of 0.1 to 3.5 mass percent based on the total amount of the glass components, wherein the ratio of the content of Sn oxide to the total content Sn oxide and Ce oxide (content of Sn oxide/(content of Sn oxide+content of Ce oxide)) is 0.01 to 0.99, having an Sb oxide content of 0 to 0.1 percent, and comprising no As or F; melting the glass starting material; clarifying the glass melt obtained; and molding the glass melt obtained.

A desirable form of glass manufacturing method III is a method of maintaining the glass melt at 1,400 to 1,600° C., decreasing the temperature, maintaining the glass melt at 1,200 to 1,400° C., and then conducting molding.

Maintaining the glass melt at 1,400 to 1,600° C. lowers the viscosity of the glass, creating a state where bubbles in the glass tend to rise, and produces a clarification-enhancing effect based on the release of oxygen by Sn. Subsequently decreasing the temperature of the glass melt and maintaining it at 1,200 to 1,400° C. markedly enhances bubble elimination by taking advantage of oxygen incorporation by Ce.

In glass manufacturing method III, in which Sn and Ce are employed in combination in the glass melt, a glass characteristic in the form of a viscosity of $10^3$ dPa·s at 1,400° C. and a synergistic effect based on the presence of both Sn and Ce markedly enhance bubble elimination.

Denoting the period of maintenance at 1,400 to 1,600° C. as TH and the period of maintenance at 1,200 to 1,400° C. as TL, it is desirable to keep TL/TH to 0.5 or less, preferably 0.2 or less. Increasing TH relative to TL in this manner facilitates the discharging of gases within the glass to the exterior. To promote the gas incorporating effect of Ce within the glass, TL/TH is desirably greater than 0.01, preferably greater than 0.02, more preferably greater than 0.03, and still more preferably, greater than 0.04.

To increase the individual bubble eliminating effects of Sn and Ce, the temperature difference in the course of dropping the temperature from within the range of 1,400 to 1,600° C. to within the range of 1,200 to 1,400° C. is desirably 30° C. or greater, preferably 50° C. or greater, more preferably 80° C. or greater, still more preferably 100° C. or greater, and even more preferably, 150° C. or greater. The upper limit of the temperature difference is 400° C.

In glass manufacturing method III, the quantities of Sn and Ce added are desirably established to yield a density of residual bubbles within the glass of 60 bubbles/kg or lower. The density of residual bubbles in the glass can be further reduced by utilizing a characteristic of the glass in the form of its viscosity of $10^3$ dPa·s or lower at 1,400° C. In glass manufacturing method III, the quantities of Sn and Ce added are desirably established to yield a density of residual bubbles of 40 bubbles/kg or lower. The quantities of Sn and Ce added are preferably established to yield a density of residual bubbles of 20 bubbles/kg or lower. The quantities of Sn and Ce added are more preferably established to yield a density of residual bubbles of 10 bubbles/kg or lower. The quantities of Sn and Ce added are still more preferably established to yield a density of residual bubbles of 2 bubbles/kg or lower. The quantities of Sn and Ce added are particularly preferably established to yield a density of residual bubbles of 0 bubbles/kg. Even when residual bubbles are present, the size of all of the bubbles can be kept to 0.3 mm or less.

In glass manufacturing method III, that is, the method for manufacturing glass III, as well, the melting vat, in which the glass starting materials are heated and vitrified, and the clarifying vat are comprised of a refractory material such as electrocasting bricks, sintered bricks, or the like. The operating vat and the connecting pipe linking the clarifying vat and the operating vat, and the outflow pipe, are desirably comprised of platinum or a platinum alloy (referred to as a "platinum-based material"). The molten material within the melting vat where the starting material is vitrified, and the glass melt within the clarifying vat reaching the maximum temperature in the glass manufacturing process, both exhibit highly corrosive properties. Although platinum-based materials exhibit good resistance to corrosion, they corrode when they come into contact with highly corrosive glass, mixing into the glass as a solid platinum material. Since the solid platinum material exhibits resistance to corrosion, platinum that has mixed into the glass as a solid material does not completely melt into the glass, but remains as foreign matter in the molded glass. However, the refractory material that corrodes will mix into the glass, melting into the glass and tending not to remain as foreign matter. Accordingly, the melting vat and clarifying vat are desirably manufactured of a refractory material. When the operating vat is made of a refractory material, the surface of the refractory material melts into the glass melt, generating striae in the glass which was homogenized, rendering it heterogeneous. The temperature of the operating vat reaches 1,400° C. or lower, and the corrosiveness of the glass decreases. Thus, the operating vat, connecting pipe, and outflow pipe are desirably comprised of platinum-based material that tends not to melt into the glass. The stirring apparatus that stirs and homogenizes the glass melt in the operating vat is also desirably comprised of a platinum-based material.

Halogens other than F, such as Cl, Br, and I, are desirably not added to glass III. These halogens also volatize from the glass melt, producing striae, which are undesirable in the formation of a flat substrate surface.

Since Pb, Cd, and the like negatively affect the environment, their incorporation is also desirably avoided in glass III.

In glass III, the incorporation of Sn in the form of $SnO_2$ is desirable for effectively releasing oxygen gas at high temperature.

From the perspectives of enhancing bubble elimination and inhibiting contamination by foreign matter, glass III for use in a magnetic recording medium substrate of the present invention is suited to production of quantities of glass melt of 10 liters or more, that is, production in which 10 liters or more of a glass melt is held in a heat resistant container. It is also suited to production of quantities of glass melt of 40 liters or more.

[Acid Resistance and Alkali Resistance]

Glasses I, II, and III desirably have an acid resistant property in the form of an etching rate of 3.0 nm/minute or less when immersed in a 0.5 volume percent hydrogenfluosilicic acid ($H_2SiF$) aqueous solution maintained at 50° C., and an alkali resistant property in the form of an etching rate of 0.1 nm/minute or less when immersed in a 1 mass percent potassium hydroxide aqueous solution maintained at 50° C. Preferably, they possess both this acid resistant property and alkali resistant property.

In manufacturing a magnetic recording medium substrate, organic material contaminating the surface of the glass is removed by an acid treatment, after which the adhesion of foreign matter is prevented by an alkali treatment to achieve an extremely clean substrate. A substrate comprised of a glass having the above-described acid resistance and alkali resistance can be maintained in a state of extremely high surface flatness despite the acid treatment and alkali treatment.

The acid resistance of glasses I, II, and III is desirably an etching rate when immersed in a 0.5 volume percent hydrogenfluosilicic acid ($H_2SiF$) aqueous solution maintained at 50° C. of 2.5 nm/minute or less, preferably 2.0 nm/minute or less, and more preferably, 1.8 nm/minute or less. The alkali resistance is desirably an etching rate when immersed in a 1 mass percent potassium hydroxide aqueous solution maintained at 50° C. of 0.09 nm/minute or less, preferably 0.08 nm/minute or less.

In the present invention, the etching rate is defined as the depth of the glass surface that is removed per unit time. For example, in the case of a glass substrate, it is the depth of the glass substrate removed per unit time. The method of measuring the etching rate is not specifically limited. The following method is an example. First, the glass is processed into a substrate shape (flat shape). To prepare a non-etched portion, part of the glass substrate is subjected to mask processing. The glass substrate in that state is then immersed in the above hydrogenfluosilicic acid aqueous solution or potassium hydroxide aqueous solution. After being immersed for a unit time, the glass substrate is pulled out of the aqueous solution and the amount of the difference (etching difference) between the masked portion and the portion without a mask is determined. In this manner, the amount of etching (etching rate) per unit time is obtained.

Methods of manufacturing glasses I, II, and III will be described next. First, glass starting materials such as oxides, carbonates, nitrates, sulfates, and hydroxides, as well as clarifying agents such as $SnO_2$ and $CeO_2$ are weighed out and mixed to obtain a mixed starting material that will yield the desired composition. This starting material is heated in a refractory furnace and melted, clarified, and homogenized at a temperature of 1,400 to 1,600° C., for example. A homogenous glass melt free of bubbles and unmelted material is prepared in this manner, caused to flow out, and molded into a prescribed shape to obtain the above-described glass.

[Chemically Strengthened Glass]

The glass for a magnetic recording medium substrate of the present invention is also suitable as a chemically strengthened glass. Glasses I, II, and III are chemically strengthened, for example, by immersing a piece of glass that has been processed into a disk shape in a molten alkali salt. Sodium nitrate molten salt, potassium nitrate molten salt, or a mixed molten salt of the two can be employed as the molten salt. The term "chemical strengthening treatment" refers to bringing a glass substrate into contact with a chemical strengthening treatment solution (molten salt) to replace some of the ions in the glass substrate with larger ions that are contained in the chemical strengthening treatment solution to chemically strengthen the glass substrate. When the glass is immersed in molten salt, Li ions in the vicinity of the surface are replaced with Na ions and K ions in the molten salt, and Na ions in the vicinity of the glass surface are replaced with K ions in the molten salt, forming a compressive stress layer in the substrate surface. The temperature of the molten salt during chemical strengthening is higher than the strain point of the glass but lower than the glass transition temperature, and is desirably within a temperature range at which the molten salt does not thermally decompose. Since the molten salt is recycled, as the concentrations of the various alkali ions in the molten salt change, trace quantities of glass components other than Li and Na leach out. As a result, the processing conditions move outside the above-stated optimal ranges. This variation in chemical strengthening due to such changes over time in the molten salt can be reduced by adjusting the composition of the glass constituting the substrate as set forth above. It can also be reduced by setting the concentration of K ions in the molten salt high. The fact that chemical strengthening processing has been conducted can be confirmed by observation of a cross-section of the glass (a cut surface of the processed layer) by the Babinet method, by measuring the distribution in the depth direction of alkali ions (such as $Li^+$, $Na^+$, and $K^+$) from the glass surface; and the like.

[The Magnetic Recording Medium Substrate]

The magnetic recording medium substrate of the present invention is comprised of above-described glass I, II, or III. In a glass substrate comprised of glass I, II, or III, the number of residual bubbles, from just one part in several tens to several percent that of conventional glasses, is extremely small. This permits a substrate with excellent surface flatness.

When residual bubbles are present in a substrate, even without appearing on the substrate surface, they diminish the mechanical strength of the substrate. Since glass in which residual bubbles are absent, or are present in an extremely small number, is employed in the present invention, a substrate having good mechanical strength and good impact resistance is provided.

Since the substrate is comprised of glass I, II, or III, all of which have good chemical durability, high surface flatness is maintained even after conducting cleaning to remove foreign matter.

Since glass I, II, or III is employed, all of which have good chemical durability and exhibit little leaching out of alkali metal components, a substrate exhibiting little leaching out of alkalis due to chemical strengthening and good impact resistance is obtained based on the present invention.

The bending strength is generally employed as an indicator of the impact resistance of the magnetic recording medium substrate. The present invention provides a glass substrate having a bending strength of, for example, 10 kg or greater, desirably 15 kg or greater, and preferably, 20 kg or greater. The bending strength is obtained as the value of the load at the point where the substrate is damaged when a steel ball is placed in a hole in the center of a substrate positioned on a holder as shown in FIG. 2, and the load is progressively increased by means of a load cell. Measurement can be conducted with a bending strength measuring and testing device (Shimadzu Autograph DDS-2000), for example.

Magnetic recording media, known as magnetic disks, hard disks, and the like, are suited to the internal memory devices (fixed disks and the like) of desktop computers, server-use computers, notebook computers, mobile computers, and the like; the internal memory devices of portable recording and reproducing devices that record and reproduce images and/or sound; vehicle-mounted audio recording and reproducing devices; and the like.

By way of example, the substrate of the present invention measures 1.5 mm or less, desirably 1.2 mm or less, and preferably 1 mm or less in thickness. The lower limit is desirably 0.3 mm. Such thin substrates tend to develop undulation due to chemical strengthening. However, the glass of the present invention is adjusted by balancing the various components to within a range in which undulation due to chemical strengthening tends not to develop. Thus, a thin substrate of good flatness is obtained even after chemical strengthening treatment. The substrate of the present invention may be disklike (disk-shaped), with a hole in the center portion (centerhole). The glass of the present invention reduces the variation in shape caused by the chemical strengthening treatment of the substrate, permitting the mass production of disk-shaped substrates with a low centerhole inner diameter size tolerance.

The present invention further relates to a method for manufacturing a glass substrate for use in an information-recording medium, comprising a step of mirror-surface polishing the glass substrate for a magnetic recording medium of the present invention, and a cleaning step, in which the glass is cleaned with an acid and cleaned with an alkali following mirror-surface polishing. This manufacturing method is a suitable method for manufacturing the substrate of the present invention. The specific form of this method will be described below.

First, a glass melt is cast into a heat-resistant metal mold and molded into a cylindrical piece of glass. This is annealed, the lateral surfaces thereof are ground by centerless processing or the like, and the rod is sliced to prescribed thickness to produce thin, disk-shaped substrate blanks.

Alternatively, an outflowing glass melt is severed to obtain a desired glass melt gob, which is then press molded in a pressing mold to manufacture a thin disk-shaped substrate blank. Those of Glasses I and II, to which Ce has been added, and glass III, afford the advantage of readily and thinly extending with uniform thickness when press molded. Accordingly, a thin substrate blank of low sheet thickness tolerance can be stably manufactured by press molding such glasses.

A substrate blank can also be manufactured by molding a sheet by causing a glass melt to flow out into a float bath, annealing the glass, and cutting out disk-shaped substrate blanks. Instead of a float bath, the glass melt can be made to flow out onto a flat support, and a gas cushion can be formed between the support and the glass to mold the glass into a sheet. These methods are referred to as “float methods”.

Further, instead of the above press molding and float methods, a glass blank can be manufactured by causing a glass melt to overflow from two sides of a flume-shaped mold, fusing together the glass moving along the two sides beneath the mold, pulling the glass downward to mold it into sheet glass, annealing the glass, and cutting disk-shaped substrate blanks from the sheet glass obtained. This sheet glass molding method is referred to as the “overflow down draw method” or “fusion method.”

A substrate blank produced as set forth above is drilled to provide a centerhole, the inner and outer circumferences thereof are processed, and lapping and polishing are conducted to finish a disk-shaped substrate. Subsequently, the substrate is cleaned with cleaning agents such as acids and alkalis, rinsed, dried, and subjected to the above-described chemical strengthening, as needed. A chemical strengthening treatment can also be conducted following the mirror-surface polishing step and before the cleaning step.

The substrate is exposed to acids, alkalis, and water in this series of steps. However, the glass for an information-recording medium substrate of the present invention has good acid resistance, alkali resistance, and water resistance. Thus, the surface of the substrate does not roughen, and a substrate with a flat, smooth surface is obtained. How a substrate with increased smoothness without adhering matter is obtained will be described in detail below.

As set forth above, a glass substrate for a magnetic recording medium (magnetic disk-use glass substrate) is subjected to lapping and polishing to form the surface shape of a substrate surface (main surface), which is a surface on which information is recorded. However, during polishing, for example, polishing abrasive and adhering matter are present on the main surface immediately following finishing (mirror-surface polishing). To remove these, it is necessary to clean the main surface after mirror-surface polishing. Further, for example, when conducting a chemical strengthening treatment following mirror-surface polishing, the chemical strengthening treatment ends up changing the surface shape of the main surface, or the strengthening salt adheres to the main surface, so cleaning must be conducted. Examples of this cleaning are washing with an acid and/or washing with an alkali. Both are often conducted. When the glass substrate for an information-recording medium has poor acid resistance and poor alkali resistance, the washing ends up roughening the substrate surface. When the cleaning agent is weakened to prevent roughening of the substrate surface by washing, the polishing abrasive, adhering material, strengthening salt or the like adhering to the substrate surface cannot be adequately removed. Accordingly, to reduce adhering material containing polishing abrasive and to enhance the smoothness of the substrate surface, it is necessary for a glass substrate for an information-recording medium to possess adequate acid and alkali resistance.

Recording densities have continued to climb in recent years. For example, high-density information-recording media with recording densities of 130 Gbit/inch$^2$ or higher, preferably 200 Gbit/inch$^2$, are in demand. Such high recording densities can be effectively achieved by reducing the amount of float of the recording and reproducing head relative to the information-recording medium. To this end, it is desirable to employ a highly smooth substrate in information-recording media. For example, to manufacture an information-recording medium with a recording density of 130 Gbit/inch$^2$, the surface roughness (Ra) of the main surface of the glass substrate of the information-recording medium is desirably 0.25 nm or lower, preferably 0.2 nm or lower, and more preferably, 0.15 nm or lower. Achieving this surface roughness makes it possible to achieve a high recording density because the amount of float of the recording and reproducing head relative to the information-recording medium is reduced. In the present invention, the term "main surface" means a surface on which an information recording layer is provided. Since these surfaces are the surfaces of greatest area of the information-recording medium, they are called "main surfaces." In a disk-shaped information-recording medium, they correspond to the round exterior surfaces of the disk (excluding the centerhole, when present).

The polishing abrasive employed in the above mirror-surface polishing is not specifically limited other than that it be capable of imparting a roughness Ra of 0.25 nm or lower to the main surface of the glass substrate of an information-recording medium. However, silicon dioxide is preferred. It is also desirable to employ colloidal silica, in which the silicon dioxide is in the form of a colloid, to conduct acid polishing or alkali polishing to impart a surface shape to the glass substrate.

In the above cleaning, acid cleaning is suitable from the perspective of removing organic matter adhering to the main substrate surface. Additionally, alkali cleaning is suitable from the perspective of removing inorganic matter (such as iron) adhering to the substrate surface. That is, acid cleaning and alkali cleaning are employed to remove different materials. In terms of manufacturing a glass substrate for an information-recording medium, both are desirably employed in combination, preferably with an acid cleaning step and an alkali cleaning step being conducted successively. From the perspective of controlling the charge on the glass substrate after cleaning, it is desirable to conduct cleaning with an alkali after cleaning with an acid.

Since the above glass substrate is highly resistant to acids and to alkalis, it permits the manufacturing of a glass substrate having a smooth surface with less adhered material.

[The Magnetic Recording Medium]

The present invention includes a magnetic recording medium having an information recording layer on the above magnetic recording medium substrate.

The present invention further relates to a method for manufacturing a magnetic recording medium, comprising manufacturing a glass substrate for a magnetic recording medium by the method for manufacturing a magnetic recording medium substrate of the present invention, and forming an information recording layer on the glass substrate.

The glasses of the present invention as set forth above permit the manufacturing of substrates of high surface flatness, and of good shape stability following chemical strengthening treatment. Magnetic recording media comprising the above-described substrates are suited to high-density recording. Further, since a substrate of high heating efficiency can be obtained, it is possible to manufacture magnetic recording media with good production efficiency.

As set forth above, the magnetic recording medium of the present invention is capable of catching up with high-density recording, and is particularly suitable to use as a magnetic recording medium in vertical magnetic recording methods. A magnetic recording medium suited to vertical magnetic recording methods makes it possible to provide a magnetic recording medium capable of catching up with even higher recording densities. That is, a magnetic recording medium suited to vertical magnetic recording methods can achieve even higher magnetic recording densities because it has a recording density (such as 1 Tbit/(2.5 cm)$^2$) that is higher than the surface recording density (100 GBit/(2.5 cm)$^2$ or higher) of magnetic recording media suited to conventional longitudinal magnetic recording methods.

The magnetic recording medium of the present invention comprises an information recording layer on the above-described glass substrate. For example, it is possible to manufacture an information-recording medium such as a magnetic disk by successively providing an underlayer, magnetic layer, protective layer, and lubricating layer and the like on the above-described glass substrate.

The information recording layer is not specifically limited other than that it be suitably selected for the type of medium. For example, it can be a Co—Cr-based (here, the term "based" means a material containing the denoted substance), Co—Cr—Pt-based, Co—Ni—Cr-based, Co—Ni—Pt-based, Co—Ni—Cr—Pt-based, or Co—Cr—Ta-based magnetic layer. An Ni layer, Ni—P layer, Cr layer, or the like can be employed as the underlayer. Specific examples of the material employed in the magnetic layer suited to high-density recording (information recording layer) are CoCrPt-based alloy materials, particularly CoCrPtB-based alloy materials. FePt-based alloy materials are also suitable. These magnetic layers are highly useful as magnetic materials, particularly in vertical magnetic recording systems. Films of CoCrPt-based alloy materials can be formed, or heat treated following film formation, at 300 to 500° C., and films of FePt-based alloy materials can be formed, or heat treated following film formation, at an elevated temperature of 500 to 600° C., to adjust the crystal orientation or crystalline structure and achieve a structure suited to high-density recording.

A nonmagnetic and/or soft magnetic underlayer can be employed as the underlayer. A nonmagnetic underlayer is principally provided to reduce the size of the crystal grains of the magnetic layer, or to control the crystal orientation of the magnetic layer. A bcc-based crystalline underlayer, such as a Cr-based underlayer, has the effect of promoting an in-plane orientation, and is thus desirable in magnetic disks employed in in-plane (longitudinal) recording methods. An hcp-based crystalline underlayer, such as a Ti-based underlayer or Ru-based underlayer, has the effect of promoting a vertical orientation, and can thus be used in magnetic disks suited to vertical magnetic recording methods. An amorphous underlayer has the effect of reducing the size of the crystal grains in the magnetic layer.

Soft magnetic underlayers are primarily employed in vertical magnetic recording disks. They have the effect of promoting magnetized pattern recording by magnetic heads on vertical magnetic recording layers (magnetic layers). To fully utilize the effects of a soft magnetic underlayer, a layer with a high saturation magnetic flux density and high magnetic transmittance is desirable. Desirable examples of such soft magnetic layer materials are Fe-based soft magnetic materials such as FeTa-based soft magnetic materials and FeTaC-based soft magnetic materials. CoZr-based soft magnetic materials and CoTaZr-based soft magnetic materials are also desirable.

A carbon film or the like can be employed as the protective layer. A lubricant such as a perfluoropolyether-based lubricant can be employed to form the lubricating layer.

One desirable form of a vertical magnetic recording disk is a magnetic disk comprised of the substrate of the present invention, upon which are successively formed films in the form of a soft magnetic underlayer, an amorphous nonmagnetic underlayer, a crystalline nonmagnetic underlayer, a vertical magnetic recording layer (magnetic layer), a protective layer, and a lubricating layer.

In the case of a magnetic recording medium suited to vertical magnetic recording methods, desirable examples of the structure of the films formed on the substrate are, on a nonmagnetic material in the form of a glass substrate: a single-layer film formed of a vertical magnetic recording layer, a two-layer film comprising a successively layered soft magnetic layer and magnetic recording layer, and a three-layer film comprising a successively layered hard magnetic layer, soft magnetic layer, and magnetic recording layer. Of these, the two-layer film and three-layer film are desirable because they are better suited to high recording densities and stably maintaining the magnetic moment.

The glass substrate for a magnetic recording medium of the present invention permits the suitable manufacturing of a magnetic disk for recording and reproduction at a surface information recording density of 200 Gbit/inch$^2$ or greater.

An example of a magnetic disk corresponding to a surface information recording density of 200 Gbit/inch$^2$ or greater is a magnetic disk corresponding to a vertical magnetic recording method.

When recording and reproducing information with a hard disk drive at a surface information recording density of 200 Gbit/inch$^2$ or greater, the flying height above the magnetic disk of the magnetic head that travels by floating opposite the main surface of the magnetic disk and records and reproduces signals is 8 nm or less. The main surfaces of a magnetic disk equipped to handle this are normally in a mirror-surface state. The main surfaces of the magnetic disk are normally required to have a surface roughness Ra of 0.25 nm or lower. Based on the glass substrate for a magnetic recording medium of the present invention, it is possible to suitably manufacture a magnetic disk corresponding to a magnetic head with a flying height of 8 nm or less.

When recording and reproducing information at a surface information recording density of 200 Gbit/inch$^2$ or higher, a dynamically controlled flying height element called a "dynamic flying height" head ("DFH head" hereinafter) is sometimes employed as the recording and reproducing element on which the magnetic head is mounted.

With a DFH head, the area around the element is heated to cause the magnetic head element to thermally expand, narrowing the gap between the magnetic head and the magnetic disk. Thus, the main surface of the magnetic disk must necessarily be a mirror surface with a surface roughness of 0.25 nm or less. Based on the glass substrate of an information-recording medium of the present invention, it is possible to suitably manufacture a magnetic disk for a DFH head.

The glass substrate for a magnetic recording medium of the present invention is amorphous glass, and permits the generation of a mirror surface of suitable surface roughness.

An implementing mode of a magnetic disk that is an information-recording medium employing the glass substrate for a magnetic recording medium of the present invention will be described below with reference to the drawings.

FIG. 1 shows an example of the configuration of a magnetic disk 10 relating to an implementing mode of the present invention. In the present implementing mode of the present invention, magnetic disk 10 comprises a glass substrate 12, an adhesive layer 14, a soft magnetic layer 16, an underlayer 18, a size reduction enhancing layer 20, a magnetic recording layer 22, a protective layer 24, and a lubricating layer 26 in this order. Magnetic recording layer 22 functions as an information recording layer for recording and reproducing information.

In magnetic disk 10, an amorphous seed layer may further be provided between soft magnetic layer 16 and underlayer 18. The term "seed layer" refers to a layer for enhancing the crystal orientation of underlayer 18. For example, when underlayer 18 is Ru, the seed layer is a layer for enhancing the C-axis orientation of the hcp crystalline structure.

Glass substrate 12 is a glass substrate on which are formed the various layers of magnetic disk 10. The above-described glass substrate for a magnetic recording medium of the present invention can be employed as this glass substrate.

The main surface of the glass substrate is desirably a mirror surface with a surface roughness Ra of 0.25 nm or less. A mirror surface with a surface roughness Rmax of 3 nm or less is desirable.

Employing such a flat mirror surface makes it possible to achieve a constant separation distance between magnetic recording layer 22, which is a vertical magnetic recording layer, and soft magnetic layer 16. Thus, it is possible to form a suitable magnetic circuit between the head, magnetic recording layer 22, and soft magnetic layer 16.

Adhesive layer 14 is a layer for enhancing adhesion between glass substrate 12 and soft magnetic layer 16. It is formed between glass substrate 12 and soft magnetic layer 16. Using adhesive layer 14 prevents separation of soft magnetic layer 16. By way of example, a Ti-containing material can be employed as the material of adhesive layer 14. In practical terms, the thickness of adhesive layer 14 is desirably 1 to 50 nm. The material of adhesive layer 14 is desirably an amorphous material.

Soft magnetic layer 16 is a layer for adjusting the magnetic circuit of magnetic recording layer 22. Soft magnetic layer 16 is not specifically limited other than that it be formed of a magnetic material exhibiting soft magnetic characteristics. For example, it desirably exhibits a magnetic characteristic in the form of a coercivity (Hc) of 0.01 to 80 Oersteds, desirably 0.01 to 50 Oersteds. Further, it desirably exhibits a magnetic characteristic in the form of a saturation magnetic flux density (Bs) of 500 to 1,920 emu/cc. Examples of the material of soft magnetic layer 16 are Fe-based and Co-based materials. For examples, materials such as Fe-based soft magnetic materials such as FeTaC-based alloys, FeTaN-based alloys, FeNi-based alloys, FeCoB-based alloys, and FeCo-based alloys; Co-based soft magnetic materials such as CoTaZr-based alloys and CoNbZr-based alloys; and FeCo-based alloy soft magnetic materials can be employed. The material of soft magnetic layer 16 is suitably an amorphous material.

The thickness of soft magnetic layer 16 is, for example, 30 to 1,000 nm, preferably 50 to 200 nm. At less than 30 nm, it is sometimes difficult to form a suitable magnetic circuit between the head, magnetic recording layer 22, and soft magnetic layer 16. At greater than 1,000 nm, the surface roughness sometimes increases. Further, at greater than 1,000 nm, film formation by sputtering is sometimes difficult.

Underlayer 18 is a layer for controlling the crystal orientation of size reduction enhancing layer 20 and magnetic recording layer 22, and contains ruthenium (Ru), for example. In the present implementing mode of the invention, underlayer 18 is formed of multiple layers. In underlayer 18, a layer containing an interface with size reduction enhancing layer 20 is formed of Ru crystal grains.

Size reduction enhancing layer 20 is a nonmagnetic layer having a granular structure. In the present implementing mode of the invention, size reduction promoting layer 20 is comprised of a nonmagnetic CoCrSiO material having a granular structure.

Size reduction enhancing layer 20 has a granular structure comprised of an oxide grain boundary portion containing SiO and a metal particle portion containing CoCr separate from the grain boundary portion.

Magnetic recording layer 22 comprises a ferromagnetic layer 32, a magnetic coupling control layer 34, and an energy exchange control layer 36 in this order on size reduction enhancing layer 20. Ferromagnetic layer 32 is a CoCrPtSiO layer with a granular structure, comprising magnetic crystal grains in the form of CoCrPt crystal grains.

Ferromagnetic layer 32 has a granular structure comprised of an oxide grain boundary portion containing SiO and a metal particle portion containing CoCrPt separate from the grain boundary portion.

Magnetic coupling control layer 34 is a coupling control layer for controlling magnetic coupling between ferromagnetic layer 32 and energy exchange control layer 36. Magnetic coupling control layer 34 is comprised of, for example, a palladium (Pd) layer or a platinum (Pt) layer. The thickness of magnetic coupling control layer 34 is, for example, 2 nm or less, preferably 0.5 to 1.5 nm.

Energy exchange control layer 36 is a magnetic layer (continuous layer) the easily magnetized axis of which is aligned in almost the same direction as ferromagnetic layer 32. By means of exchange coupling with ferromagnetic layer 32, energy exchange control layer 36 improves the magnetic recording characteristic of magnetic disk 10. Energy exchange control layer 36, for example, is comprised of multiple films in the form of alternating laminated films of cobalt (Co) or an alloy thereof and palladium (Pd) ([CoX/Pd]n), or alternating laminated films of cobalt (Co) or an alloy thereof and platinum (Pt) ([CoX/Pt]n). It is suitably 1 to 8 nm, preferably 3 to 6 nm in thickness.

Protective layer 24 is a protective layer for protecting magnetic recording layer 22 from impact with the magnetic head. Lubricating layer 26 is a layer for increasing lubrication between the magnetic head and magnetic disk 10.

A desirable method of manufacturing the various layers of magnetic disk 10 excluding lubricating layer 26 and protective layer 24 is film formation by sputtering. Formation by DC magnetron sputtering produces uniform films and is particularly desirable.

As a desirable example, protective film 24 can be formed by CVD employing a hydrocarbon as the material gas. Lubricating film 26 can be formed by dipping.

In the present mode, it is suitable to form an amorphous layer (such as adhesive layer 14) in contact with a mirror-surface amorphous glass substrate. Soft magnetic layer 16 is suitably employed as the amorphous material. Based on the present invention, it is possible to obtain a mirror-surface magnetic disk surface having a Ra of 0.25 nm or less, for example, reflecting the surface roughness of a glass substrate with a Ra of 0.25 nm or less.

The dimensions of the magnetic recording medium substrate (for example, a magnetic disk substrate) or the magnetic recording medium (for example, a magnetic disk) of the present invention are not specifically limited. However, the medium and the substrate can be reduced in size to permit a high recording density. For example, a magnetic disk substrate or a magnetic disk with a nominal diameter of 2.5 inches, or even smaller (for example, 1 inch) is suitable.

[Embodiments]

The present invention is described in greater detail below through embodiments. However, the present invention is not limited to the forms given in the embodiments.

Embodiment A (1) Melting of the Glass

Starting materials such as oxides, carbonates, nitrates, and hydroxides, as well as clarifying agents such as $SnO_2$ and $CeO_2$ were weighed out and mixed to obtain mixed starting materials so as to obtain glasses with the compositions of No. 1-1 to No. 1-59, No. 2-1 to No. 2-59, No. 3-1 to No. 3-59, No. 4-1 to No. 4-59, No. 5-1 to No. 5-59, No. 6-1 to No. 6-59, No. 7-1 to No. 7-59, and No. 8-1 to No. 8-59 shown in Tables 1 to 8. The starting materials were charged to melting vessels; heated, melted, clarified, and stirred for 6 hours over a range of 1,400 to 1,600° C. to produce homogeneous glass melts containing neither bubbles nor unmelted material. After being maintained for 6 hours at a range of 1,400 to 1,600° C. as stated above, the temperature of each glass melt was decreased (lowered), and the glass melt was maintained for 1 hour at a range of 1,200 to 1,400° C. to markedly enhance the clarifying effect. In particular, glass melts in which Sn and Ce were both present were confirmed in the manner set forth above to exhibit extremely pronounced clarifying effects. In the glass compositions shown in Tables 1 to 8, the compositions denoted as molar percentages of oxides (with the exception that clarifying agents such as $SnO_2$ and $CeO_2$, denoted as mass percentages based on the total amount of the glass components, are added) serve as bases. Compositions in which the ratios of the atoms comprising the glass are denoted as mass percentages were obtained by conversion from the compositions serving as bases (denoted as molar percentages of oxides).

The surface of each glass obtained was polished flat and smooth. The interior of the glass was magnified and observed (40 to 100-fold) from the polished surface with an optical microscope, and the number of residual bubbles was counted. The number of residual bubbles counted was divided by the mass of the glass corresponding to the magnified area observed to obtain the density of residual bubbles.

Glasses with 0 to 2 residual bubbles/kg were ranked A. Glasses with 3 to 10 residual bubbles/kg were ranked B. Glasses with 11 to 20 residual bubbles/kg were ranked C. Glasses with 21 to 40 residual bubbles/kg were ranked D. Glasses with 41 to 60 residual bubbles/kg were ranked E. Glasses with 61 to 100 residual bubbles/kg were ranked F. Glasses with 101 or more residual bubbles/kg were ranked G. The corresponding rankings of the various glasses are given in Tables 1 to 8.

The size of the residual bubbles in each of the glasses shown in Tables 1 to 8 was 0.3 mm or less.

No crystals or unmelted starting materials were found in the glasses thus obtained.

Based on the results given in Tables 1 to 8, the relation between the quantities of Sn and Ce added and the density of residual bubbles was determined. The quantities of Sn and Ce added were adjusted so that the density of residual bubbles was at or below a desired value, and glasses were produced. It is thus possible to suppress the density of residual bubbles to a desired level.

Next, glasses were prepared by the same method as the above, with the exceptions that the temperature of glass melts that had been maintained for 15 hours at 1,400 to 1,600° C. was lowered, the glass melts were maintained for 1 to 2 hours at 1,200 to 1,400° C., and molding was conducted. The density and size of the residual bubbles were examined, and the presence of crystals and unmelted starting materials was checked. This yielded the same results as above. When the period of maintenance at 1,400 to 1,600° C. is denoted as TH and the period of maintenance at 1,200 to 1,400° C. is denoted as TL, the ratio of TL/TH for all of the above-described methods is desirably 0.5 or lower, preferably 0.2 or lower. By increasing TH relative to TL, discharge of gas present within the glass to the exterior of the glass is facilitated. However, to enhance the incorporating effect of gas in the glass by Ce, TL/TH is desirably greater than 0.01, preferably greater than 0.02, more preferably greater than 0.03, and still more preferably, greater than 0.04.

To enhance the bubble eliminating effects of Sn and Ce, the temperature difference in the course of decreasing the temperature from the 1,400 to 1,600° C. range to the 1,200 to 1,400° C. range is desirably 30° C. or greater, preferably 50° C. or greater, more preferably 80° C. or greater, still more preferably 100° C. or greater, and yet more preferably, 150° C. or greater. The upper limit of the temperature difference is 400° C.

The viscosity at 1,400° C. of each of the glasses of Tables 1 to 8 was measured by the viscosity measuring method employing a coaxial double cylinder rotating viscometer of JIS Standard Z8803.

The viscosity at 1,400° C. of each of the glasses of No. 1-1 to No. 1-59 was 300 dPa·s. The viscosity at 1,400° C. of each of the glasses of No. 2-1 to No. 2-59 was 250 dPa·s. The viscosity at 1,400° C. of each of the glasses of No. 3-1 to No. 3-59 was 400 dPa·s. The viscosity at 1,400° C. of each of the glasses of No. 4-1 to No. 4-59 was 350 dPa·s. The viscosity at 1,400° C. of each of the glasses of No. 5-1 to No. 5-59 was 300 dPa·s. The viscosity at 1,400° C. of each of the glasses of No. 6-1 to No. 6-59 was 320 dPa·s. The viscosity at 1,400° C. of each of the glasses of No. 7-1 to No. 7-59 was 200 dPa·s. And the viscosity at 1,400° C. of each of the glasses of No. 8-1 to No. 8-59 was 320 dPa·s.

Further, each of the glasses to which Ce was added was processed into a flat sheet 1 mm in thickness with two optically polished surfaces. Light was directed vertically into the optically polished surfaces. The spectral transmittance was measured, and the wavelength λ(lambda)80 at which the external transmittance become 80 percent (including the loss due to reflection at the glass surface) and the wavelength λ(lambda)5 at which it became 5 percent were measured. The following are measurement results for some of the glasses. Glass No. 1-13 (0.1565 mass percent Sn, 0.1622 mass percent Ce, 0.2 mass percent $SnO_2$, 0.2 mass percent $CeO_2$) has a λ80 of 355 nm and a λ5 of 327 nm. Glass No. 1-28 (0.2344 mass percent Sn, 0.1620 mass percent Ce, 0.3 mass percent $SnO_2$, 0.2 mass percent $CeO_2$) has a λ80 of 355 nm and a λ5 of 327 nm. Glass No. 1-46 (0.3895 mass percent Sn, 0.2422 mass percent Ce, 0.5 mass percent $SnO_2$, 0.2 mass percent $CeO_2$) has a λ80 of 360 nm and a λ5 of 335 nm.

This shows that as the quantity of Ce added was increased, the absorption by the glass in the short wavelength range tended to increase. Along with this tendency, the fluorescent intensity of the glass when irradiated with UV light also increased. The addition of Ce is desirable in order to make it possible to distinguish glass based on the fluorescence emitted when irradiated with UV light and in order to generate adequately strong fluorescence to permit the detection of foreign matter on the glass surface. Accordingly, an examination of the relation between λ(lambda)80, λ(lambda)5, and the fluorescent intensity suited to these applications revealed that a λ80 of 320 nm or greater provided adequate fluorescent intensity. On this basis, the quantity of Ce added is desirably determined to yield a λ80 of 320 nm or greater. The quantity of Ce added is preferably determined to yield a λ80 of 330 nm or greater. And the quantity of Ce added is more preferably determined to yield a λ80 of 350 nm or greater. Similarly, for λ5, the quantity of Ce added is desirably determined to yield a λ5 of 300 nm or greater. The quantity of Ce added is preferably determined to yield a λ5 of 310 nm or greater. The quantity of Ce added is more preferably determined to yield a λ5 of 320 nm or greater. And the quantity of Ce added is still more preferably determined to yield a λ5 of 330 nm or greater.

From the perspective of ready distinction and detection based on fluorescence, the quantity of $CeO_2$ added is desirably 0.1 mass percent or greater, preferably 0.2 mass percent or greater, and more preferably, 0.3 mass percent or greater. For distinction and detection by fluorescence, when λ80 or the quantity of $CeO_2$ added is outside the above-stated range, it is impossible to achieve an adequate fluorescent intensity. This renders distinction and detection difficult.

The Young's modulus of each of the glasses of Nos. 1-1 to 1-59 is 81 GPa or higher; that of Nos. 5-1 to 5-59 is 84 GPa or higher; and that of Nos. 7-1 to 7-59 is 84 GPa or higher. In each of the above glasses, when neither Sn nor Ce was added, or when Sb was added without adding Sn and Ce, it is possible to obtain a glass with a higher Young's modulus than when Sn and Ce are added. For each of the glasses of Nos. 2-1 to 2-59, Nos. 3-1 to 3-59, Nos. 4-1 to 4-59, Nos. 6-1 to 6-59, and Nos. 8-1 to 8-59, as well, it is possible to increase the Young's modulus by adding Sn and Ce. Increasing the Young's modulus makes it possible to achieve good fluttering resistance during high-speed rotation in magnetic recording media equipped with substrates manufactured from these glasses.

(2) Molding of the Glass

Disk-shaped substrate blanks were fabricated from the above glasses by methods A to C below. Substrate blanks were fabricated by the three methods of A to C from the glasses of Nos. 1-1 to 1-59. For the other glasses, substrate blanks were fabricated by method A. For the glasses of Nos.

1-1 to 1-59, the results of residual bubbles and etching rates given in the tables are the results for the substrate blanks fabricated by method A. The same holds true for the results for the substrate blanks fabricated by methods B and C.

(Method A)

The above-described glass melt that had been clarified and homogenized was made to flow at a constant rate out of a pipe and received in a lower mold for press molding. The glass melt flowing out was cut with a cutting blade to obtain a glass melt gob of prescribed weight in the lower mold. The lower mold carrying the glass melt gob was immediately conveyed downward from the pipe. An upper mold facing the lower mold and a sleeve mold were employed to press mold the glass melt gob into a thin, disk shape 66 mm in diameter and 1.2 mm in thickness. The press-molded article was cooled to a temperature at which it did not deform, removed from the mold, and annealed to obtain a substrate blank. In the above molding, multiple lower molds were employed to successively mold the glass melt flowing out into disk-shaped substrate blanks. Since the glass contained prescribed quantities of Sn and Ce, particularly Ce, the glass extended more readily to a uniform thickness during press molding than glass that did not contain these additives. When glass blanks 1.2 mm or less in thickness were produced in quantity, it was possible to reduce the tolerance of the thickness of the glass blanks, permitting improved production efficiency in the glass blank processing step, described further below.

(Method B)

The above-described glass melt that had been clarified and homogenized was continuously cast from above into the through-holes of a heat-resistant casting mold equipped with cylindrical through-holes, molded into a cylindrical shape, and removed from beneath the through-holes. The glass that was removed was annealed. A multiwire saw was then employed to slice the glass at regular intervals in a direction perpendicular to the cylindrical axis thereof to fabricate disk-shaped substrate blanks.

(Method C)

The above-described glass melt was caused to flow out onto a float bath and molded into sheets (molded by the float method). After annealing, disk-shaped pieces of glass were cut from the sheet glass, yielding substrate blanks.

(Method D)

The above-described glass melt was molded into glass sheets by the overflow down draw method (fusion method) and annealed. Disk-shaped pieces of glass were then cut from the sheet glass, yielding substrate blanks.

(3) Substrate Fabrication

A grindstone was used to form throughholes in the center of substrate blanks obtained by each of the above-described methods. Outer circumference grinding processing was conducted. The edge surfaces (inner circumference, outer circumference) were polished with brushes while rotating the disk-shaped pieces of glass to achieve a maximum surface roughness (Rmax) of about 1.0 micrometer and an arithmetic average roughness (Ra) of about 0.3 micrometer. Next, abrasive particles with #1000-grit were employed to grind the glass substrate surfaces to a degree of flatness of 3 micrometers, an Rmax of about 2 micrometers, and an Ra of about 0.2 micrometer on the main surface. Here, the term "degree of flatness" refers to the distance (difference in height) in a vertical direction (direction vertical to the surface) between the highest portion and the lowest portion of the substrate surface. This was measured with a flatness measuring device. Rmax and Ra were measured for a 5×5 micrometer rectangular area with an atomic force microscope (AFM) (a Nanoscope made by Digital Instruments). Next, a preliminary polishing step was conducted with a polishing device capable of polishing both main surfaces of 100 to 200 glass substrates at once. A hard polisher was employed as the polishing pad. A polishing pad that had been preloaded with zirconium oxide and cerium oxide was employed as the polishing pad.

The polishing solution in the preliminary polishing step was prepared by mixing cerium oxide abrasive grains with an average particle diameter of 1.1 micrometers in water. Polishing grains with a grain diameter exceeding 4 micrometers were eliminated in advance. Measurement of the polishing solution revealed that the largest polishing grains contained in the polishing solution were 3.5 micrometers, the average value was 1.1 micrometers, and the D50 value was 1.1 micrometers.

Additionally, the load applied to the glass substrates was 80 to 100 g/cm$^2$. The thickness removed from the surface portion of the glass substrates was set to 20 to 40 micrometers.

Next, a mirror-surface polishing step was conducted with a planetary gear-type polishing device capable of polishing both main surfaces of 100 to 200 glass substrates at once. A soft polisher was employed as the polishing pad.

The polishing solution in the mirror-surface polishing step was prepared by adding sulfuric acid and tartaric acid to ultrapure water, and then further adding colloidal silica particles with a grain diameter of 40 nm. In this process, the sulfuric acid concentration in the polishing solution was adjusted to 0.15 mass percent, and the pH of the polishing solution to 2.0 or lower. The concentration of tartaric acid was adjusted to 0.8 mass percent, and the content of colloidal silica particles to 10 mass percent.

In the course of mirror-surface polishing processing, the pH value of the polishing solution did not vary, and could be kept approximately constant. In the present embodiment, the polishing solution that was fed onto the surfaces of the glass substrates was recovered by means of a drain, cleaned by removing foreign material with a meshlike filter, and then reused by being fed back onto the glass substrate.

The polishing rate in the mirror-surface polishing step was 0.25 micrometer/minute. This was found to be an advantageous polishing processing rate under the above-stated conditions. The polishing processing rate was calculated by dividing the amount of reduction (processing removed amount) in the thickness of the glass substrate required for finishing into a prescribed mirror surface by the time required for polishing processing.

Next, the glass substrates were cleaned with an alkali by being immersed in a 3 to 5 mass percent concentration NaOH aqueous solution. This cleaning was conducted with the application of ultrasound. Cleaning was further conducted by successive immersion in cleaning vats of a neutral cleaning agent, pure water, pure water, isopropyl alcohol, isopropyl alcohol (steam drying). The surfaces of the substrates following cleaning were observed by AFM (Nanoscope, made by Digital Instruments) (a rectangular area 5×5 micrometers was measured), revealing that no colloidal silica polishing grains had adhered. Nor was any foreign matter in the form of stainless steel, iron, or the like discovered. Nor was any increase in the roughness of the substrate surfaces observed following cleaning.

Portions of the glass substrates that had been fabricated were subjected to a masking treatment to protect the portions from etching. The glass substrates in this state were immersed in a 0.5 volume percent hydrogenfluosilicic acid aqueous solution maintained at 50° C. or a 1 mass percent potassium hydroxide aqueous solution maintained at 50° C. for a prescribed period. Subsequently, the glass substrates were withdrawn from the various aqueous solutions. The difference (etching difference) between the masked portions and the portions without masks was measured, and then divided by the immersion time to calculate the amount of etching (etching rate) per unit time. The acid etching rates and alkali etching rates obtained are given in the tables. Etching rates were measured for the glasses of Nos. 1-1 to 1-59, Nos. 2-1 to 2-59, and Nos. 7-1 to 7-59. Each of the glasses of Nos. 1-1 to 1-59 and Nos. 2-1 to 2-59 had an acid etching rate of 3.0 nm/minute or less and an alkali etching rate of 0.1 nm/minute or less. This indicates good acid resistance and alkali resistance. By contrast, although the various glasses of Nos. 7-1 to 7-59 had good alkali resistance, they exhibited poor acid resistance.

In the same manner as the various glasses of Nos. 1-1 to 1-59 and Nos. 2-1 to 2-59, the various glasses of Nos. 3-1 to 3-59, Nos. 4-1 to 4-59, and Nos. 6-1 to 6-59 also exhibited acid etching rates of 3.0 nm/minute or less and alkali etching rates of 0.1 nm/minute or less, indicating good acid resistance and alkali resistance.

Next, potassium nitrate (60 mass percent) and sodium nitrate (40 mass percent) were mixed and heated to 375° C. to prepare a chemical strengthening salt. Glass substrates that had been cleaned and preheated to 300° C. were immersed for 3 hours in this salt to conduct a chemical strengthening treatment. This treatment caused lithium ions and sodium ions on the surface of the glass substrates to be replaced with sodium ions and potassium ions, respectively, in the chemical strengthening salt, thereby chemically strengthening the glass substrates. The thickness of the compressive stress layer formed in the surfaces of the glass substrates was about 100 to 200 micrometers. Following chemical strengthening, the glass substrates were rapidly cooled by immersion in a vat of water at 20° C. and maintained there for about 10 minutes.

Next, the rapidly cooled glass substrates were immersed in sulfuric acid that had been heated to about 40° C., and cleaned while applying ultrasound. Subsequently, the glass substrates were cleaned with a 0.5 percent (volume percent) hydrogenfluosilicic acid ($H_2SiF$) aqueous solution followed by a 1 mass percent potassium hydroxide aqueous solution. Through the above process, a magnetic disk glass substrate 12 was manufactured.

The magnetic disk glass substrate was then examined. Atomic force microscopic (AFM) measurement (a 5×5 micrometer rectangular area was measured) of the surface roughness of the magnetic disk glass substrate revealed a maximum peak height (Rmax) of 1.5 nm and an arithmetic average roughness (Ra) of 0.15 nm. The surface was in a clean mirror-surface state, free of the presence of foreign material hindering magnetic head flying, and free of foreign matter causing thermal asperity impediments. No increase in the roughness of the substrate surface was observed following cleaning. Next, the bending strength was measured. The bending strength was obtained as the value of the load when the glass substrate was damaged when a load was applied to the glass substrate as shown in FIG. 2 using a bending strength measuring and testing device (Shimadzu Autograph DDS-2000). The bending strength obtained, at 24.15 kg, was satisfactory.

In the above description, acid cleaning and alkali cleaning were conducted after chemical strengthening, but it is also possible to conduct acid cleaning and alkali cleaning after the mirror-surface polishing step.

For the various glasses shown in Tables 1 to 8, the substrates fabricated by adding Ce to the glass were irradiated with UV light. When observed in a darkroom, they were visually observed to emit blue fluorescence. This fluorescence could be used to determine whether or not foreign matter, such as residual abrasive or minute dust particles, had adhered to the substrate surface. The presence of blue fluorescence due to Ce could also be used to determine whether heterogeneous glass substrates in which no Ce had been added had been mixed in with the glass substrates to which Ce had been added.

A magnetic disk 10 was fabricated using the glass substrate 12 that had been thus obtained, and tested in a hard disk drive. FIG. 1 shows a typical film configuration (cross-section) on substrate 12.

First, a film-forming device in which a vacuum had been drawn was employed to successively form adhesive layer 14 and soft magnetic layer 16 in an argon atmosphere by DC magnetron sputtering.

Adhesive layer 14 was formed as a 20 nm amorphous CrTi layer using a CrTi target. Soft magnetic layer 16 was formed as a 200 nm amorphous CoTaZr layer (Co: 88 atomic percent, Ta: 7 atomic percent, Zr: 5 atomic percent) using a CoTaZr target.

Magnetic disk 10, on which films up to soft magnetic layer 16 had been formed, was removed from the film-forming device. The surface roughness thereof was measured as set forth above, revealing a smooth mirror surface with an Rmax of 2.1 nm and an Ra of 0.20 nm. Measurement of the magnetic characteristics with a vibrating sample magnetometer (VSM) revealed a coercivity (Hc) of 2 Oersteds and a saturation magnetic flux density of 810 emu/cc. This indicated suitable soft magnetic characteristics.

Next, a single-wafer static opposed-type film-forming device was employed to successively form an underlayer 18, granular structure size reduction enhancing layer 20, granular structure ferromagnetic layer 32, magnetic coupling control layer 34, energy exchange control layer 36, and protective film 24 in an argon atmosphere. In the present embodiment, underlayer 18 had a two-layer structure comprised of a first layer and a second layer.

In this process, a layer 10 nm in thickness of amorphous NiTa (Ni: 40 atomic percent, Ta: 10 atomic percent) was first formed on the disk substrate as the first layer of underlayer 18, followed by the formation of a Ru layer 10 to 15 nm in thickness as the second layer.

Next, a nonmagnetic CoCr—$SiO_2$ target was employed to form size reduction enhancing layer 20 comprised of a 2 to 20 nm hcp crystalline structure. A CoCrPt—$SiO_2$ hard magnetic material target was then employed to form ferromagnetic layer 32 comprised of a 15 nm hcp crystalline structure. The composition of the target for fabricating ferromagnetic layer 32 was Co: 62 atomic percent; Cr: 10 atomic percent; Pt: 16 atomic percent, and $SiO_2$: 12 atomic percent. A magnetic coupling control layer 34 in the form of a Pd layer was then formed, and an energy exchange control layer 36 in the form of a [CoB/Pd]n layer was formed.

CVD employing ethylene as the material gas was then used to form protective film 24 comprised of carbon hydride. The use of hydrogenated carbon increased film hardness, making it possible to protect magnetic recording layer 22 from impact with the magnetic heads.

Subsequently, lubricating layer 26 comprised of perfluoropolyether (PFPE) was formed by dip coating. Lubricating layer 26 was 1 nm in thickness. A vertical magnetic recording medium in the form of magnetic disk 10 suited to vertical magnetic recording methods was obtained by the above manufacturing process. The roughness of the surface obtained was measured in the same manner as above, revealing a smooth mirror surface with an Rmax of 2.2 nm and an Ra of 0.21 nm.

Magnetic disk 10 that was obtained was loaded onto a 2.5-inch loading/unloading hard disk drive. The magnetic head mounted on the hard disk drive was a dynamic flying height (abbreviated as "DFH") magnetic head. The flying height of the magnetic head relative to the magnetic disk was 8 nm.

A recording and reproducing test was conducted at a recording density of 200 Gbits/inch$^2$ in the recording and reproducing region of the main surface of the magnetic disk using this hard disk drive, revealing good recording and reproducing characteristics. During the test, no crash faults or thermal asperity faults were generated.

Next, a load unload ("LUL" hereinafter) test was conducted with the hard disk drive.

The LUL test is conducted with 2.5-inch hard disk drive rotating at 5,400 rpm and a magnetic head with a flying height of 8 nm. The above-described magnetic head was employed. The shield element was comprised of NiFe alloy. The magnetic disk was loaded on the magnetic disk device, LUL operations were repeatedly conducted with the above magnetic head, and the LUL cycle durability was measured.

Following the LUL durability test, the surface of the magnetic disk and the surface of the magnetic head are examined visually and by optical microscopy to check for abnormalities such as scratches and grime. In the LUL durability test, a durability of 400,000 or more LUL cycles without failure is required, with a durability of 600,000 cycles or more being particularly desirable. In the use environment in which a hard disk drive (HDD) is normally employed, it is reported to take about 10 years of use to exceed 600,000 LUL cycles.

When the LUL test was implemented, magnetic disk 10 met the 600,000 cycle or more standard. Following the LUL test, magnetic disk 10 was removed and inspected, revealing no abnormalities such as scratches or grime. No was any precipitation of alkali metal components observed.

COMPARATIVE EXAMPLE A

Next, the 40 glasses of Comparative Examples 1-1 to 1-5, Comparative Examples 2-1 to 2-5, Comparative Examples 3-1 to 3-5, Comparative Examples 4-1 to 4-5, Comparative Examples 5-1 to 5-5, Comparative Examples 6-1 to 6-5, Comparative Examples 7-1 to 7-5, and Comparative Examples 8-1 to 8-5 shown in Tables 1 to 8 were fabricated.

Only Sb was added as a clarifying agent in the glasses of Comparative Examples 1-1 to 1-8. Sn and an excess quantity of Sb were added as clarifying agents in the glasses of Comparative Examples 1-2 to 8-2. An excess quantity of Sn was added as clarifying agent in the glasses of Comparative Examples 1-3 to 8-3. An excess quantity of Ce was added as clarifying agent in the glasses of Comparative Examples 1-4 to 8-4. And excess quantities of Sn and Ce were added as clarifying agents in the glasses of Comparative Examples (Com. Ex.) 1-5 to 8-5.

All of the glasses of the comparative examples had residual bubbles exceeding 100 bubbles/kg. Localized pitting attributed to residual bubbles was observed on the surface of glass substrates fabricated by the same methods as in the embodiments using these glasses, and the impact resistance of the substrates was inferior to that of the embodiments.

TABLE 1

| | Component | 1-1 | 1-2 | 1-3 | 1-4 | 1-5 | 1-6 | 1-7 | 1-8 | 1-9 | 1-10 | 1-11 | 1-12 | 1-13 |
|---|---|---|---|---|---|---|---|---|---|---|---|---|---|---|
| (mol %) | SiO2 | 67.3 | 67.3 | 67.3 | 67.3 | 67.3 | 67.3 | 67.3 | 67.3 | 67.3 | 67.3 | 67.3 | 67.3 | 67.3 |
| | Al2O3 | 9.2 | 9.2 | 9.2 | 9.2 | 9.2 | 9.2 | 9.2 | 9.2 | 9.2 | 9.2 | 9.2 | 9.2 | 9.2 |
| | Li2O | 8.1 | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 | 11.2 |
| | K2O | 0.3 | 0.3 | 0.3 | 0.3 | 0.3 | 0.3 | 0.3 | 0.3 | 0.3 | 0.3 | 0.3 | 0.3 | 0.3 |
| | MgO | 1.1 | 1.1 | 1.1 | 1.1 | 1.1 | 1.1 | 1.1 | 1.1 | 1.1 | 1.1 | 1.1 | 1.1 | 1.1 |
| | CaO | 1.8 | 1.8 | 1.8 | 1.8 | 1.8 | 1.8 | 1.8 | 1.8 | 1.8 | 1.8 | 1.8 | 1.8 | 1.8 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Sb2O3 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.1 | 0.1 | 0.1 | 0.1 | 0.1 | 0.1 | 0.2 | 0.2 | 0.2 | 0.2 | 0.2 | 0.2 | 0.2 |
| | CeO2 | 0 | 0.001 | 0.005 | 0.01 | 0.05 | 0.1 | 0 | 0.001 | 0.005 | 0.01 | 0.05 | 0.1 | 0.2 |
| | Sb2O3 | 0 | 0 | 0 | 0 | 0 | 0 | 0 | 0 | 0 | 0 | 0 | 0 | 0 |
| | CeO2/SnO2 | 0.0000 | 0.0100 | 0.0500 | 0.1000 | 0.5000 | 1.0000 | 0.0000 | 0.0050 | 0.0250 | 0.0500 | 0.2500 | 0.5000 | 1.0000 |
| | SnO2 + CeO2 | 0.1 | 0.101 | 0.105 | 0.11 | 0.15 | 0.2 | 0.2 | 0.201 | 0.205 | 0.21 | 0.25 | 0.3 | 0.4 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 2.9 | 2.9 | 2.9 | 2.9 | 2.9 | 2.9 | 2.9 | 2.9 | 2.9 | 2.9 | 2.9 | 2.9 | 2.9 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 76.5 | 76.5 | 76.5 | 76.5 | 76.5 | 76.5 | 76.5 | 76.5 | 76.5 | 76.5 | 76.5 | 76.5 | 76.5 |
| | Rank on bubbles | D | C | B | B | B | B | D | B | A | A | A | A | A |
| | Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |

| | Component | 1-14 | 1-15 | 1-16 | 1-17 | 1-18 | 1-19 | 1-20 | 1-21 | 1-22 | 1-23 | 1-24 | 1-25 | 1-26 |
|---|---|---|---|---|---|---|---|---|---|---|---|---|---|---|
| (mol %) | SiO2 | 67.3 | 67.3 | 67.3 | 67.3 | 67.3 | 67.3 | 67.3 | 67.3 | 67.3 | 67.3 | 67.3 | 67.3 | 67.3 |
| | Al2O3 | 9.2 | 9.2 | 9.2 | 9.2 | 9.2 | 9.2 | 9.2 | 9.2 | 9.2 | 9.2 | 9.2 | 9.2 | 9.2 |
| | Li2O | 8.1 | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 | 11.2 |
| | K2O | 0.3 | 0.3 | 0.3 | 0.3 | 0.3 | 0.3 | 0.3 | 0.3 | 0.3 | 0.3 | 0.3 | 0.3 | 0.3 |
| | MgO | 1.1 | 1.1 | 1.1 | 1.1 | 1.1 | 1.1 | 1.1 | 1.1 | 1.1 | 1.1 | 1.1 | 1.1 | 1.1 |
| | CaO | 1.8 | 1.8 | 1.8 | 1.8 | 1.8 | 1.8 | 1.8 | 1.8 | 1.8 | 1.8 | 1.8 | 1.8 | 1.8 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |

TABLE 1-continued

| | | | | | | | | | | | | | | |
|---|---|---|---|---|---|---|---|---|---|---|---|---|---|---|
| | Sb2O3 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.25 | 0.25 | 0.25 | 0.25 | 0.25 | 0.25 | 0.25 | 0.25 | 0.3 | 0.3 | 0.3 | 0.3 | 0.3 |
| | CeO2 | 0 | 0.001 | 0.005 | 0.01 | 0.05 | 0.1 | 0.2 | 0.25 | 0 | 0.001 | 0.005 | 0.01 | 0.05 |
| | Sb2O3 | 0 | 0 | 0 | 0 | 0 | 0 | 0 | 0 | 0 | 0 | 0 | 0 | 0 |
| | CeO2/SnO2 | 0.0000 | 0.0040 | 0.0200 | 0.0400 | 0.2000 | 0.4000 | 0.8000 | 1.0000 | 0.0000 | 0.0033 | 0.0167 | 0.0333 | 0.1667 |
| | SnO2 + CeO2 | 0.25 | 0.251 | 0.255 | 0.26 | 0.3 | 0.35 | 0.45 | 0.5 | 0.3 | 0.301 | 0.305 | 0.31 | 0.35 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 2.9 | 2.9 | 2.9 | 2.9 | 2.9 | 2.9 | 2.9 | 2.9 | 2.9 | 2.9 | 2.9 | 2.9 | 2.9 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 76.5 | 76.5 | 76.5 | 76.5 | 76.5 | 76.5 | 76.5 | 76.5 | 76.5 | 76.5 | 76.5 | 76.5 | 76.5 |
| | Rank on bubbles | D | B | A | A | A | A | A | A | D | B | A | A | A |
| | Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |
| | Component | 1-27 | 1-28 | 1-29 | 1-30 | 1-31 | 1-32 | 1-33 | 1-34 | 1-35 | 1-36 | 1-37 | 1-38 | 1-39 |
| (mol %) | SiO2 | 67.3 | 67.3 | 67.3 | 67.3 | 67.3 | 67.3 | 67.3 | 67.3 | 67.3 | 67.3 | 67.3 | 67.3 | 67.3 |
| | Al2O3 | 9.2 | 9.2 | 9.2 | 9.2 | 9.2 | 9.2 | 9.2 | 9.2 | 9.2 | 9.2 | 9.2 | 9.2 | 9.2 |
| | Li2O | 8.1 | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 | 11.2 |
| | K2O | 0.3 | 0.3 | 0.3 | 0.3 | 0.3 | 0.3 | 0.3 | 0.3 | 0.3 | 0.3 | 0.3 | 0.3 | 0.3 |
| | MgO | 1.1 | 1.1 | 1.1 | 1.1 | 1.1 | 1.1 | 1.1 | 1.1 | 1.1 | 1.1 | 1.1 | 1.1 | 1.1 |
| | CaO | 1.8 | 1.8 | 1.8 | 1.8 | 1.8 | 1.8 | 1.8 | 1.8 | 1.8 | 1.8 | 1.8 | 1.8 | 1.8 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Sb2O3 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.3 | 0.3 | 0.3 | 0.4 | 0.4 | 0.4 | 0.4 | 0.4 | 0.4 | 0.4 | 0.4 | 0.4 | 0.5 |
| | CeO2 | 0.1 | 0.2 | 0.3 | 0 | 0.001 | 0.005 | 0.01 | 0.05 | 0.1 | 0.2 | 0.3 | 0.4 | 0 |
| | Sb2O3 | 0 | 0 | 0 | 0 | 0 | 0 | 0 | 0 | 0 | 0 | 0 | 0 | 0 |
| | CeO2/SnO2 | 0.3333 | 0.6667 | 1.0000 | 0.0000 | 0.0025 | 0.0125 | 0.0250 | 0.1250 | 0.2500 | 0.5000 | 0.7500 | 1.0000 | 0.0000 |
| | SnO2 + CeO2 | 0.4 | 0.5 | 0.6 | 0.4 | 0.401 | 0.405 | 0.41 | 0.45 | 0.5 | 0.6 | 0.7 | 0.8 | 0.5 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 2.9 | 2.9 | 2.9 | 2.9 | 2.9 | 2.9 | 2.9 | 2.9 | 2.9 | 2.9 | 2.9 | 2.9 | 2.9 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 76.5 | 76.5 | 76.5 | 76.5 | 76.5 | 76.5 | 76.5 | 76.5 | 76.5 | 76.5 | 76.5 | 76.5 | 76.5 |
| | Rank on bubbles | A | A | A | D | B | B | A | A | A | A | A | A | E |
| | Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |
| | Component | 1-40 | 1-41 | 1-42 | 1-43 | 1-44 | 1-45 | 1-46 | 1-47 | 1-48 | 1-49 | 1-50 | 1-51 | 1-52 |

TABLE 1-continued

| | | | | | | | | | | | | | | |
|---|---|---|---|---|---|---|---|---|---|---|---|---|---|---|
| (mol %) | SiO2 | 67.3 | 67.3 | 67.3 | 67.3 | 67.3 | 67.3 | 67.3 | 67.3 | 67.3 | 67.3 | 67.3 | 67.3 | 67.3 |
| | Al2O3 | 9.2 | 9.2 | 9.2 | 9.2 | 9.2 | 9.2 | 9.2 | 9.2 | 9.2 | 9.2 | 9.2 | 9.2 | 9.2 |
| | Li2O | 8.1 | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 | 11.2 |
| | K2O | 0.3 | 0.3 | 0.3 | 0.3 | 0.3 | 0.3 | 0.3 | 0.3 | 0.3 | 0.3 | 0.3 | 0.3 | 0.3 |
| | MgO | 1.1 | 1.1 | 1.1 | 1.1 | 1.1 | 1.1 | 1.1 | 1.1 | 1.1 | 1.1 | 1.1 | 1.1 | 1.1 |
| | CaO | 1.8 | 1.8 | 1.8 | 1.8 | 1.8 | 1.8 | 1.8 | 1.8 | 1.8 | 1.8 | 1.8 | 1.8 | 1.8 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Sb2O3 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.5 | 0.5 | 0.5 | 0.5 | 0.5 | 0.5 | 0.5 | 0.5 | 0.5 | 0.6 | 0.6 | 0.6 | 0.6 |
| components | CeO2 | 0.001 | 0.005 | 0.01 | 0.05 | 0.1 | 0.2 | 0.3 | 0.4 | 0.5 | 0 | 0.001 | 0.005 | 0.01 |
| (mass %) | Sb2O3 | 0 | 0 | 0 | 0 | 0 | 0 | 0 | 0 | 0 | 0 | 0 | 0 | 0 |
| | CeO2/SnO2 | 0.0020 | 0.0100 | 0.0200 | 0.1000 | 0.2000 | 0.4000 | 0.6000 | 0.8000 | 1.0000 | 0.0000 | 0.0017 | 0.0083 | 0.0167 |
| | SnO2 + CeO2 | 0.501 | 0.505 | 0.51 | 0.55 | 0.6 | 0.7 | 0.8 | 0.9 | 1 | 0.6 | 0.601 | 0.605 | 0.61 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 2.9 | 2.9 | 2.9 | 2.9 | 2.9 | 2.9 | 2.9 | 2.9 | 2.9 | 2.9 | 2.9 | 2.9 | 2.9 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 76.5 | 76.5 | 76.5 | 76.5 | 76.5 | 76.5 | 76.5 | 76.5 | 76.5 | 76.5 | 76.5 | 76.5 | 76.5 |
| | Rank on bubbles | C | C | B | B | A | A | A | A | A | E | C | C | C |
| | Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |

| | Component | 1-53 | 1-54 | 1-55 | 1-56 | 1-57 | 1-58 | 1-59 | Com. Ex. 1-1 | Com. Ex. 1-2 | Com. Ex. 1-3 | Com. Ex. 1-4 | Com. Ex. 1-5 |
|---|---|---|---|---|---|---|---|---|---|---|---|---|---|
| (mol %) | SiO2 | 67.3 | 67.3 | 67.3 | 67.3 | 67.3 | 67.3 | 67.3 | 67.3 | 67.3 | 67.3 | 67.3 | 67.3 |
| | Al2O3 | 9.2 | 9.2 | 9.2 | 9.2 | 9.2 | 9.2 | 9.2 | 9.2 | 9.2 | 9.2 | 9.2 | 9.2 |
| | Li2O | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 |
| | K2O | 0.3 | 0.3 | 0.3 | 0.3 | 0.3 | 0.3 | 0.3 | 0.3 | 0.3 | 0.3 | 0.3 | 0.3 |
| | MgO | 1.1 | 1.1 | 1.1 | 1.1 | 1.1 | 1.1 | 1.1 | 1.1 | 1.1 | 1.1 | 1.1 | 1.1 |
| | CaO | 1.8 | 1.8 | 1.8 | 1.8 | 1.8 | 1.8 | 1.8 | 1.8 | 1.8 | 1.8 | 1.8 | 1.8 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Sb2O3 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |

TABLE 1-continued

| | | | | | | | | | | | | | |
|---|---|---|---|---|---|---|---|---|---|---|---|---|---|
| Based on glass components (mass %) | SnO2 | | 0.6 | 0.6 | 0.6 | 0.6 | 0.6 | 0.6 | 0.6 | 0 | 0.25 | 1 | 0 | 1 |
| | CeO2 | | 0.05 | 0.1 | 0.2 | 0.3 | 0.4 | 0.5 | 0.6 | 0 | 0 | 0 | 1 | 1 |
| | Sb2O3 | | 0 | 0 | 0 | 0 | 0 | 0 | 0 | 0.5 | 0.15 | 0 | 0 | 0 |
| | CeO2/SnO2 | | 0.0833 | 0.1667 | 0.3333 | 0.5000 | 0.6667 | 0.8333 | 1.0000 | — | 0 | 0 | — | 1 |
| | SnO2 + CeO2 | | 0.65 | 0.7 | 0.8 | 0.9 | 1 | 1.1 | 1.2 | 0 | 0.25 | 1 | 1 | 2 |
| (mol %) | Li2O + Na2O + K2O | | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | | 2.9 | 2.9 | 2.9 | 2.9 | 2.9 | 2.9 | 2.9 | 2.9 | 2.9 | 2.9 | 2.9 | 2.9 |
| | ZrO2 + TiO2 + La2O3 + Nb2O5 + Ta2O5 + HfO2 | | 1.0 | 1.0 | 1.0 | 1.0 | 1.0 | 1.0 | 1.0 | 1.0 | 1.0 | 1.0 | 1.0 | 1.0 |
| | SiO2 + Al2O3 | | 76.5 | 76.5 | 76.5 | 76.5 | 76.5 | 76.5 | 76.5 | 76.5 | 76.5 | 76.5 | 76.5 | 76.5 |
| | Rank on bubbles | | C | B | B | B | B | B | B | G | G | G | G | G |
| | Acid etching rate (nm/min) | | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | | 0.07 | 0.07 | 0.07 | 0.07 | 0.07 | 0.07 | 0.07 | 0.07 | 0.07 | 0.07 | 0.07 | 0.07 |

| Component (mass %) | 1-1 | 1-2 | 1-3 | 1-4 | 1-5 | 1-6 | 1-7 | 1-8 | 1-9 | 1-10 | 1-11 | 1-12 | 1-13 |
|---|---|---|---|---|---|---|---|---|---|---|---|---|---|
| Si | 30.3840 | 30.3837 | 30.3825 | 30.3810 | 30.3689 | 30.3537 | 30.3538 | 30.3535 | 30.3523 | 30.3508 | 30.3229 | 30.3078 | 30.2776 |
| Al | 7.9806 | 7.9805 | 7.9802 | 7.9798 | 7.9766 | 7.9726 | 7.9726 | 7.9725 | 7.9722 | 7.9718 | 7.9763 | 7.9724 | 7.9644 |
| Li | 1.8075 | 1.8075 | 1.8074 | 1.8073 | 1.8066 | 1.8057 | 1.8057 | 1.8057 | 1.8056 | 1.8056 | 1.8066 | 1.8057 | 1.8039 |
| Na | 8.2781 | 8.2780 | 8.2777 | 8.2773 | 8.2740 | 8.2698 | 8.2699 | 8.2698 | 8.2695 | 8.2690 | 8.2737 | 8.2696 | 8.2614 |
| K | 0.3771 | 0.3771 | 0.3771 | 0.3771 | 0.3769 | 0.3767 | 0.3767 | 0.3767 | 0.3767 | 0.3767 | 0.3769 | 0.3767 | 0.3763 |
| Mg | 0.4298 | 0.4298 | 0.4297 | 0.4297 | 0.4296 | 0.4293 | 0.4293 | 0.4293 | 0.4293 | 0.4293 | 0.4295 | 0.4293 | 0.4289 |
| Ca | 1.1597 | 1.1596 | 1.1596 | 1.1595 | 1.1591 | 1.1585 | 1.1585 | 1.1585 | 1.1584 | 1.1584 | 1.1590 | 1.1585 | 1.1573 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4664 | 1.4664 | 1.4663 | 1.4663 | 1.4657 | 1.4650 | 1.4650 | 1.4649 | 1.4649 | 1.4648 | 1.4656 | 1.4649 | 1.4635 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.0785 | 0.0786 | 0.0785 | 0.0785 | 0.0785 | 0.0784 | 0.1568 | 0.1568 | 0.1568 | 0.1568 | 0.1568 | 0.1567 | 0.1565 |
| Ce | 0.0000 | 0.0008 | 0.0041 | 0.0081 | 0.0406 | 0.0812 | 0.0000 | 0.0008 | 0.0041 | 0.0081 | 0.0406 | 0.0812 | 0.1622 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.0383 | 48.0380 | 48.0369 | 48.0354 | 48.0235 | 48.0091 | 48.0117 | 48.0115 | 48.0102 | 48.0087 | 47.9921 | 47.9773 | 47.9480 |
| Total | 100.00 | 100.00 | 100.00 | 100.00 | 100.00 | 100.00 | 100.00 | 100.00 | 100.00 | 100.00 | 100.00 | 100.00 | 100.00 |
| Li + Na + K | 10.46 | 10.46 | 10.46 | 10.46 | 10.4575 | 10.4522 | 10.4523 | 10.4522 | 10.4518 | 10.4513 | 10.4572 | 10.4520 | 10.4416 |
| Mg + Ca + Sr + Ba | 1.5895 | 1.5894 | 1.5893 | 1.5892 | 1.5887 | 1.5878 | 1.5878 | 1.5878 | 1.5877 | 1.5877 | 1.5885 | 1.5878 | 1.5862 |
| Zr + Ti + La + Nb + Ta + Hf | 1.4664 | 1.4664 | 1.4663 | 1.4663 | 1.4657 | 1.4650 | 1.4650 | 1.4649 | 1.4649 | 1.4648 | 1.4656 | 1.4649 | 1.4635 |
| Ce/Sn | 0.000 | 0.010 | 0.052 | 0.103 | 0.517 | 1.036 | 0.000 | 0.005 | 0.026 | 0.052 | 0.259 | 0.518 | 1.036 |
| Sn + Ce | 0.079 | 0.079 | 0.083 | 0.087 | 0.119 | 0.160 | 0.157 | 0.158 | 0.161 | 0.165 | 0.197 | 0.238 | 0.319 |
| Si + Al | 38.3646 | 38.3642 | 38.3627 | 38.3608 | 38.3455 | 38.3263 | 38.3264 | 38.3260 | 38.3245 | 38.3226 | 38.2992 | 38.2802 | 38.2420 |
| Rank on bubbles | D | C | B | B | B | B | D | B | A | A | A | A | A |
| Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |

| Component (mass %) | 1-14 | 1-15 | 1-16 | 1-17 | 1-18 | 1-19 | 1-20 | 1-21 | 1-22 | 1-23 | 1-24 | 1-25 | 1-26 | 1-27 |
|---|---|---|---|---|---|---|---|---|---|---|---|---|---|---|
| Si | 30.3229 | 30.3226 | 30.3214 | 30.3199 | 30.3078 | 30.2927 | 30.2626 | 30.2476 | 30.3078 | 30.3075 | 30.3063 | 30.3048 | 30.2927 | 30.2777 |
| Al | 7.9763 | 7.9763 | 7.9759 | 7.9755 | 7.9724 | 7.9684 | 7.9605 | 7.9565 | 7.9724 | 7.9723 | 7.9720 | 7.9716 | 7.9684 | 7.9644 |
| Li | 1.8066 | 1.8066 | 1.8065 | 1.8064 | 1.8057 | 1.8048 | 1.8030 | 1.8021 | 1.8057 | 1.8057 | 1.8056 | 1.8055 | 1.8048 | 1.8039 |
| Na | 8.2737 | 8.2737 | 8.2733 | 8.2729 | 8.2696 | 8.2655 | 8.2573 | 8.2532 | 8.2696 | 8.2695 | 8.2692 | 8.2688 | 8.2655 | 8.2614 |

TABLE 1-continued

| | | | | | | | | | | | | | | |
|---|---|---|---|---|---|---|---|---|---|---|---|---|---|---|
| K | 0.3769 | 0.3769 | 0.3769 | 0.3769 | 0.3767 | 0.3765 | 0.3762 | 0.3760 | 0.3767 | 0.3767 | 0.3767 | 0.3767 | 0.3765 | 0.3763 |
| Mg | 0.4295 | 0.4295 | 0.4295 | 0.4295 | 0.4293 | 0.4291 | 0.4287 | 0.4285 | 0.4293 | 0.4293 | 0.4293 | 0.4293 | 0.4291 | 0.4289 |
| Ca | 1.1590 | 1.1590 | 1.1590 | 1.1589 | 1.1585 | 1.1579 | 1.1567 | 1.1562 | 1.1585 | 1.1585 | 1.1584 | 1.1583 | 1.1579 | 1.1573 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4656 | 1.4656 | 1.4656 | 1.4655 | 1.4649 | 1.4642 | 1.4627 | 1.4620 | 1.4649 | 1.4649 | 1.4648 | 1.4648 | 1.4642 | 1.4635 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.1960 | 0.1960 | 0.1960 | 0.1960 | 0.1959 | 0.1958 | 0.1955 | 0.1954 | 0.2351 | 0.2351 | 0.2351 | 0.2350 | 0.2349 | 0.2348 |
| Ce | 0.0000 | 0.0008 | 0.0041 | 0.0081 | 0.0406 | 0.0811 | 0.1621 | 0.2024 | 0.0000 | 0.0008 | 0.0041 | 0.0082 | 0.0406 | 0.0811 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.9933 | 47.9930 | 47.9918 | 47.9904 | 47.9786 | 47.9640 | 47.9347 | 47.9201 | 47.9800 | 47.9797 | 47.9785 | 47.9770 | 47.9654 | 47.9507 |
| Total | 100.00 | 100.00 | 100.00 | 100.00 | 100.00 | 100.00 | 100.00 | 100.00 | 100.00 | 100.00 | 100.00 | 100.00 | 100.00 | 100.00 |
| Li + Na + K | 10.4572 | 10.4572 | 10.4567 | 10.4562 | 10.4520 | 10.4468 | 10.4365 | 10.4313 | 10.4520 | 10.4519 | 10.4515 | 10.4510 | 10.4468 | 10.4416 |
| Mg + Ca + Sr + Ba | 1.5885 | 1.5885 | 1.5885 | 1.5884 | 1.5878 | 1.5870 | 1.5854 | 1.5847 | 1.5878 | 1.5878 | 1.5877 | 1.5876 | 1.5870 | 1.5862 |
| Zr + Ti + La + Nb + Ta + Hf | 1.4656 | 1.4656 | 1.4656 | 1.4655 | 1.4649 | 1.4642 | 1.4627 | 1.4620 | 1.4649 | 1.4649 | 1.4648 | 1.4648 | 1.4642 | 1.4635 |
| Ce/Sn | 0.000 | 0.004 | 0.021 | 0.041 | 0.207 | 0.414 | 0.829 | 1.036 | 0.000 | 0.003 | 0.017 | 0.035 | 0.173 | 0.345 |
| Sn + Ce | 0.196 | 0.197 | 0.200 | 0.204 | 0.237 | 0.277 | 0.358 | 0.398 | 0.235 | 0.236 | 0.239 | 0.243 | 0.276 | 0.316 |
| Si + Al | 38.2992 | 38.2989 | 38.2973 | 38.2954 | 38.2802 | 38.2611 | 38.2231 | 38.2041 | 38.2802 | 38.2798 | 38.2783 | 38.2764 | 38.2611 | 38.2421 |
| Rank on bubbles | D | B | A | A | A | A | A | A | D | B | A | A | A | A |
| Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 | 0.07 |

| Component (mass %) | 1-28 | 1-29 | 1-30 | 1-31 | 1-32 | 1-33 | 1-34 | 1-35 | 1-36 | 1-37 | 1-38 | 1-39 | 1-40 | 1-41 |
|---|---|---|---|---|---|---|---|---|---|---|---|---|---|---|
| Si | 30.2476 | 30.2176 | 30.2778 | 30.2775 | 30.2762 | 30.2747 | 30.2627 | 30.2477 | 30.2177 | 30.1719 | 30.1420 | 30.2478 | 30.2475 | 30.2463 |
| Al | 7.9565 | 7.9486 | 7.9645 | 7.9644 | 7.9641 | 7.9637 | 7.9605 | 7.9566 | 7.9487 | 7.9484 | 7.9406 | 7.9566 | 7.9565 | 7.9562 |
| Li | 1.8021 | 1.8003 | 1.8039 | 1.8039 | 1.8038 | 1.8037 | 1.8030 | 1.8021 | 1.8003 | 1.8003 | 1.7985 | 1.8020 | 1.8021 | 1.8020 |
| Na | 8.2532 | 8.2450 | 8.2614 | 8.2613 | 8.2610 | 8.2606 | 8.2573 | 8.2532 | 8.2450 | 8.2448 | 8.2366 | 8.2532 | 8.2532 | 8.2528 |
| K | 0.3760 | 0.3756 | 0.3763 | 0.3763 | 0.3763 | 0.3763 | 0.3762 | 0.3760 | 0.3756 | 0.3756 | 0.3752 | 0.3760 | 0.3760 | 0.3759 |
| Mg | 0.4285 | 0.4281 | 0.4289 | 0.4289 | 0.4289 | 0.4289 | 0.4287 | 0.4285 | 0.4281 | 0.4280 | 0.4276 | 0.4285 | 0.4285 | 0.4285 |
| Ca | 1.1562 | 1.1550 | 1.1573 | 1.1573 | 1.1573 | 1.1572 | 1.1567 | 1.1562 | 1.1550 | 1.1550 | 1.1538 | 1.1562 | 1.1560 | 1.1561 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4620 | 1.4606 | 1.4635 | 1.4634 | 1.4634 | 1.4633 | 1.4627 | 1.4620 | 1.4606 | 1.4605 | 1.4592 | 1.4620 | 1.4620 | 1.4619 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.2344 | 0.2341 | 0.3130 | 0.3130 | 0.3130 | 0.3130 | 0.3128 | 0.3126 | 0.3121 | 0.3120 | 0.3116 | 0.3907 | 0.3907 | 0.3907 |
| Ce | 0.1620 | 0.2426 | 0.0000 | 0.0008 | 0.0040 | 0.0081 | 0.0405 | 0.0810 | 0.1617 | 0.2425 | 0.3229 | 0.0000 | 0.0008 | 0.0040 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.9215 | 47.8925 | 47.9534 | 47.9532 | 47.9520 | 47.9505 | 47.9389 | 47.9241 | 47.8952 | 47.8610 | 47.8320 | 47.9270 | 47.9267 | 47.9256 |
| Total | 100.00 | 100.00 | 100.00 | 100.00 | 100.00 | 100.00 | 100.00 | 100.00 | 100.00 | 100.00 | 100.00 | 100.00 | 100.00 | 100.00 |
| Li + Na + K | 10.4313 | 10.4209 | 10.4416 | 10.4415 | 10.4411 | 10.4406 | 10.4365 | 10.4313 | 10.4209 | 10.4207 | 10.4103 | 10.4312 | 10.4313 | 10.4307 |
| Mg + Ca + Sr + Ba | 1.5847 | 1.5831 | 1.5862 | 1.5862 | 1.5862 | 1.5861 | 1.5854 | 1.5847 | 1.5831 | 1.5830 | 1.5814 | 1.5847 | 1.5845 | 1.5846 |
| Zr + Ti + La + Nb + Ta + Hf | 1.4620 | 1.4606 | 1.4635 | 1.4634 | 1.4634 | 1.4633 | 1.4627 | 1.4620 | 1.4606 | 1.4605 | 1.4592 | 1.4620 | 1.4620 | 1.4619 |

TABLE 1-continued

| | | | | | | | | | | | | | | |
|---|---|---|---|---|---|---|---|---|---|---|---|---|---|---|
| Ce/Sn | 0.691 | 1.036 | 0.000 | 0.003 | 0.013 | 0.026 | 0.129 | 0.259 | 0.518 | 0.777 | 1.036 | 0.000 | 0.002 | 0.010 |
| Sn + Ce | 0.396 | 0.477 | 0.313 | 0.314 | 0.317 | 0.321 | 0.353 | 0.394 | 0.474 | 0.555 | 0.635 | 0.391 | 0.392 | 0.395 |
| Si + Al | 38.2041 | 38.1662 | 38.2423 | 38.2419 | 38.2403 | 38.2384 | 38.2232 | 38.2043 | 38.1664 | 38.1203 | 38.0826 | 38.2044 | 38.2040 | 38.2025 |
| Rank on bubbles | A | A | D | B | B | A | A | A | A | A | A | E | C | C |
| Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 | 0.07 |
| Component (mass %) | 1-42 | 1-43 | 1-44 | 1-45 | 1-46 | 1-47 | 1-48 | 1-49 | 1-50 | 1-51 | 1-52 | 1-53 | 1-54 | 1-55 |
| Si | 30.2448 | 30.2328 | 30.2178 | 30.1720 | 30.1421 | 30.1124 | 30.0827 | 30.2179 | 30.2017 | 30.2005 | 30.1990 | 30.1870 | 30.1720 | 30.1422 |
| Al | 7.9558 | 7.9526 | 7.9487 | 7.9485 | 7.9406 | 7.9328 | 7.9249 | 7.9487 | 7.9563 | 7.9560 | 7.9556 | 7.9524 | 7.9485 | 7.9406 |
| Li | 1.8019 | 1.8012 | 1.8003 | 1.8003 | 1.7985 | 1.7967 | 1.7949 | 1.8003 | 1.8020 | 1.8020 | 1.8019 | 1.8012 | 1.8003 | 1.7985 |
| Na | 8.2524 | 8.2491 | 8.2451 | 8.2448 | 8.2367 | 8.2285 | 8.2204 | 8.2451 | 8.2529 | 8.2526 | 8.2522 | 8.2489 | 8.2448 | 8.2367 |
| K | 0.3759 | 0.3758 | 0.3756 | 0.3756 | 0.3752 | 0.3748 | 0.3745 | 0.3756 | 0.3760 | 0.3759 | 0.3759 | 0.3758 | 0.3756 | 0.3752 |
| Mg | 0.4284 | 0.4283 | 0.4281 | 0.4280 | 0.4276 | 0.4272 | 0.4268 | 0.4281 | 0.4285 | 0.4284 | 0.4284 | 0.4283 | 0.4280 | 0.4276 |
| Ca | 1.1561 | 1.1556 | 1.1550 | 1.1550 | 1.1538 | 1.1527 | 1.1516 | 1.1550 | 1.1561 | 1.1561 | 1.1560 | 1.1556 | 1.1550 | 1.1538 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4619 | 1.4613 | 1.4606 | 1.4605 | 1.4591 | 1.4576 | 1.4562 | 1.4606 | 1.4620 | 1.4619 | 1.4618 | 1.4612 | 1.4605 | 1.4591 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.3906 | 0.3904 | 0.3902 | 0.3900 | 0.3895 | 0.3890 | 0.3884 | 0.4682 | 0.4686 | 0.4686 | 0.4686 | 0.4683 | 0.4680 | 0.4674 |
| Ce | 0.0081 | 0.0405 | 0.0809 | 0.1617 | 0.2422 | 0.3224 | 0.4025 | 0.0000 | 0.0008 | 0.0040 | 0.0081 | 0.0404 | 0.0808 | 0.1614 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.9241 | 47.9124 | 47.8977 | 47.8636 | 47.8347 | 47.8059 | 47.7771 | 47.9005 | 47.8951 | 47.8940 | 47.8925 | 47.8809 | 47.8665 | 47.8375 |
| Total | 100.00 | 100.00 | 100.00 | 100.00 | 100.00 | 100.00 | 100.00 | 100.00 | 100.00 | 100.00 | 100.00 | 100.00 | 100.00 | 100.00 |
| Li + Na + K | 10.4302 | 10.4261 | 10.4210 | 10.4207 | 10.4104 | 10.4000 | 10.3898 | 10.4210 | 10.4309 | 10.4305 | 10.4300 | 10.4259 | 10.4207 | 10.4104 |
| Mg + Ca + Sr + Ba | 1.5845 | 1.5839 | 1.5831 | 1.5830 | 1.5814 | 1.5799 | 1.5784 | 1.5831 | 1.5846 | 1.5845 | 1.5844 | 1.5839 | 1.5830 | 1.5814 |
| Zr + Ti + La + Nb + Ta + Hf | 1.4619 | 1.4613 | 1.4606 | 1.4605 | 1.4591 | 1.4576 | 1.4562 | 1.4606 | 1.4620 | 1.4619 | 1.4618 | 1.4612 | 1.4605 | 1.4591 |
| Ce/Sn | 0.021 | 0.104 | 0.207 | 0.415 | 0.622 | 0.829 | 1.036 | 0.000 | 0.002 | 0.009 | 0.017 | 0.086 | 0.173 | 0.345 |
| Sn + Ce | 0.399 | 0.431 | 0.471 | 0.552 | 0.632 | 0.711 | 0.791 | 0.468 | 0.469 | 0.473 | 0.477 | 0.509 | 0.549 | 0.629 |
| Si + Al | 38.2006 | 38.1854 | 38.1665 | 38.1205 | 38.0827 | 38.0452 | 38.0076 | 38.1666 | 38.1580 | 38.1565 | 38.1546 | 38.1394 | 38.1205 | 38.0828 |
| Rank on bubbles | B | B | A | A | A | A | A | E | C | C | C | C | B | B |
| Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 | 0.07 |

TABLE 2

| Component (mass %) | 1-56 | 1-57 | 1-58 | 1-59 | Com. Ex. 1-1 | Com. Ex. 1-2 | Com. Ex. 1-3 | Com. Ex. 1-4 | Com. Ex. 1-5 |
|---|---|---|---|---|---|---|---|---|---|
| Si | 30.1124 | 30.0828 | 30.0372 | 30.0076 | 30.2480 | 30.2776 | 30.4098 | 30.4083 | 30.0671 |
| Al | 7.9328 | 7.9250 | 7.9248 | 7.9170 | 7.9566 | 7.9644 | 7.9873 | 7.9869 | 7.9327 |
| Li | 1.7967 | 1.7949 | 1.7949 | 1.7931 | 1.8021 | 1.8039 | 1.8091 | 1.8090 | 1.7967 |
| Na | 8.2286 | 8.2205 | 8.2202 | 8.2122 | 8.2533 | 8.2614 | 8.2851 | 8.2847 | 8.2284 |
| K | 0.3748 | 0.3745 | 0.3745 | 0.3741 | 0.3760 | 0.3763 | 0.3774 | 0.3774 | 0.3748 |
| Mg | 0.4272 | 0.4268 | 0.4268 | 0.4263 | 0.4285 | 0.4289 | 0.4301 | 0.4301 | 0.4272 |
| Ca | 1.1527 | 1.1516 | 1.1515 | 1.1504 | 1.1562 | 1.1573 | 1.1606 | 1.1606 | 1.1527 |
| Sr | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 |
| Zr | 1.4576 | 1.4562 | 1.4562 | 1.4547 | 1.4620 | 1.4635 | 1.4677 | 1.4676 | 1.4576 |
| Ti | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 |
| Sn | 0.4667 | 0.4661 | 0.4659 | 0.4653 | 0.0000 | 0.1957 | 0.0079 | 0.0079 | 0.7775 |
| Ce | 0.2418 | 0.3220 | 0.4023 | 0.4822 | 0.0000 | 0.0000 | 0.0041 | 0.0081 | 0.0000 |
| Sb | 0.0000 | 0.0000 | 0.0000 | 0.0000 | 0.4137 | 0.1250 | 0.0000 | 0.0000 | 0.0000 |
| O | 47.8087 | 47.7796 | 47.7457 | 47.7171 | 47.9036 | 47.9460 | 48.0609 | 48.0594 | 47.7853 |
| Total | 100.00 | 100.00 | 100.00 | 100.00 | 100.00 | 100.00 | 100.00 | 100.00 | 100.00 |
| Li + Na + K | 10.4001 | 10.3899 | 10.3896 | 10.3794 | 10.4314 | 10.4416 | 10.4716 | 10.4711 | 10.3999 |
| Mg + Ca + Sr + Ba | 1.5799 | 1.5784 | 1.5783 | 1.5767 | 1.5847 | 1.5862 | 1.5907 | 1.5907 | 1.5799 |
| Zr + Ti + La + Nb + Ta + Hf | 1.4576 | 1.4562 | 1.4562 | 1.4547 | 1.4620 | 1.4635 | 1.4677 | 1.4676 | 1.4576 |
| Ce/Sn | 0.518 | 0.691 | 0.863 | 1.036 | — | 0.000 | 0.519 | — | 0.000 |
| Sn + Ce | 0.709 | 0.788 | 0.868 | 0.948 | 0.000 | 0.196 | 0.012 | 0.016 | 0.778 |
| Si + Al | 38.0452 | 38.0078 | 37.9620 | 37.9246 | 38.2046 | 38.2420 | 38.3971 | 38.3952 | 37.9998 |
| Rank on bubbles | B | B | B | B | G | G | G | G | G |
| Acid etching rate (nm/min) | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 |

| Component | | 2-1 | 2-2 | 2-3 | 2-4 | 2-5 | 2-6 | 2-7 | 2-8 | 2-9 | 2-10 | 2-11 | 2-12 | 2-13 |
|---|---|---|---|---|---|---|---|---|---|---|---|---|---|---|
| (mol %) | SiO2 | 66.2 | 66.2 | 66.2 | 66.2 | 66.2 | 66.2 | 66.2 | 66.2 | 66.2 | 66.2 | 66.2 | 66.2 | 66.2 |
| | Al2O3 | 9.3 | 9.3 | 9.3 | 9.3 | 9.3 | 9.3 | 9.3 | 9.3 | 9.3 | 9.3 | 9.3 | 9.3 | 9.3 |
| | Li2O | 8.1 | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 | 11.2 |
| | K2O | 0.4 | 0.4 | 0.4 | 0.4 | 0.4 | 0.4 | 0.4 | 0.4 | 0.4 | 0.4 | 0.4 | 0.4 | 0.4 |
| | MgO | 1.5 | 1.5 | 1.5 | 1.5 | 1.5 | 1.5 | 1.5 | 1.5 | 1.5 | 1.5 | 1.5 | 1.5 | 1.5 |
| | CaO | 2.3 | 2.3 | 2.3 | 2.3 | 2.3 | 2.3 | 2.3 | 2.3 | 2.3 | 2.3 | 2.3 | 2.3 | 2.3 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |

TABLE 2-continued

| | | | | | | | | | | | | | | |
|---|---|---|---|---|---|---|---|---|---|---|---|---|---|---|
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.1 | 0.1 | 0.1 | 0.1 | 0.1 | 0.1 | 0.2 | 0.2 | 0.2 | 0.2 | 0.2 | 0.2 | 0.2 |
| | CeO2 | 0 | 0.001 | 0.005 | 0.01 | 0.05 | 0.1 | 0 | 0.001 | 0.005 | 0.01 | 0.05 | 0.1 | 0.2 |
| | Sb2O3 | 0 | 0 | 0 | 0 | 0 | 0 | 0 | 0 | 0 | 0 | 0 | 0 | 0 |
| | CeO2/SnO2 | 0.0000 | 0.0100 | 0.0500 | 0.1000 | 0.5000 | 1.0000 | 0.0000 | 0.0050 | 0.0250 | 0.0500 | 0.2500 | 0.5000 | 1.0000 |
| | SnO2 + CeO2 | 0.1 | 0.101 | 0.105 | 0.11 | 0.15 | 0.2 | 0.2 | 0.201 | 0.205 | 0.21 | 0.25 | 0.3 | 0.4 |
| (mol %) | Li2O + Na2O + K2O | 19.7 | 19.7 | 19.7 | 19.7 | 19.7 | 19.7 | 19.7 | 19.7 | 19.7 | 19.7 | 19.7 | 19.7 | 19.7 |
| | MgO + CaO + SrO + BaO | 3.8 | 3.8 | 3.8 | 3.8 | 3.8 | 3.8 | 3.8 | 3.8 | 3.8 | 3.8 | 3.8 | 3.8 | 3.8 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 75.5 | 75.5 | 75.5 | 75.5 | 75.5 | 75.5 | 75.5 | 75.5 | 75.5 | 75.5 | 75.5 | 75.5 | 75.5 |
| | Rank on bubbles | D | C | B | B | B | B | D | B | A | A | A | A | A |
| | Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |

| | Component | 2-14 | 2-15 | 2-16 | 2-17 | 2-18 | 2-19 | 2-20 | 2-21 | 2-22 | 2-23 | 2-24 | 2-25 | 2-26 |
|---|---|---|---|---|---|---|---|---|---|---|---|---|---|---|
| (mol %) | SiO2 | 66.2 | 66.2 | 66.2 | 66.2 | 66.2 | 66.2 | 66.2 | 66.2 | 66.2 | 66.2 | 66.2 | 66.2 | 66.2 |
| | Al2O3 | 9.3 | 9.3 | 9.3 | 9.3 | 9.3 | 9.3 | 9.3 | 9.3 | 9.3 | 9.3 | 9.3 | 9.3 | 9.3 |
| | Li2O | 8.1 | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 | 11.2 |
| | K2O | 0.4 | 0.4 | 0.4 | 0.4 | 0.4 | 0.4 | 0.4 | 0.4 | 0.4 | 0.4 | 0.4 | 0.4 | 0.4 |
| | MgO | 1.5 | 1.5 | 1.5 | 1.5 | 1.5 | 1.5 | 1.5 | 1.5 | 1.5 | 1.5 | 1.5 | 1.5 | 1.5 |
| | CaO | 2.3 | 2.3 | 2.3 | 2.3 | 2.3 | 2.3 | 2.3 | 2.3 | 2.3 | 2.3 | 2.3 | 2.3 | 2.3 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.25 | 0.25 | 0.25 | 0.25 | 0.25 | 0.25 | 0.25 | 0.25 | 0.3 | 0.3 | 0.3 | 0.3 | 0.3 |
| | CeO2 | 0 | 0.001 | 0.005 | 0.01 | 0.05 | 0.1 | 0.2 | 0.25 | 0 | 0.001 | 0.005 | 0.01 | 0.05 |
| | Sb2O3 | 0 | 0 | 0 | 0 | 0 | 0 | 0 | 0 | 0 | 0 | 0 | 0 | 0 |
| | CeO2/SnO2 | 0.0000 | 0.0040 | 0.0200 | 0.0400 | 0.2000 | 0.4000 | 0.8000 | 1.0000 | 0.0000 | 0.0033 | 0.0167 | 0.0333 | 0.1667 |
| | SnO2 + CeO2 | 0.25 | 0.251 | 0.255 | 0.26 | 0.3 | 0.35 | 0.45 | 0.5 | 0.3 | 0.301 | 0.305 | 0.31 | 0.35 |
| (mol %) | Li2O + Na2O + K2O | 19.7 | 19.7 | 19.7 | 19.7 | 19.7 | 19.7 | 19.7 | 19.7 | 19.7 | 19.7 | 19.7 | 19.7 | 19.7 |
| | MgO + CaO + SrO + BaO | 3.8 | 3.8 | 3.8 | 3.8 | 3.8 | 3.8 | 3.8 | 3.8 | 3.8 | 3.8 | 3.8 | 3.8 | 3.8 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 75.5 | 75.5 | 75.5 | 75.5 | 75.5 | 75.5 | 75.5 | 75.5 | 75.5 | 75.5 | 75.5 | 75.5 | 75.5 |
| | Rank on bubbles | D | B | A | A | A | A | A | A | D | B | A | A | A |
| | Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |

| | Component | 2-27 | 2-28 | 2-29 | 2-30 | 2-31 | 2-32 | 2-33 | 2-34 | 2-35 | 2-36 | 2-37 | 2-38 | 2-39 |
|---|---|---|---|---|---|---|---|---|---|---|---|---|---|---|
| (mol %) | SiO2 | 66.2 | 66.2 | 66.2 | 66.2 | 66.2 | 66.2 | 66.2 | 66.2 | 66.2 | 66.2 | 66.2 | 66.2 | 66.2 |
| | Al2O3 | 9.3 | 9.3 | 9.3 | 9.3 | 9.3 | 9.3 | 9.3 | 9.3 | 9.3 | 9.3 | 9.3 | 9.3 | 9.3 |
| | Li2O | 8.1 | 8.1 | 8.1 | 8.1 | 8.1 | 8.1 | 8.1 | 8.1 | 8.1 | 8.1 | 8.1 | 8.1 | 8.1 |

TABLE 2-continued

| | | | | | | | | | | | | | | |
|---|---|---|---|---|---|---|---|---|---|---|---|---|---|---|
| | Na2O | 11.2 | 11.2 | 11.2 | 11.2 | 11.2 | 11.2 | 11.2 | 11.2 | 11.2 | 11.2 | 11.2 | 11.2 | 11.2 |
| | K2O | 0.4 | 0.4 | 0.4 | 0.4 | 0.4 | 0.4 | 0.4 | 0.4 | 0.4 | 0.4 | 0.4 | 0.4 | 0.4 |
| | MgO | 1.5 | 1.5 | 1.5 | 1.5 | 1.5 | 1.5 | 1.5 | 1.5 | 1.5 | 1.5 | 1.5 | 1.5 | 1.5 |
| | CaO | 2.3 | 2.3 | 2.3 | 2.3 | 2.3 | 2.3 | 2.3 | 2.3 | 2.3 | 2.3 | 2.3 | 2.3 | 2.3 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.3 | 0.3 | 0.3 | 0.4 | 0.4 | 0.4 | 0.4 | 0.4 | 0.4 | 0.4 | 0.4 | 0.4 | 0.5 |
| | CeO2 | 0.1 | 0.2 | 0.3 | 0 | 0.001 | 0.005 | 0.01 | 0.05 | 0.1 | 0.2 | 0.3 | 0.4 | 0 |
| | Sb2O3 | 0 | 0 | 0 | 0 | 0 | 0 | 0 | 0 | 0 | 0 | 0 | 0 | 0 |
| | CeO2/SnO2 | 0.3333 | 0.6667 | 1.0000 | 0.0000 | 0.0025 | 0.0125 | 0.0250 | 0.1250 | 0.2500 | 0.5000 | 0.7500 | 1.0000 | 0.0000 |
| | SnO2 + CeO2 | 0.4 | 0.5 | 0.6 | 0.4 | 0.401 | 0.405 | 0.41 | 0.45 | 0.5 | 0.6 | 0.7 | 0.8 | 0.5 |
| (mol %) | Li2O + Na2O + K2O | 19.7 | 19.7 | 19.7 | 19.7 | 19.7 | 19.7 | 19.7 | 19.7 | 19.7 | 19.7 | 19.7 | 19.7 | 19.7 |
| | MgO + CaO + SrO + BaO | 3.8 | 3.8 | 3.8 | 3.8 | 3.8 | 3.8 | 3.8 | 3.8 | 3.8 | 3.8 | 3.8 | 3.8 | 3.8 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 75.5 | 75.5 | 75.5 | 75.5 | 75.5 | 75.5 | 75.5 | 75.5 | 75.5 | 75.5 | 75.5 | 75.5 | 75.5 |
| | Rank on bubbles | A | A | A | D | B | B | A | A | A | A | A | A | E |
| | Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |

| | Component | 2-40 | 2-41 | 2-42 | 2-43 | 2-44 | 2-45 | 2-46 | 2-47 | 2-48 | 2-49 | 2-50 | 2-51 | 2-52 |
|---|---|---|---|---|---|---|---|---|---|---|---|---|---|---|
| (mol %) | SiO2 | 66.2 | 66.2 | 66.2 | 66.2 | 66.2 | 66.2 | 66.2 | 66.2 | 66.2 | 66.2 | 66.2 | 66.2 | 66.2 |
| | Al2O3 | 9.3 | 9.3 | 9.3 | 9.3 | 9.3 | 9.3 | 9.3 | 9.3 | 9.3 | 9.3 | 9.3 | 9.3 | 9.3 |
| | Li2O | 8.1 | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 | 11.2 |
| | K2O | 0.4 | 0.4 | 0.4 | 0.4 | 0.4 | 0.4 | 0.4 | 0.4 | 0.4 | 0.4 | 0.4 | 0.4 | 0.4 |
| | MgO | 1.5 | 1.5 | 1.5 | 1.5 | 1.5 | 1.5 | 1.5 | 1.5 | 1.5 | 1.5 | 1.5 | 1.5 | 1.5 |
| | CaO | 2.3 | 2.3 | 2.3 | 2.3 | 2.3 | 2.3 | 2.3 | 2.3 | 2.3 | 2.3 | 2.3 | 2.3 | 2.3 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.5 | 0.5 | 0.5 | 0.5 | 0.5 | 0.5 | 0.5 | 0.5 | 0.5 | 0.6 | 0.6 | 0.6 | 0.6 |
| | CeO2 | 0.001 | 0.005 | 0.01 | 0.05 | 0.1 | 0.2 | 0.3 | 0.4 | 0.5 | 0 | 0.001 | 0.005 | 0.01 |
| | Sb2O3 | 0 | 0 | 0 | 0 | 0 | 0 | 0 | 0 | 0 | 0 | 0 | 0 | 0 |
| | CeO2/SnO2 | 0.0020 | 0.0100 | 0.0200 | 0.1000 | 0.2000 | 0.4000 | 0.6000 | 0.8000 | 1.0000 | 0.0000 | 0.0017 | 0.0083 | 0.0167 |
| | SnO2 + CeO2 | 0.501 | 0.505 | 0.51 | 0.55 | 0.6 | 0.7 | 0.8 | 0.9 | 1 | 0.6 | 0.601 | 0.605 | 0.61 |
| (mol %) | Li2O + Na2O + K2O | 19.7 | 19.7 | 19.7 | 19.7 | 19.7 | 19.7 | 19.7 | 19.7 | 19.7 | 19.7 | 19.7 | 19.7 | 19.7 |

TABLE 2-continued

| | | | | | | | | | | | | | | |
|---|---|---|---|---|---|---|---|---|---|---|---|---|---|---|
| | MgO + CaO + SrO + BaO | 3.8 | 3.8 | 3.8 | 3.8 | 3.8 | 3.8 | 3.8 | 3.8 | 3.8 | 3.8 | 3.8 | 3.8 | 3.8 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 75.5 | 75.5 | 75.5 | 75.5 | 75.5 | 75.5 | 75.5 | 75.5 | 75.5 | 75.5 | 75.5 | 75.5 | 75.5 |
| | Rank on bubbles | C | C | B | B | A | A | A | A | A | E | C | C | C |
| | Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |

| | Component | 2-53 | 2-54 | 2-55 | 2-56 | 2-57 | 2-58 | 2-59 | Com. Ex. 2-1 | Com. Ex. 2-2 | Com. Ex. 2-3 | Com. Ex. 2-4 | Com. Ex. 2-5 |
|---|---|---|---|---|---|---|---|---|---|---|---|---|---|
| (mol %) | SiO2 | 66.2 | 66.2 | 66.2 | 66.2 | 66.2 | 66.2 | 66.2 | 66.2 | 66.2 | 66.2 | 66.2 | 66.2 |
| | Al2O3 | 9.3 | 9.3 | 9.3 | 9.3 | 9.3 | 9.3 | 9.3 | 9.3 | 9.3 | 9.3 | 9.3 | 9.3 |
| | Li2O | 8.1 | 8.1 | 8.1 | 8.1 | 8.1 | 8.1 | 8.1 | 8.1 | 8.1 | 8.1 | 8.1 | 8.1 |
| | Na2O | 11.2 | 11.2 | 11.2 | 11.2 | 11.2 | 11.2 | 11.2 | 11.2 | 11.2 | 11.2 | 11.2 | 11.2 |
| | K2O | 0.4 | 0.4 | 0.4 | 0.4 | 0.4 | 0.4 | 0.4 | 0.4 | 0.4 | 0.4 | 0.4 | 0.4 |
| | MgO | 1.5 | 1.5 | 1.5 | 1.5 | 1.5 | 1.5 | 1.5 | 1.5 | 1.5 | 1.5 | 1.5 | 1.5 |
| | CaO | 2.3 | 2.3 | 2.3 | 2.3 | 2.3 | 2.3 | 2.3 | 2.3 | 2.3 | 2.3 | 2.3 | 2.3 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 |
| | TiO2 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.6 | 0.6 | 0.6 | 0.6 | 0.6 | 0.6 | 0.6 | 0 | 0.25 | 1 | 0 | 1 |
| | CeO2 | 0.05 | 0.1 | 0.2 | 0.3 | 0.4 | 0.5 | 0.6 | 0 | 0 | 0 | 1 | 1 |
| | Sb2O3 | 0 | 0 | 0 | 0 | 0 | 0 | 0 | 0.5 | 0.15 | 0 | 0 | 0 |
| | CeO2/SnO2 | 0.0833 | 0.1667 | 0.3333 | 0.5000 | 0.6667 | 0.8333 | 1.0000 | — | 0.0000 | 0.0000 | — | 1.0000 |
| | SnO2 + CeO2 | 0.65 | 0.7 | 0.8 | 0.9 | 1 | 1.1 | 1.2 | 0 | 0.25 | 1 | 1 | 2 |
| (mol %) | Li2O + Na2O + K2O | 19.7 | 19.7 | 19.7 | 19.7 | 19.7 | 19.7 | 19.7 | 19.7 | 19.7 | 19.7 | 19.7 | 19.7 |
| | MgO + CaO + SrO + BaO | 3.8 | 3.8 | 3.8 | 3.8 | 3.8 | 3.8 | 3.8 | 3.8 | 3.8 | 3.8 | 3.8 | 3.8 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 75.5 | 75.5 | 75.5 | 75.5 | 75.5 | 75.5 | 75.5 | 75.5 | 75.5 | 75.5 | 75.5 | 75.5 |
| | Rank on bubbles | C | B | B | B | B | B | B | G | G | G | G | G |
| | Acid etching rate (nm/min) | 1.7 | 1.7 | 1.7 | 1.7 | 1.7 | 1.7 | 1.7 | 1.7 | 1.7 | 1.7 | 1.7 | 1.7 |
| | Alkaline etching rate (nm/min) | 0.07 | 0.07 | 0.07 | 0.07 | 0.07 | 0.07 | 0.07 | 0.07 | 0.07 | 0.07 | 0.07 | 0.07 |

| Component | 2-1 | 2-2 | 2-3 | 2-4 | 2-5 | 2-6 | 2-7 | 2-8 | 2-9 | 2-10 | 2-11 | 2-12 | 2-13 |
|---|---|---|---|---|---|---|---|---|---|---|---|---|---|
| Si | 30.0102 | 30.0099 | 30.0086 | 30.0069 | 29.9774 | 29.9607 | 29.9649 | 29.9645 | 29.9632 | 29.9615 | 29.9482 | 29.9317 | 29.8985 |
| Al | 8.0013 | 8.0012 | 8.0008 | 8.0004 | 8.0046 | 8.0001 | 8.0012 | 8.0011 | 8.0008 | 8.0003 | 7.9968 | 7.9924 | 7.9835 |
| Li | 1.8122 | 1.8122 | 1.8121 | 1.8120 | 1.8130 | 1.8120 | 1.8122 | 1.8122 | 1.8121 | 1.8120 | 1.8112 | 1.8102 | 1.8082 |
| Na | 8.2996 | 8.2995 | 8.2991 | 8.2987 | 8.3030 | 8.2984 | 8.2996 | 8.2995 | 8.2991 | 8.2986 | 8.2950 | 8.2904 | 8.2812 |
| K | 0.3781 | 0.3781 | 0.3781 | 0.3780 | 0.3782 | 0.3780 | 0.3781 | 0.3781 | 0.3781 | 0.3780 | 0.3779 | 0.3777 | 0.3772 |
| Mg | 0.5876 | 0.5876 | 0.5875 | 0.5875 | 0.5878 | 0.5875 | 0.5876 | 0.5876 | 0.5875 | 0.5875 | 0.5872 | 0.5869 | 0.5863 |
| Ca | 1.4856 | 1.4856 | 1.4855 | 1.4855 | 1.4862 | 1.4854 | 1.4856 | 1.4856 | 1.4855 | 1.4854 | 1.4848 | 1.4840 | 1.4823 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4702 | 1.4702 | 1.4701 | 1.4701 | 1.4708 | 1.4700 | 1.4702 | 1.4702 | 1.4701 | 1.4701 | 1.4694 | 1.4686 | 1.4670 |

TABLE 2-continued

| | | | | | | | | | | | | | |
|---|---|---|---|---|---|---|---|---|---|---|---|---|---|
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.0765 | 0.0765 | 0.0765 | 0.0765 | 0.0766 | 0.0766 | 0.1531 | 0.1531 | 0.1530 | 0.1530 | 0.1530 | 0.1529 | 0.1527 |
| Ce | 0.0000 | 0.0009 | 0.0045 | 0.0090 | 0.0452 | 0.0903 | 0.0000 | 0.0009 | 0.0046 | 0.0090 | 0.0451 | 0.0902 | 0.1803 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.8787 | 47.8783 | 47.8772 | 47.8754 | 47.8572 | 47.8410 | 47.8475 | 47.8472 | 47.8460 | 47.8446 | 47.8314 | 47.8152 | 47.7828 |
| Total | 100.0000 | 100.0000 | 100.0000 | 100.0000 | 100.0000 | 100.0000 | 100.0000 | 100.0000 | 100.0000 | 100.0000 | 100.0000 | 100.0002 | 100.0000 |
| Li + Na + K | 10.4899 | 10.4898 | 10.4893 | 10.4887 | 10.4942 | 10.4884 | 10.4899 | 10.4898 | 10.4893 | 10.4886 | 10.4841 | 10.4783 | 10.4666 |
| Mg + Ca + Sr + Ba | 2.0732 | 2.0732 | 2.0730 | 2.0730 | 2.0740 | 2.0729 | 2.0732 | 2.0732 | 2.0730 | 2.0729 | 2.0720 | 2.0709 | 2.0686 |
| Zr + Ti + La + Nb + Ta + Hf | 1.4702 | 1.4702 | 1.4701 | 1.4701 | 1.4708 | 1.4700 | 1.4702 | 1.4702 | 1.4701 | 1.4701 | 1.4694 | 1.4686 | 1.4670 |
| Ce/Sn | 0.0000 | 0.0118 | 0.0588 | 0.1176 | 0.5901 | 1.1789 | 0.0000 | 0.0059 | 0.0301 | 0.0588 | 0.2948 | 0.5899 | 1.1807 |
| Sn + Ce | 0.0765 | 0.0774 | 0.0810 | 0.0855 | 0.1218 | 0.1669 | 0.1531 | 0.1540 | 0.1576 | 0.1620 | 0.1981 | 0.2431 | 0.3330 |
| Si + Al | 38.0115 | 38.0111 | 38.0094 | 38.0073 | 37.9820 | 37.9608 | 37.9661 | 37.9656 | 37.9640 | 37.9618 | 37.9450 | 37.9241 | 37.8820 |
| Rank on bubbles | D | C | B | B | B | B | D | B | A | A | A | A | A |
| Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 |

| Component | 2-14 | 2-15 | 2-16 | 2-17 | 2-18 | 2-19 | 2-20 | 2-21 | 2-22 | 2-23 | 2-24 | 2-25 | 2-26 | 2-27 |
|---|---|---|---|---|---|---|---|---|---|---|---|---|---|---|
| Si | 29.9503 | 29.9500 | 29.9487 | 29.9470 | 29.9337 | 29.9171 | 29.8923 | 29.8758 | 29.9358 | 29.9354 | 29.9341 | 29.9325 | 29.9192 | 29.9026 |
| Al | 7.9973 | 7.9973 | 7.9969 | 7.9965 | 7.9929 | 7.9885 | 7.9819 | 7.9774 | 7.9935 | 7.9934 | 7.9930 | 7.9926 | 7.9890 | 7.9846 |
| Li | 1.8113 | 1.8113 | 1.8112 | 1.8111 | 1.8103 | 1.8093 | 1.8078 | 1.8068 | 1.8105 | 1.8104 | 1.8104 | 1.8103 | 1.8095 | 1.8084 |
| Na | 8.2955 | 8.2954 | 8.2951 | 8.2946 | 8.2909 | 8.2863 | 8.2795 | 8.2749 | 8.2915 | 8.2914 | 8.2910 | 8.2906 | 8.2869 | 8.2823 |
| K | 0.3779 | 0.3779 | 0.3779 | 0.3779 | 0.3777 | 0.3775 | 0.3772 | 0.3770 | 0.3777 | 0.3777 | 0.3777 | 0.3777 | 0.3775 | 0.3773 |
| Mg | 0.5873 | 0.5873 | 0.5873 | 0.5872 | 0.5870 | 0.5866 | 0.5861 | 0.5858 | 0.5870 | 0.5870 | 0.5870 | 0.5869 | 0.5867 | 0.5863 |
| Ca | 1.4849 | 1.4849 | 1.4848 | 1.4847 | 1.4841 | 1.4832 | 1.4820 | 1.4812 | 1.4842 | 1.4842 | 1.4841 | 1.4840 | 1.4834 | 1.4825 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4695 | 1.4695 | 1.4694 | 1.4693 | 1.4687 | 1.4679 | 1.4667 | 1.4658 | 1.4688 | 1.4688 | 1.4687 | 1.4686 | 1.4680 | 1.4672 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.1913 | 0.1912 | 0.1912 | 0.1912 | 0.1911 | 0.1910 | 0.1909 | 0.1908 | 0.2294 | 0.2294 | 0.2293 | 0.2293 | 0.2292 | 0.2291 |
| Ce | 0.0000 | 0.0009 | 0.0045 | 0.0090 | 0.0451 | 0.0903 | 0.1576 | 0.2026 | 0.0000 | 0.0009 | 0.0045 | 0.0090 | 0.0451 | 0.0901 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.8347 | 47.8343 | 47.8330 | 47.8315 | 47.8185 | 47.8023 | 47.7780 | 47.7619 | 47.8218 | 47.8214 | 47.8202 | 47.8185 | 47.8055 | 47.7896 |
| Total | 100.0000 | 100.0000 | 100.0000 | 100.0000 | 100.0000 | 100.0000 | 100.0000 | 100.0000 | 100.0002 | 100.0000 | 100.0000 | 100.0000 | 100.0000 | 100.0000 |
| Li + Na + K | 10.4847 | 10.4846 | 10.4842 | 10.4836 | 10.4789 | 10.4731 | 10.4645 | 10.4587 | 10.4797 | 10.4795 | 10.4791 | 10.4786 | 10.4739 | 10.4680 |
| Mg + Ca + Sr + Ba | 2.0722 | 2.0722 | 2.0721 | 2.0719 | 2.0711 | 2.0698 | 2.0681 | 2.0670 | 2.0712 | 2.0712 | 2.0711 | 2.0709 | 2.0701 | 2.0688 |
| Zr + Ti + La + Nb + Ta + Hf | 1.4695 | 1.4695 | 1.4694 | 1.4693 | 1.4687 | 1.4679 | 1.4667 | 1.4658 | 1.4688 | 1.4688 | 1.4687 | 1.4686 | 1.4680 | 1.4672 |
| Ce/Sn | 0.0000 | 0.0047 | 0.0235 | 0.0471 | 0.2360 | 0.4728 | 0.8256 | 1.0618 | 0.0000 | 0.0039 | 0.0196 | 0.0392 | 0.1968 | 0.3933 |
| Sn + Ce | 0.1913 | 0.1921 | 0.1957 | 0.2002 | 0.2362 | 0.2813 | 0.3485 | 0.3934 | 0.2294 | 0.2303 | 0.2338 | 0.2383 | 0.2743 | 0.3192 |
| Si + Al | 37.9476 | 37.9473 | 37.9456 | 37.9435 | 37.9266 | 37.9056 | 37.8742 | 37.8532 | 37.9293 | 37.9288 | 37.9271 | 37.9251 | 37.9082 | 37.8872 |
| Rank on bubbles | D | B | A | A | A | A | A | A | D | B | A | A | A | A |
| Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 | 0.07 |

TABLE 2-continued

| Component | 2-28 | 2-29 | 2-30 | 2-31 | 2-32 | 2-33 | 2-34 | 2-35 | 2-36 | 2-37 | 2-38 | 2-39 | 2-40 | 2-41 |
|---|---|---|---|---|---|---|---|---|---|---|---|---|---|---|
| Si | 29.8778 | 29.8285 | 29.9068 | 29.9064 | 29.9051 | 29.9034 | 29.8902 | 29.8737 | 29.8326 | 29.7996 | 29.7749 | 29.8778 | 29.8774 | 29.8761 |
| Al | 7.9780 | 7.9769 | 7.9857 | 7.9856 | 7.9853 | 7.9848 | 7.9813 | 7.9769 | 7.9780 | 7.9691 | 7.9625 | 7.9780 | 7.9779 | 7.9775 |
| Li | 1.8069 | 1.8067 | 1.8087 | 1.8087 | 1.8086 | 1.8085 | 1.8077 | 1.8067 | 1.8069 | 1.8049 | 1.8035 | 1.8069 | 1.8069 | 1.8068 |
| Na | 8.2754 | 8.2743 | 8.2835 | 8.2834 | 8.2830 | 8.2825 | 8.2789 | 8.2743 | 8.2754 | 8.2663 | 8.2594 | 8.2754 | 8.2753 | 8.2750 |
| K | 0.3770 | 0.3769 | 0.3773 | 0.3773 | 0.3773 | 0.3773 | 0.3771 | 0.3769 | 0.3770 | 0.3766 | 0.3762 | 0.3770 | 0.3770 | 0.3770 |
| Mg | 0.5859 | 0.5858 | 0.5864 | 0.5864 | 0.5864 | 0.5864 | 0.5861 | 0.5858 | 0.5859 | 0.5852 | 0.5847 | 0.5859 | 0.5859 | 0.5858 |
| Ca | 1.4813 | 1.4811 | 1.4827 | 1.4827 | 1.4827 | 1.4826 | 1.4819 | 1.4811 | 1.4813 | 1.4797 | 1.4784 | 1.4813 | 1.4813 | 1.4812 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4659 | 1.4657 | 1.4674 | 1.4673 | 1.4673 | 1.4672 | 1.4666 | 1.4657 | 1.4659 | 1.4643 | 1.4631 | 1.4659 | 1.4659 | 1.4659 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.2289 | 0.2289 | 0.3055 | 0.3056 | 0.3055 | 0.3055 | 0.3053 | 0.3052 | 0.3052 | 0.3049 | 0.3047 | 0.3815 | 0.3815 | 0.3815 |
| Ce | 0.1576 | 0.2476 | 0.0000 | 0.0009 | 0.0045 | 0.0090 | 0.0451 | 0.0901 | 0.1576 | 0.2474 | 0.3147 | 0.0000 | 0.0009 | 0.0045 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.7653 | 47.7276 | 47.7960 | 47.7957 | 47.7943 | 47.7928 | 47.7798 | 47.7636 | 47.7342 | 47.7020 | 47.6779 | 47.7703 | 47.7700 | 47.7687 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 10.4593 | 10.4579 | 10.4695 | 10.4694 | 10.4689 | 10.4683 | 10.4637 | 10.4579 | 10.4593 | 10.4478 | 10.4391 | 10.4593 | 10.4592 | 10.4588 |
| Mg + Ca + Sr + Ba | 2.0672 | 2.0669 | 2.0691 | 2.0691 | 2.0691 | 2.0690 | 2.0680 | 2.0669 | 2.0672 | 2.0649 | 2.0631 | 2.0672 | 2.0672 | 2.0670 |
| Zr + Ti + La + Nb + Ta + Hf | 1.4659 | 1.4657 | 1.4674 | 1.4673 | 1.4673 | 1.4672 | 1.4666 | 1.4657 | 1.4659 | 1.4643 | 1.4631 | 1.4659 | 1.4659 | 1.4659 |
| Ce/Sn | 0.6885 | 1.0817 | 0.0000 | 0.0029 | 0.0147 | 0.0295 | 0.1477 | 0.2952 | 0.5164 | 0.8114 | 1.0328 | 0.0000 | 0.0024 | 0.0118 |
| Sn + Ce | 0.3865 | 0.4765 | 0.3055 | 0.3065 | 0.3100 | 0.3145 | 0.3504 | 0.3953 | 0.4628 | 0.5523 | 0.6194 | 0.3815 | 0.3824 | 0.3860 |
| Si + Al | 37.8558 | 37.8054 | 37.8925 | 37.8920 | 37.8904 | 37.8882 | 37.8715 | 37.8506 | 37.8106 | 37.7687 | 37.7374 | 37.8558 | 37.8553 | 37.8536 |
| Rank on bubbles | A | A | D | B | B | A | A | A | A | A | A | E | C | C |
| Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 | 0.07 |

| Component | 2-42 | 2-43 | 2-44 | 2-45 | 2-46 | 2-47 | 2-48 | 2-49 | 2-50 | 2-51 | 2-52 | 2-53 | 2-54 | 2-55 |
|---|---|---|---|---|---|---|---|---|---|---|---|---|---|---|
| Si | 29.8582 | 29.8450 | 29.8284 | 29.8037 | 29.7708 | 29.7462 | 29.6970 | 29.8253 | 29.8250 | 29.8237 | 29.8220 | 29.8088 | 29.7924 | 29.7677 |
| Al | 7.9848 | 7.9813 | 7.9769 | 7.9702 | 7.9614 | 7.9549 | 7.9537 | 7.9760 | 7.9759 | 7.9756 | 7.9751 | 7.9716 | 7.9672 | 7.9606 |
| Li | 1.8085 | 1.8077 | 1.8067 | 1.8052 | 1.8032 | 1.8017 | 1.8015 | 1.8065 | 1.8065 | 1.8064 | 1.8063 | 1.8055 | 1.8045 | 1.8030 |
| Na | 8.2825 | 8.2788 | 8.2743 | 8.2674 | 8.2583 | 8.2515 | 8.2503 | 8.2734 | 8.2733 | 8.2729 | 8.2725 | 8.2688 | 8.2643 | 8.2574 |
| K | 0.3773 | 0.3771 | 0.3769 | 0.3766 | 0.3762 | 0.3759 | 0.3758 | 0.3769 | 0.3769 | 0.3769 | 0.3768 | 0.3767 | 0.3765 | 0.3762 |
| Mg | 0.5864 | 0.5861 | 0.5858 | 0.5853 | 0.5846 | 0.5842 | 0.5841 | 0.5857 | 0.5857 | 0.5857 | 0.5857 | 0.5854 | 0.5851 | 0.5846 |
| Ca | 1.4826 | 1.4819 | 1.4811 | 1.4799 | 1.4782 | 1.4770 | 1.4768 | 1.4809 | 1.4809 | 1.4809 | 1.4808 | 1.4801 | 1.4793 | 1.4781 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4672 | 1.4665 | 1.4657 | 1.4645 | 1.4629 | 1.4617 | 1.4615 | 1.4656 | 1.4656 | 1.4655 | 1.4654 | 1.4648 | 1.4640 | 1.4628 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.3819 | 0.3817 | 0.3815 | 0.3812 | 0.3807 | 0.3804 | 0.3804 | 0.4768 | 0.4768 | 0.4768 | 0.4767 | 0.4765 | 0.4763 | 0.4759 |
| Ce | 0.0090 | 0.0451 | 0.0901 | 0.1575 | 0.2472 | 0.3143 | 0.4041 | 0.0000 | 0.0009 | 0.0045 | 0.0090 | 0.0450 | 0.0899 | 0.1573 |

TABLE 2-continued

| | | | | | | | | | | | | | | |
|---|---|---|---|---|---|---|---|---|---|---|---|---|---|---|
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.7616 | 47.7488 | 47.7326 | 47.7085 | 47.6765 | 47.6524 | 47.6148 | 47.7329 | 47.7325 | 47.7311 | 47.7297 | 47.7168 | 47.7005 | 47.6764 |
| Total | 100.0000 | 100.0000 | 100.0000 | 100.0000 | 100.0000 | 100.0002 | 100.0000 | 100.0000 | 100.0000 | 100.0000 | 100.0000 | 100.0000 | 100.0000 | 100.0000 |
| Li + Na + K | 10.4683 | 10.4636 | 10.4579 | 10.4492 | 10.4377 | 10.4291 | 10.4276 | 10.4568 | 10.4567 | 10.4562 | 10.4556 | 10.4510 | 10.4453 | 10.4366 |
| Mg + Ca + Sr + Ba | 2.0690 | 2.0680 | 2.0669 | 2.0652 | 2.0628 | 2.0612 | 2.0609 | 2.0666 | 2.0666 | 2.0666 | 2.0665 | 2.0655 | 2.0644 | 2.0627 |
| Zr + Ti + La + Nb + Ta + Hf | 1.4672 | 1.4665 | 1.4657 | 1.4645 | 1.4629 | 1.4617 | 1.4615 | 1.4656 | 1.4656 | 1.4655 | 1.4654 | 1.4648 | 1.4640 | 1.4628 |
| Ce/Sn | 0.0236 | 0.1182 | 0.2362 | 0.4132 | 0.6493 | 0.8262 | 1.0623 | 0.0000 | 0.0019 | 0.0094 | 0.0189 | 0.0944 | 0.1887 | 0.3305 |
| Sn + Ce | 0.3909 | 0.4268 | 0.4716 | 0.5387 | 0.6279 | 0.6947 | 0.7845 | 0.4768 | 0.4777 | 0.4813 | 0.4857 | 0.5215 | 0.5662 | 0.6332 |
| Si + Al | 37.8430 | 37.8263 | 37.8053 | 37.7739 | 37.7322 | 37.7011 | 37.6507 | 37.8013 | 37.8009 | 37.7993 | 37.7971 | 37.7804 | 37.7596 | 37.7283 |
| Rank on bubbles | B | B | A | A | A | A | A | E | C | C | C | C | B | B |
| Acid etching rate (nm/min) | 1.7 | 1.7 | 1.7 | 1.7 | 1.7 | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 | 0.07 | 0.07 | 0.07 | 0.07 | 0.07 |

TABLE 3

| Component | 2-56 | 2-57 | 2-58 | 2-59 | Com. Ex. 2-1 | Com. Ex. 2-2 | Com. Ex. 2-3 | Com. Ex. 2-4 | Com. Ex. 2-5 |
|---|---|---|---|---|---|---|---|---|---|
| Si | 29.7349 | 29.6908 | 29.6612 | 29.6286 | 29.8825 | 29.9082 | 30.0348 | 30.0332 | 29.7010 |
| Al | 7.9518 | 7.9521 | 7.9441 | 7.9354 | 7.9792 | 7.9861 | 8.0078 | 8.0074 | 7.9548 |
| Li | 1.8010 | 1.8011 | 1.7993 | 1.7973 | 1.8072 | 1.8088 | 1.8137 | 1.8136 | 1.8017 |
| Na | 8.2483 | 8.2486 | 8.2403 | 8.2313 | 8.2768 | 8.2839 | 8.3064 | 8.3059 | 8.2514 |
| K | 0.3757 | 0.3758 | 0.3754 | 0.3750 | 0.3770 | 0.3774 | 0.3784 | 0.3784 | 0.3759 |
| Mg | 0.5839 | 0.5840 | 0.5834 | 0.5827 | 0.5860 | 0.5865 | 0.5881 | 0.5880 | 0.5842 |
| Ca | 1.4764 | 1.4765 | 1.4750 | 1.4734 | 1.4815 | 1.4828 | 1.4868 | 1.4868 | 1.4770 |
| Sr | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 |
| Zr | 1.4611 | 1.4612 | 1.4597 | 1.4581 | 1.4662 | 1.4674 | 1.4714 | 1.4713 | 1.4617 |
| Ti | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 |
| Sn | 0.4753 | 0.4753 | 0.4749 | 0.4744 | 0.0000 | 0.1910 | 0.0077 | 0.0077 | 0.7608 |
| Ce | 0.2469 | 0.3226 | 0.4036 | 0.4926 | 0.0000 | 0.0000 | 0.0045 | 0.0090 | 0.0000 |
| Sb | 0.0000 | 0.0000 | 0.0000 | 0.0000 | 0.3914 | 0.1175 | 0.0000 | 0.0000 | 0.0000 |
| O | 47.6447 | 47.6120 | 47.5831 | 47.5512 | 47.7522 | 47.7904 | 47.9004 | 47.8987 | 47.6315 |
| Total | 100.0000 | 100.0000 | 100.0000 | 100.0000 | 100.0000 | 100.0000 | 100.0000 | 100.0000 | 100.0000 |
| Li + Na + K | 10.4250 | 10.4255 | 10.4150 | 10.4036 | 10.4610 | 10.4701 | 10.4985 | 10.4979 | 10.4290 |
| Mg + Ca + Sr + Ba | 2.0603 | 2.0605 | 2.0584 | 2.0561 | 2.0675 | 2.0693 | 2.0749 | 2.0748 | 2.0612 |
| Zr + Ti + La + Nb + Ta + Hf | 1.4611 | 1.4612 | 1.4597 | 1.4581 | 1.4662 | 1.4674 | 1.4714 | 1.4713 | 1.4617 |
| Ce/Sn | 0.5195 | 0.6787 | 0.8499 | 1.0384 | — | 0.0000 | 0.5844 | — | 0.0000 |
| Sn + Ce | 0.7222 | 0.7979 | 0.8785 | 0.9670 | 0.0000 | 0.1910 | 0.0122 | 0.0167 | 0.7608 |
| Si + Al | 37.6867 | 37.6429 | 37.6053 | 37.5640 | 37.8617 | 37.8943 | 38.0426 | 38.0406 | 37.6558 |
| Rank on bubbles | B | B | B | B | G | G | G | G | G |
| Acid etching rate (nm/min) | 1.7 | 1.7 | 1.7 | 1.7 | 1.7 | 1.7 | 1.7 | 1.7 | 1.7 |
| Alkaline etching rate (nm/min) | 0.07 | 0.07 | 0.07 | 0.07 | 0.07 | 0.07 | 0.07 | 0.07 | 0.07 |

| | Component | 3-1 | 3-2 | 3-3 | 3-4 | 3-5 | 3-6 | 3-7 | 3-8 | 3-9 | 3-10 | 3-11 | 3-12 | 3-13 |
|---|---|---|---|---|---|---|---|---|---|---|---|---|---|---|
| (mol %) | SiO2 | 72.0 | 72.0 | 72.0 | 72.0 | 72.0 | 72.0 | 72.0 | 72.0 | 72.0 | 72.0 | 72.0 | 72.0 | 72.0 |
| | Al2O3 | 6.0 | 6.0 | 6.0 | 6.0 | 6.0 | 6.0 | 6.0 | 6.0 | 6.0 | 6.0 | 6.0 | 6.0 | 6.0 |
| | Li2O | 8.2 | 8.2 | 8.2 | 8.2 | 8.2 | 8.2 | 8.2 | 8.2 | 8.2 | 8.2 | 8.2 | 8.2 | 8.2 |
| | Na2O | 10.4 | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 2.5 | 2.5 | 2.5 | 2.5 | 2.5 | 2.5 | 2.5 | 2.5 | 2.5 | 2.5 | 2.5 | 2.5 | 2.5 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |

TABLE 3-continued

| | | | | | | | | | | | | | | |
|---|---|---|---|---|---|---|---|---|---|---|---|---|---|---|
| | Total | 100.0 | 100.0 | 100.0 | 100.0 | 100.0 | 100.0 | 100.0 | 100.0 | 100.0 | 100.0 | 100.0 | 100.0 | 100.0 |
| Based on | SnO2 | 0.1 | 0.1 | 0.1 | 0.1 | 0.1 | 0.1 | 0.2 | 0.2 | 0.2 | 0.2 | 0.2 | 0.2 | 0.2 |
| glass | CeO2 | 0 | 0.001 | 0.005 | 0.01 | 0.05 | 0.1 | 0 | 0.001 | 0.005 | 0.01 | 0.05 | 0.1 | 0.2 |
| components | Sb2O3 | 0 | 0 | 0 | 0 | 0 | 0 | 0 | 0 | 0 | 0 | 0 | 0 | 0 |
| (mass %) | CeO2/SnO2 | 0.0000 | 0.0100 | 0.0500 | 0.1000 | 0.5000 | 1.0000 | 0.0000 | 0.0050 | 0.0250 | 0.0500 | 0.2500 | 0.5000 | 1.0000 |
| | SnO2 + CeO2 | 0.100 | 0.101 | 0.105 | 0.110 | 0.150 | 0.200 | 0.200 | 0.201 | 0.205 | 0.210 | 0.250 | 0.300 | 0.400 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 2.5 | 2.5 | 2.5 | 2.5 | 2.5 | 2.5 | 2.5 | 2.5 | 2.5 | 2.5 | 2.5 | 2.5 | 2.5 |
| | ZrO2 + TiO2 + La2O3 + Nb2O5 + Ta2O5 + HfO2 | 0.9 | 0.9 | 0.9 | 0.9 | 0.9 | 0.9 | 0.9 | 0.9 | 0.9 | 0.9 | 0.9 | 0.9 | 0.9 |
| | SiO2 + Al2O3 | 78.0 | 78.0 | 78.0 | 78.0 | 78.0 | 78.0 | 78.0 | 78.0 | 78.0 | 78.0 | 78.0 | 78.0 | 78.0 |
| | Rank on bubbles | D | C | B | B | B | B | D | B | A | A | A | A | A |
| | Component | 3-14 | 3-15 | 3-16 | 3-17 | 3-18 | 3-19 | 3-20 | 3-21 | 3-22 | 3-23 | 3-24 | 3-25 | 3-26 |
| (mol %) | SiO2 | 72.0 | 72.0 | 72.0 | 72.0 | 72.0 | 72.0 | 72.0 | 72.0 | 72.0 | 72.0 | 72.0 | 72.0 | 72.0 |
| | Al2O3 | 6.0 | 6.0 | 6.0 | 6.0 | 6.0 | 6.0 | 6.0 | 6.0 | 6.0 | 6.0 | 6.0 | 6.0 | 6.0 |
| | Li2O | 8.2 | 8.2 | 8.2 | 8.2 | 8.2 | 8.2 | 8.2 | 8.2 | 8.2 | 8.2 | 8.2 | 8.2 | 8.2 |
| | Na2O | 10.4 | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 2.5 | 2.5 | 2.5 | 2.5 | 2.5 | 2.5 | 2.5 | 2.5 | 2.5 | 2.5 | 2.5 | 2.5 | 2.5 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on | SnO2 | 0.25 | 0.25 | 0.25 | 0.25 | 0.25 | 0.25 | 0.25 | 0.25 | 0.3 | 0.3 | 0.3 | 0.3 | 0.3 |
| glass | CeO2 | 0 | 0.001 | 0.005 | 0.01 | 0.05 | 0.1 | 0.2 | 0.25 | 0 | 0.001 | 0.005 | 0.01 | 0.05 |
| components | Sb2O3 | 0 | 0 | 0 | 0 | 0 | 0 | 0 | 0 | 0 | 0 | 0 | 0 | 0 |
| (mass %) | CeO2/SnO2 | 0.0000 | 0.0040 | 0.0200 | 0.0400 | 0.2000 | 0.4000 | 0.8000 | 1.0000 | 0.0000 | 0.0033 | 0.0167 | 0.0333 | 0.1667 |
| | SnO2 + CeO2 | 0.250 | 0.251 | 0.255 | 0.260 | 0.300 | 0.350 | 0.450 | 0.500 | 0.300 | 0.301 | 0.305 | 0.310 | 0.350 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 2.5 | 2.5 | 2.5 | 2.5 | 2.5 | 2.5 | 2.5 | 2.5 | 2.5 | 2.5 | 2.5 | 2.5 | 2.5 |
| | ZrO2 + TiO2 + La2O3 + Nb2O5 + Ta2O5 + HfO2 | 0.9 | 0.9 | 0.9 | 0.9 | 0.9 | 0.9 | 0.9 | 0.9 | 0.9 | 0.9 | 0.9 | 0.9 | 0.9 |
| | SiO2 + Al2O3 | 78.0 | 78.0 | 78.0 | 78.0 | 78.0 | 78.0 | 78.0 | 78.0 | 78.0 | 78.0 | 78.0 | 78.0 | 78.0 |
| | Rank on bubbles | D | B | A | A | A | A | A | A | D | B | A | A | A |
| | Component | 3-27 | 3-28 | 3-29 | 3-30 | 3-31 | 3-32 | 3-33 | 3-34 | 3-35 | 3-36 | 3-37 | 3-38 | 3-39 |
| (mol %) | SiO2 | 72.0 | 72.0 | 72.0 | 72.0 | 72.0 | 72.0 | 72.0 | 72.0 | 72.0 | 72.0 | 72.0 | 72.0 | 72.0 |
| | Al2O3 | 6.0 | 6.0 | 6.0 | 6.0 | 6.0 | 6.0 | 6.0 | 6.0 | 6.0 | 6.0 | 6.0 | 6.0 | 6.0 |
| | Li2O | 8.2 | 8.2 | 8.2 | 8.2 | 8.2 | 8.2 | 8.2 | 8.2 | 8.2 | 8.2 | 8.2 | 8.2 | 8.2 |
| | Na2O | 10.4 | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 2.5 | 2.5 | 2.5 | 2.5 | 2.5 | 2.5 | 2.5 | 2.5 | 2.5 | 2.5 | 2.5 | 2.5 | 2.5 |

TABLE 3-continued

| | | | | | | | | | | | | | | |
|---|---|---|---|---|---|---|---|---|---|---|---|---|---|---|
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on | SnO2 | 0.3 | 0.3 | 0.3 | 0.4 | 0.4 | 0.4 | 0.4 | 0.4 | 0.4 | 0.4 | 0.4 | 0.4 | 0.5 |
| glass | CeO2 | 0.1 | 0.2 | 0.3 | 0 | 0.001 | 0.005 | 0.01 | 0.05 | 0.1 | 0.2 | 0.3 | 0.4 | 0 |
| components | Sb2O3 | 0 | 0 | 0 | 0 | 0 | 0 | 0 | 0 | 0 | 0 | 0 | 0 | 0 |
| (mass %) | CeO2/SnO2 | 0.3333 | 0.6667 | 1.0000 | 0.0000 | 0.0025 | 0.0125 | 0.0250 | 0.1250 | 0.2500 | 0.5000 | 0.7500 | 1.0000 | 0.0000 |
| | SnO2 + CeO2 | 0.400 | 0.500 | 0.600 | 0.400 | 0.401 | 0.405 | 0.410 | 0.450 | 0.500 | 0.600 | 0.700 | 0.800 | 0.500 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 2.5 | 2.5 | 2.5 | 2.5 | 2.5 | 2.5 | 2.5 | 2.5 | 2.5 | 2.5 | 2.5 | 2.5 | 2.5 |
| | ZrO2 + TiO2 + La2O3 + Nb2O5 + Ta2O5 + HfO2 | 0.9 | 0.9 | 0.9 | 0.9 | 0.9 | 0.9 | 0.9 | 0.9 | 0.9 | 0.9 | 0.9 | 0.9 | 0.9 |
| | SiO2 + Al2O3 | 78.0 | 78.0 | 78.0 | 78.0 | 78.0 | 78.0 | 78.0 | 78.0 | 78.0 | 78.0 | 78.0 | 78.0 | 78.0 |
| | Rank on bubbles | A | A | A | D | B | B | A | A | A | A | A | A | E |

| | Component | 3-40 | 3-41 | 3-42 | 3-43 | 3-44 | 3-45 | 3-46 | 3-47 | 3-48 | 3-49 | 3-50 | 3-51 | 3-52 |
|---|---|---|---|---|---|---|---|---|---|---|---|---|---|---|
| (mol %) | SiO2 | 72.0 | 72.0 | 72.0 | 72.0 | 72.0 | 72.0 | 72.0 | 72.0 | 72.0 | 72.0 | 72.0 | 72.0 | 72.0 |
| | Al2O3 | 6.0 | 6.0 | 6.0 | 6.0 | 6.0 | 6.0 | 6.0 | 6.0 | 6.0 | 6.0 | 6.0 | 6.0 | 6.0 |
| | Li2O | 8.2 | 8.2 | 8.2 | 8.2 | 8.2 | 8.2 | 8.2 | 8.2 | 8.2 | 8.2 | 8.2 | 8.2 | 8.2 |
| | Na2O | 10.4 | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 2.5 | 2.5 | 2.5 | 2.5 | 2.5 | 2.5 | 2.5 | 2.5 | 2.5 | 2.5 | 2.5 | 2.5 | 2.5 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on | SnO2 | 0.5 | 0.5 | 0.5 | 0.5 | 0.5 | 0.5 | 0.5 | 0.5 | 0.5 | 0.6 | 0.6 | 0.6 | 0.6 |
| glass | CeO2 | 0.001 | 0.005 | 0.01 | 0.05 | 0.1 | 0.2 | 0.3 | 0.4 | 0.5 | 0 | 0.001 | 0.005 | 0.01 |
| components | Sb2O3 | 0 | 0 | 0 | 0 | 0 | 0 | 0 | 0 | 0 | 0 | 0 | 0 | 0 |
| (mass %) | CeO2/SnO2 | 0.0020 | 0.0100 | 0.0200 | 0.1000 | 0.2000 | 0.4000 | 0.6000 | 0.8000 | 1.0000 | 0.0000 | 0.0017 | 0.0083 | 0.0167 |
| | SnO2 + CeO2 | 0.501 | 0.505 | 0.510 | 0.550 | 0.600 | 0.700 | 0.800 | 0.900 | 1.000 | 0.600 | 0.601 | 0.605 | 0.610 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 2.5 | 2.5 | 2.5 | 2.5 | 2.5 | 2.5 | 2.5 | 2.5 | 2.5 | 2.5 | 2.5 | 2.5 | 2.5 |
| | ZrO2 + TiO2 + La2O3 + Nb2O5 + Ta2O5 + HfO2 | 0.9 | 0.9 | 0.9 | 0.9 | 0.9 | 0.9 | 0.9 | 0.9 | 0.9 | 0.9 | 0.9 | 0.9 | 0.9 |
| | SiO2 + Al2O3 | 78.0 | 78.0 | 78.0 | 78.0 | 78.0 | 78.0 | 78.0 | 78.0 | 78.0 | 78.0 | 78.0 | 78.0 | 78.0 |
| | Rank on bubbles | C | C | B | B | A | A | A | A | A | E | C | C | C |

TABLE 3-continued

| | Component | 3-53 | 3-54 | 3-55 | 3-56 | 3-57 | 3-58 | 3-59 | Com. Ex. 3-1 | Com. Ex. 3-2 | Com. Ex. 3-3 | Com. Ex. 3-4 | Com. Ex. 3-5 |
|---|---|---|---|---|---|---|---|---|---|---|---|---|---|
| (mol %) | SiO2 | 72.0 | 72.0 | 72.0 | 72.0 | 72.0 | 72.0 | 72.0 | 72.0 | 72.0 | 72.0 | 72.0 | 72.0 |
| | Al2O3 | 6.0 | 6.0 | 6.0 | 6.0 | 6.0 | 6.0 | 6.0 | 6.0 | 6.0 | 6.0 | 6.0 | 6.0 |
| | Li2O | 8.2 | 8.2 | 8.2 | 8.2 | 8.2 | 8.2 | 8.2 | 8.2 | 8.2 | 8.2 | 8.2 | 8.2 |
| | Na2O | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 |
| | CaO | 2.5 | 2.5 | 2.5 | 2.5 | 2.5 | 2.5 | 2.5 | 2.5 | 2.5 | 2.5 | 2.5 | 2.5 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.6 | 0.6 | 0.6 | 0.6 | 0.6 | 0.6 | 0.6 | 0 | 0.25 | 1 | 0 | 1 |
| | CeO2 | 0.05 | 0.1 | 0.2 | 0.3 | 0.4 | 0.5 | 0.6 | 0 | 0 | 0 | 1 | 1 |
| | Sb2O3 | 0 | 0 | 0 | 0 | 0 | 0 | 0 | 0.5 | 0.15 | 0 | 0 | 0 |
| | CeO2/SnO2 | 0.0833 | 0.1667 | 0.3333 | 0.5000 | 0.6667 | 0.8333 | 1.0000 | — | 0.0000 | 0.0000 | — | 1.0000 |
| | SnO2 + CeO2 | 0.650 | 0.700 | 0.800 | 0.900 | 1.000 | 1.100 | 1.200 | 0.000 | 0.250 | 1.000 | 1.000 | 2.000 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 2.5 | 2.5 | 2.5 | 2.5 | 2.5 | 2.5 | 2.5 | 2.5 | 2.5 | 2.5 | 2.5 | 2.5 |
| | ZrO2 + TiO2 + La2O3 + Nb2O5 + Ta2O5 + HfO2 | 0.9 | 0.9 | 0.9 | 0.9 | 0.9 | 0.9 | 0.9 | 0.9 | 0.9 | 0.9 | 0.9 | 0.9 |
| | SiO2 + Al2O3 | 78.0 | 78.0 | 78.0 | 78.0 | 78.0 | 78.0 | 78.0 | 78.0 | 78.0 | 78.0 | 78.0 | 78.0 |
| | Rank on bubbles | C | B | B | B | B | B | B | G | G | G | G | G |

| Component (mass %) | 3-1 | 3-2 | 3-3 | 3-4 | 3-5 | 3-6 | 3-7 | 3-8 | 3-9 | 3-10 | 3-11 | 3-12 | 3-13 |
|---|---|---|---|---|---|---|---|---|---|---|---|---|---|
| Si | 33.2503 | 33.2500 | 33.2486 | 33.2470 | 33.2337 | 33.2171 | 33.2172 | 33.2169 | 33.2155 | 33.2139 | 33.2006 | 33.1707 | 33.1511 |
| Al | 5.3239 | 5.3238 | 5.3236 | 5.3234 | 5.3212 | 5.3186 | 5.3186 | 5.3185 | 5.3183 | 5.3181 | 5.3159 | 5.3185 | 5.3080 |
| Li | 1.8489 | 1.8489 | 1.8488 | 1.8487 | 1.8480 | 1.8471 | 1.8471 | 1.8471 | 1.8470 | 1.8469 | 1.8462 | 1.8471 | 1.8434 |
| Na | 7.8628 | 7.8627 | 7.8624 | 7.8620 | 7.8589 | 7.8550 | 7.8550 | 7.8549 | 7.8546 | 7.8542 | 7.8511 | 7.8549 | 7.8394 |
| K | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 1.6475 | 1.6475 | 1.6474 | 1.6473 | 1.6467 | 1.6459 | 1.6459 | 1.6458 | 1.6458 | 1.6457 | 1.6450 | 1.6458 | 1.6426 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.3500 | 1.3500 | 1.3499 | 1.3499 | 1.3493 | 1.3486 | 1.3487 | 1.3486 | 1.3486 | 1.3485 | 1.3480 | 1.3486 | 1.3460 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.0786 | 0.0786 | 0.0786 | 0.0786 | 0.0785 | 0.0785 | 0.1569 | 0.1569 | 0.1569 | 0.1569 | 0.1568 | 0.1569 | 0.1565 |
| Ce | 0.0000 | 0.0008 | 0.0041 | 0.0081 | 0.0407 | 0.0813 | 0.0000 | 0.0008 | 0.0041 | 0.0081 | 0.0406 | 0.0813 | 0.1622 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.6380 | 48.6377 | 48.6366 | 48.6350 | 48.6230 | 48.6079 | 48.6106 | 48.6105 | 48.6092 | 48.6077 | 48.5957 | 48.5762 | 48.5508 |

TABLE 3-continued

| | | | | | | | | | | | | | | |
|---|---|---|---|---|---|---|---|---|---|---|---|---|---|---|
| Total | 100.0000 | 100.0000 | 100.0000 | 100.0000 | 100.0000 | 100.0000 | 100.0000 | 100.0000 | 100.0000 | 100.0000 | 99.9999 | 100.0000 | 100.0000 |
| Li + Na + K | 9.7117 | 9.7116 | 9.7112 | 9.7107 | 9.7069 | 9.7021 | 9.7021 | 9.7020 | 9.7016 | 9.7011 | 9.6973 | 9.7020 | 9.6828 |
| Mg + Ca + Sr + Ba | 1.6475 | 1.6475 | 1.6474 | 1.6473 | 1.6467 | 1.6459 | 1.6459 | 1.6458 | 1.6458 | 1.6457 | 1.6450 | 1.6458 | 1.6426 |
| Zr + Ti + La + Nb + Ta + Hf | 1.3500 | 1.3500 | 1.3499 | 1.3499 | 1.3493 | 1.3486 | 1.3487 | 1.3486 | 1.3486 | 1.3485 | 1.3480 | 1.3486 | 1.3460 |
| Ce/Sn | 0.0000 | 0.0102 | 0.0522 | 0.1031 | 0.5185 | 1.0357 | 0.0000 | 0.0051 | 0.0261 | 0.0516 | 0.2589 | 0.5182 | 1.0364 |
| Sn + Ce | 0.0786 | 0.0794 | 0.0827 | 0.0867 | 0.1192 | 0.1598 | 0.1569 | 0.1577 | 0.1610 | 0.1650 | 0.1974 | 0.2382 | 0.3187 |
| Si + Al | 38.5742 | 38.5738 | 38.5722 | 38.5704 | 38.5549 | 38.5357 | 38.5358 | 38.5354 | 38.5338 | 38.5320 | 38.5165 | 38.4892 | 38.4591 |
| Rank on bubbles | D | C | B | B | B | B | D | B | A | A | A | A | A |

| Component (mass %) | 3-14 | 3-15 | 3-16 | 3-17 | 3-18 | 3-19 | 3-20 | 3-21 | 3-22 | 3-23 | 3-24 | 3-25 | 3-26 | 3-27 |
|---|---|---|---|---|---|---|---|---|---|---|---|---|---|---|
| Si | 33.2007 | 33.2003 | 33.1990 | 33.1974 | 33.1707 | 33.1542 | 30.3850 | 30.3700 | 30.4303 | 30.4300 | 30.4288 | 30.4273 | 30.4152 | 30.4001 |
| Al | 5.3159 | 5.3159 | 5.3157 | 5.3154 | 5.3185 | 5.3159 | 8.1134 | 8.1094 | 8.1255 | 8.1254 | 8.1251 | 8.1247 | 8.1215 | 8.1175 |
| Li | 1.8462 | 1.8461 | 1.8461 | 1.8460 | 1.8471 | 1.8461 | 1.8376 | 1.8367 | 1.8404 | 1.8403 | 1.8403 | 1.8402 | 1.8394 | 1.8385 |
| Na | 7.8511 | 7.8510 | 7.8507 | 7.8503 | 7.8549 | 7.8510 | 8.4159 | 8.4118 | 8.4285 | 8.4284 | 8.4281 | 8.4276 | 8.4243 | 8.4201 |
| K | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 1.6450 | 1.6450 | 1.6450 | 1.6449 | 1.6458 | 1.6450 | 1.5064 | 1.5057 | 1.5087 | 1.5087 | 1.5086 | 1.5085 | 1.5079 | 1.5072 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.3480 | 1.3480 | 1.3479 | 1.3478 | 1.3486 | 1.3480 | 1.3417 | 1.3411 | 1.3437 | 1.3437 | 1.3437 | 1.3436 | 1.3431 | 1.3424 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.1960 | 0.1960 | 0.1960 | 0.1960 | 0.1961 | 0.1960 | 0.1950 | 0.1948 | 0.2344 | 0.2344 | 0.2344 | 0.2344 | 0.2343 | 0.2341 |
| Ce | 0.0000 | 0.0008 | 0.0041 | 0.0081 | 0.0406 | 0.0812 | 0.1616 | 0.2019 | 0.0000 | 0.0008 | 0.0040 | 0.0081 | 0.0405 | 0.0809 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.5971 | 48.5969 | 48.5955 | 48.5941 | 48.5777 | 48.5626 | 48.0434 | 48.0286 | 48.0885 | 48.0883 | 48.0870 | 48.0856 | 48.0738 | 48.0592 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 9.6973 | 9.6971 | 9.6968 | 9.6963 | 9.7020 | 9.6971 | 10.2535 | 10.2485 | 10.2689 | 10.2687 | 10.2684 | 10.2678 | 10.2637 | 10.2586 |
| Mg + Ca + Sr + Ba | 1.6450 | 1.6450 | 1.6450 | 1.6449 | 1.6458 | 1.6450 | 1.5064 | 1.5057 | 1.5087 | 1.5087 | 1.5086 | 1.5085 | 1.5079 | 1.5072 |
| Zr + Ti + La + Nb + Ta + Hf | 1.3480 | 1.3480 | 1.3479 | 1.3478 | 1.3486 | 1.3480 | 1.3417 | 1.3411 | 1.3437 | 1.3437 | 1.3437 | 1.3436 | 1.3431 | 1.3424 |
| Ce/Sn | 0.0000 | 0.0041 | 0.0209 | 0.0413 | 0.2070 | 0.4143 | 0.8287 | 1.0364 | 0.0000 | 0.0034 | 0.0171 | 0.0346 | 0.1729 | 0.3456 |
| Sn + Ce | 0.1960 | 0.1968 | 0.2001 | 0.2041 | 0.2367 | 0.2772 | 0.3566 | 0.3967 | 0.2344 | 0.2352 | 0.2384 | 0.2425 | 0.2748 | 0.3150 |
| Si + Al | 38.5166 | 38.5162 | 38.5147 | 38.5128 | 38.4892 | 38.4701 | 38.4984 | 38.4794 | 38.5558 | 38.5554 | 38.5539 | 38.5520 | 38.5367 | 38.5176 |
| Rank on bubbles | D | B | A | A | A | A | A | A | D | B | A | A | A | A |

| Component (mass %) | 3-28 | 3-29 | 3-30 | 3-31 | 3-32 | 3-33 | 3-34 | 3-35 | 3-36 | 3-37 | 3-38 | 3-39 | 3-40 | 3-41 |
|---|---|---|---|---|---|---|---|---|---|---|---|---|---|---|
| Si | 30.3700 | 30.3239 | 30.4002 | 30.3999 | 30.3987 | 30.3972 | 30.3851 | 30.3701 | 30.3240 | 30.2940 | 30.2641 | 30.3702 | 30.3699 | 30.3687 |
| Al | 8.1094 | 8.1093 | 8.1175 | 8.1174 | 8.1171 | 8.1167 | 8.1135 | 8.1094 | 8.1094 | 8.1014 | 8.0934 | 8.1095 | 8.1094 | 8.1091 |
| Li | 1.8367 | 1.8367 | 1.8385 | 1.8385 | 1.8385 | 1.8384 | 1.8376 | 1.8367 | 1.8367 | 1.8349 | 1.8331 | 1.8367 | 1.8367 | 1.8366 |
| Na | 8.4118 | 8.4117 | 8.4201 | 8.4201 | 8.4197 | 8.4193 | 8.4160 | 8.4118 | 8.4117 | 8.4034 | 8.3951 | 8.4118 | 8.4117 | 8.4114 |
| K | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 1.5057 | 1.5057 | 1.5072 | 1.5072 | 1.5071 | 1.5070 | 1.5065 | 1.5057 | 1.5057 | 1.5042 | 1.5027 | 1.5057 | 1.5057 | 1.5056 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.3411 | 1.3411 | 1.3424 | 1.3424 | 1.3424 | 1.3423 | 1.3418 | 1.3411 | 1.3411 | 1.3398 | 1.3384 | 1.3411 | 1.3411 | 1.3410 |

TABLE 3-continued

| | | | | | | | | | | | | | | |
|---|---|---|---|---|---|---|---|---|---|---|---|---|---|---|
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.2338 | 0.2337 | 0.3122 | 0.3122 | 0.3121 | 0.3121 | 0.3119 | 0.3117 | 0.3116 | 0.3112 | 0.3108 | 0.3897 | 0.3896 | 0.3896 |
| Ce | 0.1615 | 0.2422 | 0.0000 | 0.0008 | 0.0040 | 0.0081 | 0.0404 | 0.0808 | 0.1615 | 0.2419 | 0.3220 | 0.0000 | 0.0008 | 0.0040 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.0300 | 47.9957 | 48.0619 | 48.0615 | 48.0604 | 48.0589 | 48.0472 | 48.0327 | 47.9983 | 47.9692 | 47.9404 | 48.0353 | 48.0351 | 48.0340 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 10.2485 | 10.2484 | 10.2586 | 10.2586 | 10.2582 | 10.2577 | 10.2536 | 10.2485 | 10.2484 | 10.2383 | 10.2282 | 10.2485 | 10.2484 | 10.2480 |
| Mg + Ca + Sr + Ba | 1.5057 | 1.5057 | 1.5072 | 1.5072 | 1.5071 | 1.5070 | 1.5065 | 1.5057 | 1.5057 | 1.5042 | 1.5027 | 1.5057 | 1.5057 | 1.5056 |
| Zr + Ti + La + Nb + Ta + Hf | 1.3411 | 1.3411 | 1.3424 | 1.3424 | 1.3424 | 1.3423 | 1.3418 | 1.3411 | 1.3411 | 1.3398 | 1.3384 | 1.3411 | 1.3411 | 1.3410 |
| Ce/Sn | 0.6908 | 1.0364 | 0.0000 | 0.0026 | 0.0128 | 0.0260 | 0.1295 | 0.2592 | 0.5183 | 0.7773 | 1.0360 | 0.0000 | 0.0021 | 0.0103 |
| Sn + Ce | 0.3953 | 0.4759 | 0.3122 | 0.3130 | 0.3161 | 0.3202 | 0.3523 | 0.3925 | 0.4731 | 0.5531 | 0.6328 | 0.3897 | 0.3904 | 0.3936 |
| Si + Al | 38.4794 | 38.4332 | 38.5177 | 38.5173 | 38.5158 | 38.5139 | 38.4986 | 38.4795 | 38.4334 | 38.3954 | 38.3575 | 38.4797 | 38.4793 | 38.4778 |
| Rank on bubbles | A | A | D | B | B | A | A | A | A | A | A | E | C | C |

| Component (mass %) | 3-42 | 3-43 | 3-44 | 3-45 | 3-46 | 3-47 | 3-48 | 3-49 | 3-50 | 3-51 | 3-52 | 3-53 | 3-54 | 3-55 |
|---|---|---|---|---|---|---|---|---|---|---|---|---|---|---|
| Si | 30.3511 | 30.3391 | 30.3241 | 30.2941 | 30.2642 | 30.2344 | 30.1885 | 30.3241 | 30.3238 | 30.3226 | 30.3211 | 30.3092 | 30.2942 | 30.2643 |
| Al | 8.1166 | 8.1134 | 8.1094 | 8.1014 | 8.0934 | 8.0854 | 8.0854 | 8.1094 | 8.1093 | 8.1090 | 8.1086 | 8.1054 | 8.1014 | 8.0934 |
| Li | 1.8383 | 1.8376 | 1.8367 | 1.8349 | 1.8331 | 1.8313 | 1.8313 | 1.8367 | 1.8367 | 1.8366 | 1.8365 | 1.8358 | 1.8349 | 1.8331 |
| Na | 8.4192 | 8.4159 | 8.4117 | 8.4034 | 8.3951 | 8.3869 | 8.3868 | 8.4118 | 8.4117 | 8.4114 | 8.4109 | 8.4076 | 8.4035 | 8.3952 |
| K | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 1.5070 | 1.5064 | 1.5057 | 1.5042 | 1.5027 | 1.5012 | 1.5012 | 1.5057 | 1.5057 | 1.5056 | 1.5056 | 1.5050 | 1.5042 | 1.5027 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.3423 | 1.3417 | 1.3411 | 1.3398 | 1.3384 | 1.3371 | 1.3371 | 1.3411 | 1.3411 | 1.3410 | 1.3410 | 1.3404 | 1.3398 | 1.3384 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.3900 | 0.3898 | 0.3895 | 0.3890 | 0.3885 | 0.3879 | 0.3878 | 0.4674 | 0.4674 | 0.4674 | 0.4673 | 0.4671 | 0.4668 | 0.4661 |
| Ce | 0.0081 | 0.0404 | 0.0807 | 0.1612 | 0.2415 | 0.3216 | 0.4019 | 0.0000 | 0.0008 | 0.0040 | 0.0081 | 0.0403 | 0.0806 | 0.1610 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.0274 | 48.0157 | 48.0011 | 47.9720 | 47.9431 | 47.9142 | 47.8800 | 48.0038 | 48.0035 | 48.0024 | 48.0009 | 47.9892 | 47.9746 | 47.9458 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 10.2575 | 10.2535 | 10.2484 | 10.2383 | 10.2282 | 10.2182 | 10.2181 | 10.2485 | 10.2484 | 10.2480 | 10.2474 | 10.2434 | 10.2384 | 10.2283 |
| Mg + Ca + Sr + Ba | 1.5070 | 1.5064 | 1.5057 | 1.5042 | 1.5027 | 1.5012 | 1.5012 | 1.5057 | 1.5057 | 1.5056 | 1.5056 | 1.5050 | 1.5042 | 1.5027 |
| Zr + Ti + La + Nb + Ta + Hf | 1.3423 | 1.3417 | 1.3411 | 1.3398 | 1.3384 | 1.3371 | 1.3371 | 1.3411 | 1.3411 | 1.3410 | 1.3410 | 1.3404 | 1.3398 | 1.3384 |
| Ce/Sn | 0.0208 | 0.1036 | 0.2072 | 0.4144 | 0.6216 | 0.8291 | 1.0364 | 0.0000 | 0.0017 | 0.0086 | 0.0173 | 0.0863 | 0.1727 | 0.3454 |
| Sn + Ce | 0.3981 | 0.4302 | 0.4702 | 0.5502 | 0.6300 | 0.7095 | 0.7897 | 0.4674 | 0.4682 | 0.4714 | 0.4754 | 0.5074 | 0.5474 | 0.6271 |
| Si + Al | 38.4677 | 38.4525 | 38.4335 | 38.3955 | 38.3576 | 38.3198 | 38.2739 | 38.4335 | 38.4331 | 38.4316 | 38.4297 | 38.4146 | 38.3956 | 38.3577 |
| Rank on bubbles | B | B | A | A | A | A | A | E | C | C | C | C | B | B |

TABLE 4

| Component (mass %) | 3-56 | 3-57 | 3-58 | 3-59 | Com. Ex. 3-1 | Com. Ex. 3-2 | Com. Ex. 3-3 | Com. Ex. 3-4 | Com. Ex. 3-5 |
|---|---|---|---|---|---|---|---|---|---|
| Si | 30.2345 | 30.1886 | 30.1589 | 30.1293 | 30.3700 | 30.4005 | 30.5326 | 30.5311 | 30.1890 |
| Al | 8.0854 | 8.0854 | 8.0775 | 8.0695 | 8.1094 | 8.1175 | 8.1405 | 8.1401 | 8.0855 |
| Li | 1.8313 | 1.8313 | 1.8295 | 1.8277 | 1.8367 | 1.8386 | 1.8438 | 1.8437 | 1.8313 |
| Na | 8.3869 | 8.3869 | 8.3786 | 8.3704 | 8.4118 | 8.4202 | 8.4440 | 8.4436 | 8.3870 |
| K | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 |
| Ca | 1.5012 | 1.5012 | 1.4998 | 1.4983 | 1.5057 | 1.5072 | 1.5115 | 1.5114 | 1.5013 |
| Sr | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 |
| Zr | 1.3371 | 1.3371 | 1.3358 | 1.3345 | 1.3411 | 1.3424 | 1.3462 | 1.3462 | 1.3371 |
| Ti | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 |
| Sn | 0.4655 | 0.4654 | 0.4647 | 0.4641 | 0.0000 | 0.1952 | 0.0078 | 0.0078 | 0.7754 |
| Ce | 0.2412 | 0.3215 | 0.4013 | 0.4809 | 0.0000 | 0.0000 | 0.0041 | 0.0081 | 0.0000 |
| Sb | 0.0000 | 0.0000 | 0.0000 | 0.0000 | 0.4137 | 0.1234 | 0.0000 | 0.0000 | 0.0000 |
| O | 47.9169 | 47.8826 | 47.8539 | 47.8253 | 48.0116 | 48.0550 | 48.1695 | 48.1680 | 47.8934 |
| Total | 100.0000 | 100.0000 | 100.0000 | 100.0000 | 100.0000 | 100.0000 | 100.0000 | 100.0000 | 100.0000 |
| Li + Na + K | 10.2182 | 10.2182 | 10.2081 | 10.1981 | 10.2485 | 10.2588 | 10.2878 | 10.2873 | 10.2183 |
| Mg + Ca + Sr + Ba | 1.5012 | 1.5012 | 1.4998 | 1.4983 | 1.5057 | 1.5072 | 1.5115 | 1.5114 | 1.5013 |
| Zr + Ti + La + Nb + Ta + Hf | 1.3371 | 1.3371 | 1.3358 | 1.3345 | 1.3411 | 1.3424 | 1.3462 | 1.3462 | 1.3371 |
| Ce/Sn | 0.5182 | 0.6908 | 0.8636 | 1.0362 | — | 0.0000 | 0.5256 | — | 0.0000 |
| Sn + Ce | 0.7067 | 0.7869 | 0.8660 | 0.9450 | 0.0000 | 0.1952 | 0.0119 | 0.0159 | 0.7754 |
| Si + Al | 38.3199 | 38.2740 | 38.2364 | 38.1988 | 38.4794 | 38.5180 | 38.6731 | 38.6712 | 38.2745 |
| Rank on bubbles | B | B | B | B | G | G | G | G | G |

| | Component | 4-1 | 4-2 | 4-3 | 4-4 | 4-5 | 4-6 | 4-7 | 4-8 | 4-9 | 4-10 | 4-11 | 4-12 | 4-13 |
|---|---|---|---|---|---|---|---|---|---|---|---|---|---|---|
| (mol %) | SiO2 | 69.0 | 69.0 | 69.0 | 69.0 | 69.0 | 69.0 | 69.0 | 69.0 | 69.0 | 69.0 | 69.0 | 69.0 | 69.0 |
| | Al2O3 | 7.0 | 7.0 | 7.0 | 7.0 | 7.0 | 7.0 | 7.0 | 7.0 | 7.0 | 7.0 | 7.0 | 7.0 | 7.0 |
| | Li2O | 8.0 | 8.0 | 8.0 | 8.0 | 8.0 | 8.0 | 8.0 | 8.0 | 8.0 | 8.0 | 8.0 | 8.0 | 8.0 |
| | Na2O | 11.5 | 11.5 | 11.5 | 11.5 | 11.5 | 11.5 | 11.5 | 11.5 | 11.5 | 11.5 | 11.5 | 11.5 | 11.5 |
| | K2O | 0.1 | 0.1 | 0.1 | 0.1 | 0.1 | 0.1 | 0.1 | 0.1 | 0.1 | 0.1 | 0.1 | 0.1 | 0.1 |
| | MgO | 1.0 | 1.0 | 1.0 | 1.0 | 1.0 | 1.0 | 1.0 | 1.0 | 1.0 | 1.0 | 1.0 | 1.0 | 1.0 |
| | CaO | 2.0 | 2.0 | 2.0 | 2.0 | 2.0 | 2.0 | 2.0 | 2.0 | 2.0 | 2.0 | 2.0 | 2.0 | 2.0 |
| | SrO | 0.4 | 0.4 | 0.4 | 0.4 | 0.4 | 0.4 | 0.4 | 0.4 | 0.4 | 0.4 | 0.4 | 0.4 | 0.4 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.1 | 0.1 | 0.1 | 0.1 | 0.1 | 0.1 | 0.1 | 0.1 | 0.1 | 0.1 | 0.1 | 0.1 | 0.1 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.1 | 0.1 | 0.1 | 0.1 | 0.1 | 0.1 | 0.2 | 0.2 | 0.2 | 0.2 | 0.2 | 0.2 | 0.2 |

TABLE 4-continued

| | | | | | | | | | | | | | | |
|---|---|---|---|---|---|---|---|---|---|---|---|---|---|---|
| components | CeO2 | 0 | 0.001 | 0.005 | 0.01 | 0.05 | 0.1 | 0 | 0.001 | 0.005 | 0.01 | 0.05 | 0.1 | 0.2 |
| (mass %) | Sb2O3 | 0 | 0 | 0 | 0 | 0 | 0 | 0 | 0 | 0 | 0 | 0 | 0 | 0 |
| | CeO2/SnO2 | 0.0000 | 0.0100 | 0.0500 | 0.1000 | 0.5000 | 1.0000 | 0.0000 | 0.0050 | 0.0250 | 0.0500 | 0.2500 | 0.5000 | 1.0000 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 3.4 | 3.4 | 3.4 | 3.4 | 3.4 | 3.4 | 3.4 | 3.4 | 3.4 | 3.4 | 3.4 | 3.4 | 3.4 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 76.0 | 76.0 | 76.0 | 76.0 | 76.0 | 76.0 | 76.0 | 76.0 | 76.0 | 76.0 | 76.0 | 76.0 | 76.0 |
| | Rank on bubbles | D | C | B | B | B | B | D | B | A | A | A | A | A |

| | Component | 4-14 | 4-15 | 4-16 | 4-17 | 4-18 | 4-19 | 4-20 | 4-21 | 4-22 | 4-23 | 4-24 | 4-25 | 4-26 |
|---|---|---|---|---|---|---|---|---|---|---|---|---|---|---|
| (mol %) | SiO2 | 69.0 | 69.0 | 69.0 | 69.0 | 69.0 | 69.0 | 69.0 | 69.0 | 69.0 | 69.0 | 69.0 | 69.0 | 69.0 |
| | Al2O3 | 7.0 | 7.0 | 7.0 | 7.0 | 7.0 | 7.0 | 7.0 | 7.0 | 7.0 | 7.0 | 7.0 | 7.0 | 7.0 |
| | Li2O | 8.0 | 8.0 | 8.0 | 8.0 | 8.0 | 8.0 | 8.0 | 8.0 | 8.0 | 8.0 | 8.0 | 8.0 | 8.0 |
| | Na2O | 11.5 | 11.5 | 11.5 | 11.5 | 11.5 | 11.5 | 11.5 | 11.5 | 11.5 | 11.5 | 11.5 | 11.5 | 11.5 |
| | K2O | 0.1 | 0.1 | 0.1 | 0.1 | 0.1 | 0.1 | 0.1 | 0.1 | 0.1 | 0.1 | 0.1 | 0.1 | 0.1 |
| | MgO | 1.0 | 1.0 | 1.0 | 1.0 | 1.0 | 1.0 | 1.0 | 1.0 | 1.0 | 1.0 | 1.0 | 1.0 | 1.0 |
| | CaO | 2.0 | 2.0 | 2.0 | 2.0 | 2.0 | 2.0 | 2.0 | 2.0 | 2.0 | 2.0 | 2.0 | 2.0 | 2.0 |
| | SrO | 0.4 | 0.4 | 0.4 | 0.4 | 0.4 | 0.4 | 0.4 | 0.4 | 0.4 | 0.4 | 0.4 | 0.4 | 0.4 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.1 | 0.1 | 0.1 | 0.1 | 0.1 | 0.1 | 0.1 | 0.1 | 0.1 | 0.1 | 0.1 | 0.1 | 0.1 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.25 | 0.25 | 0.25 | 0.25 | 0.25 | 0.25 | 0.25 | 0.25 | 0.3 | 0.3 | 0.3 | 0.3 | 0.3 |
| components | CeO2 | 0 | 0.001 | 0.005 | 0.01 | 0.05 | 0.1 | 0.2 | 0.25 | 0 | 0.001 | 0.005 | 0.01 | 0.05 |
| (mass %) | Sb2O3 | 0 | 0 | 0 | 0 | 0 | 0 | 0 | 0 | 0 | 0 | 0 | 0 | 0 |
| | CeO2/SnO2 | 0.0000 | 0.0040 | 0.0200 | 0.0400 | 0.2000 | 0.4000 | 0.8000 | 1.0000 | 0.0000 | 0.0033 | 0.0167 | 0.0333 | 0.1667 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 3.4 | 3.4 | 3.4 | 3.4 | 3.4 | 3.4 | 3.4 | 3.4 | 3.4 | 3.4 | 3.4 | 3.4 | 3.4 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 76.0 | 76.0 | 76.0 | 76.0 | 76.0 | 76.0 | 76.0 | 76.0 | 76.0 | 76.0 | 76.0 | 76.0 | 76.0 |
| | Rank on bubbles | D | B | A | A | A | A | A | A | D | B | A | A | A |

| | Component | 4-27 | 4-28 | 4-29 | 4-30 | 4-31 | 4-32 | 4-33 | 4-34 | 4-35 | 4-36 | 4-37 | 4-38 | 4-39 |
|---|---|---|---|---|---|---|---|---|---|---|---|---|---|---|
| (mol %) | SiO2 | 69.0 | 69.0 | 69.0 | 69.0 | 69.0 | 69.0 | 69.0 | 69.0 | 69.0 | 69.0 | 69.0 | 69.0 | 69.0 |
| | Al2O3 | 7.0 | 7.0 | 7.0 | 7.0 | 7.0 | 7.0 | 7.0 | 7.0 | 7.0 | 7.0 | 7.0 | 7.0 | 7.0 |
| | Li2O | 8.0 | 8.0 | 8.0 | 8.0 | 8.0 | 8.0 | 8.0 | 8.0 | 8.0 | 8.0 | 8.0 | 8.0 | 8.0 |
| | Na2O | 11.5 | 11.5 | 11.5 | 11.5 | 11.5 | 11.5 | 11.5 | 11.5 | 11.5 | 11.5 | 11.5 | 11.5 | 11.5 |
| | K2O | 0.1 | 0.1 | 0.1 | 0.1 | 0.1 | 0.1 | 0.1 | 0.1 | 0.1 | 0.1 | 0.1 | 0.1 | 0.1 |
| | MgO | 1.0 | 1.0 | 1.0 | 1.0 | 1.0 | 1.0 | 1.0 | 1.0 | 1.0 | 1.0 | 1.0 | 1.0 | 1.0 |
| | CaO | 2.0 | 2.0 | 2.0 | 2.0 | 2.0 | 2.0 | 2.0 | 2.0 | 2.0 | 2.0 | 2.0 | 2.0 | 2.0 |
| | SrO | 0.4 | 0.4 | 0.4 | 0.4 | 0.4 | 0.4 | 0.4 | 0.4 | 0.4 | 0.4 | 0.4 | 0.4 | 0.4 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 | 0.0 |

TABLE 4-continued

| | | | | | | | | | | | | | | |
|---|---|---|---|---|---|---|---|---|---|---|---|---|---|---|
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.1 | 0.1 | 0.1 | 0.1 | 0.1 | 0.1 | 0.1 | 0.1 | 0.1 | 0.1 | 0.1 | 0.1 | 0.1 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.3 | 0.3 | 0.3 | 0.4 | 0.4 | 0.4 | 0.4 | 0.4 | 0.4 | 0.4 | 0.4 | 0.4 | 0.5 |
| components | CeO2 | 0.1 | 0.2 | 0.3 | 0 | 0.001 | 0.005 | 0.01 | 0.05 | 0.1 | 0.2 | 0.3 | 0.4 | 0 |
| (mass %) | Sb2O3 | 0 | 0 | 0 | 0 | 0 | 0 | 0 | 0 | 0 | 0 | 0 | 0 | 0 |
| | CeO2/SnO2 | 0.3333 | 0.6667 | 1.0000 | 0.0000 | 0.0025 | 0.0125 | 0.0250 | 0.1250 | 0.2500 | 0.5000 | 0.7500 | 1.0000 | 0.0000 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 3.4 | 3.4 | 3.4 | 3.4 | 3.4 | 3.4 | 3.4 | 3.4 | 3.4 | 3.4 | 3.4 | 3.4 | 3.4 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 76.0 | 76.0 | 76.0 | 76.0 | 76.0 | 76.0 | 76.0 | 76.0 | 76.0 | 76.0 | 76.0 | 76.0 | 76.0 |
| | Rank on bubbles | A | A | A | D | B | B | A | A | A | A | A | A | E |

| | Component | 4-40 | 4-41 | 4-42 | 4-43 | 4-44 | 4-45 | 4-46 | 4-47 | 4-48 | 4-49 | 4-50 | 4-51 | 4-52 |
|---|---|---|---|---|---|---|---|---|---|---|---|---|---|---|
| (mol %) | SiO2 | 69.0 | 69.0 | 69.0 | 69.0 | 69.0 | 69.0 | 69.0 | 69.0 | 69.0 | 69.0 | 69.0 | 69.0 | 69.0 |
| | Al2O3 | 7.0 | 7.0 | 7.0 | 7.0 | 7.0 | 7.0 | 7.0 | 7.0 | 7.0 | 7.0 | 7.0 | 7.0 | 7.0 |
| | Li2O | 8.0 | 8.0 | 8.0 | 8.0 | 8.0 | 8.0 | 8.0 | 8.0 | 8.0 | 8.0 | 8.0 | 8.0 | 8.0 |
| | Na2O | 11.5 | 11.5 | 11.5 | 11.5 | 11.5 | 11.5 | 11.5 | 11.5 | 11.5 | 11.5 | 11.5 | 11.5 | 11.5 |
| | K2O | 0.1 | 0.1 | 0.1 | 0.1 | 0.1 | 0.1 | 0.1 | 0.1 | 0.1 | 0.1 | 0.1 | 0.1 | 0.1 |
| | MgO | 1.0 | 1.0 | 1.0 | 1.0 | 1.0 | 1.0 | 1.0 | 1.0 | 1.0 | 1.0 | 1.0 | 1.0 | 1.0 |
| | CaO | 2.0 | 2.0 | 2.0 | 2.0 | 2.0 | 2.0 | 2.0 | 2.0 | 2.0 | 2.0 | 2.0 | 2.0 | 2.0 |
| | SrO | 0.4 | 0.4 | 0.4 | 0.4 | 0.4 | 0.4 | 0.4 | 0.4 | 0.4 | 0.4 | 0.4 | 0.4 | 0.4 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 0.9 | 0.9 | 0.9 | 0.9 | 0.9 | 0.9 | 0.9 | 0.9 | 0.9 | 0.9 | 0.9 | 0.9 | 0.9 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.1 | 0.1 | 0.1 | 0.1 | 0.1 | 0.1 | 0.1 | 0.1 | 0.1 | 0.1 | 0.1 | 0.1 | 0.1 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.5 | 0.5 | 0.5 | 0.5 | 0.5 | 0.5 | 0.5 | 0.5 | 0.5 | 0.6 | 0.6 | 0.6 | 0.6 |
| components | CeO2 | 0.001 | 0.005 | 0.01 | 0.05 | 0.1 | 0.2 | 0.3 | 0.4 | 0.5 | 0 | 0.001 | 0.005 | 0.01 |
| (mass %) | Sb2O3 | 0 | 0 | 0 | 0 | 0 | 0 | 0 | 0 | 0 | 0 | 0 | 0 | 0 |
| | CeO2/SnO2 | 0.0020 | 0.0100 | 0.0200 | 0.1000 | 0.2000 | 0.4000 | 0.6000 | 0.8000 | 1.0000 | 0.0000 | 0.0017 | 0.0083 | 0.0167 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 3.4 | 3.4 | 3.4 | 3.4 | 3.4 | 3.4 | 3.4 | 3.4 | 3.4 | 3.4 | 3.4 | 3.4 | 3.4 |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | 1.0 |
| | SiO2 + Al2O3 | 76.0 | 76.0 | 76.0 | 76.0 | 76.0 | 76.0 | 76.0 | 76.0 | 76.0 | 76.0 | 76.0 | 76.0 | 76.0 |
| | Rank on bubbles | C | C | B | B | A | A | A | A | A | E | C | C | C |

| | Component | 4-53 | 4-54 | 4-55 | 4-56 | 4-57 | 4-58 | 4-59 | Com. Ex. 4-1 | Com. Ex. 4-2 | Com. Ex. 4-3 | Com. Ex. 4-4 | Com. Ex. 4-5 |
|---|---|---|---|---|---|---|---|---|---|---|---|---|---|
| (mol %) | SiO2 | 69.0 | 69.0 | 69.0 | 69.0 | 69.0 | 69.0 | 69.0 | 69.0 | 69.0 | 69.0 | 69.0 | 69.0 |
| | Al2O3 | 7.0 | 7.0 | 7.0 | 7.0 | 7.0 | 7.0 | 7.0 | 7.0 | 7.0 | 7.0 | 7.0 | 7.0 |
| | Li2O | 8.0 | 8.0 | 8.0 | 8.0 | 8.0 | 8.0 | 8.0 | 8.0 | 8.0 | 8.0 | 8.0 | 8.0 |

TABLE 4-continued

| | Component (mass %) | 4-1 | 4-2 | 4-3 | 4-4 | 4-5 | 4-6 | 4-7 | 4-8 | 4-9 | 4-10 | 4-11 | 4-12 | 4-13 |
|---|---|---|---|---|---|---|---|---|---|---|---|---|---|---|
| | Na2O | 11.5 | 11.5 | 11.5 | 11.5 | 11.5 | 11.5 | 11.5 | 11.5 | 11.5 | 11.5 | 11.5 | 11.5 | |
| | K2O | 0.1 | 0.1 | 0.1 | 0.1 | 0.1 | 0.1 | 0.1 | 0.1 | 0.1 | 0.1 | 0.1 | 0.1 | |
| | MgO | 1.0 | 1.0 | 1.0 | 1.0 | 1.0 | 1.0 | 1.0 | 1.0 | 1.0 | 1.0 | 1.0 | 1.0 | |
| | CaO | 2.0 | 2.0 | 2.0 | 2.0 | 2.0 | 2.0 | 2.0 | 2.0 | 2.0 | 2.0 | 2.0 | 2.0 | |
| | SrO | 0.4 | 0.4 | 0.4 | 0.4 | 0.4 | 0.4 | 0.4 | 0.4 | 0.4 | 0.4 | 0.4 | 0.4 | |
| | BaO | 0.0 | 0.0 | 0.0 | 0.0 | 0.0 | 0.0 | 0.0 | 0.0 | 0.0 | 0.0 | 0.0 | 0.0 | |
| | ZrO2 | 0.9 | 0.9 | 0.9 | 0.9 | 0.9 | 0.9 | 0.9 | 0.9 | 0.9 | 0.9 | 0.9 | 0.9 | |
| | TiO2 | 0.0 | 0.0 | 0.0 | 0.0 | 0.0 | 0.0 | 0.0 | 0.0 | 0.0 | 0.0 | 0.0 | 0.0 | |
| | La2O3 | 0.0 | 0.0 | 0.0 | 0.0 | 0.0 | 0.0 | 0.0 | 0.0 | 0.0 | 0.0 | 0.0 | 0.0 | |
| | Nb2O5 | 0.0 | 0.0 | 0.0 | 0.0 | 0.0 | 0.0 | 0.0 | 0.0 | 0.0 | 0.0 | 0.0 | 0.0 | |
| | Ta2O5 | 0.0 | 0.0 | 0.0 | 0.0 | 0.0 | 0.0 | 0.0 | 0.0 | 0.0 | 0.0 | 0.0 | 0.0 | |
| | HfO2 | 0.1 | 0.1 | 0.1 | 0.1 | 0.1 | 0.1 | 0.1 | 0.1 | 0.1 | 0.1 | 0.1 | 0.1 | |
| | Total | 100.0 | 100.0 | 100.0 | 100.0 | 100.0 | 100.0 | 100.0 | 100.0 | 100.0 | 100.0 | 100.0 | 100.0 | |
| Based on glass components (mass %) | SnO2 | 0.6 | 0.6 | 0.6 | 0.6 | 0.6 | 0.6 | 0 | 0.25 | 1 | 0 | 1 | | |
| | CeO2 | 0.05 | 0.1 | 0.2 | 0.3 | 0.4 | 0.5 | 0.6 | 0 | 0 | 0 | 1 | 1 | |
| | Sb2O3 | 0 | 0 | 0 | 0 | 0 | 0 | 0 | 0.5 | 0.15 | 0 | 0 | 0 | |
| | CeO2/SnO2 | 0.0833 | 0.1667 | 0.3333 | 0.5000 | 0.6667 | 0.8333 | 1.0000 | — | 0.0000 | 0.0000 | — | 1.0000 | |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 | |
| | MgO + CaO + SrO + BaO | 3.4 | 3.4 | 3.4 | 3.4 | 3.4 | 3.4 | 3.4 | 3.4 | 3.4 | 3.4 | 3.4 | 3.4 | |
| | ZrO2 + TiO2 + La2O3 + Nb2O5 + Ta2O5 + HfO2 | 1.0 | 1.0 | 1.0 | 1.0 | 1.0 | 1.0 | 1.0 | 1.0 | 1.0 | 1.0 | 1.0 | 1.0 | |
| | SiO2 + Al2O3 | 76.0 | 76.0 | 76.0 | 76.0 | 76.0 | 76.0 | 76.0 | 76.0 | 76.0 | 76.0 | 76.0 | 76.0 | |
| | Rank on bubbles | C | B | B | B | B | B | B | G | G | G | G | G | |
| Si | | 31.4964 | 31.4961 | 31.4948 | 31.4933 | 31.4807 | 31.4501 | 31.4501 | 31.4498 | 31.4486 | 31.4470 | 31.4345 | 31.4188 | 31.3875 |
| Al | | 6.1394 | 6.1393 | 6.1391 | 6.1388 | 6.1363 | 6.1392 | 6.1393 | 6.1392 | 6.1390 | 6.1386 | 6.1362 | 6.1331 | 6.1270 |
| Li | | 1.8050 | 1.8050 | 1.8049 | 1.8048 | 1.8041 | 1.8049 | 1.8049 | 1.8049 | 1.8049 | 1.8048 | 1.8040 | 1.8031 | 1.8013 |
| Na | | 8.5939 | 8.5939 | 8.5935 | 8.5931 | 8.5896 | 8.5937 | 8.5938 | 8.5937 | 8.5933 | 8.5929 | 8.5895 | 8.5852 | 8.5767 |
| K | | 0.1271 | 0.1271 | 0.1271 | 0.1271 | 0.1270 | 0.1271 | 0.1271 | 0.1271 | 0.1271 | 0.1271 | 0.1270 | 0.1270 | 0.1268 |
| Mg | | 0.3950 | 0.3950 | 0.3950 | 0.3950 | 0.3948 | 0.3950 | 0.3950 | 0.3950 | 0.3950 | 0.3950 | 0.3948 | 0.3946 | 0.3942 |
| Ca | | 1.3028 | 1.3028 | 1.3027 | 1.3026 | 1.3021 | 1.3027 | 1.3027 | 1.3027 | 1.3027 | 1.3026 | 1.3021 | 1.3014 | 1.3001 |
| Sr | | 0.5696 | 0.5696 | 0.5696 | 0.5696 | 0.5693 | 0.5696 | 0.5696 | 0.5696 | 0.5696 | 0.5696 | 0.5693 | 0.5691 | 0.5685 |
| Ba | | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | | 1.3344 | 1.3344 | 1.3343 | 1.3343 | 1.3337 | 1.3344 | 1.3344 | 1.3343 | 1.3343 | 1.3342 | 1.3337 | 1.3330 | 1.3317 |
| Ti | | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | | 0.2901 | 0.2901 | 0.2901 | 0.2901 | 0.2900 | 0.2901 | 0.2901 | 0.2901 | 0.2901 | 0.2901 | 0.2899 | 0.2898 | 0.2895 |
| Sn | | 0.0785 | 0.0785 | 0.0785 | 0.0785 | 0.0785 | 0.0785 | 0.1570 | 0.1570 | 0.1570 | 0.1569 | 0.1569 | 0.1568 | 0.1565 |
| Ce | | 0.0000 | 0.0008 | 0.0041 | 0.0081 | 0.0407 | 0.0813 | 0.0000 | 0.0008 | 0.0041 | 0.0081 | 0.0406 | 0.0812 | 0.1622 |
| Sb | | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | | 47.8678 | 47.8674 | 47.8663 | 47.8647 | 47.8532 | 47.8334 | 47.8360 | 47.8358 | 47.8343 | 47.8331 | 47.8215 | 47.8069 | 47.7780 |
| Total | | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | | 10.5260 | 10.5260 | 10.5255 | 10.5250 | 10.5207 | 10.5257 | 10.5258 | 10.5257 | 10.5253 | 10.5248 | 10.5205 | 10.5153 | 10.5048 |
| Mg + Ca + Sr + Ba | | 2.2674 | 2.2674 | 2.2673 | 2.2672 | 2.2662 | 2.2673 | 2.2673 | 2.2673 | 2.2673 | 2.2672 | 2.2662 | 2.2651 | 2.2628 |
| Zr + Ti + La + Nb + Ta + Hf | | 1.6245 | 1.6245 | 1.6244 | 1.6244 | 1.6237 | 1.6245 | 1.6245 | 1.6244 | 1.6244 | 1.6243 | 1.6236 | 1.6228 | 1.6212 |
| Ce/Sn | | 0.0000 | 0.0102 | 0.0522 | 0.1032 | 0.5185 | 1.0357 | 0.0000 | 0.0051 | 0.0261 | 0.0516 | 0.2588 | 0.5179 | 1.0364 |
| Si + Al | | 37.6358 | 37.6354 | 37.6339 | 37.6321 | 37.6170 | 37.5893 | 37.5894 | 37.5890 | 37.5876 | 37.5856 | 37.5707 | 37.5519 | 37.5145 |

TABLE 4-continued

| Rank on bubbles | | D | C | B | B | B | B | D | B | A | A | A | A | A |
|---|---|---|---|---|---|---|---|---|---|---|---|---|---|---|
| Component (mass %) | 4-14 | 4-15 | 4-16 | 4-17 | 4-18 | 4-19 | 4-20 | 4-21 | 4-22 | 4-23 | 4-24 | 4-25 | 4-26 | 4-27 |
| Si | 31.4345 | 31.4342 | 31.4329 | 31.4314 | 31.4188 | 31.4032 | 31.3720 | 31.3564 | 31.4189 | 31.4186 | 31.4173 | 31.4157 | 31.4032 | 31.3876 |
| Al | 6.1362 | 6.1361 | 6.1359 | 6.1356 | 6.1331 | 6.1301 | 6.1240 | 6.1210 | 6.1332 | 6.1331 | 6.1329 | 6.1325 | 6.1301 | 6.1271 |
| Li | 1.8040 | 1.8040 | 1.8040 | 1.8039 | 1.8031 | 1.8022 | 1.8005 | 1.7996 | 1.8031 | 1.8031 | 1.8031 | 1.8030 | 1.8023 | 1.8014 |
| Na | 8.5895 | 8.5894 | 8.5891 | 8.5886 | 8.5852 | 8.5809 | 8.5724 | 8.5681 | 8.5852 | 8.5851 | 8.5848 | 8.5844 | 8.5810 | 8.5767 |
| K | 0.1270 | 0.1270 | 0.1270 | 0.1270 | 0.1270 | 0.1269 | 0.1268 | 0.1267 | 0.1270 | 0.1270 | 0.1270 | 0.1270 | 0.1269 | 0.1268 |
| Mg | 0.3948 | 0.3948 | 0.3948 | 0.3948 | 0.3946 | 0.3944 | 0.3940 | 0.3938 | 0.3946 | 0.3946 | 0.3946 | 0.3946 | 0.3944 | 0.3942 |
| Ca | 1.3021 | 1.3021 | 1.3020 | 1.3020 | 1.3014 | 1.3008 | 1.2995 | 1.2989 | 1.3014 | 1.3014 | 1.3014 | 1.3013 | 1.3008 | 1.3001 |
| Sr | 0.5693 | 0.5693 | 0.5693 | 0.5693 | 0.5691 | 0.5688 | 0.5682 | 0.5679 | 0.5691 | 0.5690 | 0.5690 | 0.5690 | 0.5688 | 0.5685 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.3337 | 1.3337 | 1.3336 | 1.3336 | 1.3330 | 1.3324 | 1.3310 | 1.3304 | 1.3330 | 1.3330 | 1.3330 | 1.3329 | 1.3324 | 1.3317 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.2899 | 0.2899 | 0.2899 | 0.2899 | 0.2898 | 0.2897 | 0.2894 | 0.2892 | 0.2898 | 0.2898 | 0.2898 | 0.2898 | 0.2897 | 0.2895 |
| Sn | 0.1961 | 0.1961 | 0.1961 | 0.1960 | 0.1959 | 0.1958 | 0.1955 | 0.1954 | 0.2351 | 0.2351 | 0.2351 | 0.2351 | 0.2350 | 0.2348 |
| Ce | 0.0000 | 0.0008 | 0.0041 | 0.0081 | 0.0406 | 0.0812 | 0.1621 | 0.2025 | 0.0000 | 0.0008 | 0.0040 | 0.0081 | 0.0406 | 0.0811 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.8229 | 47.8226 | 47.8213 | 47.8198 | 47.8084 | 47.7936 | 47.7646 | 47.7501 | 47.8096 | 47.8094 | 47.8080 | 47.8066 | 47.7948 | 47.7805 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 10.5205 | 10.5204 | 10.5201 | 10.5195 | 10.5153 | 10.5100 | 10.4997 | 10.4944 | 10.5153 | 10.5152 | 10.5149 | 10.5144 | 10.5102 | 10.5049 |
| Mg + Ca + Sr + Ba | 2.2662 | 2.2662 | 2.2661 | 2.2661 | 2.2651 | 2.2640 | 2.2617 | 2.2606 | 2.2651 | 2.2650 | 2.2650 | 2.2649 | 2.2640 | 2.2628 |
| Zr + Ti + La + Nb + Ta + Hf | 1.6236 | 1.6236 | 1.6235 | 1.6235 | 1.6228 | 1.6221 | 1.6204 | 1.6196 | 1.6228 | 1.6228 | 1.6228 | 1.6227 | 1.6221 | 1.6212 |
| Ce/Sn | 0.0000 | 0.0041 | 0.0209 | 0.0413 | 0.2072 | 0.4147 | 0.8292 | 1.0363 | 0.0000 | 0.0034 | 0.0170 | 0.0345 | 0.1728 | 0.3454 |
| Si + Al | 37.5707 | 37.5703 | 37.5688 | 37.5670 | 37.5519 | 37.5333 | 37.4960 | 37.4774 | 37.5521 | 37.5517 | 37.5502 | 37.5482 | 37.5333 | 37.5147 |
| Rank on bubbles | D | B | A | A | A | A | A | A | D | B | A | A | A | A |
| Component (mass %) | 4-28 | 4-29 | 4-30 | 4-31 | 4-32 | 4-33 | 4-34 | 4-35 | 4-36 | 4-37 | 4-38 | 4-39 | 4-40 | 4-41 |
| Si | 31.3564 | 31.3103 | 31.3877 | 31.3874 | 31.3861 | 31.3846 | 31.3721 | 31.3565 | 31.3104 | 31.2794 | 31.2484 | 31.3566 | 31.3563 | 31.3551 |
| Al | 6.1210 | 6.1208 | 6.1271 | 6.1270 | 6.1268 | 6.1265 | 6.1240 | 6.1210 | 6.1209 | 6.1148 | 6.1088 | 6.1210 | 6.1209 | 6.1207 |
| Li | 1.7996 | 1.7995 | 1.8014 | 1.8013 | 1.8013 | 1.8012 | 1.8005 | 1.7996 | 1.7995 | 1.7978 | 1.7960 | 1.7996 | 1.7996 | 1.7995 |
| Na | 8.5682 | 8.5680 | 8.5767 | 8.5766 | 8.5763 | 8.5759 | 8.5724 | 8.5682 | 8.5680 | 8.5595 | 8.5511 | 8.5682 | 8.5681 | 8.5678 |
| K | 0.1267 | 0.1267 | 0.1268 | 0.1268 | 0.1268 | 0.1268 | 0.1268 | 0.1267 | 0.1267 | 0.1266 | 0.1265 | 0.1267 | 0.1267 | 0.1267 |
| Mg | 0.3938 | 0.3938 | 0.3942 | 0.3942 | 0.3942 | 0.3942 | 0.3940 | 0.3938 | 0.3938 | 0.3934 | 0.3931 | 0.3938 | 0.3938 | 0.3938 |
| Ca | 1.2989 | 1.2988 | 1.3002 | 1.3001 | 1.3001 | 1.3000 | 1.2995 | 1.2989 | 1.2988 | 1.2975 | 1.2963 | 1.2989 | 1.2989 | 1.2988 |
| Sr | 0.5679 | 0.5679 | 0.5685 | 0.5685 | 0.5685 | 0.5684 | 0.5682 | 0.5679 | 0.5679 | 0.5673 | 0.5668 | 0.5679 | 0.5679 | 0.5679 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.3304 | 1.3304 | 1.3317 | 1.3317 | 1.3316 | 1.3316 | 1.3310 | 1.3304 | 1.3304 | 1.3290 | 1.3277 | 1.3304 | 1.3304 | 1.3303 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.2892 | 0.2892 | 0.2895 | 0.2895 | 0.2895 | 0.2895 | 0.2894 | 0.2892 | 0.2892 | 0.2889 | 0.2886 | 0.2892 | 0.2892 | 0.2892 |
| Sn | 0.2345 | 0.2344 | 0.3131 | 0.3131 | 0.3130 | 0.3130 | 0.3128 | 0.3126 | 0.3125 | 0.3121 | 0.3117 | 0.3908 | 0.3908 | 0.3908 |
| Ce | 0.1620 | 0.2429 | 0.0000 | 0.0008 | 0.0041 | 0.0081 | 0.0405 | 0.0810 | 0.1619 | 0.2425 | 0.3230 | 0.0000 | 0.0008 | 0.0040 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.7514 | 47.7173 | 47.7831 | 47.7830 | 47.7817 | 47.7802 | 47.7688 | 47.7542 | 47.7200 | 47.6912 | 47.6620 | 47.7569 | 47.7566 | 47.7554 |

TABLE 4-continued

| | | | | | | | | | | | | | | |
|---|---|---|---|---|---|---|---|---|---|---|---|---|---|---|
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 10.4945 | 10.4942 | 10.5049 | 10.5047 | 10.5044 | 10.5039 | 10.4997 | 10.4945 | 10.4942 | 10.4839 | 10.4736 | 10.4945 | 10.4944 | 10.4940 |
| Mg + Ca + Sr + Ba | 2.2606 | 2.2605 | 2.2629 | 2.2628 | 2.2628 | 2.2626 | 2.2617 | 2.2606 | 2.2605 | 2.2582 | 2.2562 | 2.2606 | 2.2606 | 2.2605 |
| Zr + Ti + La + Nb + Ta + Hf | 1.6196 | 1.6196 | 1.6212 | 1.6212 | 1.6211 | 1.6211 | 1.6204 | 1.6196 | 1.6196 | 1.6179 | 1.6163 | 1.6196 | 1.6196 | 1.6195 |
| Ce/Sn | 0.6908 | 1.0363 | 0.0000 | 0.0026 | 0.0131 | 0.0259 | 0.1295 | 0.2591 | 0.5181 | 0.7770 | 1.0363 | 0.0000 | 0.0020 | 0.0102 |
| Si + Al | 37.4774 | 37.4311 | 37.5148 | 37.5144 | 37.5129 | 37.5111 | 37.4961 | 37.4775 | 37.4313 | 37.3942 | 37.3572 | 37.4776 | 37.4772 | 37.4758 |
| Rank on bubbles | A | A | D | B | B | A | A | A | A | A | A | E | C | C |
| Component (mass %) | 4-42 | 4-43 | 4-44 | 4-45 | 4-46 | 4-47 | 4-48 | 4-49 | 4-50 | 4-51 | 4-52 | 4-53 | 4-54 | 4-55 |
| Si | 31.3535 | 31.3260 | 31.3105 | 31.2795 | 31.2485 | 31.2177 | 31.1718 | 31.3106 | 31.3103 | 31.3090 | 31.3075 | 31.2951 | 31.2796 | 31.2486 |
| Al | 6.1204 | 6.1239 | 6.1209 | 6.1148 | 6.1088 | 6.1027 | 6.1026 | 6.1209 | 6.1208 | 6.1206 | 6.1203 | 6.1179 | 6.1148 | 6.1088 |
| Li | 1.7994 | 1.8004 | 1.7995 | 1.7978 | 1.7960 | 1.7942 | 1.7942 | 1.7995 | 1.7995 | 1.7995 | 1.7994 | 1.7987 | 1.7978 | 1.7960 |
| Na | 8.5674 | 8.5723 | 8.5680 | 8.5596 | 8.5511 | 8.5426 | 8.5425 | 8.5681 | 8.5680 | 8.5676 | 8.5672 | 8.5638 | 8.5596 | 8.5511 |
| K | 0.1267 | 0.1268 | 0.1267 | 0.1266 | 0.1265 | 0.1263 | 0.1263 | 0.1267 | 0.1267 | 0.1267 | 0.1267 | 0.1266 | 0.1266 | 0.1265 |
| Mg | 0.3938 | 0.3940 | 0.3938 | 0.3934 | 0.3931 | 0.3927 | 0.3927 | 0.3938 | 0.3938 | 0.3938 | 0.3938 | 0.3936 | 0.3934 | 0.3931 |
| Ca | 1.2987 | 1.2995 | 1.2988 | 1.2976 | 1.2963 | 1.2950 | 1.2950 | 1.2988 | 1.2988 | 1.2988 | 1.2987 | 1.2982 | 1.2976 | 1.2963 |
| Sr | 0.5679 | 0.5682 | 0.5679 | 0.5674 | 0.5668 | 0.5662 | 0.5662 | 0.5679 | 0.5679 | 0.5679 | 0.5679 | 0.5676 | 0.5674 | 0.5668 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.3303 | 1.3310 | 1.3304 | 1.3290 | 1.3277 | 1.3264 | 1.3264 | 1.3304 | 1.3304 | 1.3303 | 1.3302 | 1.3297 | 1.3291 | 1.3277 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.2892 | 0.2894 | 0.2892 | 0.2889 | 0.2887 | 0.2884 | 0.2884 | 0.2892 | 0.2892 | 0.2892 | 0.2892 | 0.2891 | 0.2889 | 0.2887 |
| Sn | 0.3907 | 0.3910 | 0.3906 | 0.3900 | 0.3896 | 0.3891 | 0.3889 | 0.4687 | 0.4687 | 0.4687 | 0.4687 | 0.4684 | 0.4680 | 0.4675 |
| Ce | 0.0080 | 0.0405 | 0.0810 | 0.1617 | 0.2422 | 0.3225 | 0.4030 | 0.0000 | 0.0008 | 0.0040 | 0.0081 | 0.0404 | 0.0808 | 0.1615 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.7540 | 47.7370 | 47.7227 | 47.6937 | 47.6647 | 47.6362 | 47.6020 | 47.7254 | 47.7251 | 47.7239 | 47.7223 | 47.7109 | 47.6964 | 47.6674 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 10.4935 | 10.4995 | 10.4942 | 10.4840 | 10.4736 | 10.4631 | 10.4630 | 10.4943 | 10.4942 | 10.4938 | 10.4933 | 10.4891 | 10.4840 | 10.4736 |
| Mg + Ca + Sr + Ba | 2.2604 | 2.2617 | 2.2605 | 2.2584 | 2.2562 | 2.2539 | 2.2539 | 2.2605 | 2.2605 | 2.2605 | 2.2604 | 2.2594 | 2.2584 | 2.2562 |
| Zr + Ti + La + Nb + Ta + Hf | 1.6195 | 1.6204 | 1.6196 | 1.6179 | 1.6164 | 1.6148 | 1.6148 | 1.6196 | 1.6196 | 1.6195 | 1.6194 | 1.6188 | 1.6180 | 1.6164 |
| Ce/Sn | 0.0205 | 0.1036 | 0.2074 | 0.4146 | 0.6217 | 0.8288 | 1.0363 | 0.0000 | 0.0017 | 0.0085 | 0.0173 | 0.0863 | 0.1726 | 0.3455 |
| Si + Al | 37.4739 | 37.4499 | 37.4314 | 37.3943 | 37.3573 | 37.3204 | 37.2744 | 37.4315 | 37.4311 | 37.4296 | 37.4278 | 37.4130 | 37.3944 | 37.3574 |
| Rank on bubbles | B | B | A | A | A | A | A | E | C | C | C | C | B | B |

TABLE 5

| Component (mass %) | 4-56 | 4-57 | 4-58 | 4-59 | Com. Ex. 4-1 | Com. Ex. 4-2 | Com. Ex. 4-3 | Com. Ex. 4-4 | Com. Ex. 4-5 |
|---|---|---|---|---|---|---|---|---|---|
| Si | 31.2178 | 31.1719 | 31.1412 | 31.1417 | 31.3567 | 31.3870 | 31.5231 | 31.5215 | 31.1723 |
| Al | 6.1028 | 6.1027 | 6.0966 | 6.0967 | 6.1210 | 6.1269 | 6.1446 | 6.1443 | 6.1027 |
| Li | 1.7942 | 1.7942 | 1.7924 | 1.7924 | 1.7996 | 1.8013 | 1.8065 | 1.8064 | 1.7942 |
| Na | 8.5427 | 8.5425 | 8.5341 | 8.4600 | 8.5682 | 8.5765 | 8.6012 | 8.6008 | 8.5426 |
| K | 0.1263 | 0.1263 | 0.1262 | 0.1262 | 0.1267 | 0.1268 | 0.1272 | 0.1272 | 0.1263 |
| Mg | 0.3927 | 0.3927 | 0.3923 | 0.3923 | 0.3938 | 0.3942 | 0.3954 | 0.3953 | 0.3927 |
| Ca | 1.2950 | 1.2950 | 1.2937 | 1.2937 | 1.2989 | 1.3001 | 1.3039 | 1.3038 | 1.2950 |
| Sr | 0.5662 | 0.5662 | 0.5657 | 0.5657 | 0.5679 | 0.5685 | 0.5701 | 0.5701 | 0.5662 |
| Ba | 0.0000 | 0.0000 | 0.0000 | 0.0000 | 0.0000 | 0.0000 | 0.0000 | 0.0000 | 0.0000 |
| Zr | 1.3264 | 1.3264 | 1.3251 | 1.3251 | 1.3304 | 1.3317 | 1.3355 | 1.3355 | 1.3264 |
| Ti | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 |
| Hf | 0.2884 | 0.2884 | 0.2881 | 0.2881 | 0.2892 | 0.2895 | 0.2903 | 0.2903 | 0.2884 |
| Sn | 0.4668 | 0.4667 | 0.4660 | 0.4659 | 0.0000 | 0.1957 | 0.0079 | 0.0079 | 0.7776 |
| Ce | 0.2419 | 0.3224 | 0.4024 | 0.4828 | 0.0000 | 0.0000 | 0.0041 | 0.0081 | 0.0000 |
| Sb | 0.0000 | 0.0000 | 0.0000 | 0.0000 | 0.4143 | 0.1264 | 0.0000 | 0.0000 | 0.0000 |
| O | 47.6388 | 47.6046 | 47.5762 | 47.5694 | 47.7333 | 47.7754 | 47.8902 | 47.8888 | 47.6156 |
| Total | 100.0000 | 100.0000 | 100.0000 | 100.0000 | 100.0000 | 100.0000 | 100.0000 | 100.0000 | 100.0000 |
| Li + Na + K | 10.4632 | 10.4630 | 10.4527 | 10.3786 | 10.4945 | 10.5046 | 10.5349 | 10.5344 | 10.4631 |
| Mg + Ca + Sr + Ba | 2.2539 | 2.2539 | 2.2517 | 2.2517 | 2.2606 | 2.2628 | 2.2694 | 2.2692 | 2.2539 |
| Zr + Ti + La + Nb + Ta + Hf | 1.6148 | 1.6148 | 1.6132 | 1.6132 | 1.6196 | 1.6212 | 1.6258 | 1.6258 | 1.6148 |
| Ce/Sn | 0.5182 | 0.6908 | 0.8635 | 1.0363 | — | 0.0000 | 0.5190 | — | 0.0000 |
| Si + Al | 37.3206 | 37.2746 | 37.2378 | 37.2384 | 37.4777 | 37.5139 | 37.6677 | 37.6658 | 37.2750 |
| Rank on bubbles | B | B | B | B | G | G | G | G | G |

| | Component | 5-1 | 5-2 | 5-3 | 5-4 | 5-5 | 5-6 | 5-7 | 5-8 | 5-9 | 5-10 | 5-11 | 5-12 | 5-13 |
|---|---|---|---|---|---|---|---|---|---|---|---|---|---|---|
| (mol %) | SiO2 | 68.7 | 68.7 | 68.7 | 68.7 | 68.7 | 68.7 | 68.7 | 68.7 | 68.7 | 68.7 | 68.7 | 68.7 | 68.7 |
| | B2O3 | 2.0 | 2.0 | 2.0 | 2.0 | 2.0 | 2.0 | 2.0 | 2.0 | 2.0 | 2.0 | 2.0 | 2.0 | 2.0 |
| | Al2O3 | 7.7 | 7.7 | 7.7 | 7.7 | 7.7 | 7.7 | 7.7 | 7.7 | 7.7 | 7.7 | 7.7 | 7.7 | 7.7 |
| | Li2O | 14.0 | 14.0 | 14.0 | 14.0 | 14.0 | 14.0 | 14.0 | 14.0 | 14.0 | 14.0 | 14.0 | 14.0 | 14.0 |
| | Na2O | 3.5 | 3.5 | 3.5 | 3.5 | 3.5 | 3.5 | 3.5 | 3.5 | 3.5 | 3.5 | 3.5 | 3.5 | 3.5 |
| | K2O | 1.1 | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 1.5 | 1.5 | 1.5 | 1.5 | 1.5 | 1.5 | 1.5 | 1.5 | 1.5 | 1.5 | 1.5 | 1.5 | 1.5 |
| | La2O3 | 0.5 | 0.5 | 0.5 | 0.5 | 0.5 | 0.5 | 0.5 | 0.5 | 0.5 | 0.5 | 0.5 | 0.5 | 0.5 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |

TABLE 5-continued

| | | | | | | | | | | | | | | |
|---|---|---|---|---|---|---|---|---|---|---|---|---|---|---|
| Based on glass | SnO2 | 0.1 | 0.1 | 0.1 | 0.1 | 0.1 | 0.1 | 0.2 | 0.2 | 0.2 | 0.2 | 0.2 | 0.2 | 0.2 |
| components | CeO2 | 0 | 0.001 | 0.005 | 0.01 | 0.05 | 0.1 | 0 | 0.001 | 0.005 | 0.01 | 0.05 | 0.1 | 0.2 |
| (mass %) | Sb2O3 | 0 | 0 | 0 | 0 | 0 | 0 | 0 | 0 | 0 | 0 | 0 | 0 | 0 |
| | CeO2/SnO2 | 0.0000 | 0.0100 | 0.0500 | 0.1000 | 0.5000 | 1.0000 | 0.0000 | 0.0050 | 0.0250 | 0.0500 | 0.2500 | 0.5000 | 1.0000 |
| | SnO2 + CeO2 | 0.1000 | 0.1010 | 0.1050 | 0.1100 | 0.1500 | 0.2000 | 0.2000 | 0.2010 | 0.2050 | 0.2100 | 0.2500 | 0.3000 | 0.4000 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 76.4 | 76.4 | 76.4 | 76.4 | 76.4 | 76.4 | 76.4 | 76.4 | 76.4 | 76.4 | 76.4 | 76.4 | 76.4 |
| | Rank on bubbles | D | C | B | B | B | B | D | B | A | A | A | A | A |

| | Component | 5-14 | 5-15 | 5-16 | 5-17 | 5-18 | 5-19 | 5-20 | 5-21 | 5-22 | 5-23 | 5-24 | 5-25 | 5-26 |
|---|---|---|---|---|---|---|---|---|---|---|---|---|---|---|
| (mol %) | SiO2 | 68.7 | 68.7 | 68.7 | 68.7 | 68.7 | 68.7 | 68.7 | 68.7 | 68.7 | 68.7 | 68.7 | 68.7 | 68.7 |
| | B2O3 | 2.0 | 2.0 | 2.0 | 2.0 | 2.0 | 2.0 | 2.0 | 2.0 | 2.0 | 2.0 | 2.0 | 2.0 | 2.0 |
| | Al2O3 | 7.7 | 7.7 | 7.7 | 7.7 | 7.7 | 7.7 | 7.7 | 7.7 | 7.7 | 7.7 | 7.7 | 7.7 | 7.7 |
| | Li2O | 14.0 | 14.0 | 14.0 | 14.0 | 14.0 | 14.0 | 14.0 | 14.0 | 14.0 | 14.0 | 14.0 | 14.0 | 14.0 |
| | Na2O | 3.5 | 3.5 | 3.5 | 3.5 | 3.5 | 3.5 | 3.5 | 3.5 | 3.5 | 3.5 | 3.5 | 3.5 | 3.5 |
| | K2O | 1.1 | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 1.5 | 1.5 | 1.5 | 1.5 | 1.5 | 1.5 | 1.5 | 1.5 | 1.5 | 1.5 | 1.5 | 1.5 | 1.5 |
| | La2O3 | 0.5 | 0.5 | 0.5 | 0.5 | 0.5 | 0.5 | 0.5 | 0.5 | 0.5 | 0.5 | 0.5 | 0.5 | 0.5 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.25 | 0.25 | 0.25 | 0.25 | 0.25 | 0.25 | 0.25 | 0.25 | 0.3 | 0.3 | 0.3 | 0.3 | 0.3 |
| components | CeO2 | 0 | 0.001 | 0.005 | 0.01 | 0.05 | 0.1 | 0.2 | 0.25 | 0 | 0.001 | 0.005 | 0.01 | 0.05 |
| (mass %) | Sb2O3 | 0 | 0 | 0 | 0 | 0 | 0 | 0 | 0 | 0 | 0 | 0 | 0 | 0 |
| | CeO2/SnO2 | 0.0000 | 0.0040 | 0.0200 | 0.0400 | 0.2000 | 0.4000 | 0.8000 | 1.0000 | 0.0000 | 0.0033 | 0.0167 | 0.0333 | 0.1667 |
| | SnO2 + CeO2 | 0.2500 | 0.2510 | 0.2550 | 0.2600 | 0.3000 | 0.3500 | 0.4500 | 0.5000 | 0.3000 | 0.3010 | 0.3050 | 0.3100 | 0.3500 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 76.4 | 76.4 | 76.4 | 76.4 | 76.4 | 76.4 | 76.4 | 76.4 | 76.4 | 76.4 | 76.4 | 76.4 | 76.4 |
| | Rank on bubbles | D | B | A | A | A | A | A | A | D | B | A | A | A |

| | Component | 5-27 | 5-28 | 5-29 | 5-30 | 5-31 | 5-32 | 5-33 | 5-34 | 5-35 | 5-36 | 5-37 | 5-38 | 5-39 |
|---|---|---|---|---|---|---|---|---|---|---|---|---|---|---|
| (mol %) | SiO2 | 68.7 | 68.7 | 68.7 | 68.7 | 68.7 | 68.7 | 68.7 | 68.7 | 68.7 | 68.7 | 68.7 | 68.7 | 68.7 |
| | B2O3 | 2.0 | 2.0 | 2.0 | 2.0 | 2.0 | 2.0 | 2.0 | 2.0 | 2.0 | 2.0 | 2.0 | 2.0 | 2.0 |
| | Al2O3 | 7.7 | 7.7 | 7.7 | 7.7 | 7.7 | 7.7 | 7.7 | 7.7 | 7.7 | 7.7 | 7.7 | 7.7 | 7.7 |
| | Li2O | 14.0 | 14.0 | 14.0 | 14.0 | 14.0 | 14.0 | 14.0 | 14.0 | 14.0 | 14.0 | 14.0 | 14.0 | 14.0 |
| | Na2O | 3.5 | 3.5 | 3.5 | 3.5 | 3.5 | 3.5 | 3.5 | 3.5 | 3.5 | 3.5 | 3.5 | 3.5 | 3.5 |
| | K2O | 1.1 | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 | 0.0 |

TABLE 5-continued

| | | | | | | | | | | | | | | |
|---|---|---|---|---|---|---|---|---|---|---|---|---|---|---|
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 1.5 | 1.5 | 1.5 | 1.5 | 1.5 | 1.5 | 1.5 | 1.5 | 1.5 | 1.5 | 1.5 | 1.5 | 1.5 |
| | La2O3 | 0.5 | 0.5 | 0.5 | 0.5 | 0.5 | 0.5 | 0.5 | 0.5 | 0.5 | 0.5 | 0.5 | 0.5 | 0.5 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.3 | 0.3 | 0.3 | 0.4 | 0.4 | 0.4 | 0.4 | 0.4 | 0.4 | 0.4 | 0.4 | 0.4 | 0.5 |
| components | CeO2 | 0.1 | 0.2 | 0.3 | 0 | 0.001 | 0.005 | 0.01 | 0.05 | 0.1 | 0.2 | 0.3 | 0.4 | 0 |
| (mass %) | Sb2O3 | 0 | 0 | 0 | 0 | 0 | 0 | 0 | 0 | 0 | 0 | 0 | 0 | 0 |
| | CeO2/SnO2 | 0.3333 | 0.6667 | 1.0000 | 0.0000 | 0.0025 | 0.0125 | 0.0250 | 0.1250 | 0.2500 | 0.5000 | 0.7500 | 1.0000 | 0.0000 |
| | SnO2 + CeO2 | 0.4000 | 0.5000 | 0.6000 | 0.4000 | 0.4010 | 0.4050 | 0.4100 | 0.4500 | 0.5000 | 0.6000 | 0.7000 | 0.8000 | 0.5000 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 76.4 | 76.4 | 76.4 | 76.4 | 76.4 | 76.4 | 76.4 | 76.4 | 76.4 | 76.4 | 76.4 | 76.4 | 76.4 |
| | Rank on bubbles | A | A | A | D | B | B | A | A | A | A | A | A | E |

| | Component | 5-40 | 5-41 | 5-42 | 5-43 | 5-44 | 5-45 | 5-46 | 5-47 | 5-48 | 5-49 | 5-50 | 5-51 | 5-52 |
|---|---|---|---|---|---|---|---|---|---|---|---|---|---|---|
| (mol %) | SiO2 | 68.7 | 68.7 | 68.7 | 68.7 | 68.7 | 68.7 | 68.7 | 68.7 | 68.7 | 68.7 | 68.7 | 68.7 | 68.7 |
| | B2O3 | 2.0 | 2.0 | 2.0 | 2.0 | 2.0 | 2.0 | 2.0 | 2.0 | 2.0 | 2.0 | 2.0 | 2.0 | 2.0 |
| | Al2O3 | 7.7 | 7.7 | 7.7 | 7.7 | 7.7 | 7.7 | 7.7 | 7.7 | 7.7 | 7.7 | 7.7 | 7.7 | 7.7 |
| | Li2O | 14.0 | 14.0 | 14.0 | 14.0 | 14.0 | 14.0 | 14.0 | 14.0 | 14.0 | 14.0 | 14.0 | 14.0 | 14.0 |
| | Na2O | 3.5 | 3.5 | 3.5 | 3.5 | 3.5 | 3.5 | 3.5 | 3.5 | 3.5 | 3.5 | 3.5 | 3.5 | 3.5 |
| | K2O | 1.1 | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 | 1.0 |
| | TiO2 | 1.5 | 1.5 | 1.5 | 1.5 | 1.5 | 1.5 | 1.5 | 1.5 | 1.5 | 1.5 | 1.5 | 1.5 | 1.5 |
| | La2O3 | 0.5 | 0.5 | 0.5 | 0.5 | 0.5 | 0.5 | 0.5 | 0.5 | 0.5 | 0.5 | 0.5 | 0.5 | 0.5 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.5 | 0.5 | 0.5 | 0.5 | 0.5 | 0.5 | 0.5 | 0.5 | 0.5 | 0.6 | 0.6 | 0.6 | 0.6 |
| components | CeO2 | 0.001 | 0.005 | 0.01 | 0.05 | 0.1 | 0.2 | 0.3 | 0.4 | 0.5 | 0 | 0.001 | 0.005 | 0.01 |
| (mass %) | Sb2O3 | 0 | 0 | 0 | 0 | 0 | 0 | 0 | 0 | 0 | 0 | 0 | 0 | 0 |
| | CeO2/SnO2 | 0.0020 | 0.0100 | 0.0200 | 0.1000 | 0.2000 | 0.4000 | 0.6000 | 0.8000 | 1.0000 | 0.0000 | 0.0017 | 0.0083 | 0.0167 |
| | SnO2 + CeO2 | 0.5010 | 0.5050 | 0.5100 | 0.5500 | 0.6000 | 0.7000 | 0.8000 | 0.9000 | 1.0000 | 0.6000 | 0.6010 | 0.6050 | 0.6100 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 76.4 | 76.4 | 76.4 | 76.4 | 76.4 | 76.4 | 76.4 | 76.4 | 76.4 | 76.4 | 76.4 | 76.4 | 76.4 |

TABLE 5-continued

| | Rank on bubbles | C | C | B | B | A | A | A | A | A | E | C | C | C |
|---|---|---|---|---|---|---|---|---|---|---|---|---|---|---|
| | Component | 5-53 | 5-54 | 5-55 | 5-56 | 5-57 | 5-58 | 5-59 | Com. Ex. 5-1 | Com. Ex. 5-2 | Com. Ex. 5-3 | Com. Ex. 5-4 | Com. Ex. 5-5 |
| (mol %) | SiO2 | 68.7 | 68.7 | 68.7 | 68.7 | 68.7 | 68.7 | 68.7 | 68.7 | 68.7 | 68.7 | 68.7 | 68.7 |
| | B2O3 | 2.0 | 2.0 | 2.0 | 2.0 | 2.0 | 2.0 | 2.0 | 2.0 | 2.0 | 2.0 | 2.0 | 2.0 |
| | Al2O3 | 7.7 | 7.7 | 7.7 | 7.7 | 7.7 | 7.7 | 7.7 | 7.7 | 7.7 | 7.7 | 7.7 | 7.7 |
| | Li2O | 14.0 | 14.0 | 14.0 | 14.0 | 14.0 | 14.0 | 14.0 | 14.0 | 14.0 | 14.0 | 14.0 | 14.0 |
| | Na2O | 3.5 | 3.5 | 3.5 | 3.5 | 3.5 | 3.5 | 3.5 | 3.5 | 3.5 | 3.5 | 3.5 | 3.5 |
| | K2O | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 1.0 | 1.0 | 1.0 | 1.0 | 1.0 | 1.0 | 1.0 | 1.0 | 1.0 | 1.0 | 1.0 | 1.0 |
| | TiO2 | 1.5 | 1.5 | 1.5 | 1.5 | 1.5 | 1.5 | 1.5 | 1.5 | 1.5 | 1.5 | 1.5 | 1.5 |
| | La2O3 | 0.5 | 0.5 | 0.5 | 0.5 | 0.5 | 0.5 | 0.5 | 0.5 | 0.5 | 0.5 | 0.5 | 0.5 |
| | Nb2O5 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.6 | 0.6 | 0.6 | 0.6 | 0.6 | 0.6 | 0.6 | 0 | 0.25 | 1 | 0 | 1 |
| | CeO2 | 0.05 | 0.1 | 0.2 | 0.3 | 0.4 | 0.5 | 0.6 | 0 | 0 | 0 | 1 | 1 |
| | Sb2O3 | 0 | 0 | 0 | 0 | 0 | 0 | 0 | 0.5 | 0.15 | 0 | 0 | 0 |
| | CeO2/SnO2 | 0.0833 | 0.1667 | 0.3333 | 0.5000 | 0.6667 | 0.8333 | 1.0000 | — | 0.0000 | 0.0000 | — | 1.0000 |
| | SnO2 + CeO2 | 0.6500 | 0.7000 | 0.8000 | 0.9000 | 1.0000 | 1.1000 | 1.2000 | 0.0000 | 0.2500 | 1.0000 | 1.0000 | 2.0000 |
| (mol %) | Li2O + Na2O + K2O | 18.6 | 18.6 | 18.6 | 18.6 | 18.6 | 18.6 | 18.6 | 18.6 | 18.6 | 18.6 | 18.6 | 18.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 76.4 | 76.4 | 76.4 | 76.4 | 76.4 | 76.4 | 76.4 | 76.4 | 76.4 | 76.4 | 76.4 | 76.4 |
| | Rank on bubbles | C | B | B | B | B | B | B | G | G | G | G | G |

| Component (mass %) | 5-1 | 5-2 | 5-3 | 5-4 | 5-5 | 5-6 | 5-7 | 5-8 | 5-9 | 5-10 | 5-11 | 5-12 | 5-13 |
|---|---|---|---|---|---|---|---|---|---|---|---|---|---|
| Si | 30.1647 | 30.1644 | 30.1632 | 30.1617 | 30.1501 | 30.1199 | 30.1200 | 30.1197 | 30.1185 | 30.1170 | 30.1054 | 30.0908 | 30.0618 |
| B | 0.6761 | 0.6761 | 0.6760 | 0.6760 | 0.6757 | 0.6760 | 0.6760 | 0.6760 | 0.6760 | 0.6760 | 0.6757 | 0.6754 | 0.6747 |
| Al | 6.4960 | 6.4960 | 6.4957 | 6.4954 | 6.4929 | 6.4958 | 6.4958 | 6.4958 | 6.4955 | 6.4952 | 6.4927 | 6.4896 | 6.4833 |
| Li | 3.0384 | 3.0383 | 3.0382 | 3.0381 | 3.0369 | 3.0383 | 3.0383 | 3.0383 | 3.0381 | 3.0380 | 3.0368 | 3.0353 | 3.0324 |
| Na | 2.5159 | 2.5159 | 2.5158 | 2.5156 | 2.5147 | 2.5158 | 2.5158 | 2.5158 | 2.5157 | 2.5156 | 2.5146 | 2.5134 | 2.5110 |
| K | 1.3447 | 1.3447 | 1.3447 | 1.3446 | 1.3441 | 1.3447 | 1.3447 | 1.3447 | 1.3446 | 1.3446 | 1.3441 | 1.3434 | 1.3421 |
| Mg | 0.3800 | 0.3800 | 0.3800 | 0.3799 | 0.3798 | 0.3800 | 0.3800 | 0.3800 | 0.3799 | 0.3799 | 0.3798 | 0.3796 | 0.3792 |
| Ca | 1.2531 | 1.2531 | 1.2531 | 1.2530 | 1.2525 | 1.2531 | 1.2531 | 1.2531 | 1.2530 | 1.2530 | 1.2525 | 1.2519 | 1.2507 |
| Sr | 0.5479 | 0.5479 | 0.5479 | 0.5479 | 0.5477 | 0.5479 | 0.5479 | 0.5479 | 0.5479 | 0.5479 | 0.5476 | 0.5474 | 0.5469 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4262 | 1.4261 | 1.4261 | 1.4260 | 1.4255 | 1.4261 | 1.4261 | 1.4261 | 1.4261 | 1.4260 | 1.4254 | 1.4247 | 1.4234 |
| Ti | 1.1228 | 1.1228 | 1.1228 | 1.1227 | 1.1223 | 1.1228 | 1.1228 | 1.1228 | 1.1227 | 1.1227 | 1.1222 | 1.1217 | 1.1206 |
| La | 2.1626 | 2.1625 | 2.1624 | 2.1623 | 2.1615 | 2.1625 | 2.1625 | 2.1625 | 2.1624 | 2.1623 | 2.1614 | 2.1604 | 2.1583 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.0761 | 0.0761 | 0.0761 | 0.0761 | 0.0761 | 0.0761 | 0.1522 | 0.1522 | 0.1522 | 0.1522 | 0.1521 | 0.1520 | 0.1518 |

TABLE 5-continued

| | | | | | | | | | | | | | |
|---|---|---|---|---|---|---|---|---|---|---|---|---|---|
| Ce | 0.0000 | 0.0008 | 0.0039 | 0.0079 | 0.0394 | 0.0789 | 0.0000 | 0.0008 | 0.0039 | 0.0079 | 0.0394 | 0.0788 | 0.1573 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.7956 | 48.7953 | 48.7941 | 48.7927 | 48.7810 | 48.7621 | 48.7648 | 48.7645 | 48.7633 | 48.7619 | 48.7502 | 48.7356 | 48.7065 |
| Total | 100.0001 | 100.0000 | 100.0000 | 99.9999 | 100.0002 | 100.0000 | 100.0000 | 100.0002 | 99.9998 | 100.0002 | 99.9999 | 100.0000 | 100.0000 |
| Li + Na + K | 6.8990 | 6.8989 | 6.8987 | 6.8983 | 6.8957 | 6.8988 | 6.8988 | 6.8988 | 6.8984 | 6.8982 | 6.8955 | 6.8921 | 6.8855 |
| Mg + Ca + Sr + Ba | 2.1810 | 2.1810 | 2.1810 | 2.1808 | 2.1800 | 2.1810 | 2.1810 | 2.1810 | 2.1808 | 2.1808 | 2.1799 | 2.1789 | 2.1768 |
| Zr + Ti + La + Nb + Ta + Hf | 4.7116 | 4.7114 | 4.7113 | 4.7110 | 4.7093 | 4.7114 | 4.7114 | 4.7114 | 4.7112 | 4.7110 | 4.7090 | 4.7068 | 4.7023 |
| Ce/Sn | 0.0000 | 0.0105 | 0.0512 | 0.1038 | 0.5177 | 1.0368 | 0.0000 | 0.0053 | 0.0256 | 0.0519 | 0.2590 | 0.5184 | 1.0362 |
| Sn + Ce | 0.0761 | 0.0769 | 0.0800 | 0.0840 | 0.1155 | 0.1550 | 0.1522 | 0.1530 | 0.1561 | 0.1601 | 0.1915 | 0.2308 | 0.3091 |
| Si + Al | 36.6607 | 36.6604 | 36.6589 | 36.6571 | 36.6430 | 36.6157 | 36.6158 | 36.6155 | 36.6140 | 36.6122 | 36.5981 | 36.5804 | 36.5451 |
| Rank on bubbles | D | C | B | B | B | B | D | B | A | A | A | A | A |

| Component (mass %) | 5-14 | 5-15 | 5-16 | 5-17 | 5-18 | 5-19 | 5-20 | 5-21 | 5-22 | 5-23 | 5-24 | 5-25 | 5-26 | 5-27 |
|---|---|---|---|---|---|---|---|---|---|---|---|---|---|---|
| Si | 30.1054 | 30.1051 | 30.1040 | 30.1025 | 30.0909 | 30.0763 | 30.0473 | 30.0329 | 30.0909 | 30.0906 | 30.0895 | 30.0880 | 30.0764 | 30.0619 |
| B | 0.6757 | 0.6757 | 0.6757 | 0.6757 | 0.6754 | 0.6751 | 0.6744 | 0.6741 | 0.6754 | 0.6754 | 0.6754 | 0.6753 | 0.6751 | 0.6747 |
| Al | 6.4927 | 6.4926 | 6.4924 | 6.4921 | 6.4896 | 6.4864 | 6.4802 | 6.4771 | 6.4896 | 6.4895 | 6.4893 | 6.4890 | 6.4864 | 6.4833 |
| Li | 3.0368 | 3.0368 | 3.0367 | 3.0365 | 3.0353 | 3.0339 | 3.0310 | 3.0295 | 3.0354 | 3.0353 | 3.0352 | 3.0351 | 3.0339 | 3.0324 |
| Na | 2.5146 | 2.5146 | 2.5145 | 2.5144 | 2.5134 | 2.5122 | 2.5098 | 2.5086 | 2.5134 | 2.5134 | 2.5133 | 2.5132 | 2.5122 | 2.5110 |
| K | 1.3441 | 1.3440 | 1.3440 | 1.3439 | 1.3434 | 1.3428 | 1.3415 | 1.3408 | 1.3434 | 1.3434 | 1.3433 | 1.3433 | 1.3428 | 1.3421 |
| Mg | 0.3798 | 0.3798 | 0.3798 | 0.3797 | 0.3796 | 0.3794 | 0.3790 | 0.3789 | 0.3796 | 0.3796 | 0.3796 | 0.3796 | 0.3794 | 0.3792 |
| Ca | 1.2525 | 1.2525 | 1.2524 | 1.2524 | 1.2519 | 1.2513 | 1.2501 | 1.2495 | 1.2519 | 1.2519 | 1.2518 | 1.2518 | 1.2513 | 1.2507 |
| Sr | 0.5476 | 0.5476 | 0.5476 | 0.5476 | 0.5474 | 0.5471 | 0.5466 | 0.5463 | 0.5474 | 0.5474 | 0.5474 | 0.5473 | 0.5471 | 0.5469 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4254 | 1.4254 | 1.4254 | 1.4253 | 1.4247 | 1.4241 | 1.4227 | 1.4220 | 1.4247 | 1.4247 | 1.4247 | 1.4246 | 1.4241 | 1.4234 |
| Ti | 1.1222 | 1.1222 | 1.1222 | 1.1221 | 1.1217 | 1.1212 | 1.1201 | 1.1195 | 1.1217 | 1.1217 | 1.1216 | 1.1216 | 1.1212 | 1.1206 |
| La | 2.1615 | 2.1614 | 2.1613 | 2.1612 | 2.1604 | 2.1594 | 2.1573 | 2.1562 | 2.1604 | 2.1604 | 2.1603 | 2.1602 | 2.1594 | 2.1583 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.1901 | 0.1901 | 0.1901 | 0.1901 | 0.1900 | 0.1899 | 0.1896 | 0.1895 | 0.2280 | 0.2280 | 0.2280 | 0.2280 | 0.2278 | 0.2277 |
| Ce | 0.0000 | 0.0008 | 0.0039 | 0.0079 | 0.0394 | 0.0787 | 0.1572 | 0.1964 | 0.0000 | 0.0008 | 0.0039 | 0.0079 | 0.0393 | 0.0786 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.7515 | 48.7512 | 48.7500 | 48.7486 | 48.7369 | 48.7224 | 48.6933 | 48.6788 | 48.7382 | 48.7379 | 48.7368 | 48.7353 | 48.7237 | 48.7091 |
| Total | 99.9999 | 99.9998 | 100.0000 | 100.0000 | 100.0000 | 100.0002 | 100.0001 | 100.0001 | 100.0000 | 100.0000 | 100.0001 | 100.0002 | 100.0001 | 99.9999 |
| Li + Na + K | 6.8955 | 6.8954 | 6.8952 | 6.8948 | 6.8921 | 6.8889 | 6.8823 | 6.8789 | 6.8922 | 6.8921 | 6.8918 | 6.8916 | 6.8889 | 6.8855 |
| Mg + Ca + Sr + Ba | 2.1799 | 2.1799 | 2.1798 | 2.1797 | 2.1789 | 2.1778 | 2.1757 | 2.1747 | 2.1789 | 2.1789 | 2.1788 | 2.1787 | 2.1778 | 2.1768 |
| Zr + Ti + La + Nb + Ta + Hf | 4.7091 | 4.7090 | 4.7089 | 4.7086 | 4.7068 | 4.7047 | 4.7001 | 4.6977 | 4.7068 | 4.7068 | 4.7066 | 4.7064 | 4.7047 | 4.7023 |
| Ce/Sn | 0.0000 | 0.0042 | 0.0205 | 0.0416 | 0.2074 | 0.4144 | 0.8291 | 1.0364 | 0.0000 | 0.0035 | 0.0171 | 0.0346 | 0.1725 | 0.3452 |
| Sn + Ce | 0.1901 | 0.1909 | 0.1940 | 0.1980 | 0.2294 | 0.2686 | 0.3468 | 0.3859 | 0.2280 | 0.2288 | 0.2319 | 0.2359 | 0.2671 | 0.3063 |
| Si + Al | 36.5981 | 36.5977 | 36.5964 | 36.5946 | 36.5805 | 36.5627 | 36.5275 | 36.5100 | 36.5805 | 36.5801 | 36.5788 | 36.5770 | 36.5628 | 36.5452 |
| Rank on bubbles | D | B | A | A | A | A | A | A | D | B | A | A | A | A |

| Component (mass %) | 5-28 | 5-29 | 5-30 | 5-31 | 5-32 | 5-33 | 5-34 | 5-35 | 5-36 | 5-37 | 5-38 | 5-39 | 5-40 | 5-41 |
|---|---|---|---|---|---|---|---|---|---|---|---|---|---|---|
| Si | 30.0329 | 29.9883 | 30.0620 | 30.0617 | 30.0605 | 30.0591 | 30.0475 | 30.0330 | 29.9884 | 29.9596 | 29.9309 | 30.0331 | 30.0328 | 30.0316 |
| B | 0.6741 | 0.6741 | 0.6747 | 0.6747 | 0.6747 | 0.6747 | 0.6744 | 0.6741 | 0.6741 | 0.6734 | 0.6728 | 0.6741 | 0.6741 | 0.6741 |
| Al | 6.4771 | 6.4769 | 6.4833 | 6.4833 | 6.4830 | 6.4827 | 6.4802 | 6.4771 | 6.4769 | 6.4707 | 6.4645 | 6.4771 | 6.4770 | 6.4768 |
| Li | 3.0295 | 3.0294 | 3.0324 | 3.0324 | 3.0323 | 3.0321 | 3.0310 | 3.0295 | 3.0294 | 3.0265 | 3.0236 | 3.0295 | 3.0295 | 3.0294 |
| Na | 2.5086 | 2.5085 | 2.5110 | 2.5110 | 2.5109 | 2.5107 | 2.5098 | 2.5086 | 2.5085 | 2.5061 | 2.5037 | 2.5086 | 2.5085 | 2.5084 |
| K | 1.3408 | 1.3408 | 1.3421 | 1.3421 | 1.3421 | 1.3420 | 1.3415 | 1.3408 | 1.3408 | 1.3395 | 1.3382 | 1.3408 | 1.3408 | 1.3408 |

TABLE 5-continued

| | | | | | | | | | | | | | | |
|---|---|---|---|---|---|---|---|---|---|---|---|---|---|---|
| Mg | 0.3789 | 0.3789 | 0.3792 | 0.3792 | 0.3792 | 0.3792 | 0.3791 | 0.3789 | 0.3789 | 0.3785 | 0.3781 | 0.3789 | 0.3789 | 0.3789 |
| Ca | 1.2495 | 1.2494 | 1.2507 | 1.2507 | 1.2506 | 1.2506 | 1.2501 | 1.2495 | 1.2494 | 1.2482 | 1.2470 | 1.2495 | 1.2495 | 1.2494 |
| Sr | 0.5463 | 0.5463 | 0.5469 | 0.5469 | 0.5468 | 0.5468 | 0.5466 | 0.5463 | 0.5463 | 0.5458 | 0.5453 | 0.5463 | 0.5463 | 0.5463 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4220 | 1.4220 | 1.4234 | 1.4234 | 1.4233 | 1.4232 | 1.4227 | 1.4220 | 1.4220 | 1.4206 | 1.4192 | 1.4220 | 1.4220 | 1.4219 |
| Ti | 1.1195 | 1.1195 | 1.1206 | 1.1206 | 1.1206 | 1.1205 | 1.1201 | 1.1195 | 1.1195 | 1.1184 | 1.1174 | 1.1195 | 1.1195 | 1.1195 |
| La | 2.1562 | 2.1562 | 2.1583 | 2.1583 | 2.1582 | 2.1581 | 2.1573 | 2.1563 | 2.1562 | 2.1541 | 2.1521 | 2.1563 | 2.1562 | 2.1562 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.2274 | 0.2273 | 0.3036 | 0.3036 | 0.3036 | 0.3035 | 0.3034 | 0.3032 | 0.3031 | 0.3027 | 0.3023 | 0.3790 | 0.3790 | 0.3789 |
| Ce | 0.1571 | 0.2355 | 0.0000 | 0.0008 | 0.0039 | 0.0079 | 0.0393 | 0.0785 | 0.1570 | 0.2352 | 0.3132 | 0.0000 | 0.0008 | 0.0039 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.6801 | 48.6469 | 48.7118 | 48.7115 | 48.7103 | 48.7089 | 48.6972 | 48.6827 | 48.6495 | 48.6206 | 48.5918 | 48.6854 | 48.6851 | 48.6839 |
| Total | 100.0000 | 100.0000 | 100.0000 | 100.0002 | 100.0000 | 100.0000 | 100.0002 | 100.0000 | 100.0000 | 99.9999 | 100.0001 | 100.0001 | 100.0000 | 100.0000 |
| Li + Na + K | 6.8789 | 6.8787 | 6.8855 | 6.8855 | 6.8853 | 6.8848 | 6.8823 | 6.8789 | 6.8787 | 6.8721 | 6.8655 | 6.8789 | 6.8788 | 6.8786 |
| Mg + Ca + Sr + Ba | 2.1747 | 2.1746 | 2.1768 | 2.1768 | 2.1766 | 2.1766 | 2.1758 | 2.1747 | 2.1746 | 2.1725 | 2.1704 | 2.1747 | 2.1747 | 2.1746 |
| Zr + Ti + La + Nb + Ta + Hf | 4.6977 | 4.6977 | 4.7023 | 4.7023 | 4.7021 | 4.7018 | 4.7001 | 4.6978 | 4.6977 | 4.6931 | 4.6887 | 4.6978 | 4.6977 | 4.6976 |
| Ce/Sn | 0.6909 | 1.0361 | 0.0000 | 0.0026 | 0.0128 | 0.0260 | 0.1295 | 0.2589 | 0.5180 | 0.7770 | 1.0361 | 0.0000 | 0.0021 | 0.0103 |
| Sn + Ce | 0.3845 | 0.4628 | 0.3036 | 0.3044 | 0.3075 | 0.3114 | 0.3427 | 0.3817 | 0.4601 | 0.5379 | 0.6155 | 0.3790 | 0.3798 | 0.3828 |
| Si + Al | 36.5100 | 36.4652 | 36.5453 | 36.5450 | 36.5435 | 36.5418 | 36.5277 | 36.5101 | 36.4653 | 36.4303 | 36.3954 | 36.5102 | 36.5098 | 36.5084 |
| Rank on bubbles | A | A | D | B | B | A | A | A | A | A | A | E | C | C |

| Component (mass %) | 5-42 | 5-43 | 5-44 | 5-45 | 5-46 | 5-47 | 5-48 | 5-49 | 5-50 | 5-51 | 5-52 | 5-53 | 5-54 | 5-55 |
|---|---|---|---|---|---|---|---|---|---|---|---|---|---|---|
| Si | 30.0302 | 30.0030 | 29.9885 | 29.9597 | 29.9310 | 29.9023 | 29.8718 | 29.9886 | 29.9883 | 29.9872 | 29.9857 | 29.9742 | 29.9598 | 29.9310 |
| B | 0.6740 | 0.6744 | 0.6741 | 0.6734 | 0.6728 | 0.6721 | 0.6724 | 0.6741 | 0.6741 | 0.6740 | 0.6740 | 0.6738 | 0.6734 | 0.6728 |
| Al | 6.4765 | 6.4801 | 6.4769 | 6.4707 | 6.4645 | 6.4583 | 6.4612 | 6.4770 | 6.4769 | 6.4766 | 6.4763 | 6.4738 | 6.4707 | 6.4645 |
| Li | 3.0292 | 3.0309 | 3.0294 | 3.0265 | 3.0236 | 3.0207 | 3.0005 | 3.0294 | 3.0294 | 3.0293 | 3.0292 | 3.0280 | 3.0265 | 3.0236 |
| Na | 2.5083 | 2.5097 | 2.5085 | 2.5061 | 2.5037 | 2.5013 | 2.5024 | 2.5085 | 2.5085 | 2.5084 | 2.5083 | 2.5073 | 2.5061 | 2.5037 |
| K | 1.3407 | 1.3414 | 1.3408 | 1.3395 | 1.3382 | 1.3369 | 1.3375 | 1.3408 | 1.3408 | 1.3407 | 1.3407 | 1.3402 | 1.3395 | 1.3382 |
| Mg | 0.3788 | 0.3790 | 0.3789 | 0.3785 | 0.3781 | 0.3778 | 0.3779 | 0.3789 | 0.3789 | 0.3788 | 0.3788 | 0.3787 | 0.3785 | 0.3781 |
| Ca | 1.2494 | 1.2500 | 1.2494 | 1.2482 | 1.2471 | 1.2459 | 1.2464 | 1.2495 | 1.2494 | 1.2494 | 1.2493 | 1.2489 | 1.2483 | 1.2471 |
| Sr | 0.5463 | 0.5466 | 0.5463 | 0.5458 | 0.5453 | 0.5447 | 0.5450 | 0.5463 | 0.5463 | 0.5463 | 0.5463 | 0.5461 | 0.5458 | 0.5453 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 1.4219 | 1.4227 | 1.4220 | 1.4206 | 1.4192 | 1.4179 | 1.4185 | 1.4220 | 1.4220 | 1.4219 | 1.4218 | 1.4213 | 1.4206 | 1.4192 |
| Ti | 1.1194 | 1.1200 | 1.1195 | 1.1184 | 1.1174 | 1.1163 | 1.1168 | 1.1195 | 1.1195 | 1.1195 | 1.1194 | 1.1190 | 1.1184 | 1.1174 |
| La | 2.1560 | 2.1572 | 2.1562 | 2.1541 | 2.1521 | 2.1500 | 2.1510 | 2.1562 | 2.1562 | 2.1561 | 2.1560 | 2.1552 | 2.1541 | 2.1521 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.3789 | 0.3791 | 0.3788 | 0.3783 | 0.3778 | 0.3773 | 0.3773 | 0.4546 | 0.4545 | 0.4545 | 0.4545 | 0.4543 | 0.4540 | 0.4534 |
| Ce | 0.0079 | 0.0393 | 0.0785 | 0.1568 | 0.2349 | 0.3128 | 0.3910 | 0.0000 | 0.0008 | 0.0039 | 0.0078 | 0.0392 | 0.0784 | 0.1566 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.6825 | 48.6666 | 48.6521 | 48.6232 | 48.5944 | 48.5657 | 48.5303 | 48.6547 | 48.6544 | 48.6533 | 48.6518 | 48.6403 | 48.6258 | 48.5970 |
| Total | 100.0000 | 100.0000 | 99.9999 | 99.9998 | 100.0001 | 100.0000 | 100.0000 | 100.0001 | 100.0000 | 99.9999 | 99.9999 | 100.0003 | 99.9999 | 100.0000 |
| Li + Na + K | 6.8782 | 6.8820 | 6.8787 | 6.8721 | 6.8655 | 6.8589 | 6.8404 | 6.8787 | 6.8787 | 6.8784 | 6.8782 | 6.8755 | 6.8721 | 6.8655 |
| Mg + Ca + Sr + Ba | 2.1745 | 2.1756 | 2.1746 | 2.1725 | 2.1705 | 2.1684 | 2.1693 | 2.1747 | 2.1746 | 2.1745 | 2.1744 | 2.1737 | 2.1726 | 2.1705 |
| Zr + Ti + La + Nb + Ta + Hf | 4.6973 | 4.6999 | 4.6977 | 4.6931 | 4.6887 | 4.6842 | 4.6863 | 4.6977 | 4.6977 | 4.6975 | 4.6972 | 4.6955 | 4.6931 | 4.6887 |
| Ce/Sn | 0.0208 | 0.1037 | 0.2072 | 0.4145 | 0.6218 | 0.8290 | 1.0363 | 0.0000 | 0.0018 | 0.0086 | 0.0172 | 0.0863 | 0.1727 | 0.3454 |
| Sn + Ce | 0.3868 | 0.4184 | 0.4573 | 0.5351 | 0.6127 | 0.6901 | 0.7683 | 0.4546 | 0.4553 | 0.4584 | 0.4623 | 0.4935 | 0.5324 | 0.6100 |

TABLE 5-continued

| | | | | | | | | | | | | | | |
|---|---|---|---|---|---|---|---|---|---|---|---|---|---|---|
| Si + Al | 36.5067 | 36.4831 | 36.4654 | 36.4304 | 36.3955 | 36.3606 | 36.3330 | 36.4656 | 36.4652 | 36.4638 | 36.4620 | 36.4480 | 36.4305 | 36.3955 |
| Rank on bubbles | B | B | A | A | A | A | A | E | C | C | C | C | B | B |

TABLE 6

| Component (mass %) | 5-56 | 5-57 | 5-58 | 5-59 | Com. Ex. 5-1 | Com. Ex. 5-2 | Com. Ex. 5-3 | Com. Ex. 5-4 | Com. Ex. 5-5 |
|---|---|---|---|---|---|---|---|---|---|
| Si | 29.9024 | 29.8719 | 29.8434 | 29.8149 | 30.0329 | 30.0616 | 30.1895 | 30.1880 | 29.8723 |
| B | 0.6721 | 0.6724 | 0.6718 | 0.6712 | 0.6741 | 0.6747 | 0.6766 | 0.6766 | 0.6724 |
| Al | 6.4583 | 6.4612 | 6.4550 | 6.4488 | 6.4771 | 6.4833 | 6.5014 | 6.5010 | 6.4613 |
| Li | 3.0207 | 3.0005 | 2.9976 | 2.9948 | 3.0295 | 3.0324 | 3.0409 | 3.0407 | 3.0005 |
| Na | 2.5013 | 2.5024 | 2.5000 | 2.4976 | 2.5086 | 2.5110 | 2.5180 | 2.5178 | 2.5024 |
| K | 1.3369 | 1.3375 | 1.3363 | 1.3350 | 1.3408 | 1.3421 | 1.3459 | 1.3458 | 1.3376 |
| Mg | 0.3778 | 0.3779 | 0.3776 | 0.3772 | 0.3789 | 0.3792 | 0.3803 | 0.3803 | 0.3779 |
| Ca | 1.2459 | 1.2464 | 1.2452 | 1.2440 | 1.2495 | 1.2507 | 1.2542 | 1.2541 | 1.2464 |
| Sr | 0.5447 | 0.5450 | 0.5445 | 0.5439 | 0.5463 | 0.5469 | 0.5484 | 0.5484 | 0.5450 |
| Ba | 0.0000 | 0.0000 | 0.0000 | 0.0000 | 0.0000 | 0.0000 | 0.0000 | 0.0000 | 0.0000 |
| Zr | 1.4179 | 1.4185 | 1.4172 | 1.4158 | 1.4220 | 1.4234 | 1.4273 | 1.4273 | 1.4185 |
| Ti | 1.1163 | 1.1168 | 1.1157 | 1.1147 | 1.1195 | 1.1206 | 1.1237 | 1.1237 | 1.1168 |
| La | 2.1500 | 2.1510 | 2.1489 | 2.1468 | 2.1562 | 2.1583 | 2.1643 | 2.1642 | 2.1510 |
| Nb | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 |
| Sn | 0.4528 | 0.4528 | 0.4522 | 0.4516 | 0.0000 | 0.1898 | 0.0076 | 0.0076 | 0.7545 |
| Ce | 0.2346 | 0.3128 | 0.3905 | 0.4680 | 0.0000 | 0.0000 | 0.0039 | 0.0079 | 0.0000 |
| Sb | 0.0000 | 0.0000 | 0.0000 | 0.0000 | 0.4023 | 0.1216 | 0.0000 | 0.0000 | 0.0000 |
| O | 48.5683 | 48.5329 | 48.5043 | 48.4757 | 48.6623 | 48.7045 | 48.8181 | 48.8166 | 48.5433 |
| Total | 100.0000 | 100.0000 | 100.0002 | 100.0000 | 100.0000 | 100.0001 | 100.0001 | 100.0000 | 99.9999 |
| Li + Na + K | 6.8589 | 6.8404 | 6.8339 | 6.8274 | 6.8789 | 6.8855 | 6.9048 | 6.9043 | 6.8405 |
| Mg + Ca + Sr + Ba | 2.1684 | 2.1693 | 2.1673 | 2.1651 | 2.1747 | 2.1768 | 2.1829 | 2.1828 | 2.1693 |
| Zr + Ti + La + Nb + Ta + Hf | 4.6842 | 4.6863 | 4.6818 | 4.6773 | 4.6977 | 4.7023 | 4.7153 | 4.7152 | 4.6863 |
| Ce/Sn | 0.5181 | 0.6908 | 0.8636 | 1.0363 | — | 0.0000 | 0.5132 | — | 0.0000 |
| Sn + Ce | 0.6874 | 0.7656 | 0.8427 | 0.9196 | 0.0000 | 0.1898 | 0.0115 | 0.0155 | 0.7545 |
| Si + Al | 36.3607 | 36.3331 | 36.2984 | 36.2637 | 36.5100 | 36.5449 | 36.6909 | 36.6890 | 36.3336 |
| Rank on bubbles | B | B | B | B | G | G | G | G | G |

| | Component | 6-1 | 6-2 | 6-3 | 6-4 | 6-5 | 6-6 | 6-7 | 6-8 | 6-9 | 6-10 | 6-11 | 6-12 |
|---|---|---|---|---|---|---|---|---|---|---|---|---|---|
| (mol %) | SiO2 | 68.6 | 68.6 | 68.6 | 68.6 | 68.6 | 68.6 | 68.6 | 68.6 | 68.6 | 68.6 | 68.6 | 68.6 |
| | B2O3 | 0.0 | 0.0 | 0.0 | 0.0 | 0.0 | 0.0 | 0.0 | 0.0 | 0.0 | 0.0 | 0.0 | 0.0 |
| | Al2O3 | 8.8 | 8.8 | 8.8 | 8.8 | 8.8 | 8.8 | 8.8 | 8.8 | 8.8 | 8.8 | 8.8 | 8.8 |
| | P2O5 | 0.2 | 0.2 | 0.2 | 0.2 | 0.2 | 0.2 | 0.2 | 0.2 | 0.2 | 0.2 | 0.2 | 0.2 |
| | Li2O | 15.3 | 15.3 | 15.3 | 15.3 | 15.3 | 15.3 | 15.3 | 15.3 | 15.3 | 15.3 | 15.3 | 15.3 |
| | Na2O | 3.2 | 3.2 | 3.2 | 3.2 | 3.2 | 3.2 | 3.2 | 3.2 | 3.2 | 3.2 | 3.2 | 3.2 |
| | K2O | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 0.0 | 0.0 | 0.0 | 0.0 | 0.0 | 0.0 | 0.0 | 0.0 | 0.0 | 0.0 | 0.0 | 0.0 |
| | TiO2 | 1.6 | 1.6 | 1.6 | 1.6 | 1.6 | 1.6 | 1.6 | 1.6 | 1.6 | 1.6 | 1.6 | 1.6 |
| | La2O3 | 0.6 | 0.6 | 0.6 | 0.6 | 0.6 | 0.6 | 0.6 | 0.6 | 0.6 | 0.6 | 0.6 | 0.6 |
| | Nb2O5 | 0.6 | 0.6 | 0.6 | 0.6 | 0.6 | 0.6 | 0.6 | 0.6 | 0.6 | 0.6 | 0.6 | 0.6 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |

TABLE 6-continued

| | | | | | | | | | | | | | |
|---|---|---|---|---|---|---|---|---|---|---|---|---|---|
| | Total | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.100 | 0.100 | 0.100 | 0.100 | 0.100 | 0.100 | 0.200 | 0.200 | 0.200 | 0.200 | 0.200 | 0.200 |
| components | CeO2 | 0.000 | 0.001 | 0.005 | 0.010 | 0.050 | 0.100 | 0.000 | 0.001 | 0.005 | 0.010 | 0.050 | 0.100 |
| (mass %) | Sb2O3 | 0.000 | 0.000 | 0.000 | 0.000 | 0.000 | 0.000 | 0.000 | 0.000 | 0.000 | 0.000 | 0.000 | 0.000 |
| | CeO2/SnO2 | 0.0000 | 0.0100 | 0.0500 | 0.1000 | 0.5000 | 1.0000 | 0.0000 | 0.0050 | 0.0250 | 0.0500 | 0.2500 | 0.5000 |
| | SnO2 + CeO2 | 0.100 | 0.101 | 0.105 | 0.110 | 0.150 | 0.200 | 0.200 | 0.201 | 0.205 | 0.210 | 0.250 | 0.300 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 2.8 | 2.8 | 2.8 | 2.8 | 2.8 | 2.8 | 2.8 | 2.8 | 2.8 | 2.8 | 2.8 | 2.8 |
| | SiO2 + Al2O3 | 77.4 | 77.4 | 77.4 | 77.4 | 77.4 | 77.4 | 77.4 | 77.4 | 77.4 | 77.4 | 77.4 | 77.4 |
| | Rank on bubbles | D | C | B | B | B | B | D | B | A | A | A | A |
| | Component | 6-13 | 6-14 | 6-15 | 6-16 | 6-17 | 6-18 | 6-19 | 6-20 | 6-21 | 6-22 | 6-23 | 6-24 |
| (mol %) | SiO2 | 68.6 | 68.6 | 68.6 | 68.6 | 68.6 | 68.6 | 68.6 | 68.6 | 68.6 | 68.6 | 68.6 | 68.6 |
| | B2O3 | 0.0 | 0.0 | 0.0 | 0.0 | 0.0 | 0.0 | 0.0 | 0.0 | 0.0 | 0.0 | 0.0 | 0.0 |
| | Al2O3 | 8.8 | 8.8 | 8.8 | 8.8 | 8.8 | 8.8 | 8.8 | 8.8 | 8.8 | 8.8 | 8.8 | 8.8 |
| | P2O5 | 0.2 | 0.2 | 0.2 | 0.2 | 0.2 | 0.2 | 0.2 | 0.2 | 0.2 | 0.2 | 0.2 | 0.2 |
| | Li2O | 15.3 | 15.3 | 15.3 | 15.3 | 15.3 | 15.3 | 15.3 | 15.3 | 15.3 | 15.3 | 15.3 | 15.3 |
| | Na2O | 3.2 | 3.2 | 3.2 | 3.2 | 3.2 | 3.2 | 3.2 | 3.2 | 3.2 | 3.2 | 3.2 | 3.2 |
| | K2O | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 0.0 | 0.0 | 0.0 | 0.0 | 0.0 | 0.0 | 0.0 | 0.0 | 0.0 | 0.0 | 0.0 | 0.0 |
| | TiO2 | 1.6 | 1.6 | 1.6 | 1.6 | 1.6 | 1.6 | 1.6 | 1.6 | 1.6 | 1.6 | 1.6 | 1.6 |
| | La2O3 | 0.6 | 0.6 | 0.6 | 0.6 | 0.6 | 0.6 | 0.6 | 0.6 | 0.6 | 0.6 | 0.6 | 0.6 |
| | Nb2O5 | 0.6 | 0.6 | 0.6 | 0.6 | 0.6 | 0.6 | 0.6 | 0.6 | 0.6 | 0.6 | 0.6 | 0.6 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.200 | 0.250 | 0.250 | 0.250 | 0.250 | 0.250 | 0.250 | 0.250 | 0.250 | 0.300 | 0.300 | 0.300 |
| components | CeO2 | 0.200 | 0.000 | 0.001 | 0.005 | 0.010 | 0.050 | 0.100 | 0.200 | 0.250 | 0.000 | 0.001 | 0.005 |
| (mass %) | Sb2O3 | 0.000 | 0.000 | 0.000 | 0.000 | 0.000 | 0.000 | 0.000 | 0.000 | 0.000 | 0.000 | 0.000 | 0.000 |
| | CeO2/SnO2 | 1.0000 | 0.0000 | 0.0040 | 0.0200 | 0.0400 | 0.2000 | 0.4000 | 0.8000 | 1.0000 | 0.0000 | 0.0033 | 0.0167 |
| | SnO2 + CeO2 | 0.400 | 0.250 | 0.251 | 0.255 | 0.260 | 0.300 | 0.350 | 0.450 | 0.500 | 0.300 | 0.301 | 0.305 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 2.8 | 2.8 | 2.8 | 2.8 | 2.8 | 2.8 | 2.8 | 2.8 | 2.8 | 2.8 | 2.8 | 2.8 |
| | SiO2 + Al2O3 | 77.4 | 77.4 | 77.4 | 77.4 | 77.4 | 77.4 | 77.4 | 77.4 | 77.4 | 77.4 | 77.4 | 77.4 |
| | Rank on bubbles | A | D | B | A | A | A | A | A | A | D | B | A |
| | Component | 6-25 | 6-26 | 6-27 | 6-28 | 6-29 | 6-30 | 6-31 | 6-32 | 6-33 | 6-34 | 6-35 | 6-36 |
| (mol %) | SiO2 | 68.6 | 68.6 | 68.6 | 68.6 | 68.6 | 68.6 | 68.6 | 68.6 | 68.6 | 68.6 | 68.6 | 68.6 |
| | B2O3 | 0.0 | 0.0 | 0.0 | 0.0 | 0.0 | 0.0 | 0.0 | 0.0 | 0.0 | 0.0 | 0.0 | 0.0 |
| | Al2O3 | 8.8 | 8.8 | 8.8 | 8.8 | 8.8 | 8.8 | 8.8 | 8.8 | 8.8 | 8.8 | 8.8 | 8.8 |
| | P2O5 | 0.2 | 0.2 | 0.2 | 0.2 | 0.2 | 0.2 | 0.2 | 0.2 | 0.2 | 0.2 | 0.2 | 0.2 |
| | Li2O | 15.3 | 15.3 | 15.3 | 15.3 | 15.3 | 15.3 | 15.3 | 15.3 | 15.3 | 15.3 | 15.3 | 15.3 |
| | Na2O | 3.2 | 3.2 | 3.2 | 3.2 | 3.2 | 3.2 | 3.2 | 3.2 | 3.2 | 3.2 | 3.2 | 3.2 |

TABLE 6-continued

| | | | | | | | | | | | | | |
|---|---|---|---|---|---|---|---|---|---|---|---|---|---|
| | K2O | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 0.0 | 0.0 | 0.0 | 0.0 | 0.0 | 0.0 | 0.0 | 0.0 | 0.0 | 0.0 | 0.0 | 0.0 |
| | TiO2 | 1.6 | 1.6 | 1.6 | 1.6 | 1.6 | 1.6 | 1.6 | 1.6 | 1.6 | 1.6 | 1.6 | 1.6 |
| | La2O3 | 0.6 | 0.6 | 0.6 | 0.6 | 0.6 | 0.6 | 0.6 | 0.6 | 0.6 | 0.6 | 0.6 | 0.6 |
| | Nb2O5 | 0.6 | 0.6 | 0.6 | 0.6 | 0.6 | 0.6 | 0.6 | 0.6 | 0.6 | 0.6 | 0.6 | 0.6 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.300 | 0.300 | 0.300 | 0.300 | 0.300 | 0.400 | 0.400 | 0.400 | 0.400 | 0.400 | 0.400 | 0.400 |
| components | CeO2 | 0.010 | 0.050 | 0.100 | 0.200 | 0.300 | 0.000 | 0.001 | 0.005 | 0.010 | 0.050 | 0.100 | 0.200 |
| (mass %) | Sb2O3 | 0.000 | 0.000 | 0.000 | 0.000 | 0.000 | 0.000 | 0.000 | 0.000 | 0.000 | 0.000 | 0.000 | 0.000 |
| | CeO2/SnO2 | 0.0333 | 0.1667 | 0.3333 | 0.6667 | 1.0000 | 0.0000 | 0.0025 | 0.0125 | 0.0250 | 0.1250 | 0.2500 | 0.5000 |
| | SnO2 + CeO2 | 0.310 | 0.350 | 0.400 | 0.500 | 0.600 | 0.400 | 0.401 | 0.405 | 0.410 | 0.450 | 0.500 | 0.600 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 2.8 | 2.8 | 2.8 | 2.8 | 2.8 | 2.8 | 2.8 | 2.8 | 2.8 | 2.8 | 2.8 | 2.8 |
| | SiO2 + Al2O3 | 77.4 | 77.4 | 77.4 | 77.4 | 77.4 | 77.4 | 77.4 | 77.4 | 77.4 | 77.4 | 77.4 | 77.4 |
| | Rank on bubbles | A | A | A | A | A | D | B | B | A | A | A | A |

| | Component | 6-37 | 6-38 | 6-39 | 6-40 | 6-41 | 6-42 | 6-43 | 6-44 | 6-45 | 6-46 | 6-47 | 6-48 |
|---|---|---|---|---|---|---|---|---|---|---|---|---|---|
| (mol %) | SiO2 | 68.6 | 68.6 | 68.6 | 68.6 | 68.6 | 68.6 | 68.6 | 68.6 | 68.6 | 68.6 | 68.6 | 68.6 |
| | B2O3 | 0.0 | 0.0 | 0.0 | 0.0 | 0.0 | 0.0 | 0.0 | 0.0 | 0.0 | 0.0 | 0.0 | 0.0 |
| | Al2O3 | 8.8 | 8.8 | 8.8 | 8.8 | 8.8 | 8.8 | 8.8 | 8.8 | 8.8 | 8.8 | 8.8 | 8.8 |
| | P2O5 | 0.2 | 0.2 | 0.2 | 0.2 | 0.2 | 0.2 | 0.2 | 0.2 | 0.2 | 0.2 | 0.2 | 0.2 |
| | Li2O | 15.3 | 15.3 | 15.3 | 15.3 | 15.3 | 15.3 | 15.3 | 15.3 | 15.3 | 15.3 | 15.3 | 15.3 |
| | Na2O | 3.2 | 3.2 | 3.2 | 3.2 | 3.2 | 3.2 | 3.2 | 3.2 | 3.2 | 3.2 | 3.2 | 3.2 |
| | K2O | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 0.0 | 0.0 | 0.0 | 0.0 | 0.0 | 0.0 | 0.0 | 0.0 | 0.0 | 0.0 | 0.0 | 0.0 |
| | TiO2 | 1.6 | 1.6 | 1.6 | 1.6 | 1.6 | 1.6 | 1.6 | 1.6 | 1.6 | 1.6 | 1.6 | 1.6 |
| | La2O3 | 0.6 | 0.6 | 0.6 | 0.6 | 0.6 | 0.6 | 0.6 | 0.6 | 0.6 | 0.6 | 0.6 | 0.6 |
| | Nb2O5 | 0.6 | 0.6 | 0.6 | 0.6 | 0.6 | 0.6 | 0.6 | 0.6 | 0.6 | 0.6 | 0.6 | 0.6 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.400 | 0.400 | 0.500 | 0.500 | 0.500 | 0.500 | 0.500 | 0.500 | 0.500 | 0.500 | 0.500 | 0.500 |
| components | CeO2 | 0.300 | 0.400 | 0.000 | 0.001 | 0.005 | 0.010 | 0.050 | 0.100 | 0.200 | 0.300 | 0.400 | 0.500 |
| (mass %) | Sb2O3 | 0.000 | 0.000 | 0.000 | 0.000 | 0.000 | 0.000 | 0.000 | 0.000 | 0.000 | 0.000 | 0.000 | 0.000 |
| | CeO2/SnO2 | 0.7500 | 1.0000 | 0.0000 | 0.0020 | 0.0100 | 0.0200 | 0.1000 | 0.2000 | 0.4000 | 0.6000 | 0.8000 | 1.0000 |
| | SnO2 + CeO2 | 0.700 | 0.800 | 0.500 | 0.501 | 0.505 | 0.510 | 0.550 | 0.600 | 0.700 | 0.800 | 0.900 | 1.000 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 2.8 | 2.8 | 2.8 | 2.8 | 2.8 | 2.8 | 2.8 | 2.8 | 2.8 | 2.8 | 2.8 | 2.8 |

TABLE 6-continued

| | | | | | | | | | | | | | |
|---|---|---|---|---|---|---|---|---|---|---|---|---|---|
| | SiO2 + Al2O3 | 77.4 | 77.4 | 77.4 | 77.4 | 77.4 | 77.4 | 77.4 | 77.4 | 77.4 | 77.4 | 77.4 | 77.4 |
| | Rank on bubbles | A | A | E | C | C | B | B | A | A | A | A | A |

| | Component | 6-49 | 6-50 | 6-51 | 6-52 | 6-53 | 6-54 | 6-55 | 6-56 | 6-57 | 6-58 | 6-59 | Com. Ex. 6-1 |
|---|---|---|---|---|---|---|---|---|---|---|---|---|---|
| (mol %) | SiO2 | 68.6 | 68.6 | 68.6 | 68.6 | 68.6 | 68.6 | 68.6 | 68.6 | 68.6 | 68.6 | 68.6 | 68.6 |
| | B2O3 | 0.0 | 0.0 | 0.0 | 0.0 | 0.0 | 0.0 | 0.0 | 0.0 | 0.0 | 0.0 | 0.0 | 0.0 |
| | Al2O3 | 8.8 | 8.8 | 8.8 | 8.8 | 8.8 | 8.8 | 8.8 | 8.8 | 8.8 | 8.8 | 8.8 | 8.8 |
| | P2O5 | 0.2 | 0.2 | 0.2 | 0.2 | 0.2 | 0.2 | 0.2 | 0.2 | 0.2 | 0.2 | 0.2 | 0.2 |
| | Li2O | 15.3 | 15.3 | 15.3 | 15.3 | 15.3 | 15.3 | 15.3 | 15.3 | 15.3 | 15.3 | 15.3 | 15.3 |
| | Na2O | 3.2 | 3.2 | 3.2 | 3.2 | 3.2 | 3.2 | 3.2 | 3.2 | 3.2 | 3.2 | 3.2 | 3.2 |
| | K2O | 1.1 | 1.1 | 1.1 | 1.1 | 1.1 | 1.1 | 1.1 | 1.1 | 1.1 | 1.1 | 1.1 | 1.1 |
| | MgO | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 0.0 | 0.0 | 0.0 | 0.0 | 0.0 | 0.0 | 0.0 | 0.0 | 0.0 | 0.0 | 0.0 | 0.0 |
| | TiO2 | 1.6 | 1.6 | 1.6 | 1.6 | 1.6 | 1.6 | 1.6 | 1.6 | 1.6 | 1.6 | 1.6 | 1.6 |
| | La2O3 | 0.6 | 0.6 | 0.6 | 0.6 | 0.6 | 0.6 | 0.6 | 0.6 | 0.6 | 0.6 | 0.6 | 0.6 |
| | Nb2O5 | 0.6 | 0.6 | 0.6 | 0.6 | 0.6 | 0.6 | 0.6 | 0.6 | 0.6 | 0.6 | 0.6 | 0.6 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.600 | 0.600 | 0.600 | 0.600 | 0.600 | 0.600 | 0.600 | 0.600 | 0.600 | 0.600 | 0.600 | 0.000 |
| | CeO2 | 0.000 | 0.001 | 0.005 | 0.010 | 0.050 | 0.100 | 0.200 | 0.300 | 0.400 | 0.500 | 0.600 | 0.000 |
| | Sb2O3 | 0.000 | 0.000 | 0.000 | 0.000 | 0.000 | 0.000 | 0.000 | 0.000 | 0.000 | 0.000 | 0.000 | 0.500 |
| | CeO2/SnO2 | 0.0000 | 0.0017 | 0.0083 | 0.0167 | 0.0833 | 0.1667 | 0.3333 | 0.5000 | 0.6667 | 0.8333 | 1.0000 | — |
| | SnO2 + CeO2 | 0.600 | 0.601 | 0.605 | 0.610 | 0.650 | 0.700 | 0.800 | 0.900 | 1.000 | 1.100 | 1.200 | 0.000 |
| (mol %) | Li2O + Na2O + K2O | 19.6 | 19.6 | 19.6 | 19.6 | 19.6 | 19.6 | 19.6 | 19.6 | 19.6 | 19.6 | 19.6 | 19.6 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 2.8 | 2.8 | 2.8 | 2.8 | 2.8 | 2.8 | 2.8 | 2.8 | 2.8 | 2.8 | 2.8 | 2.8 |
| | SiO2 + Al2O3 | 77.4 | 77.4 | 77.4 | 77.4 | 77.4 | 77.4 | 77.4 | 77.4 | 77.4 | 77.4 | 77.4 | 77.4 |
| | Rank on bubbles | E | C | C | C | C | B | B | B | B | B | B | G |

| | Component | Com. Ex. 6-2 | Com. Ex. 6-3 | Com. Ex. 6-4 | Com. Ex. 6-5 |
|---|---|---|---|---|---|
| (mol %) | SiO2 | 68.6 | 68.6 | 68.6 | 68.6 |
| | B2O3 | 0.0 | 0.0 | 0.0 | 0.0 |
| | Al2O3 | 8.8 | 8.8 | 8.8 | 8.8 |
| | P2O5 | 0.2 | 0.2 | 0.2 | 0.2 |
| | Li2O | 15.3 | 15.3 | 15.3 | 15.3 |
| | Na2O | 3.2 | 3.2 | 3.2 | 3.2 |
| | K2O | 1.1 | 1.1 | 1.1 | 1.1 |
| | MgO | 0.0 | 0.0 | 0.0 | 0.0 |
| | CaO | 0.0 | 0.0 | 0.0 | 0.0 |
| | SrO | 0.0 | 0.0 | 0.0 | 0.0 |
| | BaO | 0.0 | 0.0 | 0.0 | 0.0 |
| | ZrO2 | 0.0 | 0.0 | 0.0 | 0.0 |
| | TiO2 | 1.6 | 1.6 | 1.6 | 1.6 |
| | La2O3 | 0.6 | 0.6 | 0.6 | 0.6 |
| | Nb2O5 | 0.6 | 0.6 | 0.6 | 0.6 |

TABLE 6-continued

| | | | | | |
|---|---|---|---|---|---|
| | Ta2O5 | 0.0 | 0.0 | 0.0 | 0.0 |
| | HfO2 | 0.0 | 0.0 | 0.0 | 0.0 |
| | Total | 100.0 | 100.0 | 100.0 | 100.0 |
| Based on glass components (mass %) | SnO2 | 0.250 | 1.000 | 0.000 | 1.000 |
| | CeO2 | 0.000 | 0.000 | 1.000 | 1.000 |
| | Sb2O3 | 0.150 | 0.000 | 0.000 | 0.000 |
| | CeO2/SnO2 | 0.0000 | 0.0000 | — | 1.0000 |
| | SnO2 + CeO2 | 0.250 | 1.000 | 1.000 | 2.000 |
| (mol %) | Li2O + Na2O + K2O | 19.6 | 19.6 | 19.6 | 19.6 |
| | MgO + CaO + SrO + BaO | 0.0 | 0.0 | 0.0 | 0.0 |
| | ZrO2 + TiO2 + La2O3 + Nb2O5 + Ta2O5 + HfO2 | 2.8 | 2.8 | 2.8 | 2.8 |
| | SiO2 + Al2O3 | 77.4 | 77.4 | 77.4 | 77.4 |
| | Rank on bubbles | G | G | G | G |

| Component (mass %) | 6-1 | 6-2 | 6-3 | 6-4 | 6-5 | 6-6 | 6-7 | 6-8 | 6-9 | 6-10 | 6-11 | 6-12 |
|---|---|---|---|---|---|---|---|---|---|---|---|---|
| Si | 30.6067 | 30.6063 | 30.6051 | 30.6036 | 30.5914 | 30.5607 | 30.5608 | 30.5605 | 30.5592 | 30.5577 | 30.5455 | 30.5303 |
| B | 0.0000 | 0.0000 | 0.0000 | 0.0000 | 0.0000 | 0.0000 | 0.0000 | 0.0000 | 0.0000 | 0.0000 | 0.0000 | 0.0000 |
| Al | 7.5438 | 7.5437 | 7.5434 | 7.5430 | 7.5400 | 7.5434 | 7.5435 | 7.5434 | 7.5431 | 7.5427 | 7.5397 | 7.5359 |
| P | 0.1968 | 0.1968 | 0.1968 | 0.1968 | 0.1967 | 0.1968 | 0.1968 | 0.1968 | 0.1968 | 0.1968 | 0.1967 | 0.1966 |
| Li | 3.3741 | 3.3740 | 3.3739 | 3.3737 | 3.3724 | 3.3739 | 3.3739 | 3.3739 | 3.3738 | 3.3736 | 3.3722 | 3.3706 |
| Na | 2.3374 | 2.3373 | 2.3372 | 2.3371 | 2.3362 | 2.3372 | 2.3373 | 2.3372 | 2.3371 | 2.3370 | 2.3361 | 2.3349 |
| K | 1.3664 | 1.3664 | 1.3664 | 1.3663 | 1.3658 | 1.3664 | 1.3664 | 1.3664 | 1.3663 | 1.3662 | 1.3657 | 1.3650 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 0.0000 | 0.0000 | 0.0000 | 0.0000 | 0.0000 | 0.0000 | 0.0000 | 0.0000 | 0.0000 | 0.0000 | 0.0000 | 0.0000 |
| Ti | 1.2170 | 1.2170 | 1.2169 | 1.2169 | 1.2164 | 1.2169 | 1.2169 | 1.2169 | 1.2169 | 1.2168 | 1.2163 | 1.2157 |
| La | 2.6369 | 2.6369 | 2.6368 | 2.6367 | 2.6356 | 2.6368 | 2.6368 | 2.6368 | 2.6367 | 2.6366 | 2.6355 | 2.6342 |
| Nb | 1.7711 | 1.7711 | 1.7710 | 1.7709 | 1.7702 | 1.7710 | 1.7710 | 1.7710 | 1.7709 | 1.7708 | 1.7701 | 1.7692 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.0785 | 0.0785 | 0.0785 | 0.0785 | 0.0785 | 0.0785 | 0.1570 | 0.1570 | 0.1570 | 0.1569 | 0.1569 | 0.1568 |
| Ce | 0.0000 | 0.0008 | 0.0041 | 0.0081 | 0.0407 | 0.0813 | 0.0000 | 0.0008 | 0.0041 | 0.0081 | 0.0406 | 0.0812 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.8713 | 48.8712 | 48.8699 | 48.8684 | 48.8561 | 48.8371 | 48.8396 | 48.8393 | 48.8381 | 48.8368 | 48.8247 | 48.8096 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 7.0779 | 7.0777 | 7.0775 | 7.0771 | 7.0744 | 7.0775 | 7.0776 | 7.0775 | 7.0772 | 7.0763 | 7.0740 | 7.0705 |
| Mg + Ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 5.6250 | 5.6250 | 5.6247 | 5.6245 | 5.6222 | 5.6247 | 5.6247 | 5.6247 | 5.6245 | 5.6242 | 5.6219 | 5.6191 |
| Ce/Sn | 0.0000 | 0.0102 | 0.0522 | 0.1032 | 0.5185 | 1.0357 | 0.0000 | 0.0051 | 0.0261 | 0.0516 | 0.2588 | 0.5179 |
| Sn + Ce | 0.0785 | 0.0793 | 0.0826 | 0.0866 | 0.1192 | 0.1598 | 0.1570 | 0.1578 | 0.1611 | 0.1650 | 0.1975 | 0.2380 |
| Si + Al | 38.1505 | 38.1500 | 38.1485 | 38.1466 | 38.1314 | 38.1041 | 38.1043 | 38.1039 | 38.1023 | 38.1004 | 38.0852 | 38.0662 |
| Rank on bubbles | D | C | B | B | B | B | D | B | A | A | A | A |

| Component (mass %) | 6-13 | 6-14 | 6-15 | 6-16 | 6-17 | 6-18 | 6-19 | 6-20 | 6-21 | 6-22 | 6-23 | 6-24 | 6-25 |
|---|---|---|---|---|---|---|---|---|---|---|---|---|---|
| Si | 30.4999 | 30.5456 | 30.5453 | 30.5440 | 30.5425 | 30.5303 | 30.5151 | 30.4848 | 30.4697 | 30.5304 | 30.5301 | 30.5289 | 30.5273 |
| B | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Al | 7.5284 | 7.5397 | 7.5396 | 7.5393 | 7.5390 | 7.5360 | 7.5322 | 7.5247 | 7.5210 | 7.5360 | 7.5359 | 7.5356 | 7.5352 |

TABLE 6-continued

| | | | | | | | | | | | | | |
|---|---|---|---|---|---|---|---|---|---|---|---|---|---|
| P | 0.1964 | 0.1967 | 0.1967 | 0.1967 | 0.1967 | 0.1966 | 0.1965 | 0.1963 | 0.1962 | 0.1966 | 0.1966 | 0.1966 | 0.1966 |
| Li | 3.3672 | 3.3722 | 3.3722 | 3.3721 | 3.3719 | 3.3706 | 3.3689 | 3.3655 | 3.3639 | 3.3706 | 3.3705 | 3.3704 | 3.3702 |
| Na | 2.3326 | 2.3361 | 2.3361 | 2.3360 | 2.3359 | 2.3349 | 2.3338 | 2.3314 | 2.3303 | 2.3349 | 2.3349 | 2.3348 | 2.3347 |
| K | 1.3637 | 1.3657 | 1.3657 | 1.3656 | 1.3656 | 1.3650 | 1.3643 | 1.3630 | 1.3623 | 1.3650 | 1.3650 | 1.3650 | 1.3649 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ti | 1.2145 | 1.2163 | 1.2163 | 1.2163 | 1.2162 | 1.2157 | 1.2151 | 1.2139 | 1.2133 | 1.2157 | 1.2157 | 1.2157 | 1.2156 |
| La | 2.6316 | 2.6355 | 2.6355 | 2.6354 | 2.6352 | 2.6342 | 2.6329 | 2.6303 | 2.6290 | 2.6342 | 2.6342 | 2.6341 | 2.6339 |
| Nb | 1.7675 | 1.7701 | 1.7701 | 1.7700 | 1.7699 | 1.7692 | 1.7684 | 1.7666 | 1.7657 | 1.7692 | 1.7692 | 1.7692 | 1.7691 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.1565 | 0.1961 | 0.1961 | 0.1961 | 0.1960 | 0.1959 | 0.1958 | 0.1955 | 0.1954 | 0.2351 | 0.2351 | 0.2351 | 0.2351 |
| Ce | 0.1622 | 0.0000 | 0.0008 | 0.0041 | 0.0081 | 0.0406 | 0.0812 | 0.1621 | 0.2025 | 0.0000 | 0.0008 | 0.0041 | 0.0081 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.7795 | 48.8260 | 48.8256 | 48.8244 | 48.8230 | 48.8110 | 48.7958 | 48.7659 | 48.7507 | 48.8123 | 48.8120 | 48.8105 | 48.8093 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 7.0635 | 7.0740 | 7.0740 | 7.0737 | 7.0734 | 7.0705 | 7.0670 | 7.0599 | 7.0565 | 7.0705 | 7.0704 | 7.0702 | 7.0698 |
| Mg + ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 5.6136 | 5.6219 | 5.6219 | 5.6217 | 5.6213 | 5.6191 | 5.6164 | 5.6108 | 5.6080 | 5.6191 | 5.6191 | 5.6190 | 5.6186 |
| Ce/Sn | 1.0364 | 0.0000 | 0.0041 | 0.0209 | 0.0413 | 0.2072 | 0.4147 | 0.8292 | 1.0363 | 0.0000 | 0.0034 | 0.0174 | 0.0345 |
| Sn + Ce | 0.3187 | 0.1961 | 0.1969 | 0.2002 | 0.2041 | 0.2365 | 0.2770 | 0.3576 | 0.3979 | 0.2351 | 0.2359 | 0.2392 | 0.2432 |
| Si + Al | 38.0283 | 38.0853 | 38.0849 | 38.0833 | 38.0815 | 38.0663 | 38.0473 | 38.0095 | 37.9907 | 38.0664 | 38.0660 | 38.0645 | 38.0625 |
| Rank on bubbles | A | D | B | A | A | A | A | A | A | D | B | A | A |

| Component (mass %) | 6-26 | 6-27 | 6-28 | 6-29 | 6-30 | 6-31 | 6-32 | 6-33 | 6-34 | 6-35 | 6-36 | 6-37 | 6-38 |
|---|---|---|---|---|---|---|---|---|---|---|---|---|---|
| Si | 30.5152 | 30.5000 | 30.4697 | 30.4240 | 30.5001 | 30.4998 | 30.4986 | 30.4971 | 30.4849 | 30.4698 | 30.4241 | 30.3939 | 30.3639 |
| B | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Al | 7.5322 | 7.5285 | 7.5210 | 7.5207 | 7.5285 | 7.5284 | 7.5281 | 7.5277 | 7.5247 | 7.5210 | 7.5207 | 7.5132 | 7.5058 |
| P | 0.1965 | 0.1964 | 0.1962 | 0.1962 | 0.1964 | 0.1964 | 0.1964 | 0.1964 | 0.1963 | 0.1962 | 0.1962 | 0.1960 | 0.1958 |
| Li | 3.3689 | 3.3672 | 3.3639 | 3.3637 | 3.3672 | 3.3672 | 3.3671 | 3.3669 | 3.3655 | 3.3639 | 3.3637 | 3.3604 | 3.3570 |
| Na | 2.3338 | 2.3326 | 2.3303 | 2.3302 | 2.3326 | 2.3326 | 2.3325 | 2.3324 | 2.3315 | 2.3303 | 2.3302 | 2.3279 | 2.3256 |
| K | 1.3643 | 1.3637 | 1.3623 | 1.3623 | 1.3637 | 1.3637 | 1.3636 | 1.3635 | 1.3630 | 1.3623 | 1.3623 | 1.3609 | 1.3596 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ti | 1.2151 | 1.2145 | 1.2133 | 1.2133 | 1.2145 | 1.2145 | 1.2145 | 1.2144 | 1.2139 | 1.2133 | 1.2133 | 1.2121 | 1.2109 |
| La | 2.6329 | 2.6316 | 2.6290 | 2.6289 | 2.6316 | 2.6316 | 2.6314 | 2.6313 | 2.6303 | 2.6290 | 2.6289 | 2.6263 | 2.6237 |
| Nb | 1.7684 | 1.7675 | 1.7657 | 1.7656 | 1.7675 | 1.7675 | 1.7674 | 1.7673 | 1.7666 | 1.7657 | 1.7657 | 1.7639 | 1.7622 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.2350 | 0.2348 | 0.2345 | 0.2344 | 0.3130 | 0.3130 | 0.3130 | 0.3130 | 0.3128 | 0.3126 | 0.3125 | 0.3121 | 0.3116 |
| Ce | 0.0406 | 0.0811 | 0.1620 | 0.2429 | 0.0000 | 0.0008 | 0.0041 | 0.0081 | 0.0405 | 0.0810 | 0.1619 | 0.2425 | 0.3229 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.7971 | 48.7821 | 48.7521 | 48.7178 | 48.7849 | 48.7845 | 48.7833 | 48.7819 | 48.7700 | 48.7549 | 48.7205 | 48.6908 | 48.6610 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |

TABLE 6-continued

| | | | | | | | | | | | | | |
|---|---|---|---|---|---|---|---|---|---|---|---|---|---|
| Li + Na + K | 7.0670 | 7.0635 | 7.0565 | 7.0562 | 7.0635 | 7.0635 | 7.0632 | 7.0628 | 7.0600 | 7.0565 | 7.0562 | 7.0492 | 7.0422 |
| Mg + Ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 5.6164 | 5.6136 | 5.6080 | 5.6078 | 5.6136 | 5.6136 | 5.6133 | 5.6130 | 5.6108 | 5.6080 | 5.6079 | 5.6023 | 5.5968 |
| Ce/Sn | 0.1728 | 0.3454 | 0.6903 | 1.0363 | 0.0000 | 0.0026 | 0.0131 | 0.0259 | 0.1295 | 0.2591 | 0.5181 | 0.7770 | 1.0363 |
| Sn + Ce | 0.2756 | 0.3159 | 0.3965 | 0.4773 | 0.3130 | 0.3138 | 0.3171 | 0.3211 | 0.3533 | 0.3936 | 0.4744 | 0.5546 | 0.6345 |
| Si + Al | 38.0474 | 38.0285 | 37.9907 | 37.9447 | 38.0286 | 38.0282 | 38.0267 | 38.0248 | 38.0096 | 37.9908 | 37.9448 | 37.9071 | 37.8697 |
| Rank on bubbles | A | A | A | A | D | B | B | A | A | A | A | A | A |

| Component (mass %) | 6-39 | 6-40 | 6-41 | 6-42 | 6-43 | 6-44 | 6-45 | 6-46 | 6-47 | 6-48 | 6-49 | 6-50 | 6-51 |
|---|---|---|---|---|---|---|---|---|---|---|---|---|---|
| Si | 30.4699 | 30.4696 | 30.4684 | 30.4669 | 30.4393 | 30.4242 | 30.3940 | 30.3639 | 30.3483 | 30.3028 | 30.4242 | 30.4239 | 30.4227 |
| B | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Al | 7.5210 | 7.5210 | 7.5207 | 7.5203 | 7.5245 | 7.5207 | 7.5133 | 7.5058 | 7.5020 | 7.5017 | 7.5207 | 7.5207 | 7.5204 |
| P | 0.1962 | 0.1962 | 0.1962 | 0.1962 | 0.1963 | 0.1962 | 0.1960 | 0.1958 | 0.1957 | 0.1957 | 0.1962 | 0.1962 | 0.1962 |
| Li | 3.3639 | 3.3639 | 3.3637 | 3.3636 | 3.3654 | 3.3637 | 3.3604 | 3.3571 | 3.3334 | 3.3333 | 3.3638 | 3.3637 | 3.3636 |
| Na | 2.3303 | 2.3303 | 2.3302 | 2.3301 | 2.3314 | 2.3302 | 2.3279 | 2.3256 | 2.3244 | 2.3243 | 2.3302 | 2.3302 | 2.3301 |
| K | 1.3623 | 1.3623 | 1.3623 | 1.3622 | 1.3629 | 1.3623 | 1.3609 | 1.3596 | 1.3589 | 1.3588 | 1.3623 | 1.3623 | 1.3622 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ti | 1.2133 | 1.2133 | 1.2133 | 1.2132 | 1.2139 | 1.2133 | 1.2121 | 1.2109 | 1.2102 | 1.2102 | 1.2133 | 1.2133 | 1.2132 |
| La | 2.6290 | 2.6289 | 2.6288 | 2.6287 | 2.6302 | 2.6289 | 2.6263 | 2.6237 | 2.6223 | 2.6222 | 2.6289 | 2.6288 | 2.6287 |
| Nb | 1.7657 | 1.7657 | 1.7656 | 1.7656 | 1.7665 | 1.7657 | 1.7639 | 1.7622 | 1.7613 | 1.7612 | 1.7657 | 1.7656 | 1.7656 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.3908 | 0.3908 | 0.3907 | 0.3907 | 0.3909 | 0.3906 | 0.3901 | 0.3895 | 0.3892 | 0.3890 | 0.4687 | 0.4687 | 0.4687 |
| Ce | 0.0000 | 0.0008 | 0.0040 | 0.0080 | 0.0405 | 0.0809 | 0.1617 | 0.2422 | 0.3226 | 0.4031 | 0.0000 | 0.0008 | 0.0040 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.7576 | 48.7572 | 48.7561 | 48.7545 | 48.7382 | 48.7233 | 48.6934 | 48.6637 | 48.6317 | 48.5977 | 48.7260 | 48.7258 | 48.7246 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 7.0565 | 7.0565 | 7.0562 | 7.0559 | 7.0597 | 7.0562 | 7.0492 | 7.0423 | 7.0167 | 7.0164 | 7.0563 | 7.0562 | 7.0559 |
| Mg + Ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 5.6080 | 5.6079 | 5.6077 | 5.6075 | 5.6106 | 5.6079 | 5.6023 | 5.5968 | 5.5938 | 5.5936 | 5.6079 | 5.6077 | 5.6075 |
| Ce/Sn | 0.0000 | 0.0020 | 0.0102 | 0.0205 | 0.1036 | 0.2071 | 0.4145 | 0.6218 | 0.8289 | 1.0362 | 0.0000 | 0.0017 | 0.0085 |
| Sn + Ce | 0.3908 | 0.3916 | 0.3947 | 0.3987 | 0.4314 | 0.4715 | 0.5518 | 0.6317 | 0.7118 | 0.7921 | 0.4687 | 0.4695 | 0.4727 |
| Si + Al | 37.9909 | 37.9906 | 37.9891 | 37.9872 | 37.9638 | 37.9449 | 37.9073 | 37.8697 | 37.8503 | 37.8045 | 37.9449 | 37.9446 | 37.9431 |
| Rank on bubbles | E | C | C | B | B | A | A | A | A | A | E | C | C |

| Component (mass %) | 6-52 | 6-53 | 6-54 | 6-55 | 6-56 | 6-57 | 6-58 | 6-59 | Com. Ex. 6-1 | Com. Ex. 6-2 | Com. Ex. 6-3 | Com. Ex. 6-4 | Com. Ex. 6-5 |
|---|---|---|---|---|---|---|---|---|---|---|---|---|---|
| Si | 30.4212 | 30.4092 | 30.3941 | 30.3640 | 30.3484 | 30.3029 | 30.2730 | 30.2432 | 30.4691 | 30.5004 | 30.6326 | 30.6311 | 30.3032 |
| B | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Al | 7.5200 | 7.5170 | 7.5133 | 7.5059 | 7.5020 | 7.5017 | 7.4943 | 7.4869 | 7.5208 | 7.5286 | 7.5502 | 7.5498 | 7.5018 |
| P | 0.1962 | 0.1961 | 0.1960 | 0.1958 | 0.1957 | 0.1957 | 0.1955 | 0.1953 | 0.1962 | 0.1964 | 0.1970 | 0.1970 | 0.1957 |
| Li | 3.3634 | 3.3621 | 3.3604 | 3.3571 | 3.3334 | 3.3333 | 3.3300 | 3.3268 | 3.3638 | 3.3673 | 3.3769 | 3.3768 | 3.3334 |
| Na | 2.3300 | 2.3291 | 2.3279 | 2.3256 | 2.3244 | 2.3243 | 2.3220 | 2.3197 | 2.3302 | 2.3326 | 2.3393 | 2.3392 | 2.3243 |
| K | 1.3621 | 1.3616 | 1.3609 | 1.3596 | 1.3589 | 1.3588 | 1.3575 | 1.3561 | 1.3623 | 1.3637 | 1.3676 | 1.3675 | 1.3588 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |

TABLE 6-continued

| | | | | | | | | | | | | | |
|---|---|---|---|---|---|---|---|---|---|---|---|---|---|
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ti | 1.2131 | 1.2127 | 1.2121 | 1.2109 | 1.2102 | 1.2102 | 1.2090 | 1.2078 | 1.2133 | 1.2145 | 1.2180 | 1.2180 | 1.2102 |
| La | 2.6286 | 2.6276 | 2.6263 | 2.6237 | 2.6223 | 2.6222 | 2.6196 | 2.6171 | 2.6289 | 2.6316 | 2.6392 | 2.6390 | 2.6223 |
| Nb | 1.7655 | 1.7648 | 1.7639 | 1.7622 | 1.7613 | 1.7612 | 1.7595 | 1.7577 | 1.7657 | 1.7675 | 1.7726 | 1.7725 | 1.7612 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.4686 | 0.4684 | 0.4681 | 0.4674 | 0.4670 | 0.4668 | 0.4662 | 0.4656 | 0.0000 | 0.1957 | 0.0079 | 0.0079 | 0.7779 |
| Ce | 0.0081 | 0.0404 | 0.0808 | 0.1615 | 0.2420 | 0.3225 | 0.4026 | 0.4824 | 0.0000 | 0.0000 | 0.0041 | 0.0081 | 0.0000 |
| Sb | 0.0000 | 0.0000 | 0.0000 | 0.0000 | 0.0000 | 0.0000 | 0.0000 | 0.0000 | 0.4165 | 0.1235 | 0.0000 | 0.0000 | 0.0000 |
| O | 48.7232 | 48.7110 | 48.6962 | 48.6663 | 48.6344 | 48.6004 | 48.5708 | 48.5414 | 48.7332 | 48.7782 | 48.8946 | 48.8931 | 48.6112 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 7.0555 | 7.0528 | 7.0492 | 7.0423 | 7.0167 | 7.0164 | 7.0095 | 7.0026 | 7.0563 | 7.0636 | 7.0838 | 7.0835 | 7.0165 |
| Mg + Ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 5.6072 | 5.6051 | 5.6023 | 5.5968 | 5.5938 | 5.5936 | 5.5881 | 5.5826 | 5.6079 | 5.6136 | 5.6298 | 5.6295 | 5.5937 |
| Ce/Sn | 0.0173 | 0.0863 | 0.1726 | 0.3455 | 0.5182 | 0.6909 | 0.8636 | 1.0361 | — | 0.0000 | 0.5190 | — | 0.0000 |
| Sn + Ce | 0.4767 | 0.5088 | 0.5489 | 0.6289 | 0.7090 | 0.7893 | 0.8688 | 0.9480 | 0.0000 | 0.1957 | 0.0120 | 0.0160 | 0.7779 |
| Si + Al | 37.9412 | 37.9262 | 37.9074 | 37.8699 | 37.8504 | 37.8046 | 37.7673 | 37.7301 | 37.9899 | 38.0290 | 38.1828 | 38.1809 | 37.8050 |
| Rank on bubbles | C | C | B | B | B | B | B | B | G | G | G | G | G |

TABLE 7

| | Component | 7-1 | 7-2 | 7-3 | 7-4 | 7-5 | 7-6 | 7-7 | 7-8 | 7-9 | 7-10 | 7-11 | 7-12 | 7-13 |
|---|---|---|---|---|---|---|---|---|---|---|---|---|---|---|
| (mol %) | SiO2 | 65.5 | 65.5 | 65.5 | 65.5 | 65.5 | 65.5 | 65.5 | 65.5 | 65.5 | 65.5 | 65.5 | 65.5 | 65.5 |
| | Al2O3 | 8.6 | 8.6 | 8.6 | 8.6 | 8.6 | 8.6 | 8.6 | 8.6 | 8.6 | 8.6 | 8.6 | 8.6 | 8.6 |
| | Li2O | 12.5 | 12.5 | 12.5 | 12.5 | 12.5 | 12.5 | 12.5 | 12.5 | 12.5 | 12.5 | 12.5 | 12.5 | 12.5 |
| | Na2O | 10.4 | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 3.0 | 3.0 | 3.0 | 3.0 | 3.0 | 3.0 | 3.0 | 3.0 | 3.0 | 3.0 | 3.0 | 3.0 | 3.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.1 | 0.1 | 0.1 | 0.1 | 0.1 | 0.1 | 0.2 | 0.2 | 0.2 | 0.2 | 0.2 | 0.2 | 0.2 |
| | CeO2 | 0 | 0.001 | 0.005 | 0.01 | 0.05 | 0.1 | 0 | 0.001 | 0.005 | 0.01 | 0.05 | 0.1 | 0.2 |
| | Sb2O3 | 0 | 0 | 0 | 0 | 0 | 0 | 0 | 0 | 0 | 0 | 0 | 0 | 0 |
| | CeO2/SnO2 | 0.0000 | 0.0100 | 0.0500 | 0.1000 | 0.5000 | 1.0000 | 0.0000 | 0.0050 | 0.0250 | 0.0500 | 0.2500 | 0.5000 | 1.0000 |
| | SnO2 + CeO2 | 0.1 | 0.101 | 0.105 | 0.11 | 0.15 | 0.2 | 0.2 | 0.201 | 0.205 | 0.21 | 0.25 | 0.3 | 0.4 |
| (mol %) | Li2O + Na2O + K2O | 22.9 | 22.9 | 22.9 | 22.9 | 22.9 | 22.9 | 22.9 | 22.9 | 22.9 | 22.9 | 22.9 | 22.9 | 22.9 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 74.1 | 74.1 | 74.1 | 74.1 | 74.1 | 74.1 | 74.1 | 74.1 | 74.1 | 74.1 | 74.1 | 74.1 | 74.1 |
| | Rank on bubbles | D | C | B | B | B | B | D | B | A | A | A | A | A |
| | Acid etching rate (nm/min) | 3.9 | 3.9 | 3.9 | 3.9 | 3.9 | 3.9 | 3.9 | 3.9 | 3.9 | 3.9 | 3.9 | 3.9 | 3.9 |
| | Alkaline etching rate (nm/min) | 0.01 | 0.01 | 0.01 | 0.01 | 0.01 | 0.01 | 0.01 | 0.01 | 0.01 | 0.01 | 0.01 | 0.01 | 0.01 |

| | Component | 7-14 | 7-15 | 7-16 | 7-17 | 7-18 | 7-19 | 7-20 | 7-21 | 7-22 | 7-23 | 7-24 | 7-25 | 7-26 |
|---|---|---|---|---|---|---|---|---|---|---|---|---|---|---|
| (mol %) | SiO2 | 65.5 | 65.5 | 65.5 | 65.5 | 65.5 | 65.5 | 65.5 | 65.5 | 65.5 | 65.5 | 65.5 | 65.5 | 65.5 |
| | Al2O3 | 8.6 | 8.6 | 8.6 | 8.6 | 8.6 | 8.6 | 8.6 | 8.6 | 8.6 | 8.6 | 8.6 | 8.6 | 8.6 |
| | Li2O | 12.5 | 12.5 | 12.5 | 12.5 | 12.5 | 12.5 | 12.5 | 12.5 | 12.5 | 12.5 | 12.5 | 12.5 | 12.5 |
| | Na2O | 10.4 | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 3.0 | 3.0 | 3.0 | 3.0 | 3.0 | 3.0 | 3.0 | 3.0 | 3.0 | 3.0 | 3.0 | 3.0 | 3.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |

TABLE 7-continued

| | | | | | | | | | | | | | | |
|---|---|---|---|---|---|---|---|---|---|---|---|---|---|---|
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.25 | 0.25 | 0.25 | 0.25 | 0.25 | 0.25 | 0.25 | 0.25 | 0.3 | 0.3 | 0.3 | 0.3 | 0.3 |
| components | CeO2 | 0 | 0.001 | 0.005 | 0.01 | 0.05 | 0.1 | 0.2 | 0.25 | 0 | 0.001 | 0.005 | 0.01 | 0.05 |
| (mass %) | Sb2O3 | 0 | 0 | 0 | 0 | 0 | 0 | 0 | 0 | 0 | 0 | 0 | 0 | 0 |
| | CeO2/SnO2 | 0.0000 | 0.0040 | 0.0200 | 0.0400 | 0.2000 | 0.4000 | 0.8000 | 1.0000 | 0.0000 | 0.0033 | 0.0167 | 0.0333 | 0.1667 |
| | SnO2 + CeO2 | 0.25 | 0.251 | 0.255 | 0.26 | 0.3 | 0.35 | 0.45 | 0.5 | 0.3 | 0.301 | 0.305 | 0.31 | 0.35 |
| (mol %) | Li2O + Na2O + K2O | 22.9 | 22.9 | 22.9 | 22.9 | 22.9 | 22.9 | 22.9 | 22.9 | 22.9 | 22.9 | 22.9 | 22.9 | 22.9 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 74.1 | 74.1 | 74.1 | 74.1 | 74.1 | 74.1 | 74.1 | 74.1 | 74.1 | 74.1 | 74.1 | 74.1 | 74.1 |
| | Rank on bubbles | D | B | A | A | A | A | A | A | D | B | A | A | A |
| | Acid etching rate (nm/min) | 3.9 | 3.9 | 3.9 | 3.9 | 3.9 | 3.9 | 3.9 | 3.9 | 3.9 | 3.9 | 3.9 | 3.9 | 3.9 |
| | Alkaline etching rate (nm/min) | 0.01 | 0.01 | 0.01 | 0.01 | 0.01 | 0.01 | 0.01 | 0.01 | 0.01 | 0.01 | 0.01 | 0.01 | 0.01 |
| | Component | 7-27 | 7-28 | 7-29 | 7-30 | 7-31 | 7-32 | 7-33 | 7-34 | 7-35 | 7-36 | 7-37 | 7-38 | 7-39 |
| (mol %) | SiO2 | 65.5 | 65.5 | 65.5 | 65.5 | 65.5 | 65.5 | 65.5 | 65.5 | 65.5 | 65.5 | 65.5 | 65.5 | 65.5 |
| | Al2O3 | 8.6 | 8.6 | 8.6 | 8.6 | 8.6 | 8.6 | 8.6 | 8.6 | 8.6 | 8.6 | 8.6 | 8.6 | 8.6 |
| | Li2O | 12.5 | 12.5 | 12.5 | 12.5 | 12.5 | 12.5 | 12.5 | 12.5 | 12.5 | 12.5 | 12.5 | 12.5 | 12.5 |
| | Na2O | 10.4 | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 3.0 | 3.0 | 3.0 | 3.0 | 3.0 | 3.0 | 3.0 | 3.0 | 3.0 | 3.0 | 3.0 | 3.0 | 3.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass | SnO2 | 0.3 | 0.3 | 0.3 | 0.4 | 0.4 | 0.4 | 0.4 | 0.4 | 0.4 | 0.4 | 0.4 | 0.4 | 0.5 |
| components | CeO2 | 0.1 | 0.2 | 0.3 | 0 | 0.001 | 0.005 | 0.01 | 0.05 | 0.1 | 0.2 | 0.3 | 0.4 | 0 |
| (mass %) | Sb2O3 | 0 | 0 | 0 | 0 | 0 | 0 | 0 | 0 | 0 | 0 | 0 | 0 | 0 |
| | CeO2/SnO2 | 0.3333 | 0.6667 | 1.0000 | 0.0000 | 0.0025 | 0.0125 | 0.0250 | 0.1250 | 0.2500 | 0.5000 | 0.7500 | 1.0000 | 0.0000 |
| | SnO2 + CeO2 | 0.4 | 0.5 | 0.6 | 0.4 | 0.401 | 0.405 | 0.41 | 0.45 | 0.5 | 0.6 | 0.7 | 0.8 | 0.5 |
| (mol %) | Li2O + Na2O + K2O | 22.9 | 22.9 | 22.9 | 22.9 | 22.9 | 22.9 | 22.9 | 22.9 | 22.9 | 22.9 | 22.9 | 22.9 | 22.9 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 74.1 | 74.1 | 74.1 | 74.1 | 74.1 | 74.1 | 74.1 | 74.1 | 74.1 | 74.1 | 74.1 | 74.1 | 74.1 |
| | Rank on bubbles | A | A | A | D | B | B | A | A | A | A | A | A | E |
| | Acid etching rate (nm/min) | 3.9 | 3.9 | 3.9 | 3.9 | 3.9 | 3.9 | 3.9 | 3.9 | 3.9 | 3.9 | 3.9 | 3.9 | 3.9 |
| | Alkaline etching rate (nm/min) | 0.01 | 0.01 | 0.01 | 0.01 | 0.01 | 0.01 | 0.01 | 0.01 | 0.01 | 0.01 | 0.01 | 0.01 | 0.01 |
| | Component | 7-40 | 7-41 | 7-42 | 7-43 | 7-44 | 7-45 | 7-46 | 7-47 | 7-48 | 7-49 | 7-50 | 7-51 | 7-52 |
| (mol %) | SiO2 | 65.5 | 65.5 | 65.5 | 65.5 | 65.5 | 65.5 | 65.5 | 65.5 | 65.5 | 65.5 | 65.5 | 65.5 | 65.5 |
| | Al2O3 | 8.6 | 8.6 | 8.6 | 8.6 | 8.6 | 8.6 | 8.6 | 8.6 | 8.6 | 8.6 | 8.6 | 8.6 | 8.6 |
| | Li2O | 12.5 | 12.5 | 12.5 | 12.5 | 12.5 | 12.5 | 12.5 | 12.5 | 12.5 | 12.5 | 12.5 | 12.5 | 12.5 |

TABLE 7-continued

| | | | | | | | | | | | | | | |
|---|---|---|---|---|---|---|---|---|---|---|---|---|---|---|
| | Na2O | 10.4 | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 | 3.0 | 3.0 | 3.0 | 3.0 | 3.0 | 3.0 | 3.0 | 3.0 | 3.0 | 3.0 | 3.0 | 3.0 | 3.0 |
| | TiO2 | 0.0 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.5 | 0.5 | 0.5 | 0.5 | 0.5 | 0.5 | 0.5 | 0.5 | 0.5 | 0.6 | 0.6 | 0.6 | 0.6 |
| | CeO2 | 0.001 | 0.005 | 0.01 | 0.05 | 0.1 | 0.2 | 0.3 | 0.4 | 0.5 | 0 | 0.001 | 0.005 | 0.01 |
| | Sb2O3 | 0 | 0 | 0 | 0 | 0 | 0 | 0 | 0 | 0 | 0 | 0 | 0 | 0 |
| | CeO2/SnO2 | 0.0020 | 0.0100 | 0.0200 | 0.1000 | 0.2000 | 0.4000 | 0.6000 | 0.8000 | 1.0000 | 0.0000 | 0.0017 | 0.0083 | 0.0167 |
| | SnO2 + CeO2 | 0.501 | 0.505 | 0.51 | 0.55 | 0.6 | 0.7 | 0.8 | 0.9 | 1 | 0.6 | 0.601 | 0.605 | 0.61 |
| (mol %) | Li2O + Na2O + K2O | 22.9 | 22.9 | 22.9 | 22.9 | 22.9 | 22.9 | 22.9 | 22.9 | 22.9 | 22.9 | 22.9 | 22.9 | 22.9 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 74.1 | 74.1 | 74.1 | 74.1 | 74.1 | 74.1 | 74.1 | 74.1 | 74.1 | 74.1 | 74.1 | 74.1 | 74.1 |
| | Rank on bubbles | C | C | B | B | A | A | A | A | A | E | C | C | C |
| | Acid etching rate (nm/min) | 3.9 | 3.9 | 3.9 | 3.9 | 3.9 | 3.9 | 3.9 | 3.9 | 3.9 | 3.9 | 3.9 | 3.9 | 3.9 |
| | Alkaline etching rate (nm/min) | 0.01 | 0.01 | 0.01 | 0.01 | 0.01 | 0.01 | 0.01 | 0.01 | 0.01 | 0.01 | 0.01 | 0.01 | 0.01 |

| | Component | 7-53 | 7-54 | 7-55 | 7-56 | 7-57 | 7-58 | 7-59 | Com. Ex. 7-1 | Com. Ex. 7-2 | Com. Ex. 7-3 | Com. Ex. 7-4 | Com. Ex. 7-5 |
|---|---|---|---|---|---|---|---|---|---|---|---|---|---|
| (mol %) | SiO2 | 65.5 | 65.5 | 65.5 | 65.5 | 65.5 | 65.5 | 65.5 | 65.5 | 65.5 | 65.5 | 65.5 | 65.5 |
| | Al2O3 | 8.6 | 8.6 | 8.6 | 8.6 | 8.6 | 8.6 | 8.6 | 8.6 | 8.6 | 8.6 | 8.6 | 8.6 |
| | Li2O | 12.5 | 12.5 | 12.5 | 12.5 | 12.5 | 12.5 | 12.5 | 12.5 | 12.5 | 12.5 | 12.5 | 12.5 |
| | Na2O | 10.4 | 10.4 | 10.4 | 10.4 | 10.4 | 10.4 | 10.4 | 10.4 | 10.4 | 10.4 | 10.4 | 10.4 |
| | K2O | 0.0 | 0.0 | 0.0 | 0.0 | 0.0 | 0.0 | 0.0 | 0.0 | 0.0 | 0.0 | 0.0 | 0.0 |
| | MgO | 0.0 | 0.0 | 0.0 | 0.0 | 0.0 | 0.0 | 0.0 | 0.0 | 0.0 | 0.0 | 0.0 | 0.0 |
| | CaO | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZrO2 | 3.0 | 3.0 | 3.0 | 3.0 | 3.0 | 3.0 | 3.0 | 3.0 | 3.0 | 3.0 | 3.0 | 3.0 |
| | TiO2 | 0.0 | 0.0 | 0.0 | 0.0 | 0.0 | 0.0 | 0.0 | 0.0 | 0.0 | 0.0 | 0.0 | 0.0 |
| | La2O3 | 0.0 | 0.0 | 0.0 | 0.0 | 0.0 | 0.0 | 0.0 | 0.0 | 0.0 | 0.0 | 0.0 | 0.0 |
| | Nb2O5 | 0.0 | 0.0 | 0.0 | 0.0 | 0.0 | 0.0 | 0.0 | 0.0 | 0.0 | 0.0 | 0.0 | 0.0 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.6 | 0.6 | 0.6 | 0.6 | 0.6 | 0.6 | 0.6 | 0 | 0.25 | 1 | 0 | 1 |
| | CeO2 | 0.05 | 0.1 | 0.2 | 0.3 | 0.4 | 0.5 | 0.6 | 0 | 0 | 0 | 1 | 1 |
| | Sb2O3 | 0 | 0 | 0 | 0 | 0 | 0 | 0 | 0.5 | 0.15 | 0 | 0 | 0 |
| | CeO2/SnO2 | 0.0833 | 0.1667 | 0.3333 | 0.5000 | 0.6667 | 0.8333 | 1.0000 | — | 0.0000 | 0.0000 | — | 1.0000 |
| | SnO2 + CeO2 | 0.65 | 0.7 | 0.8 | 0.9 | 1 | 1.1 | 1.2 | 0 | 0.25 | 1 | 1 | 2 |

TABLE 7-continued

| | | | | | | | | | | | | | |
|---|---|---|---|---|---|---|---|---|---|---|---|---|---|
| (mol %) | Li2O + Na2O + K2O | 22.9 | 22.9 | 22.9 | 22.9 | 22.9 | 22.9 | 22.9 | 22.9 | 22.9 | 22.9 | 22.9 | 22.9 |
| | MgO + CaO + SrO + BaO | 0.0 | 0.0 | 0.0 | 0.0 | 0.0 | 0.0 | 0.0 | 0.0 | 0.0 | 0.0 | 0.0 | 0.0 |
| | ZrO2 + TiO2 + La2O3 + Nb2O5 + Ta2O5 + HfO2 | 3.0 | 3.0 | 3.0 | 3.0 | 3.0 | 3.0 | 3.0 | 3.0 | 3.0 | 3.0 | 3.0 | 3.0 |
| | SiO2 + Al2O3 | 74.1 | 74.1 | 74.1 | 74.1 | 74.1 | 74.1 | 74.1 | 74.1 | 74.1 | 74.1 | 74.1 | 74.1 |
| | Rank on bubbles | C | B | B | B | B | B | B | G | G | G | G | G |
| | Acid etching rate (nm/min) | 3.9 | 3.9 | 3.9 | 3.9 | 3.9 | 3.9 | 3.9 | 3.9 | 3.9 | 3.9 | 3.9 | 3.9 |
| | Alkaline etching rate (nm/min) | 0.01 | 0.01 | 0.01 | 0.01 | 0.01 | 0.01 | 0.01 | 0.01 | 0.01 | 0.01 | 0.01 | 0.01 |

| Component (mass %) | 7-1 | 7-2 | 7-3 | 7-4 | 7-5 | 7-6 | 7-7 | 7-8 | 7-9 | 7-10 | 7-11 | 7-12 | 7-13 |
|---|---|---|---|---|---|---|---|---|---|---|---|---|---|
| Si | 30.5534 | 30.5531 | 30.5519 | 30.5504 | 30.5382 | 30.5230 | 30.5231 | 30.5228 | 30.5215 | 30.5200 | 30.5078 | 30.4927 | 30.4449 |
| Al | 4.5232 | 4.5231 | 4.5229 | 4.5227 | 4.5209 | 4.5187 | 4.5187 | 4.5186 | 4.5184 | 4.5182 | 4.5164 | 4.5142 | 4.5145 |
| Li | 5.8179 | 5.8179 | 5.8176 | 5.8173 | 5.8150 | 5.8120 | 5.8120 | 5.8120 | 5.8118 | 5.8116 | 5.8092 | 5.8064 | 5.8068 |
| Na | 7.7080 | 7.7079 | 7.7076 | 7.7072 | 7.7041 | 7.7003 | 7.7003 | 7.7002 | 7.6999 | 7.6995 | 7.6965 | 7.6926 | 7.6932 |
| K | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 2.2776 | 2.2776 | 2.2775 | 2.2774 | 2.2765 | 2.2754 | 2.2754 | 2.2754 | 2.2753 | 2.2751 | 2.2742 | 2.2731 | 2.2733 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.0785 | 0.0785 | 0.0785 | 0.0785 | 0.0784 | 0.0784 | 0.1568 | 0.1568 | 0.1567 | 0.1567 | 0.1567 | 0.1565 | 0.1565 |
| Ce | 0.0000 | 0.0008 | 0.0041 | 0.0081 | 0.0406 | 0.0812 | 0.0000 | 0.0008 | 0.0041 | 0.0081 | 0.0406 | 0.0811 | 0.1622 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 49.0414 | 49.0411 | 49.0399 | 49.0384 | 49.0263 | 49.0110 | 49.0137 | 49.0134 | 49.0123 | 49.0108 | 48.9986 | 48.9834 | 48.9486 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 13.5259 | 13.5258 | 13.5252 | 13.5245 | 13.5191 | 13.5123 | 13.5123 | 13.5122 | 13.5117 | 13.5111 | 13.5057 | 13.4990 | 13.5000 |
| Mg + Ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 2.2776 | 2.2776 | 2.2775 | 2.2774 | 2.2765 | 2.2754 | 2.2754 | 2.2754 | 2.2753 | 2.2751 | 2.2742 | 2.2731 | 2.2733 |
| Ce/Sn | 0.0000 | 0.0102 | 0.0522 | 0.1032 | 0.5179 | 1.0357 | 0.0000 | 0.0051 | 0.0262 | 0.0517 | 0.2591 | 0.5182 | 1.0364 |
| Sn + Ce | 0.0785 | 0.0793 | 0.0826 | 0.0866 | 0.1190 | 0.1596 | 0.1568 | 0.1576 | 0.1608 | 0.1648 | 0.1973 | 0.2376 | 0.3187 |
| Si + Al | 35.0766 | 35.0762 | 35.0748 | 35.0731 | 35.0591 | 35.0417 | 35.0418 | 35.0414 | 35.0399 | 35.0382 | 35.0242 | 35.0069 | 34.9594 |
| Rank on bubbles | D | C | B | B | B | B | D | B | A | A | A | A | A |
| Acid etching rate (nm/min) | 3.9 | 3.9 | 3.9 | 3.9 | 3.9 | 3.9 | 3.9 | 3.9 | 3.9 | 3.9 | 3.9 | 3.9 | 3.9 |
| Alkaline etching rate (nm/min) | 0.01 | 0.01 | 0.01 | 0.01 | 0.01 | 0.01 | 0.01 | 0.01 | 0.01 | 0.01 | 0.01 | 0.01 | 0.01 |

| Component (mass %) | 7-14 | 7-15 | 7-16 | 7-17 | 7-18 | 7-19 | 7-20 | 7-21 | 7-22 | 7-23 | 7-24 | 7-25 | 7-26 | 7-27 |
|---|---|---|---|---|---|---|---|---|---|---|---|---|---|---|
| Si | 30.5079 | 30.5076 | 30.5064 | 30.5049 | 30.4927 | 30.4775 | 30.4299 | 30.4309 | 30.4927 | 30.4924 | 30.4912 | 30.4897 | 30.4776 | 30.4450 |
| Al | 4.5164 | 4.5164 | 4.5162 | 4.5160 | 4.5142 | 4.5119 | 4.5123 | 4.5124 | 4.5142 | 4.5141 | 4.5140 | 4.5137 | 4.5119 | 4.5145 |
| Li | 5.8093 | 5.8092 | 5.8090 | 5.8087 | 5.8064 | 5.8035 | 5.8039 | 5.7794 | 5.8064 | 5.8063 | 5.8061 | 5.8058 | 5.8035 | 5.8068 |
| Na | 7.6965 | 7.6964 | 7.6961 | 7.6957 | 7.6927 | 7.6888 | 7.6894 | 7.6897 | 7.6927 | 7.6926 | 7.6923 | 7.6919 | 7.6888 | 7.6932 |
| K | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |

TABLE 7-continued

| | | | | | | | | | | | | | | |
|---|---|---|---|---|---|---|---|---|---|---|---|---|---|---|
| Zr | 2.2742 | 2.2742 | 2.2741 | 2.2740 | 2.2731 | 2.2720 | 2.2722 | 2.2722 | 2.2731 | 2.2731 | 2.2730 | 2.2729 | 2.2720 | 2.2733 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.1958 | 0.1958 | 0.1958 | 0.1958 | 0.1957 | 0.1956 | 0.1955 | 0.1955 | 0.2348 | 0.2348 | 0.2348 | 0.2348 | 0.2347 | 0.2348 |
| Ce | 0.0000 | 0.0008 | 0.0040 | 0.0080 | 0.0406 | 0.0811 | 0.1620 | 0.2026 | 0.0000 | 0.0008 | 0.0040 | 0.0081 | 0.0405 | 0.0811 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.9999 | 48.9996 | 48.9984 | 48.9969 | 48.9846 | 48.9696 | 48.9348 | 48.9173 | 48.9861 | 48.9859 | 48.9846 | 48.9831 | 48.9710 | 48.9513 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 13.5058 | 13.5056 | 13.5051 | 13.5044 | 13.4991 | 13.4923 | 13.4933 | 13.4691 | 13.4991 | 13.4989 | 13.4984 | 13.4977 | 13.4923 | 13.5000 |
| Mg + Ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 2.2742 | 2.2742 | 2.2741 | 2.2740 | 2.2731 | 2.2720 | 2.2722 | 2.2722 | 2.2731 | 2.2731 | 2.2730 | 2.2729 | 2.2720 | 2.2733 |
| Ce/Sn | 0.0000 | 0.0041 | 0.0204 | 0.0409 | 0.2075 | 0.4146 | 0.8286 | 1.0363 | 0.0000 | 0.0034 | 0.0170 | 0.0345 | 0.1726 | 0.3454 |
| Sn + Ce | 0.1958 | 0.1966 | 0.1998 | 0.2038 | 0.2363 | 0.2767 | 0.3575 | 0.3981 | 0.2348 | 0.2356 | 0.2388 | 0.2429 | 0.2752 | 0.3159 |
| Si + Al | 35.0243 | 35.0240 | 35.0226 | 35.0209 | 35.0069 | 34.9894 | 34.9422 | 34.9433 | 35.0069 | 35.0065 | 35.0052 | 35.0034 | 34.9895 | 34.9595 |
| Rank on bubbles | D | B | A | A | A | A | A | A | D | B | A | A | A | A |
| Acid etching rate (nm/min) | 3.9 | 3.9 | 3.9 | 3.9 | 3.9 | 3.9 | 3.9 | 3.9 | 3.9 | 3.9 | 3.9 | 3.9 | 3.9 | 3.9 |
| Alkaline etching rate (nm/min) | 0.01 | 0.01 | 0.01 | 0.01 | 0.01 | 0.01 | 0.01 | 0.01 | 0.01 | 0.01 | 0.01 | 0.01 | 0.01 | 0.01 |

| Component (mass %) | 7-28 | 7-29 | 7-30 | 7-31 | 7-32 | 7-33 | 7-34 | 7-35 | 7-36 | 7-37 | 7-38 | 7-39 | 7-40 | 7-41 |
|---|---|---|---|---|---|---|---|---|---|---|---|---|---|---|
| Si | 30.4310 | 30.4008 | 30.4451 | 30.4448 | 30.4436 | 30.4421 | 30.4300 | 30.4310 | 30.4008 | 30.3707 | 30.3407 | 30.4311 | 30.4308 | 30.4296 |
| Al | 4.5124 | 4.5080 | 4.5145 | 4.5145 | 4.5143 | 4.5141 | 4.5123 | 4.5124 | 4.5080 | 4.5035 | 4.4990 | 4.5125 | 4.5124 | 4.5122 |
| Li | 5.7794 | 5.7737 | 5.8068 | 5.8068 | 5.8065 | 5.8062 | 5.8039 | 5.7794 | 5.7737 | 5.7680 | 5.7623 | 5.7794 | 5.7794 | 5.7792 |
| Na | 7.6897 | 7.6821 | 7.6933 | 7.6932 | 7.6929 | 7.6925 | 7.6894 | 7.6897 | 7.6821 | 7.6745 | 7.6669 | 7.6897 | 7.6897 | 7.6893 |
| K | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 2.2722 | 2.2700 | 2.2733 | 2.2733 | 2.2732 | 2.2731 | 2.2722 | 2.2722 | 2.2700 | 2.2677 | 2.2655 | 2.2722 | 2.2722 | 2.2721 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.2346 | 0.2343 | 0.3130 | 0.3130 | 0.3130 | 0.3129 | 0.3128 | 0.3127 | 0.3123 | 0.3119 | 0.3115 | 0.3909 | 0.3909 | 0.3909 |
| Ce | 0.1620 | 0.2427 | 0.0000 | 0.0008 | 0.0041 | 0.0081 | 0.0405 | 0.0810 | 0.1618 | 0.2424 | 0.3228 | 0.0000 | 0.0008 | 0.0041 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.9187 | 48.8884 | 48.9540 | 48.9536 | 48.9524 | 48.9510 | 48.9389 | 48.9216 | 48.8913 | 48.8613 | 48.8313 | 48.9242 | 48.9238 | 48.9226 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 13.4691 | 13.4558 | 13.5001 | 13.5000 | 13.4994 | 13.4987 | 13.4933 | 13.4691 | 13.4558 | 13.4425 | 13.4292 | 13.4691 | 13.4691 | 13.4685 |
| Mg + Ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 2.2722 | 2.2700 | 2.2733 | 2.2733 | 2.2732 | 2.2731 | 2.2722 | 2.2722 | 2.2700 | 2.2677 | 2.2655 | 2.2722 | 2.2722 | 2.2721 |
| Ce/Sn | 0.6905 | 1.0359 | 0.0000 | 0.0026 | 0.0131 | 0.0259 | 0.1295 | 0.2590 | 0.5181 | 0.7772 | 1.0363 | 0.0000 | 0.0020 | 0.0105 |
| Sn + Ce | 0.3966 | 0.4770 | 0.3130 | 0.3138 | 0.3171 | 0.3210 | 0.3533 | 0.3937 | 0.4741 | 0.5543 | 0.6343 | 0.3909 | 0.3917 | 0.3950 |
| Si + Al | 34.9434 | 34.9088 | 34.9596 | 34.9593 | 34.9579 | 34.9562 | 34.9423 | 34.9434 | 34.9088 | 34.8742 | 34.8397 | 34.9436 | 34.9432 | 34.9418 |
| Rank on bubbles | A | A | D | B | B | A | A | A | A | A | A | E | C | C |
| Acid etching rate (nm/min) | 3.9 | 3.9 | 3.9 | 3.9 | 3.9 | 3.9 | 3.9 | 3.9 | 3.9 | 3.9 | 3.9 | 3.9 | 3.9 | 3.9 |

TABLE 7-continued

| Alkaline etching rate (nm/min) | 0.01 | 0.01 | 0.01 | 0.01 | 0.01 | 0.01 | 0.01 | 0.01 | 0.01 | 0.01 | 0.01 | 0.01 | 0.01 | 0.01 |
|---|---|---|---|---|---|---|---|---|---|---|---|---|---|---|
| Component (mass %) | 7-42 | 7-43 | 7-44 | 7-45 | 7-46 | 7-47 | 7-48 | 7-49 | 7-50 | 7-51 | 7-52 | 7-53 | 7-54 | 7-55 |
| Si | 30.4281 | 30.4160 | 30.4009 | 30.3708 | 30.3408 | 30.2933 | 30.2634 | 30.4010 | 30.4007 | 30.3995 | 30.3980 | 30.3859 | 30.3709 | 30.3409 |
| Al | 4.5120 | 4.5102 | 4.5080 | 4.5035 | 4.4991 | 4.4994 | 4.4950 | 4.5080 | 4.5079 | 4.5078 | 4.5075 | 4.5058 | 4.5035 | 4.4991 |
| Li | 5.7789 | 5.7766 | 5.7737 | 5.7680 | 5.7623 | 5.7627 | 5.7571 | 5.7737 | 5.7737 | 5.7734 | 5.7732 | 5.7709 | 5.7680 | 5.7623 |
| Na | 7.6890 | 7.6859 | 7.6821 | 7.6745 | 7.6669 | 7.6675 | 7.6599 | 7.6821 | 7.6820 | 7.6817 | 7.6814 | 7.6783 | 7.6745 | 7.6669 |
| K | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr | 2.2720 | 2.2711 | 2.2700 | 2.2677 | 2.2655 | 2.2657 | 2.2634 | 2.2700 | 2.2700 | 2.2699 | 2.2698 | 2.2689 | 2.2678 | 2.2655 |
| Ti | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.3909 | 0.3907 | 0.3904 | 0.3899 | 0.3894 | 0.3893 | 0.3888 | 0.4685 | 0.4685 | 0.4684 | 0.4684 | 0.4682 | 0.4678 | 0.4672 |
| Ce | 0.0081 | 0.0405 | 0.0809 | 0.1616 | 0.2420 | 0.3227 | 0.4028 | 0.0000 | 0.0008 | 0.0040 | 0.0081 | 0.0404 | 0.0808 | 0.1614 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 48.9210 | 48.9090 | 48.8940 | 48.8640 | 48.8340 | 48.7994 | 48.7696 | 48.8967 | 48.8964 | 48.8953 | 48.8936 | 48.8816 | 48.8667 | 48.8367 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 13.4679 | 13.4625 | 13.4558 | 13.4425 | 13.4292 | 13.4302 | 13.4170 | 13.4558 | 13.4557 | 13.4551 | 13.4546 | 13.4492 | 13.4425 | 13.4292 |
| Mg + Ca + Sr + Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zr + Ti + La + Nb + Ta + Hf | 2.2720 | 2.2711 | 2.2700 | 2.2677 | 2.2655 | 2.2657 | 2.2634 | 2.2700 | 2.2700 | 2.2699 | 2.2698 | 2.2689 | 2.2678 | 2.2655 |
| Ce/Sn | 0.0207 | 0.1037 | 0.2072 | 0.4145 | 0.6215 | 0.8289 | 1.0360 | 0.0000 | 0.0017 | 0.0085 | 0.0173 | 0.0863 | 0.1727 | 0.3455 |
| Sn + Ce | 0.3990 | 0.4312 | 0.4713 | 0.5515 | 0.6314 | 0.7120 | 0.7916 | 0.4685 | 0.4693 | 0.4724 | 0.4765 | 0.5086 | 0.5486 | 0.6286 |
| Si + Al | 34.9401 | 34.9262 | 34.9089 | 34.8743 | 34.8399 | 34.7927 | 34.7584 | 34.9090 | 34.9086 | 34.9073 | 34.9055 | 34.8917 | 34.8744 | 34.8400 |
| Rank or bubbles | B | B | A | A | A | A | A | E | C | C | C | C | B | B |
| Acid etching rate (nm/min) | 3.9 | 3.9 | 3.9 | 3.9 | 3.9 | 3.9 | 3.9 | 3.9 | 3.9 | 3.9 | 3.9 | 3.9 | 3.9 | 3.9 |
| Alkaline etching rate (nm/min) | 0.01 | 0.01 | 0.01 | 0.01 | 0.01 | 0.01 | 0.01 | 0.01 | 0.01 | 0.01 | 0.01 | 0.01 | 0.01 | 0.01 |

TABLE 8

| Component (mass %) | 7-56 | 7-57 | 7-58 | 7-59 | Com. Ex. 7-1 | Com. Ex. 7-2 | Com. Ex. 7-3 | Com. Ex. 7-4 | Com. Ex. 7-5 |
|---|---|---|---|---|---|---|---|---|---|
| Si | 30.2934 | 30.2635 | 30.2337 | 30.2040 | 30.4319 | 30.4621 | 30.2829 | 30.2820 | 29.9692 |
| Al | 4.4994 | 4.4950 | 4.4906 | 4.4861 | 4.5052 | 4.5096 | 4.4831 | 4.4830 | 4.4513 |
| Li | 5.7628 | 5.7571 | 5.7514 | 5.7457 | 5.7948 | 5.8005 | 5.7664 | 5.7662 | 5.7011 |
| Na | 7.6675 | 7.6599 | 7.6524 | 7.6449 | 7.6773 | 7.6849 | 7.6397 | 7.6395 | 7.5855 |
| K | 0.0000 | 0.0000 | 0.0000 | 0.0000 | 0.0000 | 0.0000 | 0.0000 | 0.0000 | 0.0000 |
| Mg | 0.0000 | 0.0000 | 0.0000 | 0.0000 | 0.0000 | 0.0000 | 0.0000 | 0.0000 | 0.0000 |
| Ca | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 |
| Zr | 2.2657 | 2.2634 | 2.2612 | 2.2590 | 2.2686 | 2.2708 | 2.2575 | 2.2574 | 2.2414 |
| Ti | 0.0000 | 0.0000 | 0.0000 | 0.0000 | 0.0000 | 0.0000 | 0.0000 | 0.0000 | 0.0000 |
| La | 0.0000 | 0.0000 | 0.0000 | 0.0000 | 0.0000 | 0.0000 | 0.0000 | 0.0000 | 0.0000 |
| Nb | 0.0000 | 0.0000 | 0.0000 | 0.0000 | 0.0000 | 0.0000 | 0.0000 | 0.0000 | 0.0000 |
| Ta | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 |
| Sn | 0.4671 | 0.4665 | 0.4659 | 0.4653 | 0.0000 | 0.1955 | 0.7753 | 0.0000 | 0.7673 |
| Ce | 0.2420 | 0.3223 | 0.4023 | 0.4821 | 0.0000 | 0.0000 | 0.0000 | 0.8037 | 0.7951 |
| Sb | 0.0000 | 0.0000 | 0.0000 | 0.0000 | 0.4152 | 0.1256 | 0.0000 | 0.0000 | 0.0000 |
| O | 48.8021 | 48.7723 | 48.7425 | 48.7129 | 48.9070 | 48.9510 | 48.7951 | 48.7682 | 48.4891 |
| Total | 100.0000 | 100.0000 | 100.0000 | 100.0000 | 100.0000 | 100.0000 | 100.0000 | 100.0000 | 100.0000 |
| Li + Na + K | 13.4303 | 13.4170 | 13.4038 | 13.3906 | 13.4721 | 13.4854 | 13.4061 | 13.4057 | 13.2866 |
| Mg + Ca + Sr + Ba | 0.0000 | 0.0000 | 0.0000 | 0.0000 | 0.0000 | 0.0000 | 0.0000 | 0.0000 | 0.0000 |
| Zr + Ti + La + Nb + Ta + Hf | 2.2657 | 2.2634 | 2.2612 | 2.2590 | 2.2686 | 2.2708 | 2.2575 | 2.2574 | 2.2414 |
| Ce/Sn | 0.5181 | 0.6909 | 0.8635 | 1.0361 | — | 0.0000 | 0.0000 | — | 1.0362 |
| Sn + Ce | 0.7091 | 0.7888 | 0.8682 | 0.9474 | 0.0000 | 0.1955 | 0.7753 | 0.8037 | 1.5624 |
| Si + Al | 34.7928 | 34.7585 | 34.7243 | 34.6901 | 34.9371 | 34.9717 | 34.7660 | 34.7650 | 34.4205 |
| Rank on bubbles | B | B | B | B | G | G | G | G | G |
| Acid etching rate (nm/min) | 3.9 | 3.9 | 3.9 | 3.9 | 3.9 | 3.9 | 3.9 | 3.9 | 3.9 |
| Alkaline etching rate (nm/min) | 0.01 | 0.01 | 0.01 | 0.01 | 0.01 | 0.01 | 0.01 | 0.01 | 0.01 |

| | Component | 8-1 | 8-2 | 8-3 | 8-4 | 8-5 | 8-6 | 8-7 | 8-8 | 8-9 | 8-10 | 8-11 | 8-12 | 8-13 |
|---|---|---|---|---|---|---|---|---|---|---|---|---|---|---|
| (mol %) | SiO2 | 64.8 | 64.8 | 64.8 | 64.8 | 64.8 | 64.8 | 64.8 | 64.8 | 64.8 | 64.8 | 64.8 | 64.8 | 64.8 |
| | B2O3 | 1.3 | 1.3 | 1.3 | 1.3 | 1.3 | 1.3 | 1.3 | 1.3 | 1.3 | 1.3 | 1.3 | 1.3 | 1.3 |
| | Al2O3 | 8.8 | 8.8 | 8.8 | 8.8 | 8.8 | 8.8 | 8.8 | 8.8 | 8.8 | 8.8 | 8.8 | 8.8 | 8.8 |
| | Li2O | 10.8 | 10.8 | 10.8 | 10.8 | 10.8 | 10.8 | 10.8 | 10.8 | 10.8 | 10.8 | 10.8 | 10.8 | 10.8 |
| | Na2O | 2.1 | 2.1 | 2.1 | 2.1 | 2.1 | 2.1 | 2.1 | 2.1 | 2.1 | 2.1 | 2.1 | 2.1 | 2.1 |
| | K2O | 1.1 | 1.1 | 1.1 | 1.1 | 1.1 | 1.1 | 1.1 | 1.1 | 1.1 | 1.1 | 1.1 | 1.1 | 1.1 |
| | MgO | 6.3 | 6.3 | 6.3 | 6.3 | 6.3 | 6.3 | 6.3 | 6.3 | 6.3 | 6.3 | 6.3 | 6.3 | 6.3 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZnO | 2.3 | 2.3 | 2.3 | 2.3 | 2.3 | 2.3 | 2.3 | 2.3 | 2.3 | 2.3 | 2.3 | 2.3 | 2.3 |
| | ZrO2 | 0.6 | 0.6 | 0.6 | 0.6 | 0.6 | 0.6 | 0.6 | 0.6 | 0.6 | 0.6 | 0.6 | 0.6 | 0.6 |
| | TiO2 | 0.8 | 0.8 | 0.8 | 0.8 | 0.8 | 0.8 | 0.8 | 0.8 | 0.8 | 0.8 | 0.8 | 0.8 | 0.8 |
| | La2O3 | 0.4 | 0.4 | 0.4 | 0.4 | 0.4 | 0.4 | 0.4 | 0.4 | 0.4 | 0.4 | 0.4 | 0.4 | 0.4 |
| | Nb2O5 | 0.7 | 0.7 | 0.7 | 0.7 | 0.7 | 0.7 | 0.7 | 0.7 | 0.7 | 0.7 | 0.7 | 0.7 | 0.7 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |

TABLE 8-continued

| | | | | | | | | | | | | | | |
|---|---|---|---|---|---|---|---|---|---|---|---|---|---|---|
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.1 | 0.1 | 0.1 | 0.1 | 0.1 | 0.1 | 0.2 | 0.2 | 0.2 | 0.2 | 0.2 | 0.2 | 0.2 |
| | CeO2 | 0 | 0.001 | 0.005 | 0.01 | 0.05 | 0.1 | 0 | 0.001 | 0.005 | 0.01 | 0.05 | 0.1 | 0.2 |
| | Sb2O3 | 0 | 0 | 0 | 0 | 0 | 0 | 0 | 0 | 0 | 0 | 0 | 0 | 0 |
| | CeO2/SnO2 | 0.0000 | 0.0100 | 0.0500 | 0.1000 | 0.5000 | 1.0000 | 0.0000 | 0.0050 | 0.0250 | 0.0500 | 0.2500 | 0.5000 | 1.0000 |
| | SnO2 + CeO2 | 0.1 | 0.101 | 0.105 | 0.11 | 0.15 | 0.2 | 0.2 | 0.201 | 0.205 | 0.21 | 0.25 | 0.3 | 0.4 |
| (mol %) | Li2O + Na2O + K2O | 14.0 | 14.0 | 14.0 | 14.0 | 14.0 | 14.0 | 14.0 | 14.0 | 14.0 | 14.0 | 14.0 | 14.0 | 14.0 |
| | MgO + CaO + SrO + BaO | 6.3 | 6.3 | 6.3 | 6.3 | 6.3 | 6.3 | 6.3 | 6.3 | 6.3 | 6.3 | 6.3 | 6.3 | 6.3 |
| | ZrO2 + TiO2 + La2O3 + Nb2O5 + Ta2O5 + HfO2 | 2.5 | 2.5 | 2.5 | 2.5 | 2.5 | 2.5 | 2.5 | 2.5 | 2.5 | 2.5 | 2.5 | 2.5 | 2.5 |
| | SiO2 + Al2O3 | 73.6 | 73.6 | 73.6 | 73.6 | 73.6 | 73.6 | 73.6 | 73.6 | 73.6 | 73.6 | 73.6 | 73.6 | 73.6 |
| | Rank on bubbles | D | C | B | B | B | B | D | B | A | A | A | A | A |
| | Component | 8-14 | 8-15 | 8-16 | 8-17 | 8-18 | 8-19 | 8-20 | 8-21 | 8-22 | 8-23 | 8-24 | 8-25 | 8-26 |
| (mol %) | SiO2 | 64.8 | 64.8 | 64.8 | 64.8 | 64.8 | 64.8 | 64.8 | 64.8 | 64.8 | 64.8 | 64.8 | 64.8 | 64.8 |
| | B2O3 | 1.3 | 1.3 | 1.3 | 1.3 | 1.3 | 1.3 | 1.3 | 1.3 | 1.3 | 1.3 | 1.3 | 1.3 | 1.3 |
| | Al2O3 | 8.8 | 8.8 | 8.8 | 8.8 | 8.8 | 8.8 | 8.8 | 8.8 | 8.8 | 8.8 | 8.8 | 8.8 | 8.8 |
| | Li2O | 10.8 | 10.8 | 10.8 | 10.8 | 10.8 | 10.8 | 10.8 | 10.8 | 10.8 | 10.8 | 10.8 | 10.8 | 10.8 |
| | Na2O | 2.1 | 2.1 | 2.1 | 2.1 | 2.1 | 2.1 | 2.1 | 2.1 | 2.1 | 2.1 | 2.1 | 2.1 | 2.1 |
| | K2O | 1.1 | 1.1 | 1.1 | 1.1 | 1.1 | 1.1 | 1.1 | 1.1 | 1.1 | 1.1 | 1.1 | 1.1 | 1.1 |
| | MgO | 6.3 | 6.3 | 6.3 | 6.3 | 6.3 | 6.3 | 6.3 | 6.3 | 6.3 | 6.3 | 6.3 | 6.3 | 6.3 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZnO | 2.3 | 2.3 | 2.3 | 2.3 | 2.3 | 2.3 | 2.3 | 2.3 | 2.3 | 2.3 | 2.3 | 2.3 | 2.3 |
| | ZrO2 | 0.6 | 0.6 | 0.6 | 0.6 | 0.6 | 0.6 | 0.6 | 0.6 | 0.6 | 0.6 | 0.6 | 0.6 | 0.6 |
| | TiO2 | 0.8 | 0.8 | 0.8 | 0.8 | 0.8 | 0.8 | 0.8 | 0.8 | 0.8 | 0.8 | 0.8 | 0.8 | 0.8 |
| | La2O3 | 0.4 | 0.4 | 0.4 | 0.4 | 0.4 | 0.4 | 0.4 | 0.4 | 0.4 | 0.4 | 0.4 | 0.4 | 0.4 |
| | Nb2O5 | 0.7 | 0.7 | 0.7 | 0.7 | 0.7 | 0.7 | 0.7 | 0.7 | 0.7 | 0.7 | 0.7 | 0.7 | 0.7 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.25 | 0.25 | 0.25 | 0.25 | 0.25 | 0.25 | 0.25 | 0.25 | 0.3 | 0.3 | 0.3 | 0.3 | 0.3 |
| | CeO2 | 0 | 0.001 | 0.005 | 0.01 | 0.05 | 0.1 | 0.2 | 0.25 | 0 | 0.001 | 0.005 | 0.01 | 0.05 |
| | Sb2O3 | 0 | 0 | 0 | 0 | 0 | 0 | 0 | 0 | 0 | 0 | 0 | 0 | 0 |
| | CeO2/SnO2 | 0.0000 | 0.0040 | 0.0200 | 0.0400 | 0.2000 | 0.4000 | 0.8000 | 1.0000 | 0.0000 | 0.0033 | 0.0167 | 0.0333 | 0.1667 |
| | SnO2 + CeO2 | 0.25 | 0.251 | 0.255 | 0.26 | 0.3 | 0.35 | 0.45 | 0.5 | 0.3 | 0.301 | 0.305 | 0.31 | 0.35 |
| (mol %) | Li2O + Na2O + K2O | 14.0 | 14.0 | 14.0 | 14.0 | 14.0 | 14.0 | 14.0 | 14.0 | 14.0 | 14.0 | 14.0 | 14.0 | 14.0 |
| | MgO + CaO + SrO + BaO | 6.3 | 6.3 | 6.3 | 6.3 | 6.3 | 6.3 | 6.3 | 6.3 | 6.3 | 6.3 | 6.3 | 6.3 | 6.3 |
| | ZrO2 + TiO2 + La2O3 + Nb2O5 + Ta2O5 + HfO2 | 2.5 | 2.5 | 2.5 | 2.5 | 2.5 | 2.5 | 2.5 | 2.5 | 2.5 | 2.5 | 2.5 | 2.5 | 2.5 |
| | SiO2 + Al2O3 | 73.6 | 73.6 | 73.6 | 73.6 | 73.6 | 73.6 | 73.6 | 73.6 | 73.6 | 73.6 | 73.6 | 73.6 | 73.6 |
| | Rank on bubbles | D | B | A | A | A | A | A | A | D | B | A | A | A |
| | Component | 8-27 | 8-28 | 8-29 | 8-30 | 8-31 | 8-32 | 8-33 | 8-34 | 8-35 | 8-36 | 8-37 | 8-38 | 8-39 |
| (mol %) | SiO2 | 64.8 | 64.8 | 64.8 | 64.8 | 64.8 | 64.8 | 64.8 | 64.8 | 64.8 | 64.8 | 64.8 | 64.8 | 64.8 |
| | B2O3 | 1.3 | 1.3 | 1.3 | 1.3 | 1.3 | 1.3 | 1.3 | 1.3 | 1.3 | 1.3 | 1.3 | 1.3 | 1.3 |
| | Al2O3 | 8.8 | 8.8 | 8.8 | 8.8 | 8.8 | 8.8 | 8.8 | 8.8 | 8.8 | 8.8 | 8.8 | 8.8 | 8.8 |

TABLE 8-continued

| | | | | | | | | | | | | | | |
|---|---|---|---|---|---|---|---|---|---|---|---|---|---|---|
| | Li2O | 10.8 | 10.8 | 10.8 | 10.8 | 10.8 | 10.8 | 10.8 | 10.8 | 10.8 | 10.8 | 10.8 | 10.8 | 10.8 |
| | Na2O | 2.1 | 2.1 | 2.1 | 2.1 | 2.1 | 2.1 | 2.1 | 2.1 | 2.1 | 2.1 | 2.1 | 2.1 | 2.1 |
| | K2O | 1.1 | 1.1 | 1.1 | 1.1 | 1.1 | 1.1 | 1.1 | 1.1 | 1.1 | 1.1 | 1.1 | 1.1 | 1.1 |
| | MgO | 6.3 | 6.3 | 6.3 | 6.3 | 6.3 | 6.3 | 6.3 | 6.3 | 6.3 | 6.3 | 6.3 | 6.3 | 6.3 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZnO | 2.3 | 2.3 | 2.3 | 2.3 | 2.3 | 2.3 | 2.3 | 2.3 | 2.3 | 2.3 | 2.3 | 2.3 | 2.3 |
| | ZrO2 | 0.6 | 0.6 | 0.6 | 0.6 | 0.6 | 0.6 | 0.6 | 0.6 | 0.6 | 0.6 | 0.6 | 0.6 | 0.6 |
| | TiO2 | 0.8 | 0.8 | 0.8 | 0.8 | 0.8 | 0.8 | 0.8 | 0.8 | 0.8 | 0.8 | 0.8 | 0.8 | 0.8 |
| | La2O3 | 0.4 | 0.4 | 0.4 | 0.4 | 0.4 | 0.4 | 0.4 | 0.4 | 0.4 | 0.4 | 0.4 | 0.4 | 0.4 |
| | Nb2O5 | 0.7 | 0.7 | 0.7 | 0.7 | 0.7 | 0.7 | 0.7 | 0.7 | 0.7 | 0.7 | 0.7 | 0.7 | 0.7 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.3 | 0.3 | 0.3 | 0.4 | 0.4 | 0.4 | 0.4 | 0.4 | 0.4 | 0.4 | 0.4 | 0.4 | 0.5 |
| | CeO2 | 0.1 | 0.2 | 0.3 | 0 | 0.001 | 0.005 | 0.01 | 0.05 | 0.1 | 0.2 | 0.3 | 0.4 | 0 |
| | Sb2O3 | 0 | 0 | 0 | 0 | 0 | 0 | 0 | 0 | 0 | 0 | 0 | 0 | 0 |
| | CeO2/SnO2 | 0.3333 | 0.6667 | 1.0000 | 0.0000 | 0.0025 | 0.0125 | 0.0250 | 0.1250 | 0.2500 | 0.5000 | 0.7500 | 1.0000 | 0.0000 |
| | SnO2 + CeO2 | 0.4 | 0.5 | 0.6 | 0.4 | 0.401 | 0.405 | 0.41 | 0.45 | 0.5 | 0.6 | 0.7 | 0.8 | 0.5 |
| (mol %) | Li2O + Na2O + K2O | 14.0 | 14.0 | 14.0 | 14.0 | 14.0 | 14.0 | 14.0 | 14.0 | 14.0 | 14.0 | 14.0 | 14.0 | 14.0 |
| | MgO + CaO + SrO + BaO | 6.3 | 6.3 | 6.3 | 6.3 | 6.3 | 6.3 | 6.3 | 6.3 | 6.3 | 6.3 | 6.3 | 6.3 | 6.3 |
| | ZrO2 + TiO2 + La2O3 + Nb2O5 + Ta2O5 + HfO2 | 2.5 | 2.5 | 2.5 | 2.5 | 2.5 | 2.5 | 2.5 | 2.5 | 2.5 | 2.5 | 2.5 | 2.5 | 2.5 |
| | SiO2 + Al2O3 | 73.6 | 73.6 | 73.6 | 73.6 | 73.6 | 73.6 | 73.6 | 73.6 | 73.6 | 73.6 | 73.6 | 73.6 | 73.6 |
| | Rank on bubbles | A | A | A | D | B | B | A | A | A | A | A | A | E |

| | Component | 8-40 | 8-41 | 8-42 | 8-43 | 8-44 | 8-45 | 8-46 | 8-47 | 8-48 | 8-49 | 8-50 | 8-51 | 8-52 |
|---|---|---|---|---|---|---|---|---|---|---|---|---|---|---|
| (mol %) | SiO2 | 64.8 | 64.8 | 64.8 | 64.8 | 64.8 | 64.8 | 64.8 | 64.8 | 64.8 | 64.8 | 64.8 | 64.8 | 64.8 |
| | B2O3 | 1.3 | 1.3 | 1.3 | 1.3 | 1.3 | 1.3 | 1.3 | 1.3 | 1.3 | 1.3 | 1.3 | 1.3 | 1.3 |
| | Al2O3 | 8.8 | 8.8 | 8.8 | 8.8 | 8.8 | 8.8 | 8.8 | 8.8 | 8.8 | 8.8 | 8.8 | 8.8 | 8.8 |
| | Li2O | 10.8 | 10.8 | 10.8 | 10.8 | 10.8 | 10.8 | 10.8 | 10.8 | 10.8 | 10.8 | 10.8 | 10.8 | 10.8 |
| | Na2O | 2.1 | 2.1 | 2.1 | 2.1 | 2.1 | 2.1 | 2.1 | 2.1 | 2.1 | 2.1 | 2.1 | 2.1 | 2.1 |
| | K2O | 1.1 | 1.1 | 1.1 | 1.1 | 1.1 | 1.1 | 1.1 | 1.1 | 1.1 | 1.1 | 1.1 | 1.1 | 1.1 |
| | MgO | 6.3 | 6.3 | 6.3 | 6.3 | 6.3 | 6.3 | 6.3 | 6.3 | 6.3 | 6.3 | 6.3 | 6.3 | 6.3 |
| | CaO | 0.0 | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 0.0 |
| | ZnO | 2.3 | 2.3 | 2.3 | 2.3 | 2.3 | 2.3 | 2.3 | 2.3 | 2.3 | 2.3 | 2.3 | 2.3 | 2.3 |
| | ZrO2 | 0.6 | 0.6 | 0.6 | 0.6 | 0.6 | 0.6 | 0.6 | 0.6 | 0.6 | 0.6 | 0.6 | 0.6 | 0.6 |
| | TiO2 | 0.8 | 0.8 | 0.8 | 0.8 | 0.8 | 0.8 | 0.8 | 0.8 | 0.8 | 0.8 | 0.8 | 0.8 | 0.8 |
| | La2O3 | 0.4 | 0.4 | 0.4 | 0.4 | 0.4 | 0.4 | 0.4 | 0.4 | 0.4 | 0.4 | 0.4 | 0.4 | 0.4 |
| | Nb2O5 | 0.7 | 0.7 | 0.7 | 0.7 | 0.7 | 0.7 | 0.7 | 0.7 | 0.7 | 0.7 | 0.7 | 0.7 | 0.7 |
| | Ta2O5 | 0.0 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.5 | 0.5 | 0.5 | 0.5 | 0.5 | 0.5 | 0.5 | 0.5 | 0.5 | 0.6 | 0.6 | 0.6 | 0.6 |
| | CeO2 | 0.001 | 0.005 | 0.01 | 0.05 | 0.1 | 0.2 | 0.3 | 0.4 | 0.5 | 0 | 0.001 | 0.005 | 0.01 |
| | Sb2O3 | 0 | 0 | 0 | 0 | 0 | 0 | 0 | 0 | 0 | 0 | 0 | 0 | 0 |
| | CeO2/SnO2 | 0.0020 | 0.0100 | 0.0200 | 0.1000 | 0.2000 | 0.4000 | 0.6000 | 0.8000 | 1.0000 | 0.0000 | 0.0017 | 0.0083 | 0.0167 |

TABLE 8-continued

| | | | | | | | | | | | | | | |
|---|---|---|---|---|---|---|---|---|---|---|---|---|---|---|
| | SnO2 + CeO2 | 0.501 | 0.505 | 0.51 | 0.55 | 0.6 | 0.7 | 0.8 | 0.9 | 1 | 0.6 | 0.601 | 0.605 | 0.61 |
| (mol %) | Li2O + Na2O + K2O | 14.0 | 14.0 | 14.0 | 14.0 | 14.0 | 14.0 | 14.0 | 14.0 | 14.0 | 14.0 | 14.0 | 14.0 | 14.0 |
| | MgO + CaO + SrO + BaO | 6.3 | 6.3 | 6.3 | 6.3 | 6.3 | 6.3 | 6.3 | 6.3 | 6.3 | 6.3 | 6.3 | 6.3 | 6.3 |
| | ZrO2 + TiO2 + La2O3 + Nb2O5 + Ta2O5 + HfO2 | 2.5 | 2.5 | 2.5 | 2.5 | 2.5 | 2.5 | 2.5 | 2.5 | 2.5 | 2.5 | 2.5 | 2.5 | 2.5 |
| | SiO2 + Al2O3 | 73.6 | 73.6 | 73.6 | 73.6 | 73.6 | 73.6 | 73.6 | 73.6 | 73.6 | 73.6 | 73.6 | 73.6 | 73.6 |
| | Rank on bubbles | C | C | B | B | A | A | A | A | A | E | C | C | C |

| | Component | 8-53 | 8-54 | 8-55 | 8-56 | 8-57 | 8-58 | 8-59 | Com. Ex. 8-1 | Com. Ex. 8-2 | Com. Ex. 8-3 | Com. Ex. 8-4 | Com. Ex. 8-5 |
|---|---|---|---|---|---|---|---|---|---|---|---|---|---|
| (mol %) | SiO2 | 64.8 | 64.8 | 64.8 | 64.8 | 64.8 | 64.8 | 64.8 | 64.8 | 64.8 | 64.8 | 64.8 | 64.8 |
| | B2O3 | 1.3 | 1.3 | 1.3 | 1.3 | 1.3 | 1.3 | 1.3 | 1.3 | 1.3 | 1.3 | 1.3 | 1.3 |
| | Al2O3 | 8.8 | 8.8 | 8.8 | 8.8 | 8.8 | 8.8 | 8.8 | 8.8 | 8.8 | 8.8 | 8.8 | 8.8 |
| | Li2O | 10.8 | 10.8 | 10.8 | 10.8 | 10.8 | 10.8 | 10.8 | 10.8 | 10.8 | 10.8 | 10.8 | 10.8 |
| | Na2O | 2.1 | 2.1 | 2.1 | 2.1 | 2.1 | 2.1 | 2.1 | 2.1 | 2.1 | 2.1 | 2.1 | 2.1 |
| | K2O | 1.1 | 1.1 | 1.1 | 1.1 | 1.1 | 1.1 | 1.1 | 1.1 | 1.1 | 1.1 | 1.1 | 1.1 |
| | MgO | 6.3 | 6.3 | 6.3 | 6.3 | 6.3 | 6.3 | 6.3 | 6.3 | 6.3 | 6.3 | 6.3 | 6.3 |
| | CaO | 0.0 | 0.0 | 0.0 | 0.0 | 0.0 | 0.0 | 0.0 | 0.0 | 0.0 | 0.0 | 0.0 | 0.0 |
| | SrO | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 |
| | ZnO | 2.3 | 2.3 | 2.3 | 2.3 | 2.3 | 2.3 | 2.3 | 2.3 | 2.3 | 2.3 | 2.3 | 2.3 |
| | ZrO2 | 0.6 | 0.6 | 0.6 | 0.6 | 0.6 | 0.6 | 0.6 | 0.6 | 0.6 | 0.6 | 0.6 | 0.6 |
| | TiO2 | 0.8 | 0.8 | 0.8 | 0.8 | 0.8 | 0.8 | 0.8 | 0.8 | 0.8 | 0.8 | 0.8 | 0.8 |
| | La2O3 | 0.4 | 0.4 | 0.4 | 0.4 | 0.4 | 0.4 | 0.4 | 0.4 | 0.4 | 0.4 | 0.4 | 0.4 |
| | Nb2O5 | 0.7 | 0.7 | 0.7 | 0.7 | 0.7 | 0.7 | 0.7 | 0.7 | 0.7 | 0.7 | 0.7 | 0.7 |
| | Ta2O5 | 0.0 | 0.0 | 0.0 | 0.0 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 |
| Based on glass components (mass %) | SnO2 | 0.6 | 0.6 | 0.6 | 0.6 | 0.6 | 0.6 | 0.6 | 0 | 0.25 | 1 | 0 | 1 |
| | CeO2 | 0.05 | 0.1 | 0.2 | 0.3 | 0.4 | 0.5 | 0.6 | 0 | 0 | 0 | 1 | 1 |
| | Sb2O3 | 0 | 0 | 0 | 0 | 0 | 0 | 0 | 0.5 | 0.15 | 0 | 0 | 0 |
| | CeO2/SnO2 | 0.0833 | 0.1667 | 0.3333 | 0.5000 | 0.6667 | 0.8333 | 1.0000 | — | 0.0000 | 0.0000 | — | 1.0000 |
| | SnO2 + CeO2 | 0.65 | 0.7 | 0.8 | 0.9 | 1 | 1.1 | 1.2 | 0 | 0.25 | 1 | 1 | 2 |
| (mol %) | Li2O + Na2O + K2O | 14.0 | 14.0 | 14.0 | 14.0 | 14.0 | 14.0 | 14.0 | 14.0 | 14.0 | 14.0 | 14.0 | 14.0 |
| | MgO + CaO + SrO + BaO | 6.3 | 6.3 | 6.3 | 6.3 | 6.3 | 6.3 | 6.3 | 6.3 | 6.3 | 6.3 | 6.3 | 6.3 |
| | ZrO2 + TiO2 + La2O3 + Nb2O5 + Ta2O5 + HfO2 | 2.5 | 2.5 | 2.5 | 2.5 | 2.5 | 2.5 | 2.5 | 2.5 | 2.5 | 2.5 | 2.5 | 2.5 |
| | SiO2 + Al2O3 | 73.6 | 73.6 | 73.6 | 73.6 | 73.6 | 73.6 | 73.6 | 73.6 | 73.6 | 73.6 | 73.6 | 73.6 |
| | Rank on bubbles | C | B | B | B | B | B | B | G | G | G | G | G |

| Component (mass %) | 8-1 | 8-2 | 8-3 | 8-4 | 8-5 | 8-6 | 8-7 | 8-8 | 8-9 | 8-10 | 8-11 | 8-12 | 8-13 |
|---|---|---|---|---|---|---|---|---|---|---|---|---|---|
| Si | 28.7106 | 28.7103 | 28.7092 | 28.7077 | 28.6963 | 28.6648 | 28.6649 | 28.6646 | 28.6635 | 28.6621 | 28.6506 | 28.6363 | 28.6078 |
| B | 0.4434 | 0.4434 | 0.4434 | 0.4434 | 0.4432 | 0.4434 | 0.4434 | 0.4434 | 0.4434 | 0.4434 | 0.4432 | 0.4430 | 0.4425 |
| Al | 7.4914 | 7.4914 | 7.4911 | 7.4907 | 7.4877 | 7.4910 | 7.4911 | 7.4910 | 7.4907 | 7.4903 | 7.4873 | 7.4836 | 7.4762 |
| Li | 2.3652 | 2.3651 | 2.3650 | 2.3649 | 2.3640 | 2.3650 | 2.3650 | 2.3650 | 2.3649 | 2.3648 | 2.3639 | 2.3627 | 2.3603 |
| Na | 1.5232 | 1.5232 | 1.5232 | 1.5231 | 1.5225 | 1.5232 | 1.5232 | 1.5232 | 1.5231 | 1.5230 | 1.5224 | 1.5217 | 1.5201 |
| K | 1.3570 | 1.3569 | 1.3569 | 1.3568 | 1.3563 | 1.3569 | 1.3569 | 1.3569 | 1.3568 | 1.3568 | 1.3562 | 1.3555 | 1.3542 |
| Mg | 2.4156 | 2.4156 | 2.4155 | 2.4153 | 2.4144 | 2.4155 | 2.4155 | 2.4154 | 2.4153 | 2.4152 | 2.4143 | 2.4131 | 2.4107 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |

TABLE 8-continued

| | | | | | | | | | | | | | | |
|---|---|---|---|---|---|---|---|---|---|---|---|---|---|---|
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zn | 2.3726 | 2.3726 | 2.3725 | 2.3724 | 2.3714 | 2.3725 | 2.3725 | 2.3725 | 2.3724 | 2.3722 | 2.3713 | 2.3701 | 2.3678 |
| Zr | 0.8635 | 0.8635 | 0.8634 | 0.8634 | 0.8630 | 0.8634 | 0.8634 | 0.8634 | 0.8634 | 0.8633 | 0.8630 | 0.8626 | 0.8617 |
| Ti | 0.6043 | 0.6043 | 0.6042 | 0.6042 | 0.6040 | 0.6042 | 0.6042 | 0.6042 | 0.6042 | 0.6042 | 0.6039 | 0.6036 | 0.6030 |
| La | 1.7457 | 1.7457 | 1.7457 | 1.7456 | 1.7449 | 1.7457 | 1.7457 | 1.7456 | 1.7456 | 1.7455 | 1.7448 | 1.7439 | 1.7422 |
| Nb | 2.0519 | 2.0519 | 2.0518 | 2.0517 | 2.0509 | 2.0518 | 2.0518 | 2.0518 | 2.0517 | 2.0516 | 2.0508 | 2.0498 | 2.0477 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.0785 | 0.0785 | 0.0785 | 0.0785 | 0.0785 | 0.0785 | 0.1570 | 0.1570 | 0.1570 | 0.1569 | 0.1569 | 0.1567 | 0.1565 |
| Ce | 0.0000 | 0.0008 | 0.0041 | 0.0081 | 0.0407 | 0.0813 | 0.0000 | 0.0008 | 0.0041 | 0.0081 | 0.0406 | 0.0812 | 0.1622 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.9771 | 47.9768 | 47.9755 | 47.9742 | 47.9622 | 47.9428 | 47.9454 | 47.9452 | 47.9439 | 47.9426 | 47.9308 | 47.9162 | 47.8871 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 5.2454 | 5.2452 | 5.2451 | 5.2448 | 5.2428 | 5.2451 | 5.2451 | 5.2451 | 5.2448 | 5.2446 | 5.2425 | 5.2399 | 5.2346 |
| Mg + Ca + Sr + Ba | 2.4156 | 2.4156 | 2.4155 | 2.4153 | 2.4144 | 2.4155 | 2.4155 | 2.4154 | 2.4153 | 2.4152 | 2.4143 | 2.4131 | 2.4107 |
| Zr + Ti + La + Nb + Ta + Hf | 5.2654 | 5.2654 | 5.2651 | 5.2649 | 5.2628 | 5.2651 | 5.2651 | 5.2650 | 5.2649 | 5.2646 | 5.2625 | 5.2599 | 5.2546 |
| Ce/Sn | 0.0000 | 0.0102 | 0.0522 | 0.1032 | 0.5185 | 1.0357 | 0.0000 | 0.0051 | 0.0261 | 0.0516 | 0.2588 | 0.5182 | 1.0364 |
| Sn + Ce | 0.0785 | 0.0793 | 0.0826 | 0.0866 | 0.1192 | 0.1598 | 0.1570 | 0.1578 | 0.1611 | 0.1650 | 0.1975 | 0.2379 | 0.3187 |
| Si + Al | 36.2020 | 36.2017 | 36.2003 | 36.1984 | 36.1840 | 36.1558 | 36.1560 | 36.1556 | 36.1542 | 36.1524 | 36.1379 | 36.1199 | 36.0840 |
| Rank on bubbles | D | C | B | B | B | B | D | B | A | A | A | A | A |

| Component (mass %) | 8-14 | 8-15 | 8-16 | 8-17 | 8-18 | 8-19 | 8-20 | 8-21 | 8-22 | 8-23 | 8-24 | 8-25 | 8-26 | 8-27 |
|---|---|---|---|---|---|---|---|---|---|---|---|---|---|---|
| Si | 28.6507 | 28.6504 | 28.6492 | 28.6478 | 28.6364 | 28.6221 | 28.5937 | 28.5795 | 28.6364 | 28.6361 | 28.6350 | 28.6336 | 28.6222 | 28.6079 |
| B | 0.4432 | 0.4432 | 0.4432 | 0.4431 | 0.4430 | 0.4427 | 0.4423 | 0.4421 | 0.4430 | 0.4430 | 0.4429 | 0.4429 | 0.4427 | 0.4425 |
| Al | 7.4873 | 7.4873 | 7.4870 | 7.4866 | 7.4836 | 7.4799 | 7.4724 | 7.4687 | 7.4836 | 7.4835 | 7.4832 | 7.4829 | 7.4799 | 7.4762 |
| Li | 2.3639 | 2.3638 | 2.3638 | 2.3636 | 2.3627 | 2.3615 | 2.3592 | 2.3580 | 2.3627 | 2.3627 | 2.3626 | 2.3625 | 2.3615 | 2.3603 |
| Na | 1.5224 | 1.5224 | 1.5223 | 1.5223 | 1.5217 | 1.5209 | 1.5194 | 1.5186 | 1.5217 | 1.5216 | 1.5216 | 1.5215 | 1.5209 | 1.5201 |
| K | 1.3562 | 1.3562 | 1.3561 | 1.3561 | 1.3555 | 1.3549 | 1.3535 | 1.3528 | 1.3555 | 1.3555 | 1.3555 | 1.3554 | 1.3549 | 1.3542 |
| Mg | 2.4143 | 2.4142 | 2.4141 | 2.4140 | 2.4131 | 2.4119 | 2.4095 | 2.4083 | 2.4131 | 2.4130 | 2.4129 | 2.4128 | 2.4119 | 2.4107 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zn | 2.3713 | 2.3713 | 2.3712 | 2.3711 | 2.3701 | 2.3689 | 2.3666 | 2.3654 | 2.3701 | 2.3701 | 2.3700 | 2.3699 | 2.3689 | 2.3678 |
| Zr | 0.8630 | 0.8630 | 0.8630 | 0.8629 | 0.8626 | 0.8621 | 0.8613 | 0.8609 | 0.8626 | 0.8626 | 0.8625 | 0.8625 | 0.8621 | 0.8617 |
| Ti | 0.6039 | 0.6039 | 0.6039 | 0.6039 | 0.6036 | 0.6033 | 0.6027 | 0.6024 | 0.6036 | 0.6036 | 0.6036 | 0.6036 | 0.6033 | 0.6030 |
| La | 1.7448 | 1.7448 | 1.7447 | 1.7446 | 1.7439 | 1.7431 | 1.7413 | 1.7405 | 1.7439 | 1.7439 | 1.7438 | 1.7438 | 1.7431 | 1.7422 |
| Nb | 2.0508 | 2.0508 | 2.0507 | 2.0506 | 2.0498 | 2.0487 | 2.0467 | 2.0457 | 2.0498 | 2.0498 | 2.0497 | 2.0496 | 2.0488 | 2.0477 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.1961 | 0.1961 | 0.1961 | 0.1960 | 0.1959 | 0.1958 | 0.1955 | 0.1954 | 0.2351 | 0.2351 | 0.2351 | 0.2351 | 0.2349 | 0.2348 |
| Ce | 0.0000 | 0.0008 | 0.0041 | 0.0081 | 0.0406 | 0.0812 | 0.1621 | 0.2025 | 0.0000 | 0.0008 | 0.0041 | 0.0081 | 0.0406 | 0.0811 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.9321 | 47.9318 | 47.9306 | 47.9293 | 47.9175 | 47.9030 | 47.8738 | 47.8592 | 47.9189 | 47.9187 | 47.9175 | 47.9158 | 47.9043 | 47.8898 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 5.2425 | 5.2424 | 5.2422 | 5.2420 | 5.2399 | 5.2373 | 5.2321 | 5.2294 | 5.2399 | 5.2398 | 5.2397 | 5.2394 | 5.2373 | 5.2346 |
| Mg + Ca + Sr + Ba | 2.4143 | 2.4142 | 2.4141 | 2.4140 | 2.4131 | 2.4119 | 2.4095 | 2.4083 | 2.4131 | 2.4130 | 2.4129 | 2.4128 | 2.4119 | 2.4107 |
| Zr + Ti + La + Nb + Ta + Hf | 5.2625 | 5.2625 | 5.2623 | 5.2620 | 5.2599 | 5.2572 | 5.2520 | 5.2495 | 5.2599 | 5.2599 | 5.2596 | 5.2595 | 5.2573 | 5.2546 |
| Ce/Sn | 0.0000 | 0.0041 | 0.0209 | 0.0413 | 0.2072 | 0.4147 | 0.8292 | 1.0363 | 0.0000 | 0.0034 | 0.0174 | 0.0345 | 0.1728 | 0.3454 |
| Sn + Ce | 0.1961 | 0.1969 | 0.2002 | 0.2041 | 0.2365 | 0.2770 | 0.3576 | 0.3979 | 0.2351 | 0.2359 | 0.2392 | 0.2432 | 0.2755 | 0.3159 |
| Si + Al | 36.1380 | 36.1377 | 36.1362 | 36.1344 | 36.1200 | 36.1020 | 36.0661 | 36.0482 | 36.1200 | 36.1196 | 36.1182 | 36.1165 | 36.1021 | 36.0841 |

TABLE 8-continued

| Rank on bubbles | D | B | A | A | A | A | A | A | D | B | A | A | A | A |
|---|---|---|---|---|---|---|---|---|---|---|---|---|---|---|
| Component (mass %) | 8-28 | 8-29 | 8-30 | 8-31 | 8-32 | 8-33 | 8-34 | 8-35 | 8-36 | 8-37 | 8-38 | 8-39 | 8-40 | 8-41 |
| Si | 28.5795 | 28.5340 | 28.6080 | 28.6077 | 28.6066 | 28.6052 | 28.5938 | 28.5796 | 28.5341 | 28.5058 | 28.4776 | 28.5797 | 28.5794 | 28.5782 |
| B | 0.4421 | 0.4421 | 0.4425 | 0.4425 | 0.4425 | 0.4425 | 0.4423 | 0.4421 | 0.4421 | 0.4416 | 0.4412 | 0.4421 | 0.4421 | 0.4421 |
| Al | 7.4687 | 7.4684 | 7.4762 | 7.4761 | 7.4758 | 7.4754 | 7.4725 | 7.4688 | 7.4684 | 7.4610 | 7.4536 | 7.4688 | 7.4687 | 7.4684 |
| Li | 2.3580 | 2.3579 | 2.3604 | 2.3603 | 2.3602 | 2.3601 | 2.3592 | 2.3580 | 2.3579 | 2.3556 | 2.3532 | 2.3580 | 2.3580 | 2.3579 |
| Na | 1.5186 | 1.5186 | 1.5201 | 1.5201 | 1.5201 | 1.5200 | 1.5194 | 1.5186 | 1.5186 | 1.5171 | 1.5156 | 1.5186 | 1.5186 | 1.5186 |
| K | 1.3528 | 1.3528 | 1.3542 | 1.3542 | 1.3541 | 1.3541 | 1.3535 | 1.3529 | 1.3528 | 1.3514 | 1.3501 | 1.3529 | 1.3528 | 1.3528 |
| Mg | 2.4083 | 2.4082 | 2.4107 | 2.4106 | 2.4105 | 2.4104 | 2.4095 | 2.4083 | 2.4082 | 2.4058 | 2.4034 | 2.4083 | 2.4083 | 2.4082 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zn | 2.3654 | 2.3653 | 2.3678 | 2.3678 | 2.3677 | 2.3675 | 2.3666 | 2.3654 | 2.3653 | 2.3630 | 2.3606 | 2.3654 | 2.3654 | 2.3653 |
| Zr | 0.8609 | 0.8608 | 0.8617 | 0.8617 | 0.8617 | 0.8616 | 0.8613 | 0.8609 | 0.8608 | 0.8600 | 0.8591 | 0.8609 | 0.8608 | 0.8608 |
| Ti | 0.6024 | 0.6024 | 0.6030 | 0.6030 | 0.6030 | 0.6030 | 0.6027 | 0.6024 | 0.6024 | 0.6018 | 0.6012 | 0.6024 | 0.6024 | 0.6024 |
| La | 1.7405 | 1.7404 | 1.7422 | 1.7422 | 1.7421 | 1.7420 | 1.7413 | 1.7405 | 1.7404 | 1.7387 | 1.7369 | 1.7405 | 1.7405 | 1.7404 |
| Nb | 2.0457 | 2.0456 | 2.0477 | 2.0477 | 2.0476 | 2.0475 | 2.0467 | 2.0457 | 2.0456 | 2.0436 | 2.0416 | 2.0457 | 2.0457 | 2.0456 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.2345 | 0.2344 | 0.3130 | 0.3130 | 0.3130 | 0.3130 | 0.3128 | 0.3126 | 0.3125 | 0.3121 | 0.3116 | 0.3907 | 0.3907 | 0.3907 |
| Ce | 0.1620 | 0.2429 | 0.0000 | 0.0008 | 0.0041 | 0.0081 | 0.0405 | 0.0810 | 0.1619 | 0.2425 | 0.3229 | 0.0000 | 0.0008 | 0.0040 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.8606 | 47.8262 | 47.8925 | 47.8923 | 47.8910 | 47.8896 | 47.8779 | 47.8632 | 47.8290 | 47.8000 | 47.7714 | 47.8660 | 47.8658 | 47.8646 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 5.2294 | 5.2293 | 5.2347 | 5.2346 | 5.2344 | 5.2342 | 5.2321 | 5.2295 | 5.2293 | 5.2241 | 5.2189 | 5.2295 | 5.2294 | 5.2293 |
| Mg + Ca + Sr + Ba | 2.4083 | 2.4082 | 2.4107 | 2.4106 | 2.4105 | 2.4104 | 2.4095 | 2.4083 | 2.4082 | 2.4058 | 2.4034 | 2.4083 | 2.4083 | 2.4082 |
| Zr + Ti + La + Nb + Ta + Hf | 5.2495 | 5.2492 | 5.2546 | 5.2546 | 5.2544 | 5.2541 | 5.2520 | 5.2495 | 5.2492 | 5.2441 | 5.2388 | 5.2495 | 5.2494 | 5.2492 |
| Ce/Sn | 0.6908 | 1.0363 | 0.0000 | 0.0026 | 0.0131 | 0.0259 | 0.1295 | 0.2591 | 0.5181 | 0.7770 | 1.0363 | 0.0000 | 0.0020 | 0.0102 |
| Sn + Ce | 0.3965 | 0.4773 | 0.3130 | 0.3138 | 0.3171 | 0.3211 | 0.3533 | 0.3936 | 0.4744 | 0.5546 | 0.6345 | 0.3907 | 0.3915 | 0.3947 |
| Si + Al | 36.0482 | 36.0024 | 36.0842 | 36.0838 | 36.0824 | 36.0806 | 36.0663 | 36.0484 | 36.0025 | 35.9668 | 35.9312 | 36.0485 | 36.0481 | 36.0466 |
| Rank on bubbles | A | A | D | B | B | A | A | A | A | A | A | E | C | C |

| Component (mass %) | 8-42 | 8-43 | 8-44 | 8-45 | 8-46 | 8-47 | 8-48 | 8-49 | 8-50 | 8-51 | 8-52 | 8-53 | 8-54 | 8-55 |
|---|---|---|---|---|---|---|---|---|---|---|---|---|---|---|
| Si | 28.5768 | 28.5655 | 28.5341 | 28.5057 | 28.4777 | 28.4496 | 28.4042 | 28.5342 | 28.5339 | 28.5328 | 28.5314 | 28.5201 | 28.5059 | 28.4778 |
| B | 0.4420 | 0.4419 | 0.4421 | 0.4416 | 0.4412 | 0.4408 | 0.4407 | 0.4421 | 0.4421 | 0.4420 | 0.4420 | 0.4419 | 0.4416 | 0.4412 |
| Al | 7.4680 | 7.4651 | 7.4684 | 7.4610 | 7.4537 | 7.4463 | 7.4460 | 7.4685 | 7.4684 | 7.4681 | 7.4677 | 7.4648 | 7.4611 | 7.4537 |
| Li | 2.3578 | 2.3568 | 2.3579 | 2.3556 | 2.3532 | 2.3509 | 2.3508 | 2.3579 | 2.3579 | 2.3578 | 2.3577 | 2.3567 | 2.3556 | 2.3532 |
| Na | 1.5185 | 1.5179 | 1.5186 | 1.5171 | 1.5156 | 1.5141 | 1.5140 | 1.5186 | 1.5186 | 1.5185 | 1.5184 | 1.5178 | 1.5171 | 1.5156 |
| K | 1.3527 | 1.3522 | 1.3528 | 1.3515 | 1.3501 | 1.3488 | 1.3487 | 1.3528 | 1.3528 | 1.3527 | 1.3527 | 1.3521 | 1.3515 | 1.3501 |
| Mg | 2.4080 | 2.4071 | 2.4082 | 2.4058 | 2.4034 | 2.4010 | 2.4009 | 2.4082 | 2.4081 | 2.4081 | 2.4079 | 2.4070 | 2.4058 | 2.4034 |
| Ca | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Zn | 2.3652 | 2.3643 | 2.3653 | 2.3630 | 2.3606 | 2.3583 | 2.3582 | 2.3653 | 2.3653 | 2.3652 | 2.3651 | 2.3642 | 2.3630 | 2.3606 |
| Zr | 0.8608 | 0.8604 | 0.8608 | 0.8600 | 0.8591 | 0.8583 | 0.8582 | 0.8608 | 0.8608 | 0.8608 | 0.8607 | 0.8604 | 0.8600 | 0.8591 |
| Ti | 0.6024 | 0.6021 | 0.6024 | 0.6018 | 0.6012 | 0.6006 | 0.6006 | 0.6024 | 0.6024 | 0.6024 | 0.6024 | 0.6021 | 0.6018 | 0.6012 |
| La | 1.7403 | 1.7396 | 1.7404 | 1.7387 | 1.7369 | 1.7352 | 1.7352 | 1.7404 | 1.7404 | 1.7403 | 1.7402 | 1.7395 | 1.7387 | 1.7370 |
| Nb | 2.0455 | 2.0447 | 2.0456 | 2.0436 | 2.0416 | 2.0395 | 2.0395 | 2.0456 | 2.0456 | 2.0455 | 2.0454 | 2.0446 | 2.0436 | 2.0416 |
| Ta | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |

TABLE 8-continued

| | | | | | | | | | | | | | | |
|---|---|---|---|---|---|---|---|---|---|---|---|---|---|---|
| Hf | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Sn | 0.3907 | 0.3905 | 0.3906 | 0.3901 | 0.3895 | 0.3890 | 0.3888 | 0.4687 | 0.4687 | 0.4686 | 0.4686 | 0.4684 | 0.4680 | 0.4674 |
| Ce | 0.0081 | 0.0405 | 0.0809 | 0.1617 | 0.2422 | 0.3225 | 0.4029 | 0.0000 | 0.0008 | 0.0040 | 0.0081 | 0.0404 | 0.0808 | 0.1614 |
| Sb | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| O | 47.8632 | 47.8514 | 47.8319 | 47.8028 | 47.7740 | 47.7451 | 47.7113 | 47.8345 | 47.8342 | 47.8332 | 47.8317 | 47.8200 | 47.8055 | 47.7767 |
| Total | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 | 100.0000 |
| Li + Na + K | 5.2290 | 5.2269 | 5.2293 | 5.2242 | 5.2189 | 5.2138 | 5.2135 | 5.2293 | 5.2293 | 5.2290 | 5.2288 | 5.2266 | 5.2242 | 5.2189 |
| Mg + Ca + Sr + Ba | 2.4080 | 2.4071 | 2.4082 | 2.4058 | 2.4034 | 2.4010 | 2.4009 | 2.4082 | 2.4081 | 2.4081 | 2.4079 | 2.4070 | 2.4058 | 2.4034 |
| Zr + Ti + La + Nb + Ta + Hf | 5.2490 | 5.2468 | 5.2492 | 5.2441 | 5.2388 | 5.2336 | 5.2335 | 5.2492 | 5.2492 | 5.2490 | 5.2487 | 5.2466 | 5.2441 | 5.2389 |
| Ce/Sn | 0.0207 | 0.1037 | 0.2071 | 0.4145 | 0.6218 | 0.8290 | 1.0363 | 0.0000 | 0.0017 | 0.0085 | 0.0173 | 0.0863 | 0.1726 | 0.3453 |
| Sn + Ce | 0.3988 | 0.4310 | 0.4715 | 0.5518 | 0.6317 | 0.7115 | 0.7917 | 0.4687 | 0.4695 | 0.4726 | 0.4767 | 0.5088 | 0.5488 | 0.6288 |
| Si + Al | 36.0448 | 36.0306 | 36.0025 | 35.9667 | 35.9314 | 35.8959 | 35.8502 | 36.0027 | 36.0023 | 36.0009 | 35.9991 | 35.9849 | 35.9670 | 35.9315 |
| Rank on bubbles | B | B | A | A | A | A | A | E | C | C | C | C | B | B |

| Component (mass %) | 8-56 | 8-57 | 8-58 | 8-59 | Com. Ex. 8-1 | Com. Ex. 8-2 | Com. Ex. 8-3 | Com. Ex. 8-4 | Com. Ex. 8-5 |
|---|---|---|---|---|---|---|---|---|---|
| Si | 28.4496 | 28.4043 | 28.3763 | 28.3617 | 28.5799 | 28.6086 | 28.4047 | 28.4211 | 28.1513 |
| B | 0.4408 | 0.4407 | 0.4403 | 0.4401 | 0.4421 | 0.4425 | 0.4407 | 0.4403 | 0.4382 |
| Al | 7.4463 | 7.4460 | 7.4387 | 7.4348 | 7.4689 | 7.4763 | 7.4461 | 7.4388 | 7.3185 |
| Li | 2.3509 | 2.3508 | 2.3485 | 2.3256 | 2.3580 | 2.3604 | 2.3508 | 2.3486 | 2.3155 |
| Na | 1.5141 | 1.5140 | 1.5125 | 1.5117 | 1.5187 | 1.5202 | 1.5140 | 1.5125 | 1.5052 |
| K | 1.3488 | 1.3487 | 1.3474 | 1.3467 | 1.3529 | 1.3542 | 1.3487 | 1.3474 | 1.3409 |
| Mg | 2.4010 | 2.4009 | 2.3986 | 2.3973 | 2.4083 | 2.4107 | 2.4010 | 2.3986 | 2.3869 |
| Ca | 0.0000 | 0.0000 | 0.0000 | 0.0000 | 0.0000 | 0.0000 | 0.0000 | 0.0000 | 0.0000 |
| Sr | 0.0000 | 0.0000 | 0.0000 | 0.0000 | 0.0000 | 0.0000 | 0.0000 | 0.0000 | 0.0000 |
| Ba | 0.0000 | 0.0000 | 0.0000 | 0.0000 | 0.0000 | 0.0000 | 0.0000 | 0.0000 | 0.0000 |
| Zn | 2.3583 | 2.3582 | 2.3559 | 2.3547 | 2.3655 | 2.3678 | 2.3582 | 2.3559 | 2.3445 |
| Zr | 0.8583 | 0.8582 | 0.8574 | 0.8569 | 0.8609 | 0.8617 | 0.8582 | 0.8574 | 0.8532 |
| Ti | 0.6006 | 0.6006 | 0.6000 | 0.5997 | 0.6024 | 0.6031 | 0.6006 | 0.6000 | 0.5971 |
| La | 1.7352 | 1.7352 | 1.7335 | 1.7326 | 1.7405 | 1.7422 | 1.7352 | 1.7335 | 1.7251 |
| Nb | 2.0396 | 2.0395 | 2.0375 | 2.0364 | 2.0457 | 2.0478 | 2.0395 | 2.0375 | 2.0276 |
| Ta | 0.0000 | 0.0000 | 0.0000 | 0.0000 | 0.0000 | 0.0000 | 0.0000 | 0.0000 | 0.0000 |
| Hf | 0.0000 | 0.0000 | 0.0000 | 0.0000 | 0.0000 | 0.0000 | 0.0000 | 0.0000 | 0.0000 |
| Sn | 0.4668 | 0.4666 | 0.4660 | 0.4655 | 0.0000 | 0.1957 | 0.7775 | 0.0000 | 0.7700 |
| Ce | 0.2418 | 0.3223 | 0.4024 | 0.4824 | 0.0000 | 0.0000 | 0.0000 | 0.8053 | 0.7980 |
| Sb | 0.0000 | 0.0000 | 0.0000 | 0.0000 | 0.4136 | 0.1227 | 0.0000 | 0.0000 | 0.0000 |
| O | 47.7479 | 47.7140 | 47.6850 | 47.6539 | 47.8426 | 47.8861 | 47.7248 | 47.7031 | 47.4280 |
| Total | 100.0000 | 100.0000 | 100.0000 | 100.0000 | 100.0000 | 100.0000 | 100.0000 | 100.0000 | 100.0000 |
| Li + Na + K | 5.2138 | 5.2135 | 5.2084 | 5.1840 | 5.2296 | 5.2348 | 5.2135 | 5.2085 | 5.1616 |
| Mg + Ca + Sr + Ba | 2.4010 | 2.4009 | 2.3986 | 2.3973 | 2.4083 | 2.4107 | 2.4010 | 2.3986 | 2.3869 |
| Zr + Ti + La + Nb + Ta + Hf | 5.2337 | 5.2335 | 5.2284 | 5.2256 | 5.2495 | 5.2548 | 5.2335 | 5.2284 | 5.2030 |
| Ce/Sn | 0.5180 | 0.6907 | 0.8635 | 1.0363 | — | 0.0000 | 0.0000 | — | 1.0364 |
| Sn + Ce | 0.7086 | 0.7889 | 0.8684 | 0.9479 | 0.0000 | 0.1957 | 0.7775 | 0.8053 | 1.5680 |
| Si + Al | 35.8959 | 35.8503 | 35.8150 | 35.7965 | 36.0488 | 36.0849 | 35.8508 | 35.8599 | 35.4698 |
| Rank on bubbles | B | B | B | B | G | G | G | G | G |

Embodiment B (1) Melting of the Glass

The basic composition indicated as No. 1 in Table 9 was employed in the glasses of Nos. 1-1 to Nos. 1-339. The basic composition indicated as No. 2 in Table 9 was employed in the glasses of Nos. 2-1 to 2-339. The basic composition indicated as No. 3 in Table 9 was employed in the glasses of Nos. 3-1 to 3-339. The basic composition indicated as No. 4 in Table 9 was employed in the glasses of Nos. 4-1 to 4-339. The basic composition indicated as No. 5 in Table 9 was employed in the glasses of Nos. 5-1 to 5-339. The basic composition indicated as No. 6 in Table 9 was employed in the glasses of Nos. 6-1 to 6-339. The basic composition indicated as No. 7 in Table 9 was employed in the glasses of Nos. 7-1 to 7-339. For each of the glasses of Nos. 1 to 7, starting materials such as oxides, carbonates, nitrates, and hydroxides, as well as clarifying agents such as $SnO_2$ and $CeO_2$, were weighed out and mixed to obtain mixed starting materials so as to obtain glasses comprising the quantities of $SnO_2$ and $CeO_2$ of Nos. 1 to 339, indicated in Table 10, that were added based on the total amount of the basic compositions of the glasses in Table 9. The starting materials were charged to a melting vessel; heated, melted, clarified, and stirred for 6 hours over a range of 1,400 to 1,600° C. to produce homogeneous glass melts containing neither bubbles nor unmelted material. After being maintained for 6 hours at a range of 1,400 to 1,600° C. as stated above, the temperature of each glass melt was decreased (lowered), and the glass melt was maintained for 1 hour at a range of 1,200 to 1,400° C. to markedly enhance the clarifying effect. In particular, glass melts in which Sn and Ce were both present were found to exhibit highly pronounced clarifying effects.

The number of glasses prepared in the present embodiment was 339×7=2,373. For example, glass No. 1-1 had the basic composition indicated by No. 1 in Table 9, with the components added based on the total amount of the basic composition indicated by No. 1 in Table 10. Glass No. 3-150 had the basic composition indicated by No. 3 in Table 9, with the components added based on the total amount of the basic composition indicated by No. 150 in Table 10. And glass No. 7-339 had the basic composition indicated by No. 7 in Table 9, with the components added based on the total amount of the basic composition indicated by No. 339 in Table 10.

TABLE 9

| | No. | | | | | | |
|---|---|---|---|---|---|---|---|
| | 1 | 2 | 3 | 4 | 5 | 6 | 7 |
| $SiO_2$ | 67.3 | 66.2 | 72.0 | 69.0 | 68.7 | 68.6 | 64.8 |
| $B_2O_3$ | — | — | — | — | 2.0 | — | 1.3 |
| $Al_2O_3$ | 9.2 | 9.3 | 6.0 | 7.0 | 7.7 | 8.8 | 8.8 |
| $P_2O_5$ | — | — | — | — | — | 0.2 | — |
| $Li_2O$ | 8.1 | 8.1 | 8.2 | 8.0 | 14.0 | 15.3 | 10.8 |
| $Na_2O$ | 11.2 | 11.2 | 10.4 | 11.5 | 3.5 | 3.2 | 2.1 |
| $K_2O$ | 0.3 | 0.4 | 0.0 | 0.1 | 1.1 | 1.1 | 1.1 |
| MgO | 1.1 | 1.5 | 0.0 | 1.0 | 0.0 | 0.0 | 6.3 |
| CaO | 1.8 | 2.3 | 2.5 | 2.0 | 0.0 | 0.0 | 0.0 |
| SrO | 0.0 | 0.0 | 0.0 | 0.4 | 0.0 | 0.0 | 0.0 |
| BaO | 0.0 | 0.0 | 0.0 | 0.0 | 0.0 | 0.0 | 0.0 |
| ZnO | — | — | — | — | — | — | 2.3 |
| $ZrO_2$ | 1.0 | 1.0 | 0.9 | 0.9 | 1.0 | 0.0 | 0.6 |
| $TiO_2$ | 0.0 | 0.0 | 0.0 | 0.0 | 1.5 | 1.6 | 0.8 |
| $La_2O_3$ | 0.0 | 0.0 | 0.0 | 0.0 | 0.5 | 0.6 | 0.4 |
| $Nb_2O_5$ | 0.0 | 0.0 | 0.0 | 0.0 | 0.0 | 0.6 | 0.7 |
| $Ta_2O_5$ | 0.0 | 0.0 | 0.0 | 0.0 | 0.0 | 0.0 | 0.0 |
| $HfO_2$ | 0.0 | 0.0 | 0.0 | 0.1 | 0.0 | 0.0 | 0.0 |
| Total | 100.0 | 100.0 | 100.0 | 100.0 | 100.0 | 100.0 | 100.0 |
| $Li_2O + Na_2O + K_2O$ | 19.6 | 19.7 | 18.6 | 19.6 | 18.6 | 19.6 | 14.0 |
| MgO + CaO + SrO + BaO | 2.9 | 3.8 | 2.5 | 3.4 | 0.0 | 0.0 | 6.3 |
| $ZrO_2 + TiO_2 + La_2O_3 + Nb_2O_5 + Ta_2O_5 + HfO_2$ | 1.0 | 1.0 | 0.9 | 1.0 | 3.0 | 2.8 | 2.5 |
| $SiO_2 + Al_2O_3$ | 76.5 | 75.5 | 78.0 | 76.0 | 76.4 | 77.4 | 73.6 |

TABLE 10

| | Added amount based on basic components (mass %) | | | | SnO2/ |
|---|---|---|---|---|---|
| No. | SnO2 | CeO2 | Sb2O3 | SnO2 + CeO2 | (SnO2 + CeO2) |
| 1 | 0.01 | 0.09 | 0.00 | 0.10 | 0.10 |
| 2 | 0.03 | 0.07 | 0.00 | 0.10 | 0.30 |
| 3 | 0.05 | 0.05 | 0.00 | 0.10 | 0.50 |
| 4 | 0.07 | 0.03 | 0.00 | 0.10 | 0.70 |
| 5 | 0.09 | 0.01 | 0.00 | 0.10 | 0.90 |
| 6 | 0.01 | 0.29 | 0.00 | 0.30 | 0.03 |
| 7 | 0.03 | 0.27 | 0.00 | 0.30 | 0.10 |
| 8 | 0.05 | 0.25 | 0.00 | 0.30 | 0.17 |
| 9 | 0.07 | 0.23 | 0.00 | 0.30 | 0.23 |
| 10 | 0.1 | 0.2 | 0.00 | 0.30 | 0.33 |
| 11 | 0.15 | 0.15 | 0.00 | 0.30 | 0.50 |
| 12 | 0.2 | 0.1 | 0.00 | 0.30 | 0.67 |
| 13 | 0.23 | 0.07 | 0.00 | 0.30 | 0.77 |
| 14 | 0.25 | 0.05 | 0.00 | 0.30 | 0.83 |
| 15 | 0.27 | 0.03 | 0.00 | 0.30 | 0.90 |
| 16 | 0.29 | 0.01 | 0.00 | 0.30 | 0.97 |
| 17 | 0.01 | 0.49 | 0.00 | 0.50 | 0.02 |
| 18 | 0.05 | 0.45 | 0.00 | 0.50 | 0.10 |
| 19 | 0.1 | 0.4 | 0.00 | 0.50 | 0.20 |
| 20 | 0.15 | 0.35 | 0.00 | 0.50 | 0.30 |
| 21 | 0.2 | 0.3 | 0.00 | 0.50 | 0.40 |
| 22 | 0.25 | 0.25 | 0.00 | 0.50 | 0.50 |
| 23 | 0.3 | 0.2 | 0.00 | 0.50 | 0.60 |
| 24 | 0.35 | 0.15 | 0.00 | 0.50 | 0.70 |
| 25 | 0.4 | 0.1 | 0.00 | 0.50 | 0.80 |
| 26 | 0.45 | 0.05 | 0.00 | 0.50 | 0.90 |
| 27 | 0.49 | 0.01 | 0.00 | 0.50 | 0.98 |
| 28 | 0.02 | 0.78 | 0.00 | 0.80 | 0.03 |
| 29 | 0.05 | 0.75 | 0.00 | 0.80 | 0.06 |
| 30 | 0.1 | 0.7 | 0.00 | 0.80 | 0.13 |
| 31 | 0.15 | 0.65 | 0.00 | 0.80 | 0.19 |
| 32 | 0.2 | 0.6 | 0.00 | 0.80 | 0.25 |
| 33 | 0.25 | 0.55 | 0.00 | 0.80 | 0.31 |
| 34 | 0.3 | 0.5 | 0.00 | 0.80 | 0.38 |
| 35 | 0.35 | 0.45 | 0.00 | 0.80 | 0.44 |
| 36 | 0.4 | 0.4 | 0.00 | 0.80 | 0.50 |
| 37 | 0.45 | 0.35 | 0.00 | 0.80 | 0.56 |
| 38 | 0.5 | 0.3 | 0.00 | 0.80 | 0.63 |
| 39 | 0.55 | 0.25 | 0.00 | 0.80 | 0.69 |
| 40 | 0.6 | 0.2 | 0.00 | 0.80 | 0.75 |
| 41 | 0.65 | 0.15 | 0.00 | 0.80 | 0.81 |
| 42 | 0.7 | 0.1 | 0.00 | 0.80 | 0.88 |
| 43 | 0.75 | 0.05 | 0.00 | 0.80 | 0.94 |
| 44 | 0.79 | 0.01 | 0.00 | 0.80 | 0.99 |
| 45 | 0.02 | 0.98 | 0.00 | 1.00 | 0.02 |
| 46 | 0.05 | 0.95 | 0.00 | 1.00 | 0.05 |
| 47 | 0.1 | 0.9 | 0.00 | 1.00 | 0.10 |
| 48 | 0.15 | 0.85 | 0.00 | 1.00 | 0.15 |
| 49 | 0.2 | 0.8 | 0.00 | 1.00 | 0.20 |
| 50 | 0.3 | 0.7 | 0.00 | 1.00 | 0.30 |
| 51 | 0.4 | 0.6 | 0.00 | 1.00 | 0.40 |
| 52 | 0.5 | 0.5 | 0.00 | 1.00 | 0.50 |
| 53 | 0.6 | 0.4 | 0.00 | 1.00 | 0.60 |
| 54 | 0.7 | 0.3 | 0.00 | 1.00 | 0.70 |
| 55 | 0.8 | 0.2 | 0.00 | 1.00 | 0.80 |
| 56 | 0.85 | 0.15 | 0.00 | 1.00 | 0.85 |
| 57 | 0.9 | 0.1 | 0.00 | 1.00 | 0.90 |
| 58 | 0.95 | 0.05 | 0.00 | 1.00 | 0.95 |
| 59 | 0.98 | 0.02 | 0.00 | 1.00 | 0.98 |

TABLE 10-continued

| No. | Added amount based on basic components (mass %) SnO2 | CeO2 | Sb2O3 | SnO2 + CeO2 | SnO2/(SnO2 + CeO2) |
|---|---|---|---|---|---|
| 60 | 0.03 | 1.17 | 0.00 | 1.20 | 0.03 |
| 61 | 0.05 | 1.15 | 0.00 | 1.20 | 0.04 |
| 62 | 0.08 | 1.12 | 0.00 | 1.20 | 0.07 |
| 63 | 0.1 | 1.1 | 0.00 | 1.20 | 0.08 |
| 64 | 0.12 | 1.08 | 0.00 | 1.20 | 0.10 |
| 65 | 0.15 | 1.05 | 0.00 | 1.20 | 0.13 |
| 66 | 0.2 | 1 | 0.00 | 1.20 | 0.17 |
| 67 | 0.3 | 0.9 | 0.00 | 1.20 | 0.25 |
| 68 | 0.4 | 0.8 | 0.00 | 1.20 | 0.33 |
| 69 | 0.5 | 0.7 | 0.00 | 1.20 | 0.42 |
| 70 | 0.6 | 0.6 | 0.00 | 1.20 | 0.50 |
| 71 | 0.7 | 0.5 | 0.00 | 1.20 | 0.58 |
| 72 | 0.8 | 0.4 | 0.00 | 1.20 | 0.67 |
| 73 | 0.9 | 0.3 | 0.00 | 1.20 | 0.75 |
| 74 | 1 | 0.2 | 0.00 | 1.20 | 0.83 |
| 75 | 1.1 | 0.1 | 0.00 | 1.20 | 0.92 |
| 76 | 1.15 | 0.05 | 0.00 | 1.20 | 0.96 |
| 77 | 1.18 | 0.02 | 0.00 | 1.20 | 0.98 |
| 78 | 0.03 | 1.47 | 0.00 | 1.50 | 0.02 |
| 79 | 0.05 | 1.45 | 0.00 | 1.50 | 0.03 |
| 80 | 0.07 | 1.43 | 0.00 | 1.50 | 0.05 |
| 81 | 0.1 | 1.4 | 0.00 | 1.50 | 0.07 |
| 82 | 0.2 | 1.3 | 0.00 | 1.50 | 0.13 |
| 83 | 0.3 | 1.2 | 0.00 | 1.50 | 0.20 |
| 84 | 0.4 | 1.1 | 0.00 | 1.50 | 0.27 |
| 85 | 0.5 | 1 | 0.00 | 1.50 | 0.33 |
| 86 | 0.6 | 0.9 | 0.00 | 1.50 | 0.40 |
| 87 | 0.7 | 0.8 | 0.00 | 1.50 | 0.47 |
| 88 | 0.75 | 0.75 | 0.00 | 1.50 | 0.50 |
| 89 | 0.8 | 0.7 | 0.00 | 1.50 | 0.53 |
| 90 | 0.9 | 0.6 | 0.00 | 1.50 | 0.60 |
| 91 | 1 | 0.5 | 0.00 | 1.50 | 0.67 |
| 92 | 1.1 | 0.4 | 0.00 | 1.50 | 0.73 |
| 93 | 1.2 | 0.3 | 0.00 | 1.50 | 0.80 |
| 94 | 1.3 | 0.2 | 0.00 | 1.50 | 0.87 |
| 95 | 1.4 | 0.1 | 0.00 | 1.50 | 0.93 |
| 96 | 1.43 | 0.07 | 0.00 | 1.50 | 0.95 |
| 97 | 1.45 | 0.05 | 0.00 | 1.50 | 0.97 |
| 98 | 1.47 | 0.03 | 0.00 | 1.50 | 0.98 |
| 99 | 1.48 | 0.02 | 0.00 | 1.50 | 0.99 |
| 100 | 0.02 | 1.68 | 0.00 | 1.70 | 0.01 |
| 101 | 0.05 | 1.65 | 0.00 | 1.70 | 0.03 |
| 102 | 0.07 | 1.63 | 0.00 | 1.70 | 0.04 |
| 103 | 0.1 | 1.6 | 0.00 | 1.70 | 0.06 |
| 104 | 0.2 | 1.5 | 0.00 | 1.70 | 0.12 |
| 105 | 0.3 | 1.4 | 0.00 | 1.70 | 0.18 |
| 106 | 0.4 | 1.3 | 0.00 | 1.70 | 0.24 |
| 107 | 0.5 | 1.2 | 0.00 | 1.70 | 0.29 |
| 108 | 0.6 | 1.1 | 0.00 | 1.70 | 0.35 |
| 109 | 0.7 | 1 | 0.00 | 1.70 | 0.41 |
| 110 | 0.8 | 0.9 | 0.00 | 1.70 | 0.47 |
| 111 | 0.9 | 0.8 | 0.00 | 1.70 | 0.53 |
| 112 | 0.85 | 0.85 | 0.00 | 1.70 | 0.50 |
| 113 | 0.9 | 0.8 | 0.00 | 1.70 | 0.53 |
| 114 | 1 | 0.7 | 0.00 | 1.70 | 0.59 |
| 115 | 1.1 | 0.6 | 0.00 | 1.70 | 0.65 |
| 116 | 1.2 | 0.5 | 0.00 | 1.70 | 0.71 |
| 117 | 1.3 | 0.4 | 0.00 | 1.70 | 0.76 |
| 118 | 1.4 | 0.3 | 0.00 | 1.70 | 0.82 |
| 119 | 1.5 | 0.2 | 0.00 | 1.70 | 0.88 |
| 120 | 1.6 | 0.1 | 0.00 | 1.70 | 0.94 |
| 121 | 1.65 | 0.05 | 0.00 | 1.70 | 0.97 |
| 122 | 1.68 | 0.02 | 0.00 | 1.70 | 0.99 |
| 123 | 0.02 | 1.98 | 0.00 | 2.00 | 0.01 |
| 124 | 0.05 | 1.95 | 0.00 | 2.00 | 0.03 |
| 125 | 0.07 | 1.93 | 0.00 | 2.00 | 0.04 |
| 126 | 0.1 | 1.9 | 0.00 | 2.00 | 0.05 |
| 127 | 0.2 | 1.8 | 0.00 | 2.00 | 0.10 |
| 128 | 0.3 | 1.7 | 0.00 | 2.00 | 0.15 |
| 129 | 0.4 | 1.6 | 0.00 | 2.00 | 0.20 |
| 130 | 0.5 | 1.5 | 0.00 | 2.00 | 0.25 |
| 131 | 0.6 | 1.4 | 0.00 | 2.00 | 0.30 |
| 132 | 0.7 | 1.3 | 0.00 | 2.00 | 0.35 |
| 133 | 0.8 | 1.2 | 0.00 | 2.00 | 0.40 |
| 134 | 0.9 | 1.1 | 0.00 | 2.00 | 0.45 |

TABLE 10-continued

| No. | Added amount based on basic components (mass %) SnO2 | CeO2 | Sb2O3 | SnO2 + CeO2 | SnO2/(SnO2 + CeO2) |
|---|---|---|---|---|---|
| 135 | 1 | 1 | 0.00 | 2.00 | 0.50 |
| 136 | 1.1 | 0.9 | 0.00 | 2.00 | 0.55 |
| 137 | 1.2 | 0.8 | 0.00 | 2.00 | 0.60 |
| 138 | 1.3 | 0.7 | 0.00 | 2.00 | 0.65 |
| 139 | 1.4 | 0.6 | 0.00 | 2.00 | 0.70 |
| 140 | 1.5 | 0.5 | 0.00 | 2.00 | 0.75 |
| 141 | 1.6 | 0.4 | 0.00 | 2.00 | 0.80 |
| 142 | 1.7 | 0.3 | 0.00 | 2.00 | 0.85 |
| 143 | 1.8 | 0.2 | 0.00 | 2.00 | 0.90 |
| 144 | 1.9 | 0.1 | 0.00 | 2.00 | 0.95 |
| 145 | 1.95 | 0.05 | 0.00 | 2.00 | 0.98 |
| 146 | 1.97 | 0.03 | 0.00 | 2.00 | 0.99 |
| 147 | 1.98 | 0.02 | 0.00 | 2.00 | 0.99 |
| 148 | 0.05 | 2.25 | 0.00 | 2.30 | 0.02 |
| 149 | 0.1 | 2.2 | 0.00 | 2.30 | 0.04 |
| 150 | 0.2 | 2.1 | 0.00 | 2.30 | 0.09 |
| 151 | 0.3 | 2 | 0.00 | 2.30 | 0.13 |
| 152 | 0.4 | 1.9 | 0.00 | 2.30 | 0.17 |
| 153 | 0.5 | 1.8 | 0.00 | 2.30 | 0.22 |
| 154 | 0.6 | 1.7 | 0.00 | 2.30 | 0.26 |
| 155 | 0.7 | 1.6 | 0.00 | 2.30 | 0.30 |
| 156 | 0.8 | 1.5 | 0.00 | 2.30 | 0.35 |
| 157 | 0.9 | 1.4 | 0.00 | 2.30 | 0.39 |
| 158 | 1 | 1.3 | 0.00 | 2.30 | 0.43 |
| 159 | 1.1 | 1.2 | 0.00 | 2.30 | 0.48 |
| 160 | 1.2 | 1.1 | 0.00 | 2.30 | 0.52 |
| 161 | 1.3 | 1 | 0.00 | 2.30 | 0.57 |
| 162 | 1.4 | 0.9 | 0.00 | 2.30 | 0.61 |
| 163 | 1.5 | 0.8 | 0.00 | 2.30 | 0.65 |
| 164 | 1.6 | 0.7 | 0.00 | 2.30 | 0.70 |
| 165 | 1.7 | 0.6 | 0.00 | 2.30 | 0.74 |
| 166 | 1.8 | 0.5 | 0.00 | 2.30 | 0.78 |
| 167 | 1.9 | 0.4 | 0.00 | 2.30 | 0.83 |
| 168 | 2 | 0.3 | 0.00 | 2.30 | 0.87 |
| 169 | 2.1 | 0.2 | 0.00 | 2.30 | 0.91 |
| 170 | 2.2 | 0.1 | 0.00 | 2.30 | 0.96 |
| 171 | 2.25 | 0.05 | 0.00 | 2.30 | 0.98 |
| 172 | 2.27 | 0.03 | 0.00 | 2.30 | 0.99 |
| 173 | 0.05 | 2.45 | 0.00 | 2.50 | 0.02 |
| 174 | 0.07 | 2.43 | 0.00 | 2.50 | 0.03 |
| 175 | 0.1 | 2.4 | 0.00 | 2.50 | 0.04 |
| 176 | 0.2 | 2.3 | 0.00 | 2.50 | 0.08 |
| 177 | 0.3 | 2.2 | 0.00 | 2.50 | 0.12 |
| 178 | 0.4 | 2.1 | 0.00 | 2.50 | 0.16 |
| 179 | 0.5 | 2 | 0.00 | 2.50 | 0.20 |
| 180 | 0.6 | 1.9 | 0.00 | 2.50 | 0.24 |
| 181 | 0.7 | 1.8 | 0.00 | 2.50 | 0.28 |
| 182 | 0.8 | 1.7 | 0.00 | 2.50 | 0.32 |
| 183 | 0.9 | 1.6 | 0.00 | 2.50 | 0.36 |
| 184 | 1 | 1.5 | 0.00 | 2.50 | 0.40 |
| 185 | 1.1 | 1.4 | 0.00 | 2.50 | 0.44 |
| 186 | 1.2 | 1.3 | 0.00 | 2.50 | 0.48 |
| 187 | 1.3 | 1.2 | 0.00 | 2.50 | 0.52 |
| 188 | 1.4 | 1.1 | 0.00 | 2.50 | 0.56 |
| 189 | 1.5 | 1 | 0.00 | 2.50 | 0.60 |
| 190 | 1.6 | 0.9 | 0.00 | 2.50 | 0.64 |
| 191 | 1.7 | 0.8 | 0.00 | 2.50 | 0.68 |
| 192 | 1.8 | 0.7 | 0.00 | 2.50 | 0.72 |
| 193 | 1.9 | 0.6 | 0.00 | 2.50 | 0.76 |
| 194 | 2 | 0.5 | 0.00 | 2.50 | 0.80 |
| 195 | 2.1 | 0.4 | 0.00 | 2.50 | 0.84 |
| 196 | 2.2 | 0.3 | 0.00 | 2.50 | 0.88 |
| 197 | 2.3 | 0.2 | 0.00 | 2.50 | 0.92 |
| 198 | 2.4 | 0.1 | 0.00 | 2.50 | 0.96 |
| 199 | 2.45 | 0.05 | 0.00 | 2.50 | 0.98 |
| 200 | 2.47 | 0.03 | 0.00 | 2.50 | 0.99 |
| 201 | 2.48 | 0.02 | 0.00 | 2.50 | 0.99 |
| 202 | 0.06 | 2.64 | 0.00 | 2.70 | 0.02 |
| 203 | 0.08 | 2.62 | 0.00 | 2.70 | 0.03 |
| 204 | 0.1 | 2.6 | 0.00 | 2.70 | 0.04 |
| 205 | 0.2 | 2.5 | 0.00 | 2.70 | 0.07 |
| 206 | 0.3 | 2.4 | 0.00 | 2.70 | 0.11 |
| 207 | 0.4 | 2.3 | 0.00 | 2.70 | 0.15 |
| 208 | 0.5 | 2.2 | 0.00 | 2.70 | 0.19 |
| 209 | 0.6 | 2.1 | 0.00 | 2.70 | 0.22 |

TABLE 10-continued

| No. | Added amount based on basic components (mass %) SnO2 | CeO2 | Sb2O3 | SnO2 + CeO2 | SnO2/ (SnO2 + CeO2) |
|---|---|---|---|---|---|
| 210 | 0.7 | 2 | 0.00 | 2.70 | 0.26 |
| 211 | 0.8 | 1.9 | 0.00 | 2.70 | 0.30 |
| 212 | 0.9 | 1.8 | 0.00 | 2.70 | 0.33 |
| 213 | 1 | 1.7 | 0.00 | 2.70 | 0.37 |
| 214 | 1.1 | 1.6 | 0.00 | 2.70 | 0.41 |
| 215 | 1.2 | 1.5 | 0.00 | 2.70 | 0.44 |
| 216 | 1.3 | 1.4 | 0.00 | 2.70 | 0.48 |
| 217 | 1.35 | 1.35 | 0.00 | 2.70 | 0.50 |
| 218 | 1.4 | 1.3 | 0.00 | 2.70 | 0.52 |
| 219 | 1.5 | 1.2 | 0.00 | 2.70 | 0.56 |
| 220 | 1.6 | 1.1 | 0.00 | 2.70 | 0.59 |
| 221 | 1.7 | 1 | 0.00 | 2.70 | 0.63 |
| 222 | 1.8 | 0.9 | 0.00 | 2.70 | 0.67 |
| 223 | 1.9 | 0.8 | 0.00 | 2.70 | 0.70 |
| 224 | 2 | 0.7 | 0.00 | 2.70 | 0.74 |
| 225 | 2.1 | 0.6 | 0.00 | 2.70 | 0.78 |
| 226 | 2.2 | 0.5 | 0.00 | 2.70 | 0.81 |
| 227 | 2.3 | 0.4 | 0.00 | 2.70 | 0.85 |
| 228 | 2.4 | 0.3 | 0.00 | 2.70 | 0.89 |
| 229 | 2.5 | 0.2 | 0.00 | 2.70 | 0.93 |
| 230 | 2.6 | 0.1 | 0.00 | 2.70 | 0.96 |
| 231 | 2.65 | 0.05 | 0.00 | 2.70 | 0.98 |
| 232 | 2.67 | 0.03 | 0.00 | 2.70 | 0.99 |
| 233 | 0.06 | 2.94 | 0.00 | 3.00 | 0.02 |
| 234 | 0.08 | 2.92 | 0.00 | 3.00 | 0.03 |
| 235 | 0.1 | 2.9 | 0.00 | 3.00 | 0.03 |
| 236 | 0.2 | 2.8 | 0.00 | 3.00 | 0.07 |
| 237 | 0.3 | 2.7 | 0.00 | 3.00 | 0.10 |
| 238 | 0.4 | 2.6 | 0.00 | 3.00 | 0.13 |
| 239 | 0.5 | 2.5 | 0.00 | 3.00 | 0.17 |
| 240 | 0.6 | 2.4 | 0.00 | 3.00 | 0.20 |
| 241 | 0.7 | 2.3 | 0.00 | 3.00 | 0.23 |
| 242 | 0.8 | 2.2 | 0.00 | 3.00 | 0.27 |
| 243 | 0.9 | 2.1 | 0.00 | 3.00 | 0.30 |
| 244 | 1 | 2 | 0.00 | 3.00 | 0.33 |
| 245 | 1.1 | 1.9 | 0.00 | 3.00 | 0.37 |
| 246 | 1.2 | 1.8 | 0.00 | 3.00 | 0.40 |
| 247 | 1.3 | 1.7 | 0.00 | 3.00 | 0.43 |
| 248 | 1.4 | 1.6 | 0.00 | 3.00 | 0.47 |
| 249 | 1.5 | 1.5 | 0.00 | 3.00 | 0.50 |
| 250 | 1.6 | 1.4 | 0.00 | 3.00 | 0.53 |
| 251 | 1.7 | 1.3 | 0.00 | 3.00 | 0.57 |
| 252 | 1.8 | 1.2 | 0.00 | 3.00 | 0.60 |
| 253 | 1.9 | 1.1 | 0.00 | 3.00 | 0.63 |
| 254 | 2 | 1 | 0.00 | 3.00 | 0.67 |
| 255 | 2.1 | 0.9 | 0.00 | 3.00 | 0.70 |
| 256 | 2.2 | 0.8 | 0.00 | 3.00 | 0.73 |
| 257 | 2.3 | 0.7 | 0.00 | 3.00 | 0.77 |
| 258 | 2.4 | 0.6 | 0.00 | 3.00 | 0.80 |
| 259 | 2.5 | 0.5 | 0.00 | 3.00 | 0.83 |
| 260 | 2.6 | 0.4 | 0.00 | 3.00 | 0.87 |
| 261 | 2.7 | 0.3 | 0.00 | 3.00 | 0.90 |
| 262 | 2.8 | 0.2 | 0.00 | 3.00 | 0.93 |
| 263 | 2.9 | 0.1 | 0.00 | 3.00 | 0.97 |
| 264 | 2.95 | 0.05 | 0.00 | 3.00 | 0.98 |
| 265 | 2.97 | 0.03 | 0.00 | 3.00 | 0.99 |
| 266 | 0.07 | 3.13 | 0.00 | 3.20 | 0.02 |
| 267 | 0.1 | 3.1 | 0.00 | 3.20 | 0.03 |
| 268 | 0.2 | 3 | 0.00 | 3.20 | 0.06 |
| 269 | 0.3 | 2.9 | 0.00 | 3.20 | 0.09 |
| 270 | 0.4 | 2.8 | 0.00 | 3.20 | 0.13 |
| 271 | 0.5 | 2.7 | 0.00 | 3.20 | 0.16 |
| 272 | 0.6 | 2.6 | 0.00 | 3.20 | 0.19 |
| 273 | 0.7 | 2.5 | 0.00 | 3.20 | 0.22 |
| 274 | 0.8 | 2.4 | 0.00 | 3.20 | 0.25 |
| 275 | 0.9 | 2.3 | 0.00 | 3.20 | 0.28 |
| 276 | 1 | 2.2 | 0.00 | 3.20 | 0.31 |
| 277 | 1.1 | 2.1 | 0.00 | 3.20 | 0.34 |
| 278 | 1.2 | 2 | 0.00 | 3.20 | 0.38 |
| 279 | 1.3 | 1.9 | 0.00 | 3.20 | 0.41 |
| 280 | 1.4 | 1.8 | 0.00 | 3.20 | 0.44 |
| 281 | 1.5 | 1.7 | 0.00 | 3.20 | 0.47 |
| 282 | 1.6 | 1.6 | 0.00 | 3.20 | 0.50 |
| 283 | 1.7 | 1.5 | 0.00 | 3.20 | 0.53 |
| 284 | 1.8 | 1.4 | 0.00 | 3.20 | 0.56 |

TABLE 10-continued

| No. | Added amount based on basic components (mass %) SnO2 | CeO2 | Sb2O3 | SnO2 + CeO2 | SnO2/ (SnO2 + CeO2) |
|---|---|---|---|---|---|
| 285 | 1.9 | 1.3 | 0.00 | 3.20 | 0.59 |
| 286 | 2 | 1.2 | 0.00 | 3.20 | 0.63 |
| 287 | 2.1 | 1.1 | 0.00 | 3.20 | 0.66 |
| 288 | 2.2 | 1 | 0.00 | 3.20 | 0.69 |
| 289 | 2.3 | 0.9 | 0.00 | 3.20 | 0.72 |
| 290 | 2.4 | 0.8 | 0.00 | 3.20 | 0.75 |
| 291 | 2.5 | 0.7 | 0.00 | 3.20 | 0.78 |
| 292 | 2.6 | 0.6 | 0.00 | 3.20 | 0.81 |
| 293 | 2.7 | 0.5 | 0.00 | 3.20 | 0.84 |
| 294 | 2.8 | 0.4 | 0.00 | 3.20 | 0.88 |
| 295 | 2.9 | 0.3 | 0.00 | 3.20 | 0.91 |
| 296 | 3 | 0.2 | 0.00 | 3.20 | 0.94 |
| 297 | 3.1 | 0.1 | 0.00 | 3.20 | 0.97 |
| 298 | 3.15 | 0.05 | 0.00 | 3.20 | 0.98 |
| 299 | 3.16 | 0.04 | 0.00 | 3.20 | 0.99 |
| 300 | 0.07 | 3.43 | 0.00 | 3.50 | 0.02 |
| 301 | 0.09 | 3.41 | 0.00 | 3.50 | 0.03 |
| 302 | 0.1 | 3.4 | 0.00 | 3.50 | 0.03 |
| 303 | 0.2 | 3.3 | 0.00 | 3.50 | 0.06 |
| 304 | 0.3 | 3.2 | 0.00 | 3.50 | 0.09 |
| 305 | 0.4 | 3.1 | 0.00 | 3.50 | 0.11 |
| 306 | 0.5 | 3 | 0.00 | 3.50 | 0.14 |
| 307 | 0.6 | 2.9 | 0.00 | 3.50 | 0.17 |
| 308 | 0.7 | 2.8 | 0.00 | 3.50 | 0.20 |
| 309 | 0.8 | 2.7 | 0.00 | 3.50 | 0.23 |
| 310 | 0.9 | 2.6 | 0.00 | 3.50 | 0.26 |
| 311 | 1 | 2.5 | 0.00 | 3.50 | 0.29 |
| 312 | 1.1 | 2.4 | 0.00 | 3.50 | 0.31 |
| 313 | 1.2 | 2.3 | 0.00 | 3.50 | 0.34 |
| 314 | 1.3 | 2.2 | 0.00 | 3.50 | 0.37 |
| 315 | 1.4 | 2.1 | 0.00 | 3.50 | 0.40 |
| 316 | 1.5 | 2 | 0.00 | 3.50 | 0.43 |
| 317 | 1.6 | 1.9 | 0.00 | 3.50 | 0.46 |
| 318 | 1.7 | 1.8 | 0.00 | 3.50 | 0.49 |
| 319 | 1.75 | 1.75 | 0.00 | 3.50 | 0.50 |
| 320 | 1.8 | 1.7 | 0.00 | 3.50 | 0.51 |
| 321 | 1.9 | 1.6 | 0.00 | 3.50 | 0.54 |
| 322 | 2 | 1.5 | 0.00 | 3.50 | 0.57 |
| 323 | 2.1 | 1.4 | 0.00 | 3.50 | 0.60 |
| 324 | 2.2 | 1.3 | 0.00 | 3.50 | 0.63 |
| 325 | 2.3 | 1.2 | 0.00 | 3.50 | 0.66 |
| 326 | 2.4 | 1.1 | 0.00 | 3.50 | 0.69 |
| 327 | 2.5 | 1 | 0.00 | 3.50 | 0.71 |
| 328 | 2.6 | 0.9 | 0.00 | 3.50 | 0.74 |
| 329 | 2.7 | 0.8 | 0.00 | 3.50 | 0.77 |
| 330 | 2.8 | 0.7 | 0.00 | 3.50 | 0.80 |
| 331 | 2.9 | 0.6 | 0.00 | 3.50 | 0.83 |
| 332 | 3 | 0.5 | 0.00 | 3.50 | 0.86 |
| 333 | 3.1 | 0.4 | 0.00 | 3.50 | 0.89 |
| 334 | 3.2 | 0.3 | 0.00 | 3.50 | 0.91 |
| 335 | 3.3 | 0.2 | 0.00 | 3.50 | 0.94 |
| 336 | 3.4 | 0.1 | 0.00 | 3.50 | 0.97 |
| 337 | 3.43 | 0.07 | 0.00 | 3.50 | 0.98 |
| 338 | 3.45 | 0.05 | 0.00 | 3.50 | 0.99 |
| 339 | 3.46 | 0.04 | 0.00 | 3.50 | 0.99 |
| Com. Ex. 1 | 2.16 | 2.75 | 0 | 4.91 | 0.44 |
| Com. Ex. 2 | 2.21 | 2.8 | 0 | 5.01 | 0.44 |
| Com. Ex. 3 | 2.4 | 2.9 | 0 | 5.3 | 0.45 |
| Com. Ex. 4 | 2.39 | 3.05 | 0 | 5.44 | 0.44 |
| Com. Ex. 5 | 3.52 | 8.56 | 0 | 12.08 | 0.29 |
| Com. Ex. 6 | 0 | 0 | 0.50 | 0.00 | — |
| Com. Ex. 7 | 0.25 | 0 | 0.15 | 0.25 | 1.00 |
| Com. Ex. 8 | 1 | 0 | 0 | 1 | 1.00 |
| Com. Ex. 9 | 0 | 1 | 0 | 1 | 0.00 |

TABLE 11

| No. | Bubbles rank | Unmelted rank | Acid etching rate (nm/min) | Alkaline etching rate (nm/min) |
|---|---|---|---|---|
| 1-1 | E | S | 1.7 | 0.07 |
| 1-2 | E | S | 1.7 | 0.07 |

TABLE 11-continued

| No. | Bubbles rank | Unmelted rank | Acid etching rate (nm/min) | Alkaline etching rate (nm/min) |
|---|---|---|---|---|
| 1-3 | B | S | 1.7 | 0.07 |
| 1-4 | B | S | 1.7 | 0.07 |
| 1-5 | C | S | 1.7 | 0.07 |
| 1-6 | E | S | 1.7 | 0.07 |
| 1-7 | E | S | 1.7 | 0.07 |
| 1-8 | E | S | 1.7 | 0.07 |
| 1-9 | E | S | 1.7 | 0.07 |
| 1-10 | D | S | 1.7 | 0.07 |
| 1-11 | B | S | 1.7 | 0.07 |
| 1-12 | B | S | 1.7 | 0.07 |
| 1-13 | B | S | 1.7 | 0.07 |
| 1-14 | B | S | 1.7 | 0.07 |
| 1-15 | C | S | 1.7 | 0.07 |
| 1-16 | C | S | 1.7 | 0.07 |
| 1-17 | D | S | 1.7 | 0.07 |
| 1-18 | D | S | 1.7 | 0.07 |
| 1-19 | D | S | 1.7 | 0.07 |
| 1-20 | D | S | 1.7 | 0.07 |
| 1-21 | C | S | 1.7 | 0.07 |
| 1-22 | A | S | 1.7 | 0.07 |
| 1-23 | A | S | 1.7 | 0.07 |
| 1-24 | A | S | 1.7 | 0.07 |
| 1-25 | A | S | 1.7 | 0.07 |
| 1-26 | B | S | 1.7 | 0.07 |
| 1-27 | B | S | 1.7 | 0.07 |
| 1-28 | D | S | 1.7 | 0.07 |
| 1-29 | D | S | 1.7 | 0.07 |
| 1-30 | D | S | 1.7 | 0.07 |
| 1-31 | D | S | 1.7 | 0.07 |
| 1-32 | D | S | 1.7 | 0.07 |
| 1-33 | D | S | 1.7 | 0.07 |
| 1-34 | C | S | 1.7 | 0.07 |
| 1-35 | C | S | 1.7 | 0.07 |
| 1-36 | A | S | 1.7 | 0.07 |
| 1-37 | A | S | 1.7 | 0.07 |
| 1-38 | S | S | 1.7 | 0.07 |
| 1-39 | S | S | 1.7 | 0.07 |
| 1-40 | S | S | 1.7 | 0.07 |
| 1-41 | A | S | 1.7 | 0.07 |
| 1-42 | A | S | 1.7 | 0.07 |
| 1-43 | B | S | 1.7 | 0.07 |
| 1-44 | B | S | 1.7 | 0.07 |
| 1-45 | D | S | 1.7 | 0.07 |
| 1-46 | D | S | 1.7 | 0.07 |
| 1-47 | D | S | 1.7 | 0.07 |
| 1-48 | D | S | 1.7 | 0.07 |
| 1-49 | D | S | 1.7 | 0.07 |
| 1-50 | D | S | 1.7 | 0.07 |
| 1-51 | A | S | 1.7 | 0.07 |
| 1-52 | S | S | 1.7 | 0.07 |
| 1-53 | S | S | 1.7 | 0.07 |
| 1-54 | S | S | 1.7 | 0.07 |
| 1-55 | S | S | 1.7 | 0.07 |
| 1-56 | A | S | 1.7 | 0.07 |
| 1-57 | A | S | 1.7 | 0.07 |
| 1-58 | B | S | 1.7 | 0.07 |
| 1-59 | B | S | 1.7 | 0.07 |
| 1-60 | D | S | 1.7 | 0.07 |
| 1-61 | D | S | 1.7 | 0.07 |
| 1-62 | D | S | 1.7 | 0.07 |
| 1-63 | D | S | 1.7 | 0.07 |
| 1-64 | D | S | 1.7 | 0.07 |
| 1-65 | D | S | 1.7 | 0.07 |
| 1-66 | D | S | 1.7 | 0.07 |
| 1-67 | D | S | 1.7 | 0.07 |
| 1-68 | C | S | 1.7 | 0.07 |
| 1-69 | B | S | 1.7 | 0.07 |
| 1-70 | S | S | 1.7 | 0.07 |
| 1-71 | S | S | 1.7 | 0.07 |
| 1-72 | S | S | 1.7 | 0.07 |
| 1-73 | S | S | 1.7 | 0.07 |
| 1-74 | S | S | 1.7 | 0.07 |
| 1-75 | A | A | 1.7 | 0.07 |
| 1-76 | B | A | 1.7 | 0.07 |
| 1-77 | B | A | 1.7 | 0.07 |
| 1-78 | D | S | 1.7 | 0.07 |
| 1-79 | D | S | 1.7 | 0.07 |

TABLE 11-continued

| No. | Bubbles rank | Unmelted rank | Acid etching rate (nm/min) | Alkaline etching rate (nm/min) |
|---|---|---|---|---|
| 1-80 | D | S | 1.7 | 0.07 |
| 1-81 | D | S | 1.7 | 0.07 |
| 1-82 | D | S | 1.7 | 0.07 |
| 1-83 | D | S | 1.7 | 0.07 |
| 1-84 | D | S | 1.7 | 0.07 |
| 1-85 | C | S | 1.7 | 0.07 |
| 1-86 | B | S | 1.7 | 0.07 |
| 1-87 | S | S | 1.7 | 0.07 |
| 1-88 | S | S | 1.7 | 0.07 |
| 1-89 | S | S | 1.7 | 0.07 |
| 1-90 | S | S | 1.7 | 0.07 |
| 1-91 | S | S | 1.7 | 0.07 |
| 1-92 | S | A | 1.7 | 0.07 |
| 1-93 | S | A | 1.7 | 0.07 |
| 1-94 | A | A | 1.7 | 0.07 |
| 1-95 | A | A | 1.7 | 0.07 |
| 1-96 | B | A | 1.7 | 0.07 |
| 1-97 | B | A | 1.7 | 0.07 |
| 1-98 | B | A | 1.7 | 0.07 |
| 1-99 | B | A | 1.7 | 0.07 |
| 1-100 | D | B | 1.7 | 0.07 |
| 1-101 | D | B | 1.7 | 0.07 |
| 1-102 | D | B | 1.7 | 0.07 |
| 1-103 | D | B | 1.7 | 0.07 |
| 1-104 | D | B | 1.7 | 0.07 |
| 1-105 | D | B | 1.7 | 0.07 |
| 1-106 | D | B | 1.7 | 0.07 |
| 1-107 | C | B | 1.7 | 0.07 |
| 1-108 | B | B | 1.7 | 0.07 |
| 1-109 | B | B | 1.7 | 0.07 |
| 1-110 | S | B | 1.7 | 0.07 |
| 1-111 | S | B | 1.7 | 0.07 |
| 1-112 | S | B | 1.7 | 0.07 |
| 1-113 | S | B | 1.7 | 0.07 |
| 1-114 | S | B | 1.7 | 0.07 |
| 1-115 | S | B | 1.7 | 0.07 |
| 1-116 | S | B | 1.7 | 0.07 |
| 1-117 | S | B | 1.7 | 0.07 |
| 1-118 | S | B | 1.7 | 0.07 |
| 1-119 | A | B | 1.7 | 0.07 |
| 1-120 | A | B | 1.7 | 0.07 |
| 1-121 | B | B | 1.7 | 0.07 |
| 1-122 | B | B | 1.7 | 0.07 |
| 1-123 | D | B | 1.7 | 0.07 |
| 1-124 | D | B | 1.7 | 0.07 |
| 1-125 | D | B | 1.7 | 0.07 |
| 1-126 | D | B | 1.7 | 0.07 |
| 1-127 | D | B | 1.7 | 0.07 |
| 1-128 | D | B | 1.7 | 0.07 |
| 1-129 | D | B | 1.7 | 0.07 |
| 1-130 | C | B | 1.7 | 0.07 |
| 1-131 | C | B | 1.7 | 0.07 |
| 1-132 | B | B | 1.7 | 0.07 |
| 1-133 | B | B | 1.7 | 0.07 |
| 1-134 | S | B | 1.7 | 0.07 |
| 1-135 | S | B | 1.7 | 0.07 |
| 1-136 | S | B | 1.7 | 0.07 |
| 1-137 | S | B | 1.7 | 0.07 |
| 1-138 | S | B | 1.7 | 0.07 |
| 1-139 | S | B | 1.7 | 0.07 |
| 1-140 | S | B | 1.7 | 0.07 |
| 1-141 | S | B | 1.7 | 0.07 |
| 1-142 | S | B | 1.7 | 0.07 |
| 1-143 | A | B | 1.7 | 0.07 |
| 1-144 | A | B | 1.7 | 0.07 |
| 1-145 | B | B | 1.7 | 0.07 |
| 1-146 | B | B | 1.7 | 0.07 |
| 1-147 | B | B | 1.7 | 0.07 |
| 1-148 | D | B | 1.7 | 0.07 |
| 1-149 | D | B | 1.7 | 0.07 |
| 1-150 | D | B | 1.7 | 0.07 |
| 1-151 | D | B | 1.7 | 0.07 |
| 1-152 | D | B | 1.7 | 0.07 |
| 1-153 | C | B | 1.7 | 0.07 |
| 1-154 | C | B | 1.7 | 0.07 |
| 1-155 | C | B | 1.7 | 0.07 |
| 1-156 | C | B | 1.7 | 0.07 |

TABLE 11-continued

| No. | Bubbles rank | Unmelted rank | Acid etching rate (nm/min) | Alkaline etching rate (nm/min) |
|---|---|---|---|---|
| 1-157 | B | B | 1.7 | 0.07 |
| 1-158 | B | B | 1.7 | 0.07 |
| 1-159 | S | B | 1.7 | 0.07 |
| 1-160 | S | B | 1.7 | 0.07 |
| 1-161 | S | B | 1.7 | 0.07 |
| 1-162 | S | B | 1.7 | 0.07 |
| 1-163 | S | B | 1.7 | 0.07 |
| 1-164 | S | B | 1.7 | 0.07 |
| 1-165 | S | B | 1.7 | 0.07 |
| 1-166 | S | B | 1.7 | 0.07 |
| 1-167 | S | B | 1.7 | 0.07 |
| 1-168 | A | B | 1.7 | 0.07 |
| 1-169 | A | B | 1.7 | 0.07 |
| 1-170 | A | B | 1.7 | 0.07 |
| 1-171 | B | B | 1.7 | 0.07 |
| 1-172 | B | B | 1.7 | 0.07 |
| 1-173 | D | B | 1.7 | 0.07 |
| 1-174 | D | B | 1.7 | 0.07 |
| 1-175 | D | B | 1.7 | 0.07 |
| 1-176 | D | B | 1.7 | 0.07 |
| 1-177 | D | B | 1.7 | 0.07 |
| 1-178 | D | B | 1.7 | 0.07 |
| 1-179 | C | B | 1.7 | 0.07 |
| 1-180 | C | B | 1.7 | 0.07 |
| 1-181 | C | B | 1.7 | 0.07 |
| 1-182 | C | B | 1.7 | 0.07 |
| 1-183 | B | B | 1.7 | 0.07 |
| 1-184 | B | B | 1.7 | 0.07 |
| 1-185 | B | B | 1.7 | 0.07 |
| 1-186 | S | B | 1.7 | 0.07 |
| 1-187 | S | B | 1.7 | 0.07 |
| 1-188 | S | B | 1.7 | 0.07 |
| 1-189 | S | B | 1.7 | 0.07 |
| 1-190 | S | B | 1.7 | 0.07 |
| 1-191 | S | B | 1.7 | 0.07 |
| 1-192 | S | B | 1.7 | 0.07 |
| 1-193 | S | B | 1.7 | 0.07 |
| 1-194 | S | B | 1.7 | 0.07 |
| 1-195 | S | B | 1.7 | 0.07 |
| 1-196 | A | B | 1.7 | 0.07 |
| 1-197 | A | B | 1.7 | 0.07 |
| 1-198 | A | B | 1.7 | 0.07 |
| 1-199 | B | B | 1.7 | 0.07 |
| 1-200 | B | B | 1.7 | 0.07 |
| 1-201 | E | B | 1.7 | 0.07 |
| 1-202 | D | C | 1.7 | 0.07 |
| 1-203 | D | C | 1.7 | 0.07 |
| 1-204 | D | C | 1.7 | 0.07 |
| 1-205 | D | C | 1.7 | 0.07 |
| 1-206 | D | C | 1.7 | 0.07 |
| 1-207 | D | C | 1.7 | 0.07 |
| 1-208 | C | C | 1.7 | 0.07 |
| 1-209 | C | C | 1.7 | 0.07 |
| 1-210 | C | C | 1.7 | 0.07 |
| 1-211 | C | C | 1.7 | 0.07 |
| 1-212 | C | C | 1.7 | 0.07 |
| 1-213 | B | C | 1.7 | 0.07 |
| 1-214 | B | C | 1.7 | 0.07 |
| 1-215 | B | C | 1.7 | 0.07 |
| 1-216 | S | C | 1.7 | 0.07 |
| 1-217 | S | C | 1.7 | 0.07 |
| 1-218 | S | C | 1.7 | 0.07 |
| 1-219 | S | C | 1.7 | 0.07 |
| 1-220 | S | C | 1.7 | 0.07 |
| 1-221 | S | C | 1.7 | 0.07 |
| 1-222 | S | C | 1.7 | 0.07 |
| 1-223 | S | C | 1.7 | 0.07 |
| 1-224 | S | C | 1.7 | 0.07 |
| 1-225 | S | C | 1.7 | 0.07 |
| 1-226 | S | C | 1.7 | 0.07 |
| 1-227 | S | C | 1.7 | 0.07 |
| 1-228 | A | C | 1.7 | 0.07 |
| 1-229 | A | C | 1.7 | 0.07 |
| 1-230 | A | C | 1.7 | 0.07 |
| 1-231 | B | C | 1.7 | 0.07 |
| 1-232 | B | C | 1.7 | 0.07 |
| 1-233 | D | C | 1.7 | 0.07 |

TABLE 11-continued

| No. | Bubbles rank | Unmelted rank | Acid etching rate (nm/min) | Alkaline etching rate (nm/min) |
|---|---|---|---|---|
| 1-234 | D | C | 1.7 | 0.07 |
| 1-235 | D | C | 1.7 | 0.07 |
| 1-236 | D | C | 1.7 | 0.07 |
| 1-237 | D | C | 1.7 | 0.07 |
| 1-238 | D | C | 1.7 | 0.07 |
| 1-239 | C | C | 1.7 | 0.07 |
| 1-240 | C | C | 1.7 | 0.07 |
| 1-241 | C | C | 1.7 | 0.07 |
| 1-242 | C | C | 1.7 | 0.07 |
| 1-243 | C | C | 1.7 | 0.07 |
| 1-244 | C | C | 1.7 | 0.07 |
| 1-245 | B | C | 1.7 | 0.07 |
| 1-246 | B | C | 1.7 | 0.07 |
| 1-247 | B | C | 1.7 | 0.07 |
| 1-248 | S | C | 1.7 | 0.07 |
| 1-249 | S | C | 1.7 | 0.07 |
| 1-250 | S | C | 1.7 | 0.07 |
| 1-251 | S | C | 1.7 | 0.07 |
| 1-252 | S | C | 1.7 | 0.07 |
| 1-253 | S | C | 1.7 | 0.07 |
| 1-254 | S | C | 1.7 | 0.07 |
| 1-255 | S | C | 1.7 | 0.07 |
| 1-256 | S | C | 1.7 | 0.07 |
| 1-257 | S | C | 1.7 | 0.07 |
| 1-258 | S | C | 1.7 | 0.07 |
| 1-259 | S | C | 1.7 | 0.07 |
| 1-260 | A | C | 1.7 | 0.07 |
| 1-261 | A | C | 1.7 | 0.07 |
| 1-262 | A | C | 1.7 | 0.07 |
| 1-263 | A | C | 1.7 | 0.07 |
| 1-264 | B | C | 1.7 | 0.07 |
| 1-265 | B | C | 1.7 | 0.07 |
| 1-266 | D | C | 1.7 | 0.07 |
| 1-267 | D | C | 1.7 | 0.07 |
| 1-268 | D | C | 1.7 | 0.07 |
| 1-269 | D | C | 1.7 | 0.07 |
| 1-270 | D | C | 1.7 | 0.07 |
| 1-271 | C | C | 1.7 | 0.07 |
| 1-272 | C | C | 1.7 | 0.07 |
| 1-273 | C | C | 1.7 | 0.07 |
| 1-274 | C | C | 1.7 | 0.07 |
| 1-275 | C | C | 1.7 | 0.07 |
| 1-276 | C | C | 1.7 | 0.07 |
| 1-277 | C | C | 1.7 | 0.07 |
| 1-278 | B | C | 1.7 | 0.07 |
| 1-279 | B | C | 1.7 | 0.07 |
| 1-280 | B | C | 1.7 | 0.07 |
| 1-281 | S | C | 1.7 | 0.07 |
| 1-282 | S | C | 1.7 | 0.07 |
| 1-283 | S | C | 1.7 | 0.07 |
| 1-284 | S | C | 1.7 | 0.07 |
| 1-285 | S | C | 1.7 | 0.07 |
| 1-286 | S | C | 1.7 | 0.07 |
| 1-287 | S | C | 1.7 | 0.07 |
| 1-288 | S | C | 1.7 | 0.07 |
| 1-289 | S | C | 1.7 | 0.07 |
| 1-290 | S | C | 1.7 | 0.07 |
| 1-291 | S | C | 1.7 | 0.07 |
| 1-292 | S | C | 1.7 | 0.07 |
| 1-293 | S | C | 1.7 | 0.07 |
| 1-294 | A | C | 1.7 | 0.07 |
| 1-295 | A | C | 1.7 | 0.07 |
| 1-296 | A | C | 1.7 | 0.07 |
| 1-297 | A | C | 1.7 | 0.07 |
| 1-298 | B | C | 1.7 | 0.07 |
| 1-299 | B | C | 1.7 | 0.07 |
| 1-300 | D | C | 1.7 | 0.07 |
| 1-301 | D | C | 1.7 | 0.07 |
| 1-302 | D | C | 1.7 | 0.07 |
| 1-303 | D | C | 1.7 | 0.07 |
| 1-304 | D | C | 1.7 | 0.07 |
| 1-305 | D | C | 1.7 | 0.07 |
| 1-306 | C | C | 1.7 | 0.07 |
| 1-307 | C | C | 1.7 | 0.07 |
| 1-308 | C | C | 1.7 | 0.07 |
| 1-309 | C | C | 1.7 | 0.07 |
| 1-310 | C | C | 1.7 | 0.07 |

TABLE 11-continued

| No. | Bubbles rank | Unmelted rank | Acid etching rate (nm/min) | Alkaline etching rate (nm/min) |
|---|---|---|---|---|
| 1-311 | C | C | 1.7 | 0.07 |
| 1-312 | C | C | 1.7 | 0.07 |
| 1-313 | C | C | 1.7 | 0.07 |
| 1-314 | B | C | 1.7 | 0.07 |
| 1-315 | B | C | 1.7 | 0.07 |
| 1-316 | B | C | 1.7 | 0.07 |
| 1-317 | S | C | 1.7 | 0.07 |
| 1-318 | S | C | 1.7 | 0.07 |
| 1-319 | S | C | 1.7 | 0.07 |
| 1-320 | S | C | 1.7 | 0.07 |
| 1-321 | S | C | 1.7 | 0.07 |
| 1-322 | S | C | 1.7 | 0.07 |
| 1-323 | S | C | 1.7 | 0.07 |
| 1-324 | S | C | 1.7 | 0.07 |
| 1-325 | S | C | 1.7 | 0.07 |
| 1-326 | S | C | 1.7 | 0.07 |
| 1-327 | S | C | 1.7 | 0.07 |
| 1-328 | S | C | 1.7 | 0.07 |
| 1-329 | S | C | 1.7 | 0.07 |
| 1-330 | S | C | 1.7 | 0.07 |
| 1-331 | S | C | 1.7 | 0.07 |
| 1-332 | A | C | 1.7 | 0.07 |
| 1-333 | A | C | 1.7 | 0.07 |
| 1-334 | A | C | 1.7 | 0.07 |
| 1-335 | A | C | 1.7 | 0.07 |
| 1-336 | A | C | 1.7 | 0.07 |
| 1-337 | B | C | 1.7 | 0.07 |
| 1-338 | B | C | 1.7 | 0.07 |
| 1-339 | B | C | 1.7 | 0.07 |
| Com. Ex. 1-1 | C | D | 1.7 | 0.07 |
| Com. Ex. 1-2 | C | D | 1.7 | 0.07 |
| Com. Ex. 1-3 | B | D | 1.7 | 0.07 |
| Com. Ex. 1-4 | C | D | 1.7 | 0.07 |
| Com. Ex. 1-5 | E | D | 1.7 | 0.07 |
| Com. Ex. 1-6 | G | S | 1.7 | 0.07 |
| Com. Ex. 1-7 | G | S | 1.7 | 0.07 |
| Com. Ex. 1-8 | G | S | 1.7 | 0.07 |
| Com. Ex. 1-9 | G | S | 1.7 | 0.07 |

TABLE 12

| No. | Bubbles rank | Unmelted rank | Acid etching rate (nm/min) | Alkaline etching rate (nm/min) |
|---|---|---|---|---|
| 2-1 | E | S | 1.7 | 0.07 |
| 2-2 | E | S | 1.7 | 0.07 |
| 2-3 | B | S | 1.7 | 0.07 |
| 2-4 | B | S | 1.7 | 0.07 |
| 2-5 | C | S | 1.7 | 0.07 |
| 2-6 | E | S | 1.7 | 0.07 |
| 2-7 | E | S | 1.7 | 0.07 |
| 2-8 | E | S | 1.7 | 0.07 |
| 2-9 | E | S | 1.7 | 0.07 |
| 2-10 | D | S | 1.7 | 0.07 |
| 2-11 | B | S | 1.7 | 0.07 |
| 2-12 | B | S | 1.7 | 0.07 |
| 2-13 | B | S | 1.7 | 0.07 |
| 2-14 | B | S | 1.7 | 0.07 |
| 2-15 | C | S | 1.7 | 0.07 |
| 2-16 | C | S | 1.7 | 0.07 |
| 2-17 | D | S | 1.7 | 0.07 |
| 2-18 | D | S | 1.7 | 0.07 |
| 2-19 | D | S | 1.7 | 0.07 |
| 2-20 | D | S | 1.7 | 0.07 |
| 2-21 | C | S | 1.7 | 0.07 |
| 2-22 | A | S | 1.7 | 0.07 |
| 2-23 | A | S | 1.7 | 0.07 |
| 2-24 | A | S | 1.7 | 0.07 |
| 2-25 | A | S | 1.7 | 0.07 |
| 2-26 | B | S | 1.7 | 0.07 |
| 2-27 | B | S | 1.7 | 0.07 |
| 2-28 | D | S | 1.7 | 0.07 |
| 2-29 | D | S | 1.7 | 0.07 |

TABLE 12-continued

| No. | Bubbles rank | Unmelted rank | Acid etching rate (nm/min) | Alkaline etching rate (nm/min) |
|---|---|---|---|---|
| 2-30 | D | S | 1.7 | 0.07 |
| 2-31 | D | S | 1.7 | 0.07 |
| 2-32 | D | S | 1.7 | 0.07 |
| 2-33 | D | S | 1.7 | 0.07 |
| 2-34 | C | S | 1.7 | 0.07 |
| 2-35 | C | S | 1.7 | 0.07 |
| 2-36 | A | S | 1.7 | 0.07 |
| 2-37 | A | S | 1.7 | 0.07 |
| 2-38 | S | S | 1.7 | 0.07 |
| 2-39 | S | S | 1.7 | 0.07 |
| 2-40 | S | S | 1.7 | 0.07 |
| 2-41 | A | S | 1.7 | 0.07 |
| 2-42 | A | S | 1.7 | 0.07 |
| 2-43 | B | S | 1.7 | 0.07 |
| 2-44 | B | S | 1.7 | 0.07 |
| 2-45 | D | S | 1.7 | 0.07 |
| 2-46 | D | S | 1.7 | 0.07 |
| 2-47 | D | S | 1.7 | 0.07 |
| 2-48 | D | S | 1.7 | 0.07 |
| 2-49 | D | S | 1.7 | 0.07 |
| 2-50 | D | S | 1.7 | 0.07 |
| 2-51 | A | S | 1.7 | 0.07 |
| 2-52 | S | S | 1.7 | 0.07 |
| 2-53 | S | S | 1.7 | 0.07 |
| 2-54 | S | S | 1.7 | 0.07 |
| 2-55 | S | S | 1.7 | 0.07 |
| 2-56 | A | S | 1.7 | 0.07 |
| 2-57 | A | S | 1.7 | 0.07 |
| 2-58 | B | S | 1.7 | 0.07 |
| 2-59 | B | S | 1.7 | 0.07 |
| 2-60 | D | S | 1.7 | 0.07 |
| 2-61 | D | S | 1.7 | 0.07 |
| 2-62 | D | S | 1.7 | 0.07 |
| 2-63 | D | S | 1.7 | 0.07 |
| 2-64 | D | S | 1.7 | 0.07 |
| 2-65 | D | S | 1.7 | 0.07 |
| 2-66 | D | S | 1.7 | 0.07 |
| 2-67 | D | S | 1.7 | 0.07 |
| 2-68 | C | S | 1.7 | 0.07 |
| 2-69 | B | S | 1.7 | 0.07 |
| 2-70 | S | S | 1.7 | 0.07 |
| 2-71 | S | S | 1.7 | 0.07 |
| 2-72 | S | S | 1.7 | 0.07 |
| 2-73 | S | S | 1.7 | 0.07 |
| 2-74 | S | S | 1.7 | 0.07 |
| 2-75 | A | A | 1.7 | 0.07 |
| 2-76 | B | A | 1.7 | 0.07 |
| 2-77 | B | A | 1.7 | 0.07 |
| 2-78 | D | S | 1.7 | 0.07 |
| 2-79 | D | S | 1.7 | 0.07 |
| 2-80 | D | S | 1.7 | 0.07 |
| 2-81 | D | S | 1.7 | 0.07 |
| 2-82 | D | S | 1.7 | 0.07 |
| 2-83 | D | S | 1.7 | 0.07 |
| 2-84 | D | S | 1.7 | 0.07 |
| 2-85 | C | S | 1.7 | 0.07 |
| 2-86 | B | S | 1.7 | 0.07 |
| 2-87 | S | S | 1.7 | 0.07 |
| 2-88 | S | S | 1.7 | 0.07 |
| 2-89 | S | S | 1.7 | 0.07 |
| 2-90 | S | S | 1.7 | 0.07 |
| 2-91 | S | S | 1.7 | 0.07 |
| 2-92 | S | A | 1.7 | 0.07 |
| 2-93 | S | A | 1.7 | 0.07 |
| 2-94 | A | A | 1.7 | 0.07 |
| 2-95 | A | A | 1.7 | 0.07 |
| 2-96 | B | A | 1.7 | 0.07 |
| 2-97 | B | A | 1.7 | 0.07 |
| 2-98 | B | A | 1.7 | 0.07 |
| 2-99 | B | A | 1.7 | 0.07 |
| 2-100 | D | B | 1.7 | 0.07 |
| 2-101 | D | B | 1.7 | 0.07 |
| 2-102 | D | B | 1.7 | 0.07 |
| 2-103 | D | B | 1.7 | 0.07 |
| 2-104 | D | B | 1.7 | 0.07 |
| 2-105 | D | B | 1.7 | 0.07 |

TABLE 12-continued

| No. | Bubbles rank | Unmelted rank | Acid etching rate (nm/min) | Alkaline etching rate (nm/min) |
|---|---|---|---|---|
| 2-106 | D | B | 1.7 | 0.07 |
| 2-107 | C | B | 1.7 | 0.07 |
| 2-108 | B | B | 1.7 | 0.07 |
| 2-109 | B | B | 1.7 | 0.07 |
| 2-110 | S | B | 1.7 | 0.07 |
| 2-111 | S | B | 1.7 | 0.07 |
| 2-112 | S | B | 1.7 | 0.07 |
| 2-113 | S | B | 1.7 | 0.07 |
| 2-114 | S | B | 1.7 | 0.07 |
| 2-115 | S | B | 1.7 | 0.07 |
| 2-116 | S | B | 1.7 | 0.07 |
| 2-117 | S | B | 1.7 | 0.07 |
| 2-118 | S | B | 1.7 | 0.07 |
| 2-119 | A | B | 1.7 | 0.07 |
| 2-120 | A | B | 1.7 | 0.07 |
| 2-121 | B | B | 1.7 | 0.07 |
| 2-122 | B | B | 1.7 | 0.07 |
| 2-123 | D | B | 1.7 | 0.07 |
| 2-124 | D | B | 1.7 | 0.07 |
| 2-125 | D | B | 1.7 | 0.07 |
| 2-126 | D | B | 1.7 | 0.07 |
| 2-127 | D | B | 1.7 | 0.07 |
| 2-128 | D | B | 1.7 | 0.07 |
| 2-129 | D | B | 1.7 | 0.07 |
| 2-130 | C | B | 1.7 | 0.07 |
| 2-131 | C | B | 1.7 | 0.07 |
| 2-132 | B | B | 1.7 | 0.07 |
| 2-133 | B | B | 1.7 | 0.07 |
| 2-134 | S | B | 1.7 | 0.07 |
| 2-135 | S | B | 1.7 | 0.07 |
| 2-136 | S | B | 1.7 | 0.07 |
| 2-137 | S | B | 1.7 | 0.07 |
| 2-138 | S | B | 1.7 | 0.07 |
| 2-139 | S | B | 1.7 | 0.07 |
| 2-140 | S | B | 1.7 | 0.07 |
| 2-141 | S | B | 1.7 | 0.07 |
| 2-142 | S | B | 1.7 | 0.07 |
| 2-143 | A | B | 1.7 | 0.07 |
| 2-144 | A | B | 1.7 | 0.07 |
| 2-145 | B | B | 1.7 | 0.07 |
| 2-146 | B | B | 1.7 | 0.07 |
| 2-147 | B | B | 1.7 | 0.07 |
| 2-148 | D | B | 1.7 | 0.07 |
| 2-149 | D | B | 1.7 | 0.07 |
| 2-150 | D | B | 1.7 | 0.07 |
| 2-151 | D | B | 1.7 | 0.07 |
| 2-152 | D | B | 1.7 | 0.07 |
| 2-153 | C | B | 1.7 | 0.07 |
| 2-154 | C | B | 1.7 | 0.07 |
| 2-155 | C | B | 1.7 | 0.07 |
| 2-156 | C | B | 1.7 | 0.07 |
| 2-157 | B | B | 1.7 | 0.07 |
| 2-158 | B | B | 1.7 | 0.07 |
| 2-159 | S | B | 1.7 | 0.07 |
| 2-160 | S | B | 1.7 | 0.07 |
| 2-161 | S | B | 1.7 | 0.07 |
| 2-162 | S | B | 1.7 | 0.07 |
| 2-163 | S | B | 1.7 | 0.07 |
| 2-164 | S | B | 1.7 | 0.07 |
| 2-165 | S | B | 1.7 | 0.07 |
| 2-166 | S | B | 1.7 | 0.07 |
| 2-167 | S | B | 1.7 | 0.07 |
| 2-168 | A | B | 1.7 | 0.07 |
| 2-169 | A | B | 1.7 | 0.07 |
| 2-170 | A | B | 1.7 | 0.07 |
| 2-171 | B | B | 1.7 | 0.07 |
| 2-172 | B | B | 1.7 | 0.07 |
| 2-173 | D | B | 1.7 | 0.07 |
| 2-174 | D | B | 1.7 | 0.07 |
| 2-175 | D | B | 1.7 | 0.07 |
| 2-176 | D | B | 1.7 | 0.07 |
| 2-177 | D | B | 1.7 | 0.07 |
| 2-178 | D | B | 1.7 | 0.07 |
| 2-179 | C | B | 1.7 | 0.07 |
| 2-180 | C | B | 1.7 | 0.07 |
| 2-181 | C | B | 1.7 | 0.07 |

TABLE 12-continued

| No. | Bubbles rank | Unmelted rank | Acid etching rate (nm/min) | Alkaline etching rate (nm/min) |
|---|---|---|---|---|
| 2-182 | C | B | 1.7 | 0.07 |
| 2-183 | B | B | 1.7 | 0.07 |
| 2-184 | B | B | 1.7 | 0.07 |
| 2-185 | B | B | 1.7 | 0.07 |
| 2-186 | S | B | 1.7 | 0.07 |
| 2-187 | S | B | 1.7 | 0.07 |
| 2-188 | S | B | 1.7 | 0.07 |
| 2-189 | S | B | 1.7 | 0.07 |
| 2-190 | S | B | 1.7 | 0.07 |
| 2-191 | S | B | 1.7 | 0.07 |
| 2-192 | S | B | 1.7 | 0.07 |
| 2-193 | S | B | 1.7 | 0.07 |
| 2-194 | S | B | 1.7 | 0.07 |
| 2-195 | S | B | 1.7 | 0.07 |
| 2-196 | A | B | 1.7 | 0.07 |
| 2-197 | A | B | 1.7 | 0.07 |
| 2-198 | A | B | 1.7 | 0.07 |
| 2-199 | B | B | 1.7 | 0.07 |
| 2-200 | B | B | 1.7 | 0.07 |
| 2-201 | E | B | 1.7 | 0.07 |
| 2-202 | D | C | 1.7 | 0.07 |
| 2-203 | D | C | 1.7 | 0.07 |
| 2-204 | D | C | 1.7 | 0.07 |
| 2-205 | D | C | 1.7 | 0.07 |
| 2-206 | D | C | 1.7 | 0.07 |
| 2-207 | D | C | 1.7 | 0.07 |
| 2-208 | C | C | 1.7 | 0.07 |
| 2-209 | C | C | 1.7 | 0.07 |
| 2-210 | C | C | 1.7 | 0.07 |
| 2-211 | C | C | 1.7 | 0.07 |
| 2-212 | C | C | 1.7 | 0.07 |
| 2-213 | B | C | 1.7 | 0.07 |
| 2-214 | B | C | 1.7 | 0.07 |
| 2-215 | B | C | 1.7 | 0.07 |
| 2-216 | S | C | 1.7 | 0.07 |
| 2-217 | S | C | 1.7 | 0.07 |
| 2-218 | S | C | 1.7 | 0.07 |
| 2-219 | S | C | 1.7 | 0.07 |
| 2-220 | S | C | 1.7 | 0.07 |
| 2-221 | S | C | 1.7 | 0.07 |
| 2-222 | S | C | 1.7 | 0.07 |
| 2-223 | S | C | 1.7 | 0.07 |
| 2-224 | S | C | 1.7 | 0.07 |
| 2-225 | S | C | 1.7 | 0.07 |
| 2-226 | S | C | 1.7 | 0.07 |
| 2-227 | S | C | 1.7 | 0.07 |
| 2-228 | A | C | 1.7 | 0.07 |
| 2-229 | A | C | 1.7 | 0.07 |
| 2-230 | A | C | 1.7 | 0.07 |
| 2-231 | B | C | 1.7 | 0.07 |
| 2-232 | B | C | 1.7 | 0.07 |
| 2-233 | D | C | 1.7 | 0.07 |
| 2-234 | D | C | 1.7 | 0.07 |
| 2-235 | D | C | 1.7 | 0.07 |
| 2-236 | D | C | 1.7 | 0.07 |
| 2-237 | D | C | 1.7 | 0.07 |
| 2-238 | D | C | 1.7 | 0.07 |
| 2-239 | C | C | 1.7 | 0.07 |
| 2-240 | C | C | 1.7 | 0.07 |
| 2-241 | C | C | 1.7 | 0.07 |
| 2-242 | C | C | 1.7 | 0.07 |
| 2-243 | C | C | 1.7 | 0.07 |
| 2-244 | C | C | 1.7 | 0.07 |
| 2-245 | B | C | 1.7 | 0.07 |
| 2-246 | B | C | 1.7 | 0.07 |
| 2-247 | B | C | 1.7 | 0.07 |
| 2-248 | S | C | 1.7 | 0.07 |
| 2-249 | S | C | 1.7 | 0.07 |
| 2-250 | S | C | 1.7 | 0.07 |
| 2-251 | S | C | 1.7 | 0.07 |
| 2-252 | S | C | 1.7 | 0.07 |
| 2-253 | S | C | 1.7 | 0.07 |
| 2-254 | S | C | 1.7 | 0.07 |
| 2-255 | S | C | 1.7 | 0.07 |
| 2-256 | S | C | 1.7 | 0.07 |
| 2-257 | S | C | 1.7 | 0.07 |

TABLE 12-continued

| No. | Bubbles rank | Unmelted rank | Acid etching rate (nm/min) | Alkaline etching rate (nm/min) |
|---|---|---|---|---|
| 2-258 | S | C | 1.7 | 0.07 |
| 2-259 | S | C | 1.7 | 0.07 |
| 2-260 | A | C | 1.7 | 0.07 |
| 2-261 | A | C | 1.7 | 0.07 |
| 2-262 | A | C | 1.7 | 0.07 |
| 2-263 | A | C | 1.7 | 0.07 |
| 2-264 | B | C | 1.7 | 0.07 |
| 2-265 | B | C | 1.7 | 0.07 |
| 2-266 | D | C | 1.7 | 0.07 |
| 2-267 | D | C | 1.7 | 0.07 |
| 2-268 | D | C | 1.7 | 0.07 |
| 2-269 | D | C | 1.7 | 0.07 |
| 2-270 | D | C | 1.7 | 0.07 |
| 2-271 | C | C | 1.7 | 0.07 |
| 2-272 | C | C | 1.7 | 0.07 |
| 2-273 | C | C | 1.7 | 0.07 |
| 2-274 | C | C | 1.7 | 0.07 |
| 2-275 | C | C | 1.7 | 0.07 |
| 2-276 | C | C | 1.7 | 0.07 |
| 2-277 | C | C | 1.7 | 0.07 |
| 2-278 | B | C | 1.7 | 0.07 |
| 2-279 | B | C | 1.7 | 0.07 |
| 2-280 | B | C | 1.7 | 0.07 |
| 2-281 | S | C | 1.7 | 0.07 |
| 2-282 | S | C | 1.7 | 0.07 |
| 2-283 | S | C | 1.7 | 0.07 |
| 2-284 | S | C | 1.7 | 0.07 |
| 2-285 | S | C | 1.7 | 0.07 |
| 2-286 | S | C | 1.7 | 0.07 |
| 2-287 | S | C | 1.7 | 0.07 |
| 2-288 | S | C | 1.7 | 0.07 |
| 2-289 | S | C | 1.7 | 0.07 |
| 2-290 | S | C | 1.7 | 0.07 |
| 2-291 | S | C | 1.7 | 0.07 |
| 2-292 | S | C | 1.7 | 0.07 |
| 2-293 | S | C | 1.7 | 0.07 |
| 2-294 | A | C | 1.7 | 0.07 |
| 2-295 | A | C | 1.7 | 0.07 |
| 2-296 | A | C | 1.7 | 0.07 |
| 2-297 | A | C | 1.7 | 0.07 |
| 2-298 | B | C | 1.7 | 0.07 |
| 2-299 | B | C | 1.7 | 0.07 |
| 2-300 | D | C | 1.7 | 0.07 |
| 2-301 | D | C | 1.7 | 0.07 |
| 2-302 | D | C | 1.7 | 0.07 |
| 2-303 | D | C | 1.7 | 0.07 |
| 2-304 | D | C | 1.7 | 0.07 |
| 2-305 | D | C | 1.7 | 0.07 |
| 2-306 | C | C | 1.7 | 0.07 |
| 2-307 | C | C | 1.7 | 0.07 |
| 2-308 | C | C | 1.7 | 0.07 |
| 2-309 | C | C | 1.7 | 0.07 |
| 2-310 | C | C | 1.7 | 0.07 |
| 2-311 | C | C | 1.7 | 0.07 |
| 2-312 | C | C | 1.7 | 0.07 |
| 2-313 | C | C | 1.7 | 0.07 |
| 2-314 | B | C | 1.7 | 0.07 |
| 2-315 | B | C | 1.7 | 0.07 |
| 2-316 | B | C | 1.7 | 0.07 |
| 2-317 | S | C | 1.7 | 0.07 |
| 2-318 | S | C | 1.7 | 0.07 |
| 2-319 | S | C | 1.7 | 0.07 |
| 2-320 | S | C | 1.7 | 0.07 |
| 2-321 | S | C | 1.7 | 0.07 |
| 2-322 | S | C | 1.7 | 0.07 |
| 2-323 | S | C | 1.7 | 0.07 |
| 2-324 | S | C | 1.7 | 0.07 |
| 2-325 | S | C | 1.7 | 0.07 |
| 2-326 | S | C | 1.7 | 0.07 |
| 2-327 | S | C | 1.7 | 0.07 |
| 2-328 | S | C | 1.7 | 0.07 |
| 2-329 | S | C | 1.7 | 0.07 |
| 2-330 | S | C | 1.7 | 0.07 |
| 2-331 | S | C | 1.7 | 0.07 |
| 2-332 | A | C | 1.7 | 0.07 |
| 2-333 | A | C | 1.7 | 0.07 |

TABLE 12-continued

| No. | Bubbles rank | Unmelted rank | Acid etching rate (nm/min) | Alkaline etching rate (nm/min) |
|---|---|---|---|---|
| 2-334 | A | C | 1.7 | 0.07 |
| 2-335 | A | C | 1.7 | 0.07 |
| 2-336 | A | C | 1.7 | 0.07 |
| 2-337 | B | C | 1.7 | 0.07 |
| 2-338 | B | C | 1.7 | 0.07 |
| 2-339 | B | C | 1.7 | 0.07 |
| Com. Ex. 2-1 | C | D | 1.7 | 0.07 |
| Com. Ex. 2-2 | C | D | 1.7 | 0.07 |
| Com. Ex. 2-3 | B | D | 1.7 | 0.07 |
| Com. Ex. 2-4 | C | D | 1.7 | 0.07 |
| Com. Ex. 2-5 | E | D | 1.7 | 0.07 |
| Com. Ex. 2-6 | G | S | 1.7 | 0.07 |
| Com. Ex. 2-7 | G | S | 1.7 | 0.07 |
| Com. Ex. 2-8 | G | S | 1.7 | 0.07 |
| Com. Ex. 2-9 | G | S | 1.7 | 0.07 |

TABLE 13

| No. | Bubbles rank | Unmelted rank |
|---|---|---|
| 3-1 | E | S |
| 3-2 | E | S |
| 3-3 | B | S |
| 3-4 | B | S |
| 3-5 | C | S |
| 3-6 | E | S |
| 3-7 | E | S |
| 3-8 | E | S |
| 3-9 | E | S |
| 3-10 | D | S |
| 3-11 | B | S |
| 3-12 | B | S |
| 3-13 | B | S |
| 3-14 | B | S |
| 3-15 | C | S |
| 3-16 | C | S |
| 3-17 | D | S |
| 3-18 | D | S |
| 3-19 | D | S |
| 3-20 | D | S |
| 3-21 | C | S |
| 3-22 | A | S |
| 3-23 | A | S |
| 3-24 | A | S |
| 3-25 | A | S |
| 3-26 | B | S |
| 3-27 | B | S |
| 3-28 | D | S |
| 3-29 | D | S |
| 3-30 | D | S |
| 3-31 | D | S |
| 3-32 | D | S |
| 3-33 | D | S |
| 3-34 | C | S |
| 3-35 | C | S |
| 3-36 | A | S |
| 3-37 | A | S |
| 3-38 | S | S |
| 3-39 | S | S |
| 3-40 | S | S |
| 3-41 | A | S |
| 3-42 | A | S |
| 3-43 | B | S |
| 3-44 | B | S |
| 3-45 | D | S |
| 3-46 | D | S |
| 3-47 | D | S |
| 3-48 | D | S |
| 3-49 | D | S |
| 3-50 | D | S |
| 3-51 | A | S |
| 3-52 | S | S |
| 3-53 | S | S |

TABLE 13-continued

| No. | Bubbles rank | Unmelted rank |
|---|---|---|
| 3-54 | S | S |
| 3-55 | S | S |
| 3-56 | A | S |
| 3-57 | A | S |
| 3-58 | B | S |
| 3-59 | B | S |
| 3-60 | D | S |
| 3-61 | D | S |
| 3-62 | D | S |
| 3-63 | D | S |
| 3-64 | D | S |
| 3-65 | D | S |
| 3-66 | D | S |
| 3-67 | D | S |
| 3-68 | C | S |
| 3-69 | B | S |
| 3-70 | S | S |
| 3-71 | S | S |
| 3-72 | S | S |
| 3-73 | S | S |
| 3-74 | S | S |
| 3-75 | A | A |
| 3-76 | B | A |
| 3-77 | B | A |
| 3-78 | D | S |
| 3-79 | D | S |
| 3-80 | D | S |
| 3-81 | D | S |
| 3-82 | D | S |
| 3-83 | D | S |
| 3-84 | D | S |
| 3-85 | C | S |
| 3-86 | B | S |
| 3-87 | S | S |
| 3-88 | S | S |
| 3-89 | S | S |
| 3-90 | S | S |
| 3-91 | S | S |
| 3-92 | S | A |
| 3-93 | S | A |
| 3-94 | A | A |
| 3-95 | A | A |
| 3-96 | B | A |
| 3-97 | B | A |
| 3-98 | B | A |
| 3-99 | B | A |
| 3-100 | D | B |
| 3-101 | D | B |
| 3-102 | D | B |
| 3-103 | D | B |
| 3-104 | D | B |
| 3-105 | D | B |
| 3-106 | D | B |
| 3-107 | C | B |
| 3-108 | B | B |
| 3-109 | B | B |
| 3-110 | S | B |
| 3-111 | S | B |
| 3-112 | S | B |
| 3-113 | S | B |
| 3-114 | S | B |
| 3-115 | S | B |
| 3-116 | S | B |
| 3-117 | S | B |
| 3-118 | S | B |
| 3-119 | A | B |
| 3-120 | A | B |
| 3-121 | B | B |
| 3-122 | B | B |
| 3-123 | D | B |
| 3-124 | D | B |
| 3-125 | D | B |
| 3-126 | D | B |
| 3-127 | D | B |
| 3-128 | D | B |
| 3-129 | D | B |
| 3-130 | C | B |
| 3-131 | C | B |

TABLE 13-continued

| No. | Bubbles rank | Unmelted rank |
|---|---|---|
| 3-132 | B | B |
| 3-133 | B | B |
| 3-134 | S | B |
| 3-135 | S | B |
| 3-136 | S | B |
| 3-137 | S | B |
| 3-138 | S | B |
| 3-139 | S | B |
| 3-140 | S | B |
| 3-141 | S | B |
| 3-142 | S | B |
| 3-143 | A | B |
| 3-144 | A | B |
| 3-145 | B | B |
| 3-146 | B | B |
| 3-147 | B | B |
| 3-148 | D | B |
| 3-149 | D | B |
| 3-150 | D | B |
| 3-151 | D | B |
| 3-152 | D | B |
| 3-153 | C | B |
| 3-154 | C | B |
| 3-155 | C | B |
| 3-156 | C | B |
| 3-157 | B | B |
| 3-158 | B | B |
| 3-159 | S | B |
| 3-160 | S | B |
| 3-161 | S | B |
| 3-162 | S | B |
| 3-163 | S | B |
| 3-164 | S | B |
| 3-165 | S | B |
| 3-166 | S | B |
| 3-167 | S | B |
| 3-168 | A | B |
| 3-169 | A | B |
| 3-170 | A | B |
| 3-171 | B | B |
| 3-172 | B | B |
| 3-173 | D | B |
| 3-174 | D | B |
| 3-175 | D | B |
| 3-176 | D | B |
| 3-177 | D | B |
| 3-178 | D | B |
| 3-179 | C | B |
| 3-180 | C | B |
| 3-181 | C | B |
| 3-182 | C | B |
| 3-183 | B | B |
| 3-184 | B | B |
| 3-185 | B | B |
| 3-186 | S | B |
| 3-187 | S | B |
| 3-188 | S | B |
| 3-189 | S | B |
| 3-190 | S | B |
| 3-191 | S | B |
| 3-192 | S | B |
| 3-193 | S | B |
| 3-194 | S | B |
| 3-195 | S | B |
| 3-196 | A | B |
| 3-197 | A | B |
| 3-198 | A | B |
| 3-199 | B | B |
| 3-200 | B | B |
| 3-201 | E | B |
| 3-202 | D | C |
| 3-203 | D | C |
| 3-204 | D | C |
| 3-205 | D | C |
| 3-206 | D | C |
| 3-207 | D | C |
| 3-208 | C | C |
| 3-209 | C | C |

TABLE 13-continued

| No. | Bubbles rank | Unmelted rank |
|---|---|---|
| 3-210 | C | C |
| 3-211 | C | C |
| 3-212 | C | C |
| 3-213 | B | C |
| 3-214 | B | C |
| 3-215 | B | C |
| 3-216 | S | C |
| 3-217 | S | C |
| 3-218 | S | C |
| 3-219 | S | C |
| 3-220 | S | C |
| 3-221 | S | C |
| 3-222 | S | C |
| 3-223 | S | C |
| 3-224 | S | C |
| 3-225 | S | C |
| 3-226 | S | C |
| 3-227 | S | C |
| 3-228 | A | C |
| 3-229 | A | C |
| 3-230 | A | C |
| 3-231 | B | C |
| 3-232 | B | C |
| 3-233 | D | C |
| 3-234 | D | C |
| 3-235 | D | C |
| 3-236 | D | C |
| 3-237 | D | C |
| 3-238 | D | C |
| 3-239 | C | C |
| 3-240 | C | C |
| 3-241 | C | C |
| 3-242 | C | C |
| 3-243 | C | C |
| 3-244 | C | C |
| 3-245 | B | C |
| 3-246 | B | C |
| 3-247 | B | C |
| 3-248 | S | C |
| 3-249 | S | C |
| 3-250 | S | C |
| 3-251 | S | C |
| 3-252 | S | C |
| 3-253 | S | C |
| 3-254 | S | C |
| 3-255 | S | C |
| 3-256 | S | C |
| 3-257 | S | C |
| 3-258 | S | C |
| 3-259 | S | C |
| 3-260 | A | C |
| 3-261 | A | C |
| 3-262 | A | C |
| 3-263 | A | C |
| 3-264 | B | C |
| 3-265 | B | C |
| 3-266 | D | C |
| 3-267 | D | C |
| 3-268 | D | C |
| 3-269 | D | C |
| 3-270 | D | C |
| 3-271 | C | C |
| 3-272 | C | C |
| 3-273 | C | C |
| 3-274 | C | C |
| 3-275 | C | C |
| 3-276 | C | C |
| 3-277 | C | C |
| 3-278 | B | C |
| 3-279 | B | C |
| 3-280 | B | C |
| 3-281 | S | C |
| 3-282 | S | C |
| 3-283 | S | C |
| 3-284 | S | C |
| 3-285 | S | C |
| 3-286 | S | C |
| 3-287 | S | C |

TABLE 13-continued

| No. | Bubbles rank | Unmelted rank |
|---|---|---|
| 3-288 | S | C |
| 3-289 | S | C |
| 3-290 | S | C |
| 3-291 | S | C |
| 3-292 | S | C |
| 3-293 | S | C |
| 3-294 | A | C |
| 3-295 | A | C |
| 3-296 | A | C |
| 3-297 | A | C |
| 3-298 | B | C |
| 3-299 | B | C |
| 3-300 | D | C |
| 3-301 | D | C |
| 3-302 | D | C |
| 3-303 | D | C |
| 3-304 | D | C |
| 3-305 | D | C |
| 3-306 | C | C |
| 3-307 | C | C |
| 3-308 | C | C |
| 3-309 | C | C |
| 3-310 | C | C |
| 3-311 | C | C |
| 3-312 | C | C |
| 3-313 | C | C |
| 3-314 | B | C |
| 3-315 | B | C |
| 3-316 | B | C |
| 3-317 | S | C |
| 3-318 | S | C |
| 3-319 | S | C |
| 3-320 | S | C |
| 3-321 | S | C |
| 3-322 | S | C |
| 3-323 | S | C |
| 3-324 | S | C |
| 3-325 | S | C |
| 3-326 | S | C |
| 3-327 | S | C |
| 3-328 | S | C |
| 3-329 | S | C |
| 3-330 | S | C |
| 3-331 | S | C |
| 3-332 | A | C |
| 3-333 | A | C |
| 3-334 | A | C |
| 3-335 | A | C |
| 3-336 | A | C |
| 3-337 | B | C |
| 3-338 | B | C |
| 3-339 | B | C |
| Com. Ex. 3-1 | C | D |
| Com. Ex. 3-2 | C | D |
| Com. Ex. 3-3 | B | D |
| Com. Ex. 3-4 | C | D |
| Com. Ex. 3-5 | E | D |
| Com. Ex. 3-6 | G | S |
| Com. Ex. 3-7 | G | S |
| Com. Ex. 3-8 | G | S |
| Com. Ex. 3-9 | G | S |

TABLE 14

| No. | Bubbles rank | Unmelted rank |
|---|---|---|
| 4-1 | E | S |
| 4-2 | E | S |
| 4-3 | B | S |
| 4-4 | B | S |
| 4-5 | C | S |
| 4-6 | E | S |
| 4-7 | E | S |
| 4-8 | E | S |
| 4-9 | E | S |

TABLE 14-continued

| No. | Bubbles rank | Unmelted rank |
|---|---|---|
| 4-10 | D | S |
| 4-11 | B | S |
| 4-12 | B | S |
| 4-13 | B | S |
| 4-14 | B | S |
| 4-15 | C | S |
| 4-16 | C | S |
| 4-17 | D | S |
| 4-18 | D | S |
| 4-19 | D | S |
| 4-20 | D | S |
| 4-21 | C | S |
| 4-22 | A | S |
| 4-23 | A | S |
| 4-24 | A | S |
| 4-25 | A | S |
| 4-26 | B | S |
| 4-27 | B | S |
| 4-28 | D | S |
| 4-29 | D | S |
| 4-30 | D | S |
| 4-31 | D | S |
| 4-32 | D | S |
| 4-33 | D | S |
| 4-34 | C | S |
| 4-35 | C | S |
| 4-36 | A | S |
| 4-37 | A | S |
| 4-38 | S | S |
| 4-39 | S | S |
| 4-40 | S | S |
| 4-41 | A | S |
| 4-42 | A | S |
| 4-43 | B | S |
| 4-44 | B | S |
| 4-45 | D | S |
| 4-46 | D | S |
| 4-47 | D | S |
| 4-48 | D | S |
| 4-49 | D | S |
| 4-50 | D | S |
| 4-51 | A | S |
| 4-52 | S | S |
| 4-53 | S | S |
| 4-54 | S | S |
| 4-55 | S | S |
| 4-56 | A | S |
| 4-57 | A | S |
| 4-58 | B | S |
| 4-59 | B | S |
| 4-60 | D | S |
| 4-61 | D | S |
| 4-62 | D | S |
| 4-63 | D | S |
| 4-64 | D | S |
| 4-65 | D | S |
| 4-66 | D | S |
| 4-67 | D | S |
| 4-68 | C | S |
| 4-69 | B | S |
| 4-70 | S | S |
| 4-71 | S | S |
| 4-72 | S | S |
| 4-73 | S | S |
| 4-74 | S | S |
| 4-75 | A | A |
| 4-76 | B | A |
| 4-77 | B | A |
| 4-78 | D | S |
| 4-79 | D | S |
| 4-80 | D | S |
| 4-81 | D | S |
| 4-82 | D | S |
| 4-83 | D | S |
| 4-84 | D | S |
| 4-85 | C | S |
| 4-86 | B | S |
| 4-87 | S | S |

TABLE 14-continued

| No. | Bubbles rank | Unmelted rank |
|---|---|---|
| 4-88 | S | S |
| 4-89 | S | S |
| 4-90 | S | S |
| 4-91 | S | S |
| 4-92 | S | A |
| 4-93 | S | A |
| 4-94 | A | A |
| 4-95 | A | A |
| 4-96 | B | A |
| 4-97 | B | A |
| 4-98 | B | A |
| 4-99 | B | A |
| 4-100 | D | B |
| 4-101 | D | B |
| 4-102 | D | B |
| 4-103 | D | B |
| 4-104 | D | B |
| 4-105 | D | B |
| 4-106 | D | B |
| 4-107 | C | B |
| 4-108 | B | B |
| 4-109 | B | B |
| 4-110 | S | B |
| 4-111 | S | B |
| 4-112 | S | B |
| 4-113 | S | B |
| 4-114 | S | B |
| 4-115 | S | B |
| 4-116 | S | B |
| 4-117 | S | B |
| 4-118 | S | B |
| 4-119 | A | B |
| 4-120 | A | B |
| 4-121 | B | B |
| 4-122 | B | B |
| 4-123 | D | B |
| 4-124 | D | B |
| 4-125 | D | B |
| 4-126 | D | B |
| 4-127 | D | B |
| 4-128 | D | B |
| 4-129 | D | B |
| 4-130 | C | B |
| 4-131 | C | B |
| 4-132 | B | B |
| 4-133 | B | B |
| 4-134 | S | B |
| 4-135 | S | B |
| 4-136 | S | B |
| 4-137 | S | B |
| 4-138 | S | B |
| 4-139 | S | B |
| 4-140 | S | B |
| 4-141 | S | B |
| 4-142 | S | B |
| 4-143 | A | B |
| 4-144 | A | B |
| 4-145 | B | B |
| 4-146 | B | B |
| 4-147 | B | B |
| 4-148 | D | B |
| 4-149 | D | B |
| 4-150 | D | B |
| 4-151 | D | B |
| 4-152 | D | B |
| 4-153 | C | B |
| 4-154 | C | B |
| 4-155 | C | B |
| 4-156 | C | B |
| 4-157 | B | B |
| 4-158 | B | B |
| 4-159 | S | B |
| 4-160 | S | B |
| 4-161 | S | B |
| 4-162 | S | B |
| 4-163 | S | B |
| 4-164 | S | B |
| 4-165 | S | B |

TABLE 14-continued

| No. | Bubbles rank | Unmelted rank |
|---|---|---|
| 4-166 | S | B |
| 4-167 | S | B |
| 4-168 | A | B |
| 4-169 | A | B |
| 4-170 | A | B |
| 4-171 | B | B |
| 4-172 | B | B |
| 4-173 | D | B |
| 4-174 | D | B |
| 4-175 | D | B |
| 4-176 | D | B |
| 4-177 | D | B |
| 4-178 | D | B |
| 4-179 | C | B |
| 4-180 | C | B |
| 4-181 | C | B |
| 4-182 | C | B |
| 4-183 | B | B |
| 4-184 | B | B |
| 4-185 | B | B |
| 4-186 | S | B |
| 4-187 | S | B |
| 4-188 | S | B |
| 4-189 | S | B |
| 4-190 | S | B |
| 4-191 | S | B |
| 4-192 | S | B |
| 4-193 | S | B |
| 4-194 | S | B |
| 4-195 | S | B |
| 4-196 | A | B |
| 4-197 | A | B |
| 4-198 | A | B |
| 4-199 | B | B |
| 4-200 | B | B |
| 4-201 | E | B |
| 4-202 | D | C |
| 4-203 | D | C |
| 4-204 | D | C |
| 4-205 | D | C |
| 4-206 | D | C |
| 4-207 | D | C |
| 4-208 | C | C |
| 4-209 | C | C |
| 4-210 | C | C |
| 4-211 | C | C |
| 4-212 | C | C |
| 4-213 | B | C |
| 4-214 | B | C |
| 4-215 | B | C |
| 4-216 | S | C |
| 4-217 | S | C |
| 4-218 | S | C |
| 4-219 | S | C |
| 4-220 | S | C |
| 4-221 | S | C |
| 4-222 | S | C |
| 4-223 | S | C |
| 4-224 | S | C |
| 4-225 | S | C |
| 4-226 | S | C |
| 4-227 | S | C |
| 4-228 | A | C |
| 4-229 | A | C |
| 4-230 | A | C |
| 4-231 | B | C |
| 4-232 | B | C |
| 4-233 | D | C |
| 4-234 | D | C |
| 4-235 | D | C |
| 4-236 | D | C |
| 4-237 | D | C |
| 4-238 | D | C |
| 4-239 | C | C |
| 4-240 | C | C |
| 4-241 | C | C |
| 4-242 | C | C |
| 4-243 | C | C |

TABLE 14-continued

| No. | Bubbles rank | Unmelted rank |
|---|---|---|
| 4-244 | C | C |
| 4-245 | B | C |
| 4-246 | B | C |
| 4-247 | B | C |
| 4-248 | S | C |
| 4-249 | S | C |
| 4-250 | S | C |
| 4-251 | S | C |
| 4-252 | S | C |
| 4-253 | S | C |
| 4-254 | S | C |
| 4-255 | S | C |
| 4-256 | S | C |
| 4-257 | S | C |
| 4-258 | S | C |
| 4-259 | S | C |
| 4-260 | A | C |
| 4-261 | A | C |
| 4-262 | A | C |
| 4-263 | A | C |
| 4-264 | B | C |
| 4-265 | B | C |
| 4-266 | D | C |
| 4-267 | D | C |
| 4-268 | D | C |
| 4-269 | D | C |
| 4-270 | D | C |
| 4-271 | C | C |
| 4-272 | C | C |
| 4-273 | C | C |
| 4-274 | C | C |
| 4-275 | C | C |
| 4-276 | C | C |
| 4-277 | C | C |
| 4-278 | B | C |
| 4-279 | B | C |
| 4-280 | B | C |
| 4-281 | S | C |
| 4-282 | S | C |
| 4-283 | S | C |
| 4-284 | S | C |
| 4-285 | S | C |
| 4-286 | S | C |
| 4-287 | S | C |
| 4-288 | S | C |
| 4-289 | S | C |
| 4-290 | S | C |
| 4-291 | S | C |
| 4-292 | S | C |
| 4-293 | S | C |
| 4-294 | A | C |
| 4-295 | A | C |
| 4-296 | A | C |
| 4-297 | A | C |
| 4-298 | B | C |
| 4-299 | B | C |
| 4-300 | D | C |
| 4-301 | D | C |
| 4-302 | D | C |
| 4-303 | D | C |
| 4-304 | D | C |
| 4-305 | D | C |
| 4-306 | C | C |
| 4-307 | C | C |
| 4-308 | C | C |
| 4-309 | C | C |
| 4-310 | C | C |
| 4-311 | C | C |
| 4-312 | C | C |
| 4-313 | C | C |
| 4-314 | B | C |
| 4-315 | B | C |
| 4-316 | B | C |
| 4-317 | S | C |
| 4-318 | S | C |
| 4-319 | S | C |
| 4-320 | S | C |
| 4-321 | S | C |

TABLE 14-continued

| No. | Bubbles rank | Unmelted rank |
|---|---|---|
| 4-322 | S | C |
| 4-323 | S | C |
| 4-324 | S | C |
| 4-325 | S | C |
| 4-326 | S | C |
| 4-327 | S | C |
| 4-328 | S | C |
| 4-329 | S | C |
| 4-330 | S | C |
| 4-331 | S | C |
| 4-332 | A | C |
| 4-333 | A | C |
| 4-334 | A | C |
| 4-335 | A | C |
| 4-336 | A | C |
| 4-337 | B | C |
| 4-338 | B | C |
| 4-339 | B | C |
| Com. Ex. 4-1 | C | D |
| Com. Ex. 4-2 | C | D |
| Com. Ex. 4-3 | B | D |
| Com. Ex. 4-4 | C | D |
| Com. Ex. 4-5 | E | D |
| Com. Ex. 4-6 | G | S |
| Com. Ex. 4-7 | G | S |
| Com. Ex. 4-8 | G | S |
| Com. Ex. 4-9 | G | S |

TABLE 15

| No. | Bubbles rank | Unmelted rank |
|---|---|---|
| 5-1 | E | S |
| 5-2 | E | S |
| 5-3 | B | S |
| 5-4 | B | S |
| 5-5 | C | S |
| 5-6 | E | S |
| 5-7 | E | S |
| 5-8 | E | S |
| 5-9 | E | S |
| 5-10 | D | S |
| 5-11 | B | S |
| 5-12 | B | S |
| 5-13 | B | S |
| 5-14 | B | S |
| 5-15 | C | S |
| 5-16 | C | S |
| 5-17 | D | S |
| 5-18 | D | S |
| 5-19 | D | S |
| 5-20 | D | S |
| 5-21 | C | S |
| 5-22 | A | S |
| 5-23 | A | S |
| 5-24 | A | S |
| 5-25 | A | S |
| 5-26 | B | S |
| 5-27 | B | S |
| 5-28 | D | S |
| 5-29 | D | S |
| 5-30 | D | S |
| 5-31 | D | S |
| 5-32 | D | S |
| 5-33 | D | S |
| 5-34 | C | S |
| 5-35 | C | S |
| 5-36 | A | S |
| 5-37 | A | S |
| 5-38 | S | S |
| 5-39 | S | S |
| 5-40 | S | S |
| 5-41 | A | S |
| 5-42 | A | S |
| 5-43 | B | S |

TABLE 15-continued

| No. | Bubbles rank | Unmelted rank |
|---|---|---|
| 5-44 | B | S |
| 5-45 | D | S |
| 5-46 | D | S |
| 5-47 | D | S |
| 5-48 | D | S |
| 5-49 | D | S |
| 5-50 | D | S |
| 5-51 | A | S |
| 5-52 | S | S |
| 5-53 | S | S |
| 5-54 | S | S |
| 5-55 | S | S |
| 5-56 | A | S |
| 5-57 | A | S |
| 5-58 | B | S |
| 5-59 | B | S |
| 5-60 | D | S |
| 5-61 | D | S |
| 5-62 | D | S |
| 5-63 | D | S |
| 5-64 | D | S |
| 5-65 | D | S |
| 5-66 | D | S |
| 5-67 | D | S |
| 5-68 | C | S |
| 5-69 | B | S |
| 5-70 | S | S |
| 5-71 | S | S |
| 5-72 | S | S |
| 5-73 | S | S |
| 5-74 | S | S |
| 5-75 | A | A |
| 5-76 | B | A |
| 5-77 | B | A |
| 5-78 | D | S |
| 5-79 | D | S |
| 5-80 | D | S |
| 5-81 | D | S |
| 5-82 | D | S |
| 5-83 | D | S |
| 5-84 | D | S |
| 5-85 | C | S |
| 5-86 | B | S |
| 5-87 | S | S |
| 5-88 | S | S |
| 5-89 | S | S |
| 5-90 | S | S |
| 5-91 | S | S |
| 5-92 | S | A |
| 5-93 | S | A |
| 5-94 | A | A |
| 5-95 | A | A |
| 5-96 | B | A |
| 5-97 | B | A |
| 5-98 | B | A |
| 5-99 | B | A |
| 5-100 | D | B |
| 5-101 | D | B |
| 5-102 | D | B |
| 5-103 | D | B |
| 5-104 | D | B |
| 5-105 | D | B |
| 5-106 | D | B |
| 5-107 | C | B |
| 5-108 | B | B |
| 5-109 | B | B |
| 5-110 | S | B |
| 5-111 | S | B |
| 5-112 | S | B |
| 5-113 | S | B |
| 5-114 | S | B |
| 5-115 | S | B |
| 5-116 | S | B |
| 5-117 | S | B |
| 5-118 | S | B |
| 5-119 | A | B |
| 5-120 | A | B |
| 5-121 | B | B |

TABLE 15-continued

| No. | Bubbles rank | Unmelted rank |
|---|---|---|
| 5-122 | B | B |
| 5-123 | D | B |
| 5-124 | D | B |
| 5-125 | D | B |
| 5-126 | D | B |
| 5-127 | D | B |
| 5-128 | D | B |
| 5-129 | D | B |
| 5-130 | C | B |
| 5-131 | C | B |
| 5-132 | B | B |
| 5-133 | B | B |
| 5-134 | S | B |
| 5-135 | S | B |
| 5-136 | S | B |
| 5-137 | S | B |
| 5-138 | S | B |
| 5-139 | S | B |
| 5-140 | S | B |
| 5-141 | S | B |
| 5-142 | S | B |
| 5-143 | A | B |
| 5-144 | A | B |
| 5-145 | B | B |
| 5-146 | B | B |
| 5-147 | B | B |
| 5-148 | D | B |
| 5-149 | D | B |
| 5-150 | D | B |
| 5-151 | D | B |
| 5-152 | D | B |
| 5-153 | C | B |
| 5-154 | C | B |
| 5-155 | C | B |
| 5-156 | C | B |
| 5-157 | B | B |
| 5-158 | B | B |
| 5-159 | S | B |
| 5-160 | S | B |
| 5-161 | S | B |
| 5-162 | S | B |
| 5-163 | S | B |
| 5-164 | S | B |
| 5-165 | S | B |
| 5-166 | S | B |
| 5-167 | S | B |
| 5-168 | A | B |
| 5-169 | A | B |
| 5-170 | A | B |
| 5-171 | B | B |
| 5-172 | B | B |
| 5-173 | D | B |
| 5-174 | D | B |
| 5-175 | D | B |
| 5-176 | D | B |
| 5-177 | D | B |
| 5-178 | D | B |
| 5-179 | C | B |
| 5-180 | C | B |
| 5-181 | C | B |
| 5-182 | C | B |
| 5-183 | B | B |
| 5-184 | B | B |
| 5-185 | B | B |
| 5-186 | S | B |
| 5-187 | S | B |
| 5-188 | S | B |
| 5-189 | S | B |
| 5-190 | S | B |
| 5-191 | S | B |
| 5-192 | S | B |
| 5-193 | S | B |
| 5-194 | S | B |
| 5-195 | S | B |
| 5-196 | A | B |
| 5-197 | A | B |
| 5-198 | A | B |
| 5-199 | B | B |

TABLE 15-continued

| No. | Bubbles rank | Unmelted rank |
|---|---|---|
| 5-200 | B | B |
| 5-201 | E | B |
| 5-202 | D | C |
| 5-203 | D | C |
| 5-204 | D | C |
| 5-205 | D | C |
| 5-206 | D | C |
| 5-207 | D | C |
| 5-208 | C | C |
| 5-209 | C | C |
| 5-210 | C | C |
| 5-211 | C | C |
| 5-212 | C | C |
| 5-213 | B | C |
| 5-214 | B | C |
| 5-215 | B | C |
| 5-216 | S | C |
| 5-217 | S | C |
| 5-218 | S | C |
| 5-219 | S | C |
| 5-220 | S | C |
| 5-221 | S | C |
| 5-222 | S | C |
| 5-223 | S | C |
| 5-224 | S | C |
| 5-225 | S | C |
| 5-226 | S | C |
| 5-227 | S | C |
| 5-228 | A | C |
| 5-229 | A | C |
| 5-230 | A | C |
| 5-231 | B | C |
| 5-232 | B | C |
| 5-233 | D | C |
| 5-234 | D | C |
| 5-235 | D | C |
| 5-236 | D | C |
| 5-237 | D | C |
| 5-238 | D | C |
| 5-239 | C | C |
| 5-240 | C | C |
| 5-241 | C | C |
| 5-242 | C | C |
| 5-243 | C | C |
| 5-244 | C | C |
| 5-245 | B | C |
| 5-246 | B | C |
| 5-247 | B | C |
| 5-248 | S | C |
| 5-249 | S | C |
| 5-250 | S | C |
| 5-251 | S | C |
| 5-252 | S | C |
| 5-253 | S | C |
| 5-254 | S | C |
| 5-255 | S | C |
| 5-256 | S | C |
| 5-257 | S | C |
| 5-258 | S | C |
| 5-259 | S | C |
| 5-260 | A | C |
| 5-261 | A | C |
| 5-262 | A | C |
| 5-263 | A | C |
| 5-264 | B | C |
| 5-265 | B | C |
| 5-266 | D | C |
| 5-267 | D | C |
| 5-268 | D | C |
| 5-269 | D | C |
| 5-270 | D | C |
| 5-271 | C | C |
| 5-272 | C | C |
| 5-273 | C | C |
| 5-274 | C | C |
| 5-275 | C | C |
| 5-276 | C | C |
| 5-277 | C | C |

TABLE 15-continued

| No. | Bubbles rank | Unmelted rank |
|---|---|---|
| 5-278 | B | C |
| 5-279 | B | C |
| 5-280 | B | C |
| 5-281 | S | C |
| 5-282 | S | C |
| 5-283 | S | C |
| 5-284 | S | C |
| 5-285 | S | C |
| 5-286 | S | C |
| 5-287 | S | C |
| 5-288 | S | C |
| 5-289 | S | C |
| 5-290 | S | C |
| 5-291 | S | C |
| 5-292 | S | C |
| 5-293 | S | C |
| 5-294 | A | C |
| 5-295 | A | C |
| 5-296 | A | C |
| 5-297 | A | C |
| 5-298 | B | C |
| 5-299 | B | C |
| 5-300 | D | C |
| 5-301 | D | C |
| 5-302 | D | C |
| 5-303 | D | C |
| 5-304 | D | C |
| 5-305 | D | C |
| 5-306 | C | C |
| 5-307 | C | C |
| 5-308 | C | C |
| 5-309 | C | C |
| 5-310 | C | C |
| 5-311 | C | C |
| 5-312 | C | C |
| 5-313 | C | C |
| 5-314 | B | C |
| 5-315 | B | C |
| 5-316 | B | C |
| 5-317 | S | C |
| 5-318 | S | C |
| 5-319 | S | C |
| 5-320 | S | C |
| 5-321 | S | C |
| 5-322 | S | C |
| 5-323 | S | C |
| 5-324 | S | C |
| 5-325 | S | C |
| 5-326 | S | C |
| 5-327 | S | C |
| 5-328 | S | C |
| 5-329 | S | C |
| 5-330 | S | C |
| 5-331 | S | C |
| 5-332 | A | C |
| 5-333 | A | C |
| 5-334 | A | C |
| 5-335 | A | C |
| 5-336 | A | C |
| 5-337 | B | C |
| 5-338 | B | C |
| 5-339 | B | C |
| Com. Ex. 5-1 | C | D |
| Com. Ex. 5-2 | C | D |
| Com. Ex. 5-3 | B | D |
| Com. Ex. 5-4 | C | D |
| Com. Ex. 5-5 | E | D |
| Com. Ex. 5-6 | G | S |
| Com. Ex. 5-7 | G | S |
| Com. Ex. 5-8 | G | S |
| Com. Ex. 5-9 | G | S |

TABLE 16

| No. | Bubbles rank | Unmelted rank |
|---|---|---|
| 6-1 | E | S |
| 6-2 | E | S |
| 6-3 | B | S |
| 6-4 | B | S |
| 6-5 | C | S |
| 6-6 | E | S |
| 6-7 | E | S |
| 6-8 | E | S |
| 6-9 | E | S |
| 6-10 | D | S |
| 6-11 | B | S |
| 6-12 | B | S |
| 6-13 | B | S |
| 6-14 | B | S |
| 6-15 | C | S |
| 6-16 | C | S |
| 6-17 | D | S |
| 6-18 | D | S |
| 6-19 | D | S |
| 6-20 | D | S |
| 6-21 | C | S |
| 6-22 | A | S |
| 6-23 | A | S |
| 6-24 | A | S |
| 6-25 | A | S |
| 6-26 | B | S |
| 6-27 | B | S |
| 6-28 | D | S |
| 6-29 | D | S |
| 6-30 | D | S |
| 6-31 | D | S |
| 6-32 | D | S |
| 6-33 | D | S |
| 6-34 | C | S |
| 6-35 | C | S |
| 6-36 | A | S |
| 6-37 | A | S |
| 6-38 | S | S |
| 6-39 | S | S |
| 6-40 | S | S |
| 6-41 | A | S |
| 6-42 | A | S |
| 6-43 | B | S |
| 6-44 | B | S |
| 6-45 | D | S |
| 6-46 | D | S |
| 6-47 | D | S |
| 6-48 | D | S |
| 6-49 | D | S |
| 6-50 | D | S |
| 6-51 | A | S |
| 6-52 | S | S |
| 6-53 | S | S |
| 6-54 | S | S |
| 6-55 | S | S |
| 6-56 | A | S |
| 6-57 | A | S |
| 6-58 | B | S |
| 6-59 | B | S |
| 6-60 | D | S |
| 6-61 | D | S |
| 6-62 | D | S |
| 6-63 | D | S |
| 6-64 | D | S |
| 6-65 | D | S |
| 6-66 | D | S |
| 6-67 | D | S |
| 6-68 | C | S |
| 6-69 | B | S |
| 6-70 | S | S |
| 6-71 | S | S |
| 6-72 | S | S |
| 6-73 | S | S |
| 6-74 | S | S |
| 6-75 | A | A |
| 6-76 | B | A |
| 6-77 | B | A |
| 6-78 | D | S |

TABLE 16-continued

| No. | Bubbles rank | Unmelted rank |
|---|---|---|
| 6-79 | D | S |
| 6-80 | D | S |
| 6-81 | D | S |
| 6-82 | D | S |
| 6-83 | D | S |
| 6-84 | D | S |
| 6-85 | C | S |
| 6-86 | B | S |
| 6-87 | S | S |
| 6-88 | S | S |
| 6-89 | S | S |
| 6-90 | S | S |
| 6-91 | S | S |
| 6-92 | S | A |
| 6-93 | S | A |
| 6-94 | A | A |
| 6-95 | A | A |
| 6-96 | B | A |
| 6-97 | B | A |
| 6-98 | B | A |
| 6-99 | B | A |
| 6-100 | D | B |
| 6-101 | D | B |
| 6-102 | D | B |
| 6-103 | D | B |
| 6-104 | D | B |
| 6-105 | D | B |
| 6-106 | D | B |
| 6-107 | C | B |
| 6-108 | B | B |
| 6-109 | B | B |
| 6-110 | S | B |
| 6-111 | S | B |
| 6-112 | S | B |
| 6-113 | S | B |
| 6-114 | S | B |
| 6-115 | S | B |
| 6-116 | S | B |
| 6-117 | S | B |
| 6-118 | S | B |
| 6-119 | A | B |
| 6-120 | A | B |
| 6-121 | B | B |
| 6-122 | B | B |
| 6-123 | D | B |
| 6-124 | D | B |
| 6-125 | D | B |
| 6-126 | D | B |
| 6-127 | D | B |
| 6-128 | D | B |
| 6-129 | D | B |
| 6-130 | C | B |
| 6-131 | C | B |
| 6-132 | B | B |
| 6-133 | B | B |
| 6-134 | S | B |
| 6-135 | S | B |
| 6-136 | S | B |
| 6-137 | S | B |
| 6-138 | S | B |
| 6-139 | S | B |
| 6-140 | S | B |
| 6-141 | S | B |
| 6-142 | S | B |
| 6-143 | A | B |
| 6-144 | A | B |
| 6-145 | B | B |
| 6-146 | B | B |
| 6-147 | B | B |
| 6-148 | D | B |
| 6-149 | D | B |
| 6-150 | D | B |
| 6-151 | D | B |
| 6-152 | D | B |
| 6-153 | C | B |
| 6-154 | C | B |
| 6-155 | C | B |
| 6-156 | C | B |

TABLE 16-continued

| No. | Bubbles rank | Unmelted rank |
|---|---|---|
| 6-157 | B | B |
| 6-158 | B | B |
| 6-159 | S | B |
| 6-160 | S | B |
| 6-161 | S | B |
| 6-162 | S | B |
| 6-163 | S | B |
| 6-164 | S | B |
| 6-165 | S | B |
| 6-166 | S | B |
| 6-167 | S | B |
| 6-168 | A | B |
| 6-169 | A | B |
| 6-170 | A | B |
| 6-171 | B | B |
| 6-172 | B | B |
| 6-173 | D | B |
| 6-174 | D | B |
| 6-175 | D | B |
| 6-176 | D | B |
| 6-177 | D | B |
| 6-178 | D | B |
| 6-179 | C | B |
| 6-180 | C | B |
| 6-181 | C | B |
| 6-182 | C | B |
| 6-183 | B | B |
| 6-184 | B | B |
| 6-185 | B | B |
| 6-186 | S | B |
| 6-187 | S | B |
| 6-188 | S | B |
| 6-189 | S | B |
| 6-190 | S | B |
| 6-191 | S | B |
| 6-192 | S | B |
| 6-193 | S | B |
| 6-194 | S | B |
| 6-195 | S | B |
| 6-196 | A | B |
| 6-197 | A | B |
| 6-198 | A | B |
| 6-199 | B | B |
| 6-200 | B | B |
| 6-201 | E | B |
| 6-202 | D | C |
| 6-203 | D | C |
| 6-204 | D | C |
| 6-205 | D | C |
| 6-206 | D | C |
| 6-207 | D | C |
| 6-208 | C | C |
| 6-209 | C | C |
| 6-210 | C | C |
| 6-211 | C | C |
| 6-212 | C | C |
| 6-213 | B | C |
| 6-214 | B | C |
| 6-215 | B | C |
| 6-216 | S | C |
| 6-217 | S | C |
| 6-218 | S | C |
| 6-219 | S | C |
| 6-220 | S | C |
| 6-221 | S | C |
| 6-222 | S | C |
| 6-223 | S | C |
| 6-224 | S | C |
| 6-225 | S | C |
| 6-226 | S | C |
| 6-227 | S | C |
| 6-228 | A | C |
| 6-229 | A | C |
| 6-230 | A | C |
| 6-231 | B | C |
| 6-232 | B | C |
| 6-233 | D | C |
| 6-234 | D | C |

TABLE 16-continued

| No. | Bubbles rank | Unmelted rank |
|---|---|---|
| 6-235 | D | C |
| 6-236 | D | C |
| 6-237 | D | C |
| 6-238 | D | C |
| 6-239 | C | C |
| 6-240 | C | C |
| 6-241 | C | C |
| 6-242 | C | C |
| 6-243 | C | C |
| 6-244 | C | C |
| 6-245 | B | C |
| 6-246 | B | C |
| 6-247 | B | C |
| 6-248 | S | C |
| 6-249 | S | C |
| 6-250 | S | C |
| 6-251 | S | C |
| 6-252 | S | C |
| 6-253 | S | C |
| 6-254 | S | C |
| 6-255 | S | C |
| 6-256 | S | C |
| 6-257 | S | C |
| 6-258 | S | C |
| 6-259 | S | C |
| 6-260 | A | C |
| 6-261 | A | C |
| 6-262 | A | C |
| 6-263 | A | C |
| 6-264 | B | C |
| 6-265 | B | C |
| 6-266 | D | C |
| 6-267 | D | C |
| 6-268 | D | C |
| 6-269 | D | C |
| 6-270 | D | C |
| 6-271 | C | C |
| 6-272 | C | C |
| 6-273 | C | C |
| 6-274 | C | C |
| 6-275 | C | C |
| 6-276 | C | C |
| 6-277 | C | C |
| 6-278 | B | C |
| 6-279 | B | C |
| 6-280 | B | C |
| 6-281 | S | C |
| 6-282 | S | C |
| 6-283 | S | C |
| 6-284 | S | C |
| 6-285 | S | C |
| 6-286 | S | C |
| 6-287 | S | C |
| 6-288 | S | C |
| 6-289 | S | C |
| 6-290 | S | C |
| 6-291 | S | C |
| 6-292 | S | C |
| 6-293 | S | C |
| 6-294 | A | C |
| 6-295 | A | C |
| 6-296 | A | C |
| 6-297 | A | C |
| 6-298 | B | C |
| 6-299 | B | C |
| 6-300 | D | C |
| 6-301 | D | C |
| 6-302 | D | C |
| 6-303 | D | C |
| 6-304 | D | C |
| 6-305 | D | C |
| 6-306 | C | C |
| 6-307 | C | C |
| 6-308 | C | C |
| 6-309 | C | C |
| 6-310 | C | C |
| 6-311 | C | C |
| 6-312 | C | C |

TABLE 16-continued

| No. | Bubbles rank | Unmelted rank |
|---|---|---|
| 6-313 | C | C |
| 6-314 | B | C |
| 6-315 | B | C |
| 6-316 | B | C |
| 6-317 | S | C |
| 6-318 | S | C |
| 6-319 | S | C |
| 6-320 | S | C |
| 6-321 | S | C |
| 6-322 | S | C |
| 6-323 | S | C |
| 6-324 | S | C |
| 6-325 | S | C |
| 6-326 | S | C |
| 6-327 | S | C |
| 6-328 | S | C |
| 6-329 | S | C |
| 6-330 | S | C |
| 6-331 | S | C |
| 6-332 | A | C |
| 6-333 | A | C |
| 6-334 | A | C |
| 6-335 | A | C |
| 6-336 | A | C |
| 6-337 | B | C |
| 6-338 | B | C |
| 6-339 | B | C |
| Com. Ex. 6-1 | C | D |
| Com. Ex. 6-2 | C | D |
| Com. Ex. 6-3 | B | D |
| Com. Ex. 6-4 | C | D |
| Com. Ex. 6-5 | E | D |
| Com. Ex. 6-6 | G | S |
| Com. Ex. 6-7 | G | S |
| Com. Ex. 6-8 | G | S |
| Com. Ex. 6-9 | G | S |

TABLE 17

| No. | Bubbles rank | Unmelted rank |
|---|---|---|
| 7-1 | E | S |
| 7-2 | E | S |
| 7-3 | B | S |
| 7-4 | B | S |
| 7-5 | C | S |
| 7-6 | E | S |
| 7-7 | E | S |
| 7-8 | E | S |
| 7-9 | E | S |
| 7-10 | D | S |
| 7-11 | B | S |
| 7-12 | B | S |
| 7-13 | B | S |
| 7-14 | B | S |
| 7-15 | C | S |
| 7-16 | C | S |
| 7-17 | D | S |
| 7-18 | D | S |
| 7-19 | D | S |
| 7-20 | D | S |
| 7-21 | C | S |
| 7-22 | A | S |
| 7-23 | A | S |
| 7-24 | A | S |
| 7-25 | A | S |
| 7-26 | B | S |
| 7-27 | B | S |
| 7-28 | D | S |
| 7-29 | D | S |
| 7-30 | D | S |
| 7-31 | D | S |
| 7-32 | D | S |
| 7-33 | D | S |
| 7-34 | C | S |

TABLE 17-continued

| No. | Bubbles rank | Unmelted rank |
|---|---|---|
| 7-35 | C | S |
| 7-36 | A | S |
| 7-37 | A | S |
| 7-38 | S | S |
| 7-39 | S | S |
| 7-40 | S | S |
| 7-41 | A | S |
| 7-42 | A | S |
| 7-43 | B | S |
| 7-44 | B | S |
| 7-45 | D | S |
| 7-46 | D | S |
| 7-47 | D | S |
| 7-48 | D | S |
| 7-49 | D | S |
| 7-50 | D | S |
| 7-51 | A | S |
| 7-52 | S | S |
| 7-53 | S | S |
| 7-54 | S | S |
| 7-55 | S | S |
| 7-56 | A | S |
| 7-57 | A | S |
| 7-58 | B | S |
| 7-59 | B | S |
| 7-60 | D | S |
| 7-61 | D | S |
| 7-62 | D | S |
| 7-63 | D | S |
| 7-64 | D | S |
| 7-65 | D | S |
| 7-66 | D | S |
| 7-67 | D | S |
| 7-68 | C | S |
| 7-69 | B | S |
| 7-70 | S | S |
| 7-71 | S | S |
| 7-72 | S | S |
| 7-73 | S | S |
| 7-74 | S | S |
| 7-75 | A | A |
| 7-76 | B | A |
| 7-77 | B | A |
| 7-78 | D | S |
| 7-79 | D | S |
| 7-80 | D | S |
| 7-81 | D | S |
| 7-82 | D | S |
| 7-83 | D | S |
| 7-84 | D | S |
| 7-85 | C | S |
| 7-86 | B | S |
| 7-87 | S | S |
| 7-88 | S | S |
| 7-89 | S | S |
| 7-90 | S | S |
| 7-91 | S | S |
| 7-92 | S | A |
| 7-93 | S | A |
| 7-94 | A | A |
| 7-95 | A | A |
| 7-96 | B | A |
| 7-97 | B | A |
| 7-98 | B | A |
| 7-99 | B | A |
| 7-100 | D | B |
| 7-101 | D | B |
| 7-102 | D | B |
| 7-103 | D | B |
| 7-104 | D | B |
| 7-105 | D | B |
| 7-106 | D | B |
| 7-107 | C | B |
| 7-108 | B | B |
| 7-109 | B | B |
| 7-110 | S | B |
| 7-111 | S | B |
| 7-112 | S | B |

TABLE 17-continued

| No. | Bubbles rank | Unmelted rank |
|---|---|---|
| 7-113 | S | B |
| 7-114 | S | B |
| 7-115 | S | B |
| 7-116 | S | B |
| 7-117 | S | B |
| 7-118 | S | B |
| 7-119 | A | B |
| 7-120 | A | B |
| 7-121 | B | B |
| 7-122 | B | B |
| 7-123 | D | B |
| 7-124 | D | B |
| 7-125 | D | B |
| 7-126 | D | B |
| 7-127 | D | B |
| 7-128 | D | B |
| 7-129 | D | B |
| 7-130 | C | B |
| 7-131 | C | B |
| 7-132 | B | B |
| 7-133 | B | B |
| 7-134 | S | B |
| 7-135 | S | B |
| 7-136 | S | B |
| 7-137 | S | B |
| 7-138 | S | B |
| 7-139 | S | B |
| 7-140 | S | B |
| 7-141 | S | B |
| 7-142 | S | B |
| 7-143 | A | B |
| 7-144 | A | B |
| 7-145 | B | B |
| 7-146 | B | B |
| 7-147 | B | B |
| 7-148 | D | B |
| 7-149 | D | B |
| 7-150 | D | B |
| 7-151 | D | B |
| 7-152 | D | B |
| 7-153 | C | B |
| 7-154 | C | B |
| 7-155 | C | B |
| 7-156 | C | B |
| 7-157 | B | B |
| 7-158 | B | B |
| 7-159 | S | B |
| 7-160 | S | B |
| 7-161 | S | B |
| 7-162 | S | B |
| 7-163 | S | B |
| 7-164 | S | B |
| 7-165 | S | B |
| 7-166 | S | B |
| 7-167 | S | B |
| 7-168 | A | B |
| 7-169 | A | B |
| 7-170 | A | B |
| 7-171 | B | B |
| 7-172 | B | B |
| 7-173 | D | B |
| 7-174 | D | B |
| 7-175 | D | B |
| 7-176 | D | B |
| 7-177 | D | B |
| 7-178 | D | B |
| 7-179 | C | B |
| 7-180 | C | B |
| 7-181 | C | B |
| 7-182 | C | B |
| 7-183 | B | B |
| 7-184 | B | B |
| 7-185 | B | B |
| 7-186 | S | B |
| 7-187 | S | B |
| 7-188 | S | B |
| 7-189 | S | B |
| 7-190 | S | B |

TABLE 17-continued

| No. | Bubbles rank | Unmelted rank |
|---|---|---|
| 7-191 | S | B |
| 7-192 | S | B |
| 7-193 | S | B |
| 7-194 | S | B |
| 7-195 | S | B |
| 7-196 | A | B |
| 7-197 | A | B |
| 7-198 | A | B |
| 7-199 | B | B |
| 7-200 | B | B |
| 7-201 | E | B |
| 7-202 | D | C |
| 7-203 | D | C |
| 7-204 | D | C |
| 7-205 | D | C |
| 7-206 | D | C |
| 7-207 | D | C |
| 7-208 | C | C |
| 7-209 | C | C |
| 7-210 | C | C |
| 7-211 | C | C |
| 7-212 | C | C |
| 7-213 | B | C |
| 7-214 | B | C |
| 7-215 | B | C |
| 7-216 | S | C |
| 7-217 | S | C |
| 7-218 | S | C |
| 7-219 | S | C |
| 7-220 | S | C |
| 7-221 | S | C |
| 7-222 | S | C |
| 7-223 | S | C |
| 7-224 | S | C |
| 7-225 | S | C |
| 7-226 | S | C |
| 7-227 | S | C |
| 7-228 | A | C |
| 7-229 | A | C |
| 7-230 | A | C |
| 7-231 | B | C |
| 7-232 | B | C |
| 7-233 | D | C |
| 7-234 | D | C |
| 7-235 | D | C |
| 7-236 | D | C |
| 7-237 | D | C |
| 7-238 | D | C |
| 7-239 | C | C |
| 7-240 | C | C |
| 7-241 | C | C |
| 7-242 | C | C |
| 7-243 | C | C |
| 7-244 | C | C |
| 7-245 | B | C |
| 7-246 | B | C |
| 7-247 | B | C |
| 7-248 | S | C |
| 7-249 | S | C |
| 7-250 | S | C |
| 7-251 | S | C |
| 7-252 | S | C |
| 7-253 | S | C |
| 7-254 | S | C |
| 7-255 | S | C |
| 7-256 | S | C |
| 7-257 | S | C |
| 7-258 | S | C |
| 7-259 | S | C |
| 7-260 | A | C |
| 7-261 | A | C |
| 7-262 | A | C |
| 7-263 | A | C |
| 7-264 | B | C |
| 7-265 | B | C |
| 7-266 | D | C |
| 7-267 | D | C |
| 7-268 | D | C |

TABLE 17-continued

| No. | Bubbles rank | Unmelted rank |
|---|---|---|
| 7-269 | D | C |
| 7-270 | D | C |
| 7-271 | C | C |
| 7-272 | C | C |
| 7-273 | C | C |
| 7-274 | C | C |
| 7-275 | C | C |
| 7-276 | C | C |
| 7-277 | C | C |
| 7-278 | B | C |
| 7-279 | B | C |
| 7-280 | B | C |
| 7-281 | S | C |
| 7-282 | S | C |
| 7-283 | S | C |
| 7-284 | S | C |
| 7-285 | S | C |
| 7-286 | S | C |
| 7-287 | S | C |
| 7-288 | S | C |
| 7-289 | S | C |
| 7-290 | S | C |
| 7-291 | S | C |
| 7-292 | S | C |
| 7-293 | S | C |
| 7-294 | A | C |
| 7-295 | A | C |
| 7-296 | A | C |
| 7-297 | A | C |
| 7-298 | B | C |
| 7-299 | B | C |
| 7-300 | D | C |
| 7-301 | D | C |
| 7-302 | D | C |
| 7-303 | D | C |
| 7-304 | D | C |
| 7-305 | D | C |
| 7-306 | C | C |
| 7-307 | C | C |
| 7-308 | C | C |
| 7-309 | C | C |
| 7-310 | C | C |
| 7-311 | C | C |
| 7-312 | C | C |
| 7-313 | C | C |
| 7-314 | B | C |
| 7-315 | B | C |
| 7-316 | B | C |
| 7-317 | S | C |
| 7-318 | S | C |
| 7-319 | S | C |
| 7-320 | S | C |
| 7-321 | S | C |
| 7-322 | S | C |
| 7-323 | S | C |
| 7-324 | S | C |
| 7-325 | S | C |
| 7-326 | S | C |
| 7-327 | S | C |
| 7-328 | S | C |
| 7-329 | S | C |
| 7-330 | S | C |
| 7-331 | S | C |
| 7-332 | A | C |
| 7-333 | A | C |
| 7-334 | A | C |
| 7-335 | A | C |
| 7-336 | A | C |
| 7-337 | B | C |
| 7-338 | B | C |
| 7-339 | B | C |
| Com. Ex. 7-1 | C | D |
| Com. Ex. 7-2 | C | D |
| Com. Ex. 7-3 | B | D |
| Com. Ex. 7-4 | C | D |
| Com. Ex. 7-4 | E | D |
| Com. Ex. 7-5 | G | S |
| Com. Ex. 7-6 | G | S |

TABLE 17-continued

| No. | Bubbles rank | Unmelted rank |
|---|---|---|
| Com. Ex. 7-7 | G | S |
| Com. Ex. 7-8 | G | S |

The surface of each glass obtained was polished flat and smooth. The interior of the glass was magnified and observed (40 to 100-fold) from the polished surface with an optical microscope, and the number of residual bubbles was counted. The number of residual bubbles counted was divided by the mass of the glass corresponding to the magnified area observed to obtain the density of residual bubbles.

Glasses with 0 residual bubbles/kg were ranked S. Glasses with 2 or fewer residual bubbles/kg were ranked A. Glasses with 3 to 10 residual bubbles/kg were ranked B. Glasses with 11 to 20 residual bubbles/kg were ranked C. Glasses with 21 to 40 residual bubbles/kg were ranked D. Glasses with 41 to 60 residual bubbles/kg were ranked E. And glasses with 61 or more residual bubbles/kg were ranked G. The corresponding rankings of the various glasses are given in Tables 11 to 17.

Glasses containing neither unmelted nor foreign matter were ranked S. Glasses containing 2 pieces/kg or less of foreign matter, including unmelted material, were ranked A. Glasses containing 3-10 pieces/kg or more of foreign matter were ranked B. Glasses containing 11-20 pieces/kg or more of foreign matter were ranked C. And glasses containing 21 pieces/kg or more of foreign matter were ranked D. The corresponding ranks of the various glasses are given in Tables 11 to 17. Rank D indicated unsuitability as a glass material for an information-recording medium substrate.

The size of the residual bubbles in each of the various glasses prepared from Nos. 1-1 to 7-339 shown in Tables 11 to 17 was 0.3 mm or less.

No crystals or unmelted starting materials were found in the glasses thus obtained.

Based on the results given in Table 9 and Tables 10 to 17, the relation between the quantities of Sn and Ce added and the density of residual bubbles was determined. The quantities of Sn and Ce added are adjusted so that the density of residual bubbles is at or below a desired value, and glasses are produced. It is thus possible to suppress the density of residual bubbles to a desired level.

Next, glasses were prepared by the same method as above, with the exceptions that the temperature of glass melts that had been maintained for 15 hours at 1,400 to 1,600° C. was lowered, the glass melts were maintained for 1 to 2 hours at 1,200 to 1,400° C., and molding was conducted. The density and size of the residual bubbles were examined, and the presence of crystals and unmelted starting materials was checked. This yielded the same results as above. When the period of maintenance at 1,400 to 1,600° C. is denoted as TH and the period of maintenance at 1,200 to 1,400° C. is denoted as TL, the ratio of TL/TH for all of the above-described methods is desirably 0.5 or lower, preferably 0.2 or lower. By increasing TH relative to TL, discharge of gas in the glass to the exterior of the glass is facilitated. However, to enhance the incorporating effect of gas in the glass by Ce, TL/TH is desirably greater than 0.01, preferably greater than 0.02, more preferably greater than 0.03, and still more preferably, greater than 0.04.

To enhance the bubble eliminating effects of Sn and Ce, the temperature difference in the course of decreasing the temperature from the 1,400 to 1,600° C. range to the 1,200 to 1,400° C. range is desirably 30° C. or greater, preferably 50° C. or greater, more preferably 80° C. or greater, still more preferably 100° C. or greater, and yet more preferably, 150° C. or greater. The upper limit of the temperature difference is 400° C.

The viscosity at 1,400° C. of each of the glasses of Nos. 1-1 to 7-339 in Tables 11 to 17 was measured by the viscosity measuring method employing a coaxial double cylinder rotating viscometer of JIS Standard Z8803.

The viscosity at 1,400° C. of each of the glasses of No. 1-1 to No. 1-339 in Tables 11 to 17 is 300 dPa·s. The viscosity at 1,400° C. of each of the glasses of No. 2-1 to No. 2-339 is 250 dPa·s. The viscosity at 1,400° C. of each of the glasses of No. 3-1 to No. 3-339 is 400 dPa·s. The viscosity at 1,400° C. of each of the glasses of No. 4-1 to No. 4-339 is 350 dPa·s. The viscosity at 1,400° C. of each of the glasses of No. 5-1 to No. 5-339 is 300 dPa·s. The viscosity at 1,400° C. of each of the glasses of No. 6-1 to No. 6-339 is 320 dPa·s. And the viscosity at 1,400° C. of each of the glasses of No. 7-1 to No. 7-339 is 320 dPa·s.

Among the various glasses of Nos. 1-1 to 7-339 in Tables 11 to 17, the Young's modulus of the various glasses of Nos. 1-1 to 1-339 is 81 GPa or higher, and that of Nos. 5-1 to 5-339 is 84 GPa or higher. In each of the above glasses, when neither Sn nor Ce is added, or when Sb is added without adding Sn and Ce, it is possible to obtain a glass with a higher Young's modulus than when Sn and Ce were added. For each of the glasses of Nos. 2-1 to 2-339, Nos. 3-1 to 3-339, Nos. 4-1 to 4-339, Nos. 6-1 to 6-339, and Nos. 7-1 to 7-339, as well, it is possible to increase the Young's modulus by adding Sn and Ce. Increasing the Young's modulus makes it possible to achieve good fluttering resistance during high-speed rotation in magnetic recording media equipped with substrates manufactured from these glasses.

When substrates fabricated using the various glasses shown in Tables 11 to 17 were irradiated with UV light and observed in a darkroom, they were visually observed to emit blue fluorescence. This fluorescence could be used to determine whether or not foreign matter, such as residual abrasive or minute dust particles, had adhered to the substrate surface. The presence of blue fluorescence due to Ce could also be used to determine whether heterogeneous glass substrates in which no Ce had been added had been mixed in with the glass substrates to which Ce had been added.

Each of the glasses to which Ce was added was processed into a flat sheet 1 mm in thickness with two optically polished surfaces. Light was directed vertically into the optically polished surfaces. The spectral transmittance was measured, and the wavelength λ(lambda)80 at which the external transmittance become 80 percent (including the loss due to reflection at the glass surface) and the wavelength λ(lambda)5 at which it became 5 percent were measured. The following are measurement results for some of the glasses. Glass No. 1-23 (quantity of $SnO_2$ added: 0.3 mass percent; quantity of $CeO_2$ added: 0.2 mass percent) had a λ80 of 354 nm and a λ5 of 327 nm. Glass No. 1-38 (quantity of $SnO_2$ added: 0.5 mass percent; quantity of $CeO_2$ added: 0.3 mass percent) had a λ80 of 360 nm and a λ5 of 335 nm. Glass No. 1-71 (quantity of $SnO_2$ added: 0.7 mass percent; quantity of $CeO_2$ added: 0.5 mass percent) had a λ80 of 366 nm and a λ5 of 342 nm. This shows that as the quantity of Ce added was increased, the absorption by the glass in the short wavelength range tended to increase. Along with this tendency, the fluorescent intensity of the glass when irradiated with UV light also increased. The addition of Ce is desirable to make it possible to distinguish between glasses based on the fluorescence emitted when irradiated with UV light and to generate adequately strong fluorescence to permit the detection of foreign matter on the glass surface. Accordingly, an examination of the relation between λ80, λ5, and the fluorescent intensity suited to these applications revealed that a λ80 of 320 nm or greater provided adequate fluorescent intensity. On this basis, the quantity of Ce added is desirably determined to yield a λ80 of 320 nm or greater. The quantity of Ce added is preferably determined to yield a λ80 of 330 nm or greater. The quantity of Ce added is more preferably determined to yield a λ80 of 350 nm or greater. And the quantity of Ce added is still more preferably determined to yield a λ80 of 355 nm or greater. Similarly, for λ5, the quantity of Ce added is desirably determined to yield a λ5 of 300 nm or greater. The quantity of Ce added is preferably determined to yield a λ5 of 310 nm or greater. The quantity of Ce added is more preferably determined to yield a λ5 of 320 nm or greater. And the quantity of Ce added is still more preferably determined to yield a λ5 of 330 nm or greater.

From the perspective of ready distinction and detection based on fluorescence, the quantity of $CeO_2$ added is desirably 0.1 mass percent or greater, preferably 0.2 mass percent or greater, and more preferably, 0.3 mass percent or greater. For distinction and detection by fluorescence, when λ80 or the quantity of $CeO_2$ added is outside the above-stated range, it is impossible to achieve an adequate fluorescent intensity. This renders distinction and detection difficult.

(2) Molding of the glass

Disk-shaped substrate blanks were fabricated from the above glasses by methods A to C below. Substrate blanks were fabricated by the same four methods of A to D as in Embodiment A from the glasses of Nos. 1-1 to 1-339 and Nos. 2-1 to 2-339. For the other glasses, substrate blanks were fabricated by method A. For the glasses of Nos. 1-1 to 1-339 and Nos. 2-1 to 2-339, the results of residual bubbles and etching rates given in the tables are the results for the substrate blanks fabricated by method A. The same holds true for the results for the substrate blanks fabricated by methods B to D.

(3) Substrate Fabrication

Glass substrates were fabricated by the same method as in Embodiment A from substrate blanks obtained by the various above methods.

Portions of the glass substrates that had been fabricated were subjected to a masking treatment to protect the portions from etching. The glass substrates in this state were immersed in a 0.5 volume percent hydrogenfluosilicic acid aqueous solution maintained at 50° C. or a 1 mass percent potassium hydroxide aqueous solution maintained at 50° C. for a prescribed period. Subsequently, the glass substrates were withdrawn from the various aqueous solutions. The difference (etching difference) between the masked portions and the portions without masks was measured, and then divided by the immersion time to calculate the amount of etching (etching rate) per unit time. The acid etching rates and alkali etching rates obtained are given in the tables, respectively. Etching rates were measured for the glasses of Nos. 1-1 to 1-339 and Nos. 2-1 to 2-339. Each of the glasses of Nos. 1-1 to 1-339 and Nos. 2-1 to 2-339 had an acid etching rate of 3.0 nm/minute or less and an alkali etching rate of 0.1 nm/minute or less. This indicates good acid resistance and alkali resistance.

In the same manner as the various glasses of Nos. 1-1 to 1-339 and Nos. 2-1 to 2-339, the various glasses of Nos. 3-1 to 3-339, Nos. 4-1 to 4-339, and Nos. 6-1 to 6-339 also exhibited acid etching rates of 3.0 nm/minute or less and alkali etching rates of 0.1 nm/minute or less, indicating good acid resistance and alkali resistance.

Next, potassium nitrate (60 mass percent) and sodium nitrate (40 mass percent) were mixed and heated to 375° C. to prepare a chemical strengthening salt. Glass substrates that had been cleaned and preheated to 300° C. were immersed for 3 hours in this salt to conduct a chemical strengthening treatment. This treatment caused lithium ions and sodium ions on the surface of the glass substrates to be replaced with sodium ions and potassium ions, respectively, in the chemical strengthening salt, thereby chemically strengthening the glass substrates. The thickness of the compressive stress layer formed in the surfaces of the glass substrates was about 100 to 200 micrometers. Following chemical strengthening, the glass substrates were rapidly cooled by immersion in a vat of water at 20° C. and maintained there for about 10 minutes.

Next, the rapidly cooled glass substrates were immersed in sulfuric acid that had been heated to about 40° C. and cleaned while applying ultrasound. Subsequently, the glass substrates were cleaned with a 0.5 percent (volume percent) hydrogenfluosilicic acid ($H_2SiF$) aqueous solution followed by a 1 mass percent potassium hydroxide aqueous solution. Through the process, a magnetic disk glass substrate 12 was manufactured.

The magnetic disk glass substrate was then examined. Atomic force microscopic (AFM) measurement (a 5×5 micrometer rectangular area was measured) of the surface roughness of the magnetic disk glass substrate revealed a maximum peak height (Rmax) of 1.5 nm and an arithmetic average roughness (Ra) of 0.15 nm. The surface was in a clean mirror-surface state, free of the presence of foreign material hindering magnetic head flying, and free of foreign matter causing thermal asperity impediments. No increase in the roughness of the substrate surface was observed following cleaning. Next, the bending strength was measured. The bending strength was obtained as the value of the load when the glass substrate was damaged when a load was applied to the glass substrate as shown in FIG. 2 using a bending strength measuring and testing device (Shimadzu Autograph DDS-2000). The bending strength obtained, at 24.15 kg, was satisfactory.

In the above description, acid cleaning and alkali cleaning were conducted after chemical strengthening, but it is also possible to conduct acid cleaning and alkali cleaning after the mirror-surface polishing step.

A magnetic disk 10 was fabricated using the glass substrate 12 that had been thus obtained, and tested in a hard disk drive. FIG. 1 shows a typical film configuration (cross-section) on substrate 12.

First, a film-forming device in which a vacuum had been drawn was employed to successively form adhesive layer 14 and soft magnetic layer 16 in an argon atmosphere by DC magnetron sputtering.

Adhesive layer 14 was formed as a 20 nm amorphous CrTi layer using a CrTi target. Soft magnetic layer 16 was formed as a 200 nm amorphous CoTaZr layer (Co: 88 atomic percent, Ta: 7 atomic percent, Zr: 5 atomic percent) using a CoTaZr target.

Magnetic disk 10, on which films up to soft magnetic layer 16 had been formed, was removed from the film-forming device. The surface roughness thereof was measured as set forth above, revealing a smooth mirror surface with an Rmax of 2.1 nm and an Ra of 0.20 nm. Measurement of the magnetic characteristics with a vibrating sample magnetometer (VSM) revealed a coercivity (Hc) of 2 Oersteds and a saturation magnetic flux density of 810 emu/cc. This indicated suitable soft magnetic characteristics.

Next, a single-wafer static opposed-type film-forming device was employed to successively form an underlayer 18, granular structure size reduction enhancing layer 20, granular structure ferromagnetic layer 32, magnetic coupling control layer 34, energy exchange control layer 36, and protective film 24 in an argon atmosphere. In the present embodiment, underlayer 18 had a two-layer structure comprised of a first layer and a second layer.

In this process, a layer 10 nm in thickness of amorphous NiTa (Ni: 40 atomic percent, Ta: 10 atomic percent) was first formed on the disk substrate as the first layer of underlayer 18, followed by the formation of a Ru layer 10 to 15 nm in thickness as the second layer.

Next, a nonmagnetic CoCr—$SiO_2$ target was employed to form size reduction enhancing layer 20 comprised of a 2 to 20 nm hcp crystalline structure. A CoCrPt—$SiO_2$ hard magnetic material target was then employed to form ferromagnetic layer 32 comprised of a 15 nm hcp crystalline structure. The composition of the target for fabricating ferromagnetic layer 32 was Co: 62 atomic percent; Cr: 10 atomic percent; Pt: 16 atomic percent, and $SiO_2$: 12 atomic percent. A magnetic coupling control layer 34 in the form of a Pd layer was then formed, and an energy exchange control layer 36 in the form of [CoB/Pd]n layers was formed.

CVD employing ethylene as the material gas was then used to form protective film 24 comprised of carbon hydride. The use of carbon hydride increased film hardness, making it possible to protect magnetic recording layer 22 from impact with the magnetic head.

Subsequently, lubricating layer 26 comprised of perfluoropolyether (PFPE) was formed by dip coating. Lubricating layer 26 was 1 nm in thickness. A vertical magnetic recording medium in the form of magnetic disk 10 suited to vertical magnetic recording methods was obtained by the above manufacturing process. The roughness of the surface obtained was measured in the same manner as above, revealing a smooth mirror surface with an Rmax of 2.2 nm and an Ra of 0.21 nm.

The magnetic disk 10 that had been obtained was loaded onto a 2.5-inch loading/unloading hard disk drive. The magnetic head mounted on the hard disk drive was a dynamic flying height (abbreviated as "DFH") magnetic head. The flying height of the magnetic head relative to the magnetic disk was 8 nm.

A recording and reproducing test was conducted at a recording density of 200 Gbits/inch$^2$ in the recording and reproducing region of the main surface of the magnetic disk using this hard disk drive, revealing good recording and reproducing characteristics. During the test, no crash faults or thermal asperity faults were generated.

Next, a load unload ("LUL" hereinafter) test was conducted with the hard disk drive.

The LUL test was conducted with 2.5-inch hard disk drive rotating at 5,400 rpm and a magnetic head with a flying height of 8 nm. The above-described magnetic head was employed. The shield element was comprised of NiFe alloy. The magnetic disk was loaded on the magnetic disk device, LUL operations were repeatedly conducted with the above magnetic head, and the LUL cycle durability was measured.

Following the LUL durability test, the surface of the magnetic disk and the surface of the magnetic head are examined visually and by optical microscopy to check for abnormalities such as scratches and grime. In the LUL durability test, a durability of 400,000 or more LUL cycles without failure is required, with a durability of 600,000 cycles or more being particularly desirable. In the use environment in which a hard disk drive (HDD) is normally employed, it is reported to take about 10 years of use to exceed 600,000 LUL cycles.

When the LUL test was implemented, magnetic disk 10 met the 600,000 cycle or more standard. Following the LUL test, magnetic disk 10 was removed and inspected, revealing no abnormalities such as scratches or grime. Any precipitation of alkali metal components was observed.

COMPARATIVE EXAMPLE B

Next, the 63 glasses of Comparative Examples 1-1 to 1-9, Comparative Examples 2-1 to 2-9, Comparative Examples 3-1 to 3-9, Comparative Examples 4-1 to 4-9, Comparative Examples 5-1 to 5-9, Comparative Examples 6-1 to 6-9, and Comparative Examples 7-1 to 7-9 shown in Tables 11 to 17 were fabricated. The glasses of the comparative examples were fabricated by the same procedure as in the embodiments.

Excess quantities of Sn oxide and Ce oxide were added as clarifying agents to the glasses of Comparative Examples 1-1 to 7-1, Comparative Examples 1-2 to 7-2, and Comparative Examples 1-3 to 7-3 shown in Tables 11 to 17.

Residual unmelted Sn oxide was observed in all of these glasses, rendering them unsuitable as glass substrate materials for information-recording media.

Sb alone was added as clarifying agent to the glasses of Comparative Examples 1-6 to 7-6 shown in Tables 11 to 17. Sn and an excess quantity of Sb were added as clarifying agents to the glasses of Comparative Examples 1-7 to 8-7. An excess quantity of Sn was added as clarifying agent to the glasses of Comparative Examples 1-8 to 8-8. And an excess quantity of Ce was added as clarifying agent to the glasses of Comparative Examples 1-9 to 8-9 shown in Tables 11 to 17.

The number of residual bubbles exceeded 100 bubbles/kg in all of these glasses. Localized pitting due to residual bubbles was also observed on the surface of glass substrates fabricated by the same methods as in the embodiments using these glasses. The impact resistance of the substrates was also poorer than that of the embodiments.

Figure 1:
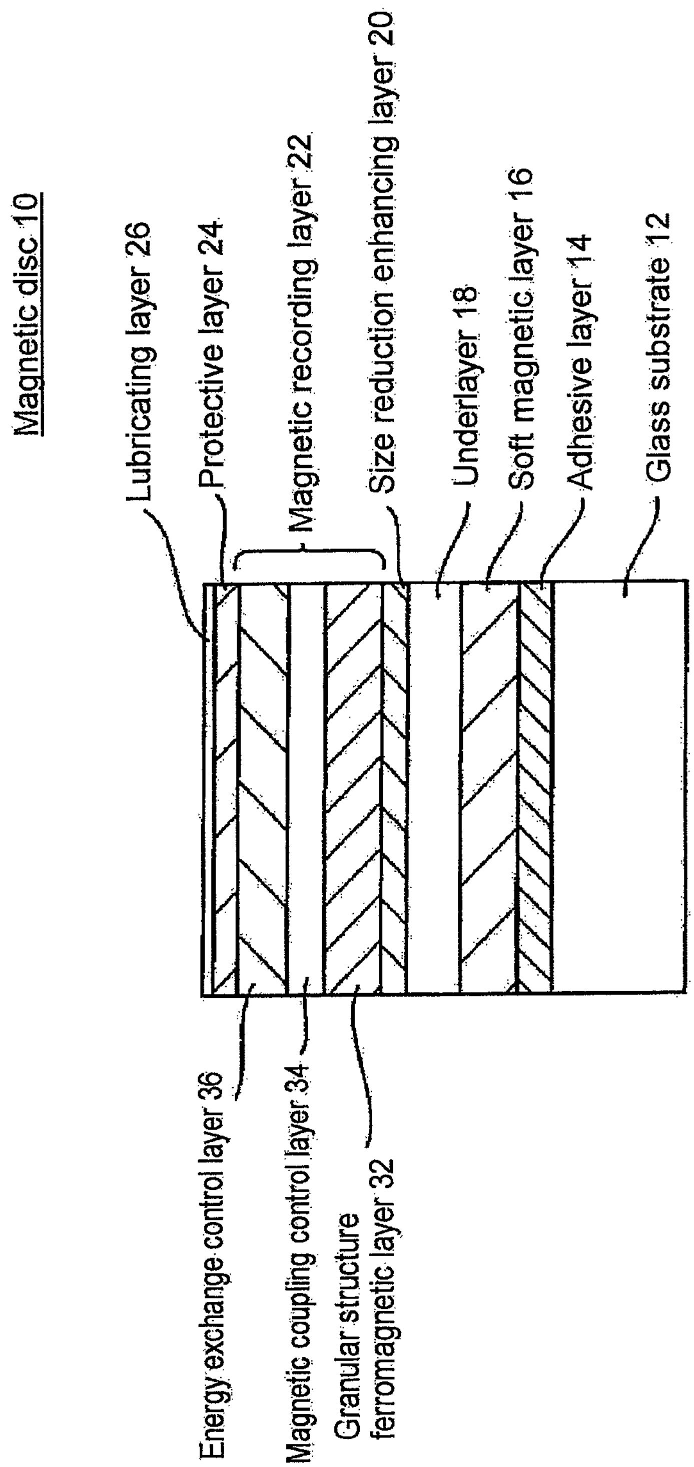
FIG. 1 A drawing showing an example of the configuration of a magnetic disk relating to an implementing mode of the present invention.
Figure 2:
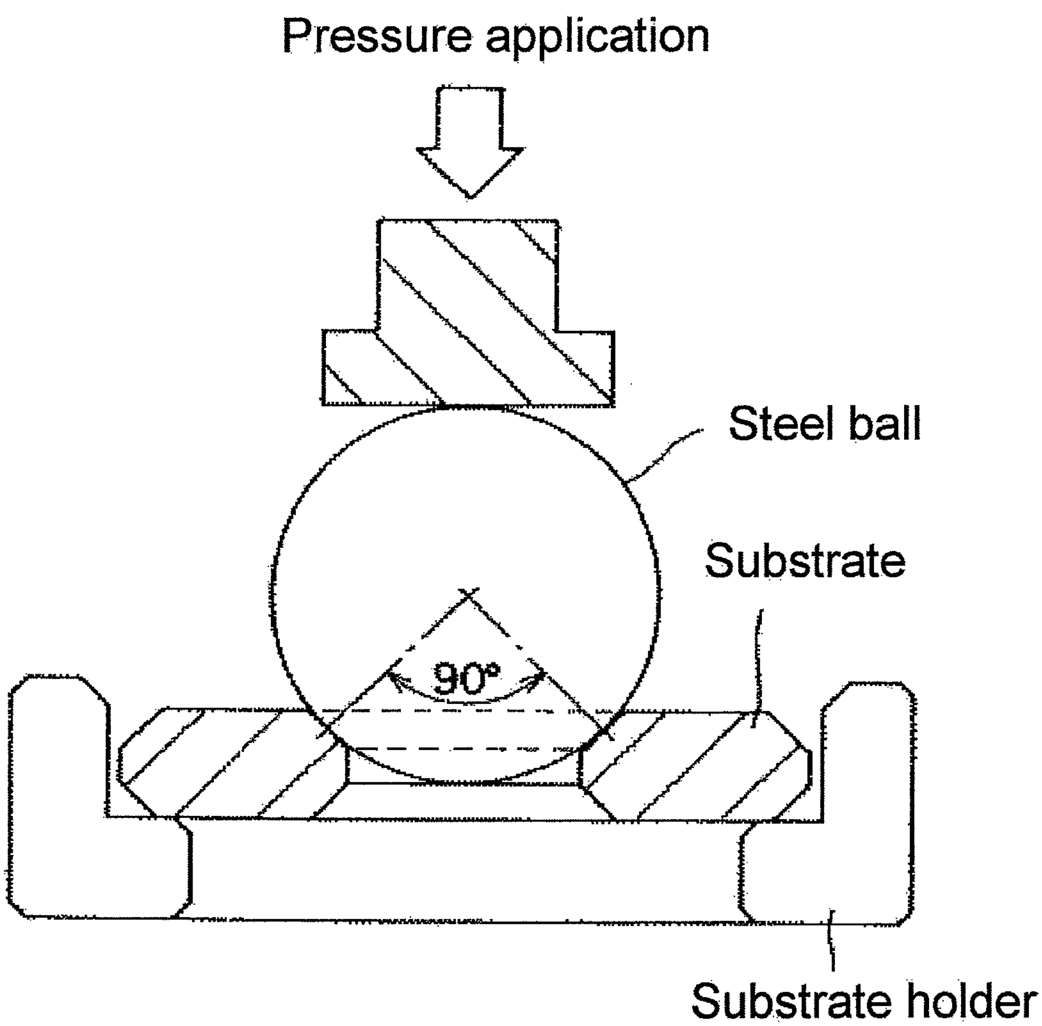
FIG. 2 A descriptive diagram of the method used to measure bending strength.

The invention claimed is:

1. A method for manufacturing a glass for a magnetic recording medium substrate comprised of an oxide glass, characterized by:

preparing a glass starting material to which Sn and Ce are added, comprising, as converted based on the oxide, denoted as molar percentages:

$SiO_2$ 60 to 75 percent,
$Al_2O_3$ 1 to 15 percent,
$Li_2O$ 5 to 10 percent,
$Na_2O$ 8 to 15 percent,
$P_2O_5$ 0 percent, and
$K_2O$ 0 to 5 percent, (wherein one or more of MgO, CaO, SrO and BaO is present and the total amount of MgO, CaO, SrO and BaO is in a range of 0.1 to 5% and a total content of $Li_2O$, $Na_2O$, and $K_2O$ is 25 percent or lower);

so as to permit obtaining a glass containing a total quantity of Sn oxide and Ce oxide of 0.5 mass percent to 1.5 mass percent based on the total amount of the glass components, wherein the ratio of the content of Sn oxide to the total content Sn oxide and Ce oxide (content of Sn oxide/(content of Sn oxide+content of Ce oxide)) is 0.45 to 0.85, having an Sb oxide content of 0 to 0.1 percent, and comprising no As or F;

melting the glass starting material;

clarifying the resulting glass melt; and molding the resulting glass melt, wherein the molded glass contains 2 pieces/kg or less of residual bubbles.

2. The method for manufacturing a glass for a magnetic recording medium substrate according to claim 1, wherein the glass melt obtained by preparing and melting the glass starting material is maintained at 1,400 to 1,600° C., the temperature is decreased, the glass melt is maintained at 1,200 to 1,400° C., and the glass melt is molded.

3. The method for manufacturing a glass for a magnetic recording medium substrate according to claim 1, wherein a viscosity of the glass melt at 1,400° C. is $10^3$ dPa·s or lower.

4. The method for manufacturing a glass for a magnetic recording medium substrate according to claim 1, wherein the glass melt is made to flow out to obtain glass melt gobs and the glass gobs are press molded.

5. The method for manufacturing a glass for a magnetic recording medium substrate according to claim 1, wherein the glass melt is molded into a sheet of glass by the float method.

6. The method for manufacturing a glass for a magnetic recording medium substrate according to claim 1, wherein the glass melt is molded into a sheet of glass by overflow down draw molding.

7. A method for manufacturing a magnetic recording medium substrate, comprising:

a step of preparing a glass by the method described in claim 1;

a step of mirror-surface polishing the glass; and following mirror-surface polishing, a cleaning step of cleaning with an acid and cleaning with an alkali.

8. A method for manufacturing the magnetic recording medium substrate according to claim 7, comprising a step of subjecting the glass to a chemical strengthening treatment between the mirror-surface polishing step and the cleaning step.

9. The method for manufacturing a glass for a magnetic recording medium substrate according to claim 1, wherein the glass starting material comprises 0.1 to 5 percent of MgO and CaO in total, 0 to 1 percent of ZnO, and 0.1 to 5 molar percent of $ZrO_2$, $TiO_2$, $La_2O_3$, $Nb_2O_5$, $Ta_2O_5$, and $HfO_2$ in total, wherein a ratio of the $ZrO_2$ content to the total content of $ZrO_2$, $TiO_2$, $La_2O_3$, $Nb_2O_5$, $Ta_2O_5$, and $HfO_2$ ($ZrO_2/(ZrO_2+TiO_2+La_2O_3,+Nb_2O_5+Ta_2O_5+HfO_2)$) is 0.9 to 1.

10. A method for manufacturing a magnetic recording medium substrate, comprising:

a step of preparing a glass by the method described in claim 4;

a step of mirror-surface polishing the glass; and following mirror-surface polishing, a cleaning step of cleaning with an acid and cleaning with an alkali.

11. A method for manufacturing a magnetic recording medium substrate, comprising:

a step of preparing a glass by the method described in claim 9;

a step of mirror-surface polishing the glass; and following mirror-surface polishing, a cleaning step of cleaning with an acid and cleaning with an alkali.

12. A method for manufacturing a magnetic recording medium substrate, comprising:

a step of preparing a glass by the method described in claim 1; and a step of mirror-surface polishing the glass.

13. A method for manufacturing a magnetic recording medium substrate, comprising:

a step of preparing a glass by the method described in claim 4;

a step of mirror-surface polishing the glass.

14. A method for manufacturing a magnetic recording medium substrate, comprising:

a step of preparing a glass by the method described in claim 5; and a step of mirror-surface polishing the glass.

15. A method for manufacturing a magnetic recording medium substrate, comprising:

a step of preparing a glass by the method described in claim 6; and a step of mirror-surface polishing the glass.

16. A method for manufacturing a magnetic recording medium substrate, comprising:

a step of preparing a glass by the method described in claim 9; and a step of mirror-surface polishing the glass.

17. A method for manufacturing a glass for a magnetic recording medium substrate comprised of an oxide glass, characterized by:

preparing a glass starting material to which Sn and Ce are added, comprising, as converted based on the oxide, denoted as molar percentages:

$SiO_2$ 60 to 75 percent, $Al_2O_3$ 1 to 15 percent, $Li_2O$ 5 to 10 percent, $Na_2O$ 8 to 15 percent, $P_2O_5$ 0 percent, and $K_2O$ 0 to 5 percent, (wherein one or more of MgO, CaO, SrO and BaO is present and the total amount of MgO, CaO, SrO and BaO is in a range of 0.1 to 5% and a total content of $Li_2O$, $Na_2O$, and $K_2O$ is 25 percent or lower);

so as to permit obtaining a glass containing a total quantity of Sn oxide and Ce oxide of 0.5 mass percent to 1.5 mass percent based on the total amount of the glass components, wherein the ratio of the content of Sn oxide to the total content Sn oxide and Ce oxide (content of Sn oxide/(content of Sn oxide+content of Ce oxide)) is 0.45 to 0.85, having an Sb oxide content of 0 to 0.1 percent, and comprising no As or F;

melting the glass starting material;

clarifying the resulting glass melt;

molding the resulting glass melt;

further processing the molded glass, and forming a magnetic layer on the further processed glass.

18. The method for manufacturing a magnetic recording medium according to claim 17, wherein the glass melt obtained by preparing and melting the glass starting material is maintained at 1,400 to 1,600° C., the temperature is decreased, the glass melt is maintained at 1,200 to 1,400° C., and the glass melt is molded.

19. The method for manufacturing a magnetic recording medium according to claim 17, wherein a viscosity of the glass melt at 1,400° C. is $10^3$ dPa·s or lower.

20. The method for manufacturing a magnetic recording medium according to claim 17, wherein the glass starting material comprises 0.1 to 5 percent of MgO and CaO in total, 0 to 1 percent of ZnO, and 0.1 to 5 molar percent of $ZrO_2$, $TiO_2$, $La_2O_3$, $Nb_2O_5$, $Ta_2O_5$, and $HfO_2$ in total, and wherein a ratio of the $ZrO_2$ content to the total content of $ZrO_2$, $TiO_2$, $La_2O_3$, $Nb_2O_5$, $Ta_2O_5$, and $HfO_2$ ($ZrO_2/(ZrO_2+TiO_2+La_2O_3,+Nb_2O_5+Ta_2O_5+HfO_2)$) is 0.9 to 1.

* * * * *